US012487936B1

(12) United States Patent
Favor et al.

(10) Patent No.: US 12,487,936 B1
(45) Date of Patent: *Dec. 2, 2025

(54) STORE-TO-LOAD FORWARDING CORRECTNESS CHECKS USING PHYSICAL ADDRESS PROXIES STORED IN LOAD QUEUE ENTRIES

(71) Applicant: Ventana Micro Systems Inc., Cupertino, CA (US)

(72) Inventors: John G Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,590

(22) Filed: Sep. 16, 2024

Related U.S. Application Data

(63) Continuation of application No. 17/747,513, filed on May 18, 2022, now Pat. No. 12,093,179, which is a continuation-in-part of application No. 17/370,009, filed on Jul. 8, 2021, now Pat. No. 11,481,332, and a continuation-in-part of application No. 17/351,946, filed on Jun. 18, 2021, now Pat. No. 11,397,686, and a continuation-in-part of application No. 17/351,927, filed on Jun. 18, 2021, now Pat. No. 11,416,406, said application No. 17/370,009 is a continuation-in-part of application No. 17/351,927, filed on Jun. 18, 2021, now Pat. No. 11,416,406, and a continuation-in-part (Continued)

(51) Int. Cl.
*G06F 12/08* (2016.01)
*G06F 12/0864* (2016.01)

(52) U.S. Cl.
CPC .. *G06F 12/0864* (2013.01); *G06F 2212/6032* (2013.04)

(58) Field of Classification Search
CPC .................................................. G06F 12/0864
See application file for complete search history.

(56) References Cited

U.S. PATENT DOCUMENTS 5,526,510 A 6/1996 Akkary et al.
5,742,831 A 4/1998 Creta
(Continued)

*Primary Examiner* — Jae U Yu
(74) *Attorney, Agent, or Firm* — E. Alan Davis; Gary Stanford; Huffman Law Group, PC

(57) ABSTRACT

A microprocessor includes a load/store unit that performs store-to-load forwarding, a PIPT L2 set-associative cache, a store queue having store entries, and a load queue having load entries. Each L2 entry is uniquely identified by a set index and a way. Each store/load entry holds, for an associated store/load instruction, a store/load physical address proxy (PAP) for a store/load physical memory line address (PMLA). The store/load PAP specifies the set index and the way of the L2 entry into which a cache line specified by the store/load PMLA is allocated. Each load entry also holds associated load instruction store-to-load forwarding information. The load/store unit compares the store PAP with the load PAP of each valid load entry whose associated load instruction is younger in program order than the store instruction and uses the comparison and associated forwarding information to check store-to-load forwarding correctness with respect to each younger load instruction.

21 Claims, 44 Drawing Sheets

Related U.S. Application Data of application No. 17/351,946, filed on Jun. 18, 2021, now Pat. No. 11,397,686, said application No. 17/351,927 is a continuation-in-part of application No. 17/315,262, filed on May 7, 2021, now Pat. No. 11,416,400, said application No. 17/370,009 is a continuation-in-part of application No. 17/315,262, filed on May 7, 2021, now Pat. No. 11,416,400, said application No. 17/351,946 is a continuation-in-part of application No. 17/315,262, filed on May 7, 2021, now Pat. No. 11,416,400, said application No. 17/747,513 is a continuation-in-part of application No. 17/315,262, filed on May 7, 2021, now Pat. No. 11,416,400.

(56) References Cited

U.S. PATENT DOCUMENTS

| | | |
|---|---|---|
| 5,745,729 A | 4/1998 | Greenley et al. |
| 6,006,312 A | 12/1999 | Kohn et al. |
| 6,606,686 B1 | 8/2003 | Agarwala et al. |
| 6,662,280 B1 | 12/2003 | Hughes |
| 7,058,065 B2 | 6/2006 | Musoll et al. |
| 8,521,982 B2 | 8/2013 | Cargnoni et al. |
| 8,782,348 B2 | 7/2014 | Eddy et al. |
| 8,984,254 B2 | 3/2015 | Tran et al. |
| 9,772,943 B1 | 9/2017 | Mukherjee |
| 10,397,362 B1 | 8/2019 | Volpe et al. |
| 10,565,113 B2 | 2/2020 | Avudaiyappan |
| 10,977,175 B2 | 4/2021 | Campbell et al. |
| 11,397,686 B1 * | 7/2022 | Favor ............... G06F 12/1054 |
| 11,625,335 B2 | 4/2023 | Borikar et al. |
| 2002/0120813 A1 | 8/2002 | Boatright et al. |
| 2003/0023814 A1 | 1/2003 | Barroso et al. |
| 2004/0148468 A1 | 7/2004 | Hooker |
| 2006/0107021 A1 | 5/2006 | Barrick et al. |
| 2007/0156971 A1 | 7/2007 | Sistla et al. |
| 2008/0104325 A1 | 5/2008 | Narad et al. |
| 2009/0172360 A1 | 7/2009 | Hikichi |
| 2010/0325395 A1 | 12/2010 | Burger et al. |
| 2013/0185792 A1 | 7/2013 | Balakrishnan et al. |
| 2013/0304991 A1 | 11/2013 | Böttcher et al. |
| 2014/0215191 A1 | 7/2014 | Kanapathipillai et al. |
| 2015/0019840 A1 | 1/2015 | Anderson et al. |
| 2015/0032964 A1 | 1/2015 | Habermann et al. |
| 2015/0331796 A1 | 11/2015 | Guthrie et al. |
| 2017/0293567 A1 | 10/2017 | Bryant et al. |
| 2019/0108028 A1 | 4/2019 | Gonzalez et al. |
| 2019/0108035 A1 | 4/2019 | Gonzalez et al. |
| 2020/0133861 A1 | 4/2020 | Avudaiyappan |
| 2022/0004501 A1 | 1/2022 | Favor et al. |
| 2022/0357955 A1 | 11/2022 | Favor et al. |
| 2022/0358037 A1 | 11/2022 | Favor et al. |
| 2022/0358038 A1 | 11/2022 | Favor et al. |
| 2022/0358039 A1 | 11/2022 | Favor et al. |
| 2022/0358040 A1 | 11/2022 | Favor et al. |
| 2022/0358044 A1 | 11/2022 | Favor et al. |
| 2022/0358045 A1 | 11/2022 | Favor et al. |
| 2022/0358046 A1 | 11/2022 | Favor et al. |
| 2022/0358047 A1 | 11/2022 | Favor et al. |
| 2022/0358048 A1 | 11/2022 | Favor et al. |
| 2022/0358052 A1 | 11/2022 | Favor et al. |
| 2022/0358209 A1 | 11/2022 | Favor et al. |
| 2022/0358210 A1 | 11/2022 | Favor et al. |

\* cited by examiner

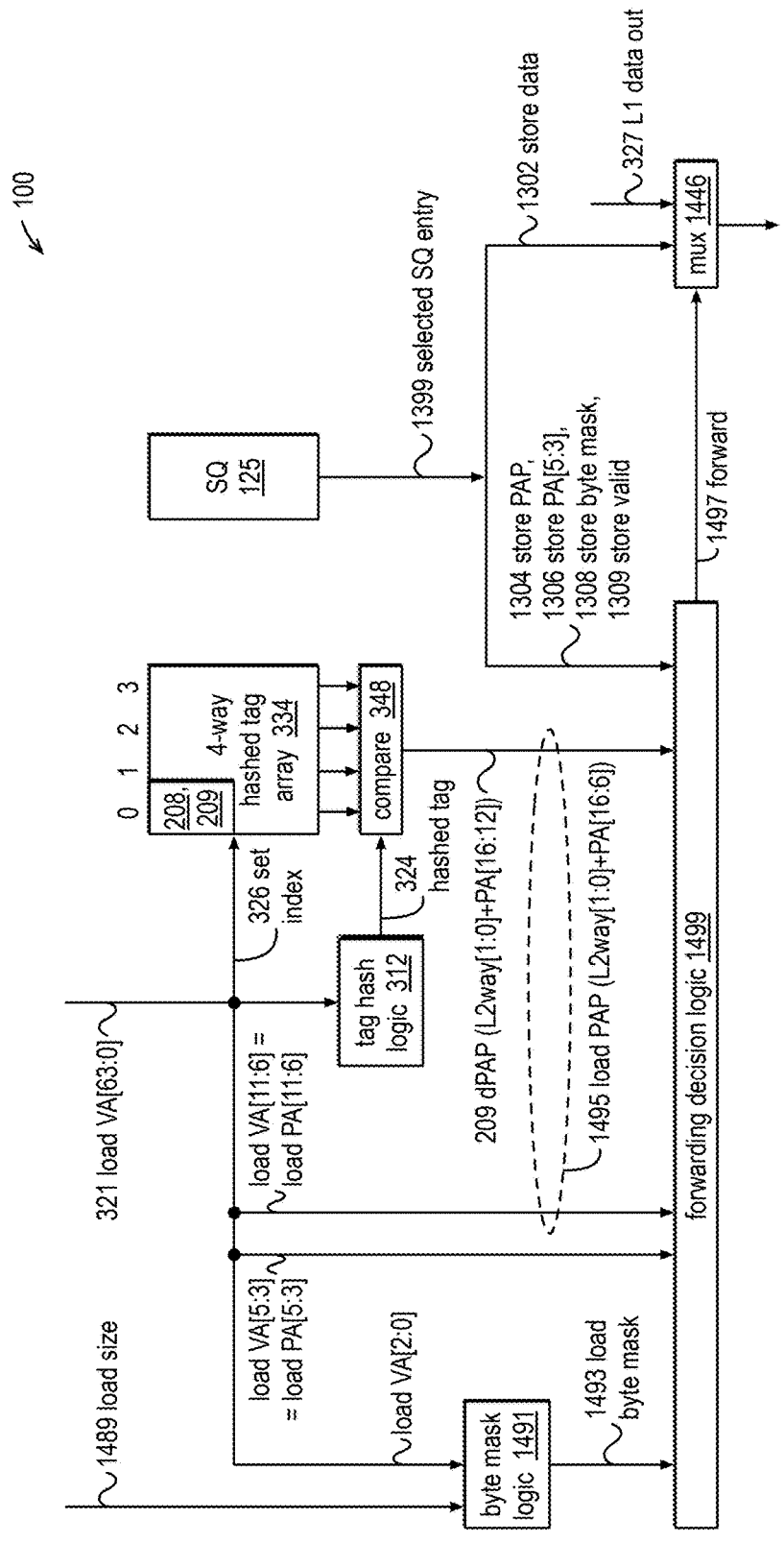

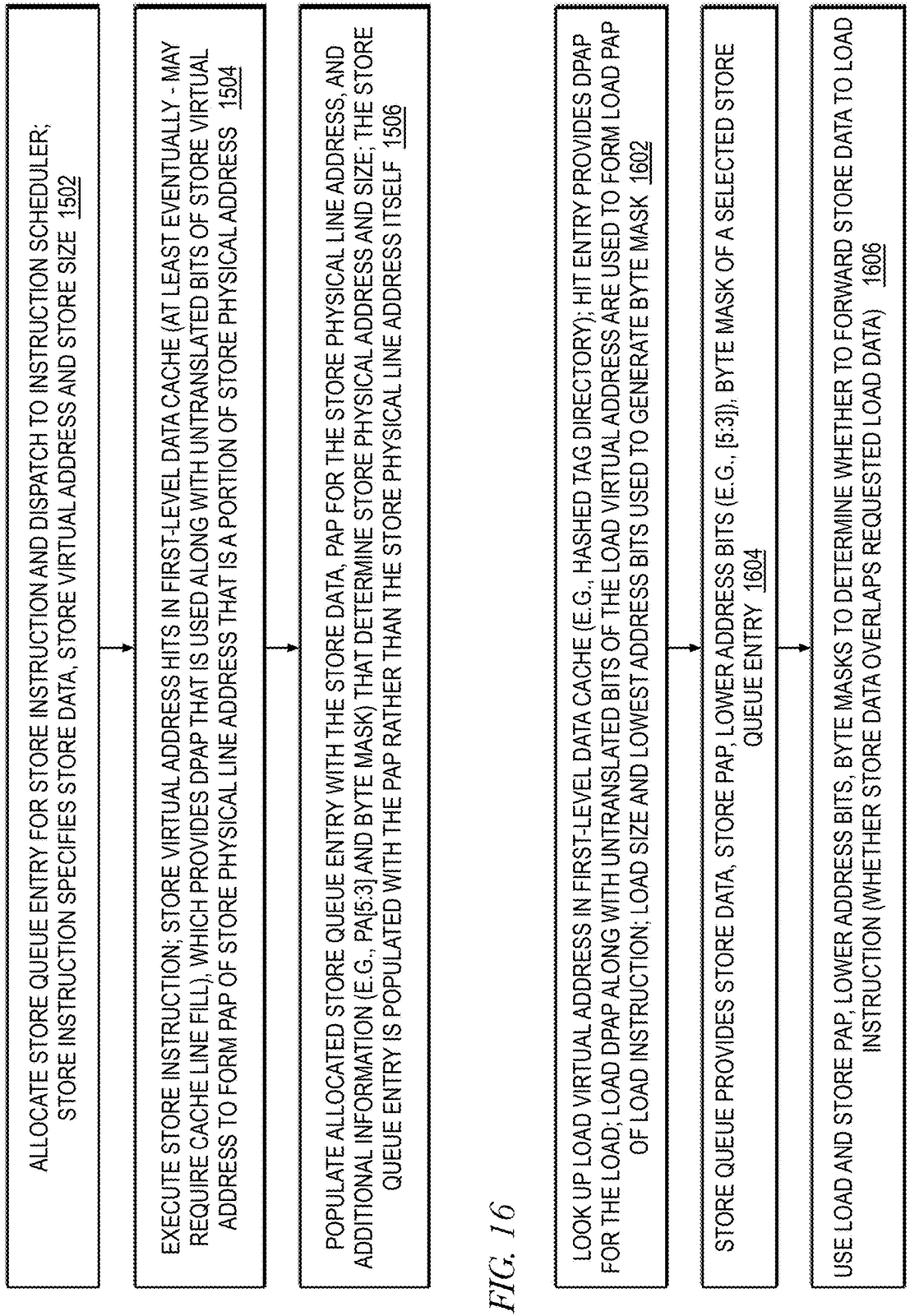

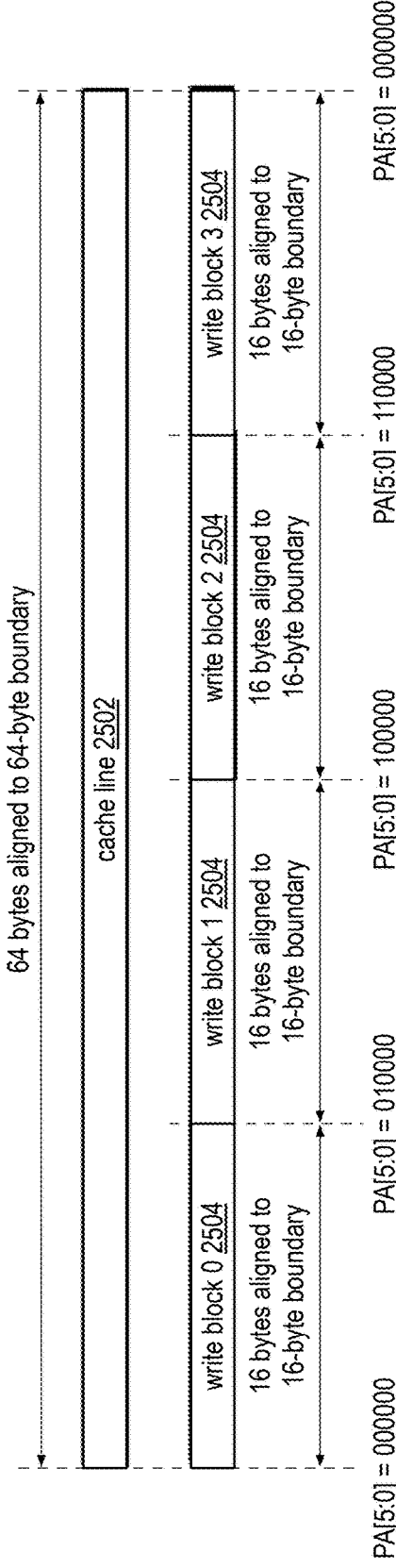

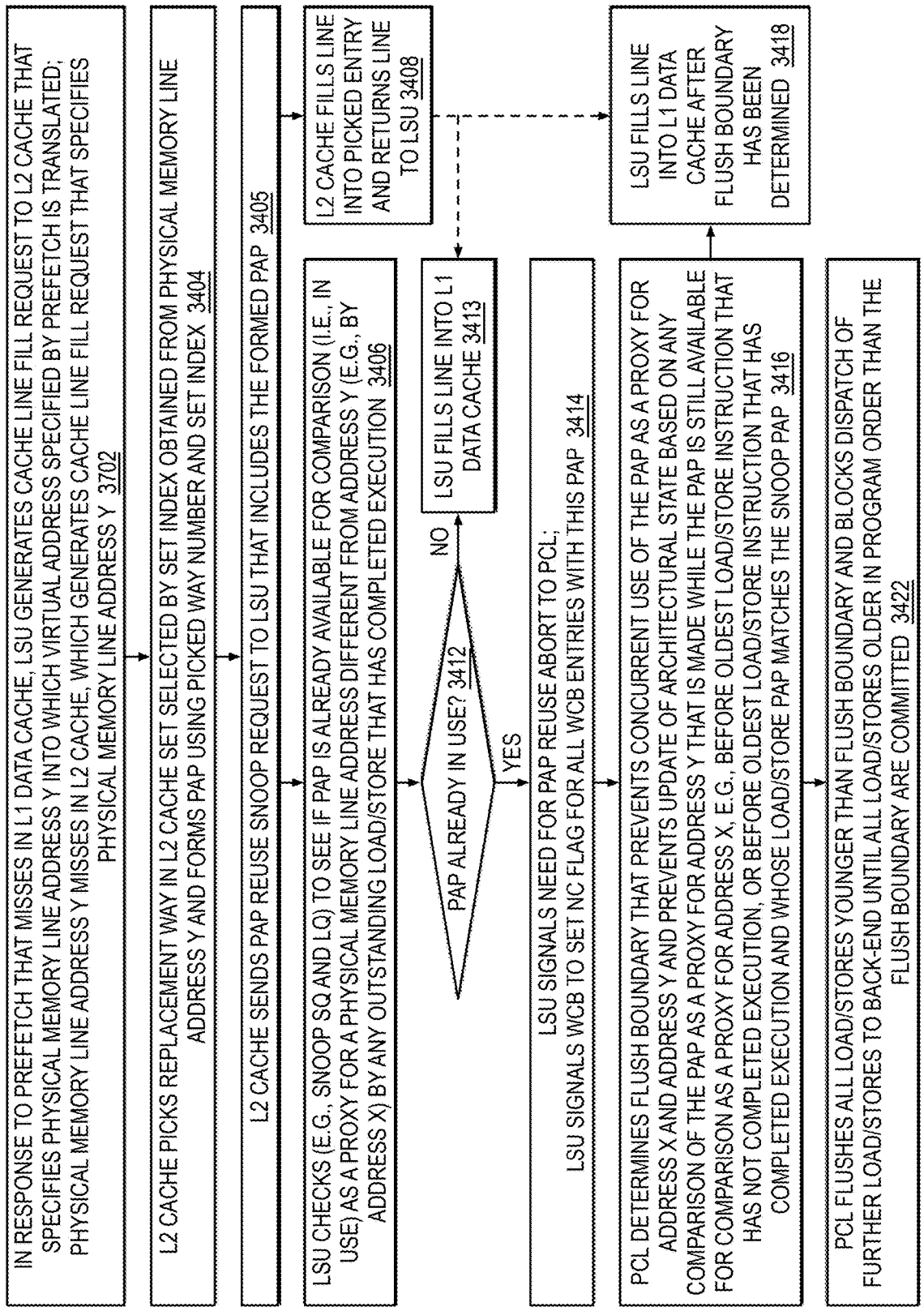

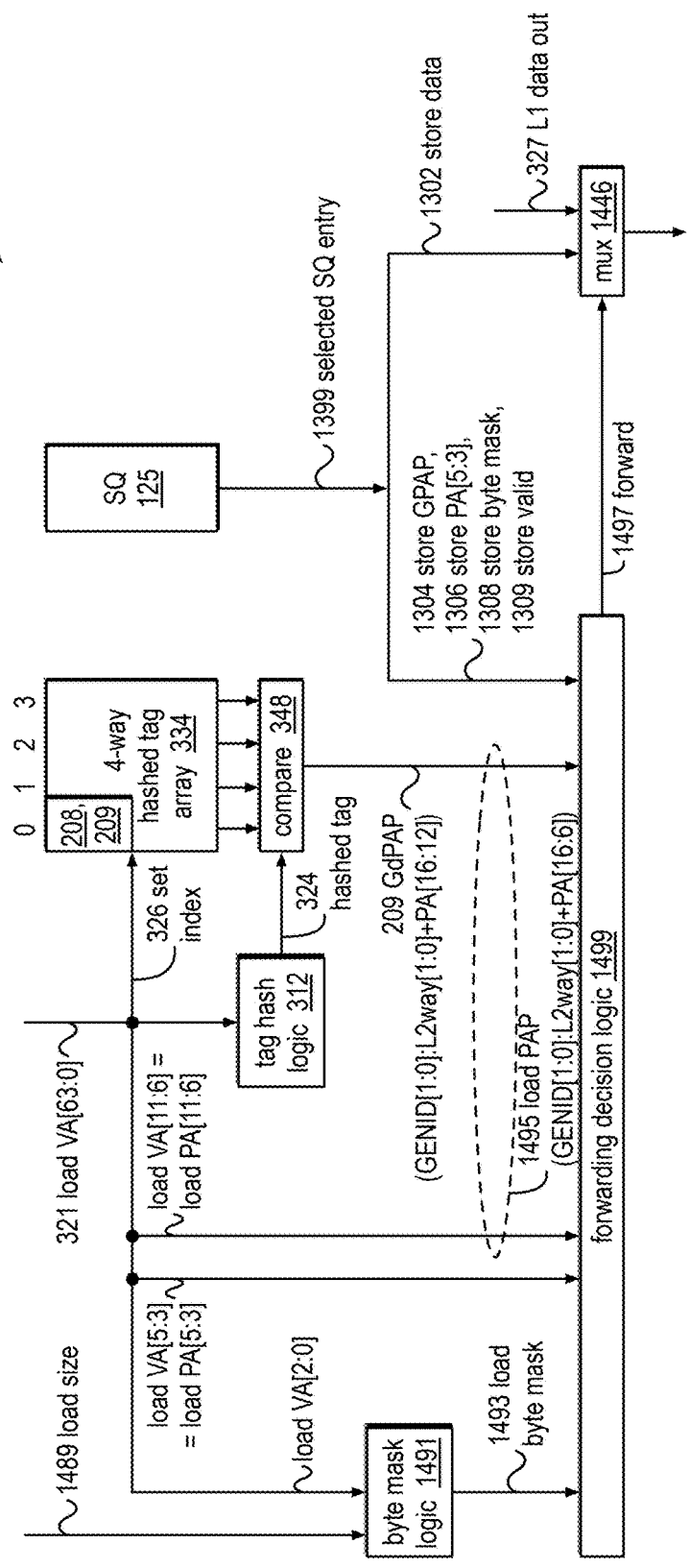

FIG. 52

| load PMLA 5205 | load PA[5:3] 5206 | load byte mask 2908 | Fwd 2912 | NonFwd 2914 | FwdStId 2916 | FwdingGood 2922 | FwdingViol 2924 | FwdingViolStId 2926 | lastStId 2932 | load RobId 2934 | Done 2936 |
|---|---|---|---|---|---|---|---|---|---|---|---|

← 2901 LQ entry

LOAD ADDRESS/SIZE | FORWARDING BEHAVIOR | FORWARDING CORRECTNESS

FIG. 53

← 1301 SQ entry

| store data 1302 | store PMLA 5305 | store PA[5:3] 1306 | store byte mask 1308 | valid 1309 |
|---|---|---|---|---|

FIG. 54

← 2401 WCB entry

| write data 2402 | write PMLA 5405 | write PA[5:4] 2406 | write byte mask 2408 | valid 2409 | write VA[63:12]) 2411 | NC 2413 |
|---|---|---|---|---|---|---|

FIG. 55

← 5501 L1 TLB entry

| tag 5504 | status 5506 | PPA (PA[51:12]) 5509 |
|---|---|---| combinable with untranslated address bits VA[11:6] to form load/store PMLA 5592 (PA[51:6])

FIG. 56

← 201 L1 data cache entry

| cache line data 202 | tag 204 | status 206 | hashed tag 208 | PPA (PA[51:12]) 5609 |
|---|---|---|---|---| combinable with untranslated address bits VA[11:6] to form load/store PMLA 5592 (PA[51:6])

STORE-TO-LOAD FORWARDING CORRECTNESS CHECKS USING PHYSICAL ADDRESS PROXIES STORED IN LOAD QUEUE ENTRIES

CROSS REFERENCE TO RELATED APPLICATION(S)

This application is a continuation of U.S. Non-Provisional application Ser. No. 17/747,513 (VENT.0125), filed May 18, 2022; and Ser. No. 17/747,513 (VENT.0125) claims priority to U.S. Provisional Application Ser. No. 63/271,934 (VENT.0125PROV) filed Oct. 26, 2021 and to U.S. Provisional Application Ser. No. 63/331,487 (VENT.0125PROV2) filed Apr. 15, 2022, and Ser. No. 17/747,513 (VENT.0125) is a continuation-in-part of U.S. Non-Provisional application Ser. No. 17/370,009 (VENT.0126), filed Jul. 8, 2021, and is a continuation-in-part of U.S. Non-Provisional application Ser. No. 17/351,927 (VENT.0124), filed Jun. 18, 2021, and is a continuation-in-part of U.S. Non-Provisional application Ser. No. 17/351,946 (VENT.0162), filed Jun. 18, 2021, and is a continuation-in-part of U.S. Non-Provisional application Ser. No. 17/315,262 (VENT.0118), filed May 7, 2021; Ser. No. 17/370,009 (VENT.0126) is a continuation-in-part of Ser. No. 17/351,927 (VENT.0124) and Ser. No. 17/351,946 (VENT.0162) and Ser. No. 17/315,262 (VENT.0118); each of Ser. No. 17/351,927 (VENT.0124) and Ser. No. 17/351,946 (VENT.0162) is a continuation-in-part of Ser. No. 17/315,262 (VENT.0118); each of Ser. No. 17/370,009 (VENT.0126) and Ser. No. 17/351,927 (VENT.0124) and Ser. No. 17/351,946 (VENT.0162) and Ser. No. 17/315,262 (VENT.0118) and 63/271,934 (VENT.0125PROV), 63/331,487 (VENT.0125PROV2), and Ser. No. 17/747,513 (VENT.0125) is hereby incorporated by reference in its entirety.

BACKGROUND

Cache memories in microprocessors may have a significant impact on their performance. A cache memory is a memory within a processor that is small and fast relative to system memory, also referred to as main memory. The cache memory holds a copy of a small subset of the contents of system memory so that the processor can access the subset faster than the processor can access system memory. Generally, the cache tends to hold most recently used data by evicting least recently used data when allocating space for newly used data. In this manner, a cache memory reduces the execution time of load/store instructions by alleviating the need to read system memory to access the data specified by a load instruction and enabling a store instruction to immediately write its data to the cache memory without having to wait to write the data to system memory, for example. Generally, a cache memory stores a copy of system memory data in a quantum of a cache line, or cache block, e.g., 64 bytes. That is, when a cache memory allocates an entry for a memory address, the cache memory brings in an entire cache line implicated by the memory address, and when the cache memory has modified a copy of system memory, the cache memory writes back to system memory the entire modified cache line rather than merely the modified data.

The cache memories may significantly improve processor performance since a system memory access may require an order of magnitude more clock cycles than a cache memory access. Importantly, a load instruction, for example, may be stalled in its execution waiting for the data to be read from memory. To further exacerbate the situation, instructions dependent upon the load data may be prevented from being issued for execution, and instructions dependent upon the dependent instructions may also be prevented from being issued for execution, and so forth. If enough dependent instructions are stalled or waiting to issue and sufficient independent instructions are not within the execution window, execution units of the processor may sit idle, significantly reducing the instruction execution rate of the processor.

Even though a cache memory may improve load/store execution time by mitigating the need for memory accesses, nevertheless the time required to access the cache memory also affects the performance of the processor. This is particularly true for the cache memory that is directly accessed by load/store units of the processor, i.e., the cache memory at the lowest level in a processor that includes a cache hierarchy of multiple cache memories. That is, the performance of the processor may be significantly improved by reducing even a single clock cycle from the access time to the first level cache memory and/or enabling the cycle time of the processor to be made shorter by reducing the first level cache memory access time.

Finally, the performance of the processor is also significantly affected by the hit rate of the cache memory, which is affected by the capacity of the cache memory in terms of the number of bytes the cache memory is designed to hold. Cache memories hold other information besides the actual cache line data such as tags, status, and replacement policy information. Reducing the amount of other information held by the cache may enable the capacity of the cache to be bigger, i.e., to store more bytes of copies of memory data, thereby improving its hit rate. Furthermore, reducing the amount of other information held by the cache may enable the physical size of the cache—i.e., the area on the integrated circuit—to be smaller and to reduce the physical size of accompanying logic, e.g., comparators, again potentially enabling the capacity of the cache to be bigger, thereby improving its hit rate and improving the performance of the processor.

Another issue arises in the context of a system that includes multiple processors that share system memory and that each include a cache memory. In such systems, the processors must cooperate to ensure that when a processor reads from a memory address it receives the value most recently written to the address by any of the processors. For example, assume processors A and B each have a copy of a cache line at a memory address in their respective caches, and assume processor A modifies its copy of the cache line. The system needs to ensure that processor B receives the modified value when it subsequently reads from the address. This is commonly referred to as cache coherency.

A frequently employed protocol for attaining cache coherency is commonly referred to as a write-invalidate protocol that involves each processor snooping a shared bus used to access system memory. Using the example above, processor A broadcasts on the bus an invalidate transaction to announce that it intends to modify its copy of the cache line at the memory address. Processor B snoops the bus and sees the invalidate transaction. In response, processor B invalidates its copy of the cache line. When processor B later reads from the memory address, it broadcasts a read transaction on the bus. Processor A snoops the bus and sees the read transaction. In response, processor A provides the modified cache line to processor B and cancels the read transaction to the system memory. Processor A may also write back the modified cache line to system memory at this time.

As described above, cache memories hold and process other information besides the actual cache line data, some of which involves information for handling snooping the shared bus to attain cache coherency. By reducing the amount of cache coherence-related information held and processed by the cache, performance of the processor may be improved by increasing the speed of the cache and reducing its physical size.

SUMMARY

In one embodiment, the present disclosure provides a microprocessor that includes a load/store unit configured to perform store-to-load forwarding, a physically-indexed physically-tagged second-level set-associative cache, a store queue having store entries, and a load queue having load entries. Each entry in the second-level cache is uniquely identified by a set index and a way of the second-level cache. Each store entry is configured to hold, for an associated store instruction to which the store entry has been allocated, a store physical address proxy (PAP) for a store physical memory line address that is a translation of a store virtual memory line address specified by the associated store instruction. The store PAP specifies the set index and the way of the entry in the second-level cache into which a cache line specified by the store physical memory line address is allocated. Each load entry is configured to hold, for an associated load instruction to which the load entry has been allocated, a load PAP for a load physical memory line address that is a translation of a load virtual memory line address specified by the associated load instruction. The load PAP specifies the set index and the way of the entry in the second-level cache into which a cache line specified by the load physical memory line address is allocated. Each load entry is also configured to hold forwarding information about store-to-load forwarding with respect to the associated load instruction. The load/store unit is configured to make a comparison of the store PAP associated with the store instruction with the load PAP of each valid entry of the load queue whose associated load instruction is younger in program order than the store instruction and use the comparison, along with the associated forwarding information, to make a store-to-load forwarding correctness check with respect to each younger load instruction.

In another embodiment, the present disclosure provides a method for use in a microprocessor that includes a load/store unit configured to perform store-to-load forwarding, a physically-indexed physically-tagged second-level set-associative cache, a store queue having store entries, and a load queue having load entries. Each entry in the second-level cache is uniquely identified by a set index and a way of the second-level cache. Each store entry is configured to hold, for an associated store instruction to which the store entry has been allocated, a store physical address proxy (PAP) for a store physical memory line address that is a translation of a store virtual memory line address specified by the associated store instruction. The store PAP specifies the set index and the way of the entry in the second-level cache into which a cache line specified by the store physical memory line address is allocated. Each load entry is configured to hold, for an associated load instruction to which the load entry has been allocated, a load PAP for a load physical memory line address that is a translation of a load virtual memory line address specified by the associated load instruction. The load PAP specifies the set index and the way of the entry in the second-level cache into which a cache line specified by the load physical memory line address is allocated. Each load entry is also configured to hold forwarding information about store-to-load forwarding with respect to the associated load instruction. The method includes, by the load/store unit, making a comparison of the store PAP associated with the store instruction with the load PAP of each valid entry of the load queue whose associated load instruction is younger in program order than the store instruction, and using the comparison, along with the associated forwarding information, to make a store-to-load forwarding correctness check with respect to each younger load instruction.

In yet another embodiment, the present disclosure provides a non-transitory computer-readable medium having instructions stored thereon that are capable of causing or configuring a microprocessor that includes a load/store unit configured to perform store-to-load forwarding, a physically-indexed physically-tagged second-level set-associative cache, a store queue having store entries, and a load queue having load entries. Each entry in the second-level cache is uniquely identified by a set index and a way of the second-level cache. Each store entry is configured to hold, for an associated store instruction to which the store entry has been allocated, a store physical address proxy (PAP) for a store physical memory line address that is a translation of a store virtual memory line address specified by the associated store instruction. The store PAP specifies the set index and the way of the entry in the second-level cache into which a cache line specified by the store physical memory line address is allocated. Each load entry is configured to hold, for an associated load instruction to which the load entry has been allocated, a load PAP for a load physical memory line address that is a translation of a load virtual memory line address specified by the associated load instruction. The load PAP specifies the set index and the way of the entry in the second-level cache into which a cache line specified by the load physical memory line address is allocated. Each load entry is also configured to hold forwarding information about store-to-load forwarding with respect to the associated load instruction. The load/store unit is configured to make a comparison of the store PAP associated with the store instruction with the load PAP of each valid entry of the load queue whose associated load instruction is younger in program order than the store instruction and use the comparison, along with the associated forwarding information, to make a store-to-load forwarding correctness check with respect to each younger load instruction.

BRIEF DESCRIPTION OF THE DRAWINGS

FIG. 13 is an example block diagram of a store queue entry of the store queue (SQ) of FIG. 1 that holds PAPs to accomplish store-to-load forwarding in accordance with embodiments of the present disclosure.

FIG. 14 is an example block diagram of portions of the processor of FIG. 1 used to perform store-to-load forwarding using PAPs in accordance with embodiments of the present disclosure.

FIG. 15 is an example flowchart illustrating processing of a store instruction that includes writing a store PAP into a store queue entry in accordance with embodiments of the present disclosure.

FIG. 16 is an example flowchart illustrating processing of a load instruction that includes using a load PAP and a store PAP from a store queue entry to decide whether to forward store data to the load instruction from the store queue entry in accordance with embodiments of the present disclosure.

FIG. 23 is an example block diagram of a store queue entry of the store queue (SQ) of FIG. 1 that holds PAPs to accomplish write-combining in accordance with embodiments of the present disclosure.

FIG. 24 is an example block diagram of a write combining buffer (WCB) entry of the WCB of FIG. 1 that holds PAPs to accomplish write combining in accordance with embodiments of the present disclosure.

FIG. 25 is an example block diagram illustrating a relationship between a cache line and write blocks as used in performing writing combining using PAPs in accordance with one embodiment of the present disclosure.

FIGS. 33 through 37 are example flowcharts illustrating operation of the processor of FIG. 1 to manage PAP reuse in accordance with embodiments of the present disclosure.

FIG. 44 is an example block diagram of an alternate embodiment of a store queue entry of the store queue of FIG. 1 that holds GPAPs in accordance with embodiments of the present disclosure.

FIG. 45 is an example block diagram of portions of an alternate embodiment of the processor of FIG. 1 used to perform store-to-load forwarding using GPAPs in accordance with embodiments of the present disclosure.

FIG. 46 is an example block diagram of a load queue entry of the LQ of FIG. 1 in accordance with embodiments of the present disclosure.

FIG. 52 is an example block diagram of a load queue (LQ) entry of the LQ of FIG. 1 in accordance with embodiments of the present disclosure.

FIG. 53 is an example block diagram of a store queue (SQ) entry of the SQ of FIG. 1 in accordance with embodiments of the present disclosure.

FIG. 54 is an example block diagram of a write-combine buffer (WCB) entry of the WCB of FIG. 1 in accordance with embodiments of the present disclosure.

FIG. 55 is an example block diagram of an entry of the translation lookaside buffer of FIG. 51 that is employed to accomplish SALLOV prevention in accordance with embodiments of the present disclosure.

FIG. 56 is an example block diagram of a cache entry of L1 data cache of FIG. 1 that is employed to accomplish SALLOV prevention in accordance with embodiments of the present disclosure.

DETAILED DESCRIPTION

Figure 1:
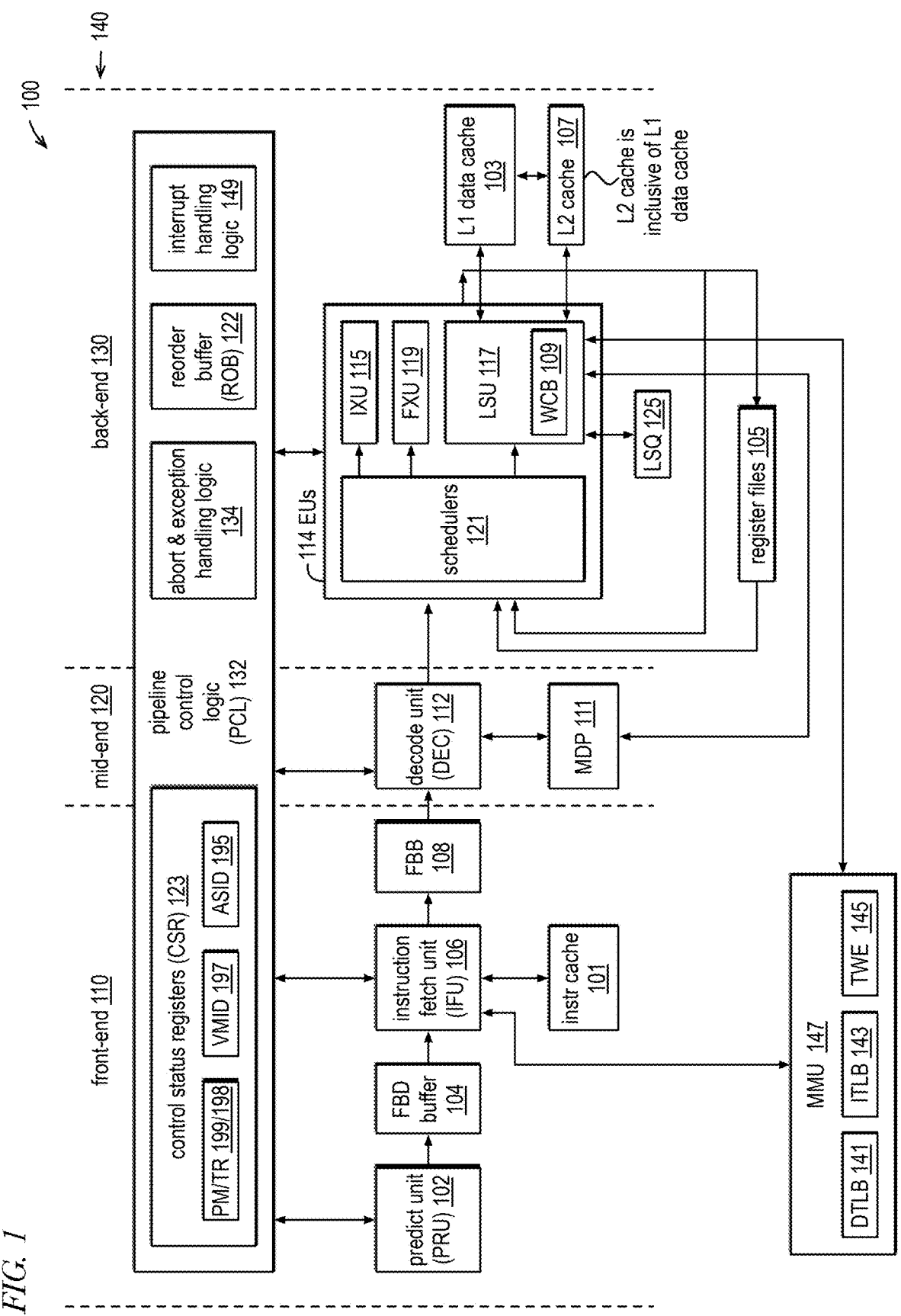
FIG. 1 is an example block diagram of a pipelined super-scalar, out-of-order execution microprocessor core that performs speculative execution of instructions in accordance with embodiments of the present disclosure.

FIG. 1 is an example block diagram of a pipelined super-scalar, out-of-order execution microprocessor core 100 that performs speculative execution of instructions in accordance with embodiments of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 includes a cache memory subsystem that employs physical address proxies (PAP) to attain cache coherence as described herein. Although a single core 100 is shown, the PAP cache coherence techniques described herein are not limited to a particular number of cores. Generally, the PAP cache coherence embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the PAP cache coherence techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a level-1 (L1) data cache 103, a level-2 (L2) cache 107, a register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as microarchitectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the L1 data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed.

The LSU 117 includes a write combining buffer (WCB) 109 that buffers write requests sent by the LSU 117 to the DTLB 141 and to the L2 cache 107. In one embodiment, the L1 data cache 103 is a virtually-indexed virtually-tagged write-through cache. In the case of a store operation, when there are no older operations that could cause the store operation to be aborted, the store operation is ready to be committed, and the store data is written into the L1 data cache 103. The LSU 117 also generates a write request to "write-through" the store data to the L2 cache 107 and update the DTLB 141, e.g., to set a page dirty, or page modified, bit. The write request is buffered in the WCB 109. Eventually, at a relatively low priority, the store data associated with the write request will be written to the L2 cache 107. However, entries of the write combining buffer 109 are larger (e.g., 32 bytes) than the largest load and store operations (e.g., eight bytes). When possible, the WCB 109 combines, or merges, multiple write requests into a single entry of the WCB 109 such that the WCB 109 may make a potentially larger single write request to the L2 cache 107 that encompasses the store data of multiple store operations that have spatially-locality. The merging, or combining, is possible when the starting physical memory address and size of two or more store operations align and fall within a single entry of the WCB 109. For example, assume a first 8-byte store operation to 32-byte aligned physical address A, a second 4-byte store operation to physical address A+8, a third 2-byte store operation to physical address A+12, and a fourth 1-byte store operation to physical address A+14. The WCB 109 may combine the four store operations into a single entry and perform a single write request to the L2 cache 107 of the fifteen bytes at address A. By combining write requests, the WCB 109 may free up bandwidth of the L2 cache 107 for other requests, such as cache line fill requests from the L1 data cache 103 to the L2 cache 107 or snoop requests.

The microprocessor 100 may also include other blocks not shown, such as a load buffer, a bus interface unit, and various levels of cache memory above the instruction cache 101 and L1 data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor(S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or a translation regime (TR), which is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a microarchitectural register. However, the previous PM 199 is readable by a software read of a CSR 123 in certain circumstances, such as upon taking of an exception. In one embodiment, the CSRs 123 may hold a VMID 197 and ASID 195 for each TR or PM.

The pipeline units may signal a need for an abort, as described in more detail below, e.g., in response to detection of a mis-prediction (e.g., by a branch predictor of a direction or target address of a branch instruction, or of a mis-prediction that store data should be forwarded to a load Op in response to a store dependence prediction, e.g., by the MDP 111) or other microarchitectural exception, architectural exception, or interrupt. Examples of architectural exceptions include an invalid opcode fault, debug breakpoint, or illegal instruction fault (e.g., insufficient privilege mode) that may be detected by the DEC 112, a page fault, permission violation or access fault that may be detected by the LSU 117, and an attempt to fetch an instruction from a non-executable page or a page the current process does not have permission to access that may be detected by the IFU 106. In response, the PCL 132 may assert flush signals to selectively flush instructions/Ops from the various units of the pipeline 140. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism may also be used to handle architectural exceptions and for architecturally defined cases where changing the privilege mode requires strong in-order synchronization. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses—also referred to as result busses or bypass busses—back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all the EUs 114 (and integrated with the ROB 122 according to one embodiment) serves all the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Embodiments of a cache subsystem are described herein that advantageously enable cache coherency attainment with higher performance and/or reduced size using PAPs.

Figures 2, 3:
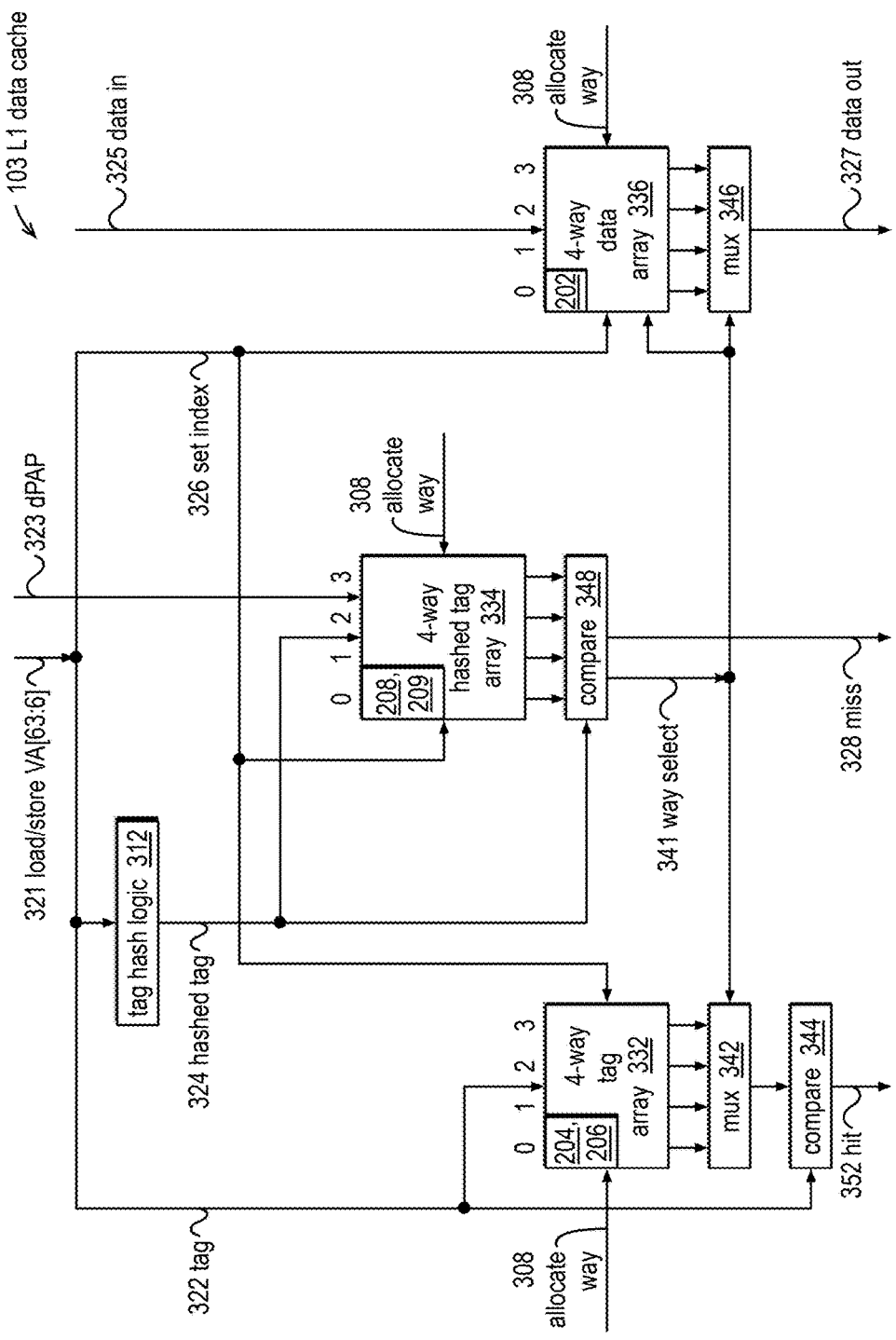
FIG. 2 is an example block diagram of a cache entry of L1 data cache of FIG. 1 that employs PAPs to accomplish cache coherence in accordance with embodiments of the present disclosure.
FIG. 3 is an example block diagram illustrating the L1 data cache of FIG. 1 that employs PAPs to accomplish cache coherence in accordance with embodiments of the present disclosure.

FIG. 2 is an example block diagram of a cache entry 201 of L1 data cache 103 of FIG. 1 that employs PAPs to accomplish cache coherence in accordance with embodiments of the present disclosure. The L1 data cache entry 201 is used in the L1 data cache 103 embodiment of FIG. 3 described in more detail below. The L1 data cache entry 201 includes cache line data 202, a virtual address tag 204, a status field 206, a hashed tag field 208, and a diminutive physical address proxy (dPAP) field 209. The cache line data 202 is the copy of the data brought into the L1 data cache 103 from system memory indirectly through a higher level of the cache memory hierarchy, namely the L2 cache 107.

The tag 204 is upper bits (e.g., tag bits 322 of FIG. 3) of the virtual memory address (e.g., virtual load/store address 321 of FIG. 3) specified by the operation that brought the cache line into the L1 data cache 103, e.g., the virtual memory address specified by a load/store operation. That is, when an entry 201 in the L1 data cache 103 is allocated, the tag bits 322 of the virtual memory address 321 are written to the virtual address tag 204 of the entry 201. When the L1 data cache 103 is subsequently accessed (e.g., by a subsequent load/store operation), the virtual address tag 204 is used to determine whether the access hits in the L1 data cache 103. Generally speaking, the L1 data cache 103 uses lower bits (e.g., set index bits 326 of FIG. 3) of the virtual memory address to index into the L1 data cache 103 and uses the remaining bits of the virtual address 321 above the set index bits 326 as the tag bits. To illustrate by way of example, assume a 64 kilobyte (KB) L1 data cache 103 arranged as a 4-way set associative cache having 64-byte cache lines; address bits [5:0] are an offset into the cache line, virtual address bits [13:6] (set index bits) are used as the set index, and virtual address bits [N−1:14] (tag bits) are used as the tag, where N is the number of bits of the virtual memory address, where N is 63 in the embodiment of FIG. 3.

The status 206 indicates the state of the cache line. More specifically, the status 206 indicates whether the cache line data is valid or invalid. Typically, the status 206 also indicates whether the cache line has been modified since it was brought into the L1 data cache 103. The status 206 may also indicate whether the cache line is exclusively held by the L1 data cache 103 or whether the cache line is shared by other cache memories in the system. An example protocol used to maintain cache coherency defines four possible states for a cache line: Modified, Exclusive, Shared, Invalid (MESI).

The hashed tag 208 may be a hash of the tag bits 322 of FIG. 3 of the virtual memory address 321, as described in more detail below. Advantageously, the hashed tag 208 may be used to generate a predicted early miss indication, e.g., miss 328 of FIG. 3, and may be used to generate a predicted early way select signal, e.g., way select 341 of FIG. 3, as described in more detail with respect to FIG. 3.

Figure 6:
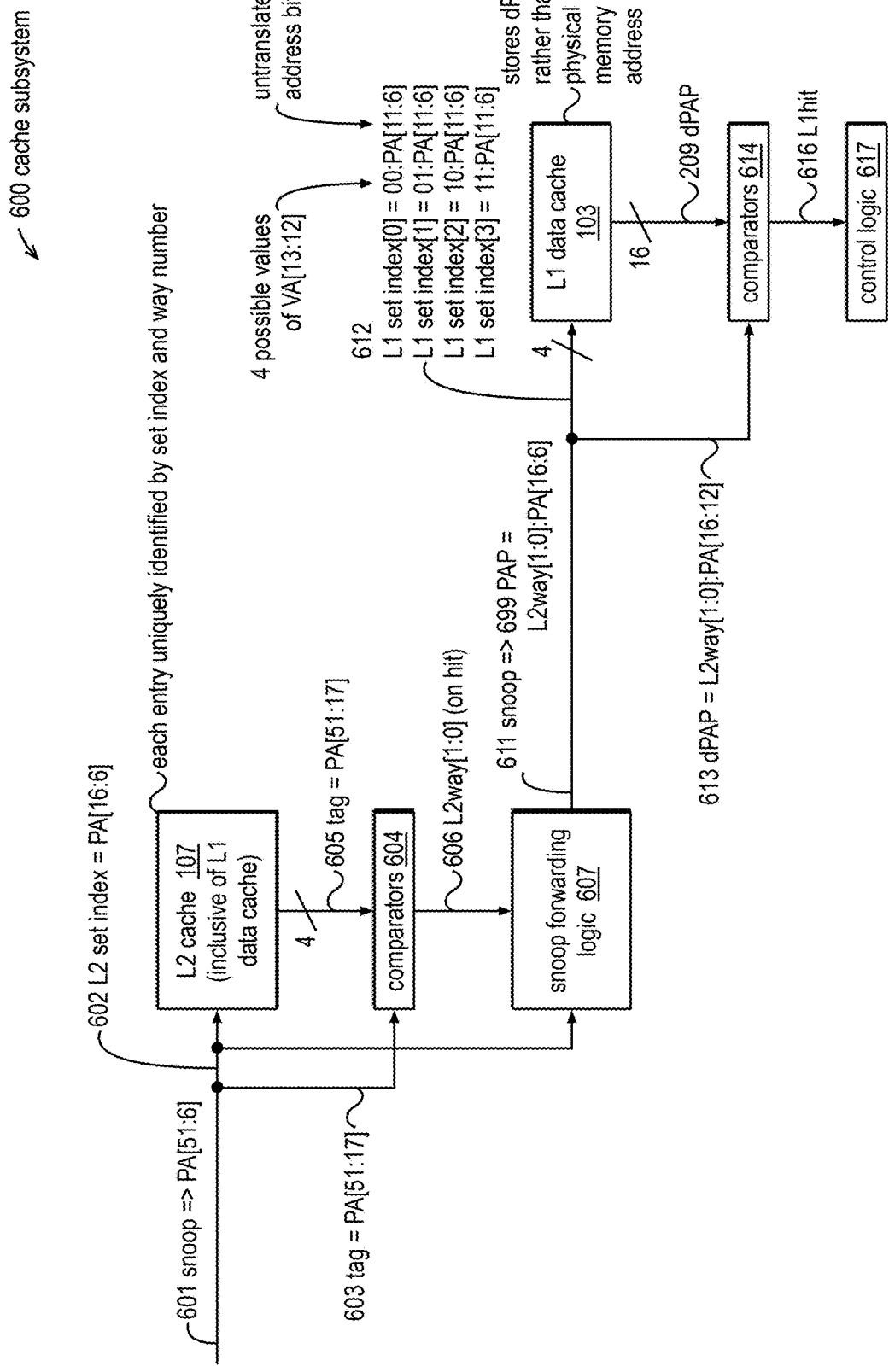
FIG. 6 is an example block diagram of a cache subsystem that employs PAPs to accomplish cache coherence in accordance with embodiments of the present disclosure.

The dPAP 209 is all or a portion of a physical address proxy (PAP), e.g., PAP 699 of FIG. 6. As described herein, the L2 cache 107 is inclusive of the L1 data cache 103. That is, each cache line of memory allocated into the L1 data cache 103 is also allocated into the L2 cache 107, and when the L2 cache 107 evicts the cache line, the L2 cache 107 also causes the L1 data cache 103 to evict the cache line. A PAP is a forward pointer to the unique entry in the L2 cache 107 (e.g., L2 entry 401 of FIG. 4) that holds a copy of the cache line held in the entry 201 of the L1 data cache 103. For example, in the embodiments of FIGS. 6 and 9, the dPAP 209 is the PAP less the untranslated physical address PA[11:6] bits that are used in the L1 set index. That is, the dPAP is the L2 way and the translated physical address bits PA[16:12] of the set index of the L2 cache 107 set containing the entry 401 that holds the copy of the L1 data cache 103 cache line. For another example, in the embodiment of FIG. 11, the dPAP is the entire PAP, e.g., all the bits of the L2 way and L2 set index that point to the entry 401 in the L2 cache 107 that holds the copy of the L1 data cache 103 cache line. Uses of the dPAP 209 and PAP are described in more detail herein.

FIG. 3 is an example block diagram illustrating the L1 data cache 103 of FIG. 1 that employs PAPs to accomplish cache coherence in accordance with embodiments of the present disclosure. In the embodiment of FIG. 3, the L1 data cache 103 is a virtual cache, i.e., it is virtually-indexed and virtually-tagged. In the embodiment of FIG. 3, the DTLB 141 of FIG. 1 is a second-level TLB, and the processor 100 includes no first-level TLB. The L1 data cache 103 includes a tag array 332, a data array 336, a hashed tag array 334, a multiplexer 342, a comparator 344, a multiplexer 346, and tag hash logic 312. The LSU 117 generates a virtual load/store address VA[63:0] and provides to the L1 data cache 103 a portion thereof VA[63:6] 321 used to specify a line of memory that may be stored in the L1 data cache 103. The virtual address 321 includes a tag 322 portion (e.g., bits [63:14]) and a set index 326 portion (e.g., bits [13:6]). The L1 data cache 103 also includes an allocate way input 308 for allocating an entry into the L1 data cache 103. The L1 data cache 103 also includes a data in input 325 for writing data into the L1 data cache 103, e.g., during a store commit operation and during a cache line allocation.

The L1 data cache 103 also includes a hit output 352, early miss prediction 328, and a data out output 227. The tag array 332 and data array 336 are random access memory arrays. In the embodiment of FIG. 3, the L1 data cache 103 is arranged as a 4-way set associative cache; hence, the tag array 332 and data array 336 are arranged as 4-way set associative memory arrays. However, other embodiments are contemplated in which the associativity has a different number of ways than four, including direct-mapped and fully associative embodiments. The set index 326 selects the set of entries on each allocation or access, e.g., load/store operation.

In the embodiment of FIG. 3, each entry of the L1 data cache 103 is structured as the entry 201 of FIG. 2, having cache line data 202, a tag 204, a status 206, a hashed tag 208, and a dPAP 209. The data array 336 holds the cache line data 202 associated with each of the entries 201 of the L1 data cache 103. The tag array 332 holds the tag 204 associated with each of the entries 201 of the L1 data cache 103. The hashed tag array 334, also referred to as a hashed address directory 334, holds the hashed tag 208 and dPAP 209 associated with each of the entries 201 of the L1 data cache 103. In one embodiment, the status 206 of each entry is also stored in the tag array 332, whereas in another embodiment the L1 data cache 103 includes a separate memory array for storing the status 206 of the entries. Although in the embodiment of FIG. 3 the data array 336 and tag array 332 are separate, other embodiments are contemplated in which the data and tag (and status) reside in the same memory array.

The tag hash logic 312 hashes the tag 322 portion of the virtual load/store address 321 to generate the hashed tag 324. That is, the tag 322 is an input to a hash function performed by tag hash logic 312 that outputs the hashed tag 324. The hash function performs a logical and/or arithmetic operation on its input bits to generate output bits. For example, in one embodiment, the hash function is a logical exclusive-OR on at least a portion of the tag 322 bits. The number of output bits of the hash function is the size of the hashed tag 324 and the hashed tag field 208 of the data cache entry 201. The hashed tag 324 is provided as an input to the hashed tag array 334 for writing into the hashed tag 208 of the selected entry 201 of the hashed tag array 334, e.g., during an allocation. Similarly, a dPAP 323 obtained from the L2 cache 107 during an allocation (as described with respect to FIG. 7) are written into the dPAP 209 of the selected entry 201 of the hashed tag array 334 during an allocation. The set index 326 selects the set of entries of the hashed tag array 334. In the case of an allocation, the hashed tag 324 and dPAP 323 are written into the hashed tag 208 and dPAP 209 of the entry 201 of the way selected by an allocate way input 308 of the selected set. In the case of an access, comparator 348 compares the hashed tag 324 with each of the hashed tags 208 of the selected set. If there is a valid match, the early miss signal 328 is false and the way select 341 indicates the matching way; otherwise, the early miss signal 328 is true. The dPAP 323 stored in the dPAP field 209 of the L1 entry 201 is used to process a snoop request to attain cache coherency, as described in more detail with respect to FIGS. 6 through 12.

Because the hashed tag 324 and the hashed tags 208 are small (e.g., 16 bits as an illustrative example) relative to the tag 322 and tags 204 (e.g., 54 bits as an illustrative example), the comparison performed by comparator 348 may be faster than the comparison performed by comparator 344 (described more below), for example. Therefore, the way select 341 may be signaled by an earlier stage in the L1 data cache 103 pipeline than an embodiment that relies on a comparison of the tags 204 of the tag array 332 to generate a way select. This may be advantageous because it may shorten the time to data out 227.

Additionally, the early miss prediction 328 may be signaled by an earlier stage than the stage that signals the hit indicator 352. This may be advantageous because it may enable a cache line fill requestor (not shown) to generate a cache line fill request to fill a missing cache line earlier than an embodiment that would rely on a comparison of the tags 204 in the tag array 332 to detect a miss. Thus, the hashed tag array 334 may enable a high performance, high frequency design of the processor 100.

It is noted that due to the nature of the hashed tag 324, if the early miss indicator 328 indicates a false value, i.e., indicates a hit, the hit indication may be incorrect, i.e., the hit indicator 352 may subsequently indicate a false value, i.e., a miss. Thus, the early miss indicator 328 is a prediction, not necessarily a correct miss indicator. This is because differing tag 322 values may hash to the same value. However, if the early miss indicator 328 indicates a true value, i.e., indicates a miss, the miss indication is correct, i.e., the hit indicator 352 will also indicate a miss, i.e., will indicate a false value. This is because if two hash results are not equal (assuming they were hashed using the same hash algorithm), then they could not have been generated from equal inputs, i.e., matching inputs.

The tag 322 is provided as an input to the tag array 332 for writing into the tag 204 field of the selected entry of the tag array 332, e.g., during an allocation. The set index 326 selects the set of entries of the tag array 332. In the case of an allocation, the tag 322 is written into the tag 204 of the entry of the way selected by the allocate way input 308 of the selected set. In the case of an access (e.g., a load/store operation), the mux 342 selects the tag 204 of the way selected by the early way select 341, and the comparator 344 compares the tag 322 with the tag 204 of the selected set. If there is a valid match, the hit signal 352 is true; otherwise, the hit signal 352 is false. In one embodiment, the cache line fill requestor advantageously uses the early miss prediction 328 provided by the hashed tag array 334 in order to generate a fill request as soon as possible, rather than waiting for the hit signal 352. However, in embodiments of the LSU 117 that employ the L1 data cache 103 of FIG. 3, the cache line fill requestor is also configured to examine both the early miss prediction 328 and the hit indicator 352, detect an instance in which the early miss prediction 328 predicted a false hit, and generate a fill request accordingly.

The data array 336 receives the data in input 325 for writing into the cache line data 202 field of the selected entry of the data array 336, e.g., during a cache line allocation or a store commit operation. The set index 326 selects the set of entries of the data array 336. In the case of an allocation, the way of the selected set is selected by the allocate way input 308, and in the case of a memory access operation (e.g., load/store operation) the way is selected by the way select signal 341. In the case of a read operation (e.g., load operation), the mux 346 receives the cache line data 202 of all four ways and selects one of the ways based on the way select signal 341, and the cache line data 202 selected by the mux 346 is provided on the data out output 227.

Figure 4:
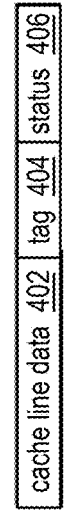
FIG. 4 is an example block diagram of a cache entry of the L2 cache of FIG. 1 that employs PAPs to accomplish cache coherence in accordance with embodiments of the present disclosure.

FIG. 4 is an example block diagram of a cache entry 401 of L2 cache 107 of FIG. 1 that employs PAPs to accomplish cache coherence in accordance with embodiments of the present disclosure. The L2 cache entry 401 is used in the physically-indexed physically-tagged L2 cache 107 embodiment of FIG. 5 described in more detail below. That is, the tag field 404 holds a physical address tag, rather than a virtual address tag. Also, the cache entry 401 of FIG. 4 does not include a hashed tag field 208 nor a dPAP field 209 as in FIG. 2. Otherwise, the cache entry 401 of FIG. 4 is similar in many respects to the cache entry 201 of FIG. 2, e.g., the status field 406 is similar to the status field 206 of FIG. 2.

Figure 5:
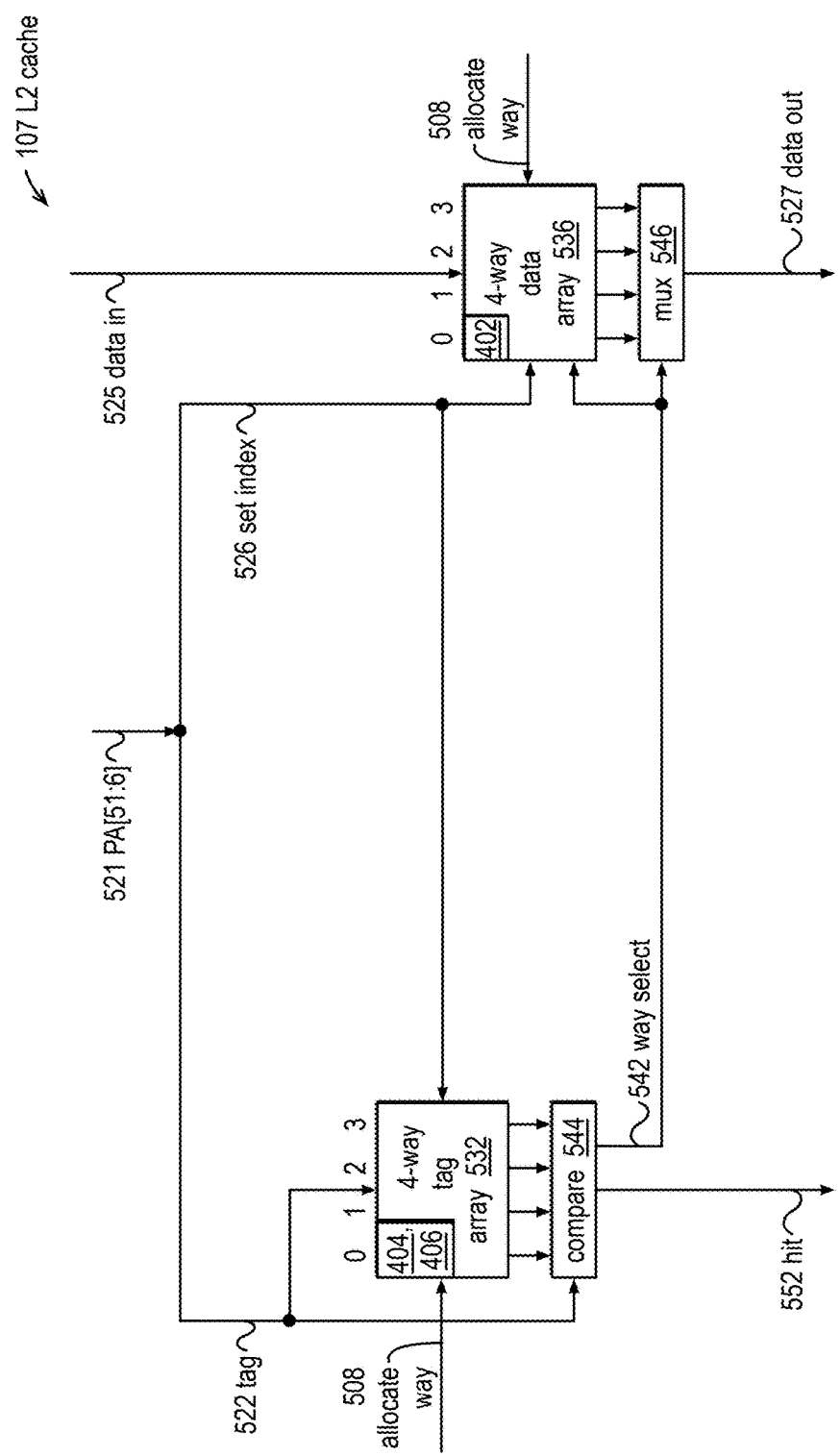
FIG. 5 is an example block diagram illustrating the L2 cache of FIG. 1 that employs PAPs to accomplish cache coherence in accordance with embodiments of the present disclosure.

FIG. 5 is an example block diagram illustrating the L2 cache 107 of FIG. 1 that employs PAPs to accomplish cache coherence in accordance with embodiments of the present disclosure. The DTLB 141 of FIG. 1 receives the virtual load/store address 321 of FIG. 2 and provides to the L2 cache 107 a physical memory line address PA[51:6] 521 that is the translation of the virtual load/store address 321. More specifically, physical memory line address 521 bits PA[51:12] are translated from the virtual load/store address 321 bits [63:12]. The physical memory line address 521 comprises a tag 522 portion and a set index 526 portion. In some respects, the L2 cache 107 of FIG. 5 is similar and operates similarly to the L1 data cache 103 of FIG. 3 in that it analogously includes a tag array 532, a data array 536, a comparator 544, a multiplexer 546, an allocate way input 508 for allocating an entry into the L2 cache 107, and a data in input 525 for writing data into the L2 cache 107. However, the L2 cache 107 does not analogously include the tag hash logic 312, hashed tag array 334, comparator 348, nor multiplexer 342 of FIG. 3. The L2 cache 107 is physically-indexed and physically-tagged. That is, tag 522 is the tag portion (e.g., bits [51:17]) of the physical memory line address 521, and the set index 526 is the index portion (e.g., bits [16:6]) of the physical memory line address 521. Finally, the comparator 544 compares the tag 522 with the tag 404 of all ways of the selected set. If there is a valid match, the hit signal 552 is true and a way select signal 542, which indicates the matching way, is provided to mux 546; otherwise, the hit signal 552 is false. As described herein, a cache line of memory associated with a physical memory line address can only reside in one entry 401 of the L2 cache 107, and a PAP points to the one entry 401 of the L2 cache 107 that holds the copy of the cache line associated with the physical memory line address for which the PAP is a proxy.

FIG. 6 is an example block diagram of a cache subsystem 600 that employs PAPs to accomplish cache coherence in accordance with embodiments of the present disclosure. The cache subsystem 600 includes the L2 cache 107 of FIG. 5 that includes entries 401 of FIG. 4 and the L1 data cache 103 of FIG. 3 that includes entries 201 of FIG. 2. The cache subsystem 600 has an inclusive allocation policy such that each cache line of memory allocated into the L1 data cache 103 is also allocated into the L2 cache 107, and when the L2 cache 107 evicts the cache line, the L2 cache 107 also causes the L1 data cache 103 to evict the cache line. Because the L2 cache 107 is a physically-indexed physically-tagged cache, a cache line of memory may reside only in a single entry of the L2 cache 107. As described herein, each valid L1 entry 201 of the L1 data cache 103 includes a field, referred to as the dPAP 209 of FIG. 2. The dPAP 209, along with relevant bits of the L1 set index used to select the set of the L1 data cache 103 that includes the L1 entry 201, points to the entry 401 of the L2 cache 107 that holds a copy of the cache line of memory allocated into the L1 entry 201. The dPAP 209 along with the relevant bits of the L1 set index are referred to herein as the physical address proxy (PAP) 699 of FIG. 6, which may be considered a forward pointer to the L2 cache 107 that holds a copy of the cache line of memory allocated into the L1 entry 201. The PAP 699 is used to accomplish cache coherency in a more efficient manner, both in terms of timing and storage space, than using a full physical memory line address to accomplish cache coherency, as described herein. The inclusive allocation policy is further described with respect to FIG. 7.

In the embodiment of FIG. 6, the L2 cache 107 is a 512 KB 4-way set associative cache memory whose entries each store a 64-byte cache line. Thus, the L2 cache 107 includes an 11-bit L2 set index 602 that receives physical address bits PA[16:6] to select one of 2048 sets. However, other embodiments are contemplated in which the L2 cache 107 has a different cache line size, different set associativity, and different size. In the embodiment of FIG. 6, the L1 data cache 103 is a 64 KB 4-way set associative cache memory whose entries each store a 64-byte cache line. Thus, the L1 data cache 103 includes an 8-bit L1 set index 612 to select one of 256 sets. However, other embodiments are contemplated in which the L1 data cache 103 has a different cache line size, different set associativity, and different size. In the embodiment of FIG. 6, the lower six bits [5:0] of the L1 set index 612 receive physical address bits PA[11:6]. The upper two bits [7:6] are described in more detail below. In particular, in the example of FIG. 6, the lower six bits [5:0] of the L1 set index 612 correspond to untranslated virtual address bits VA[11:6] that are mathematically equivalent to untranslated physical address bits PA[11:6] which correspond to the lower six bits [5:0] of the L2 set index 602.

Figure 8:
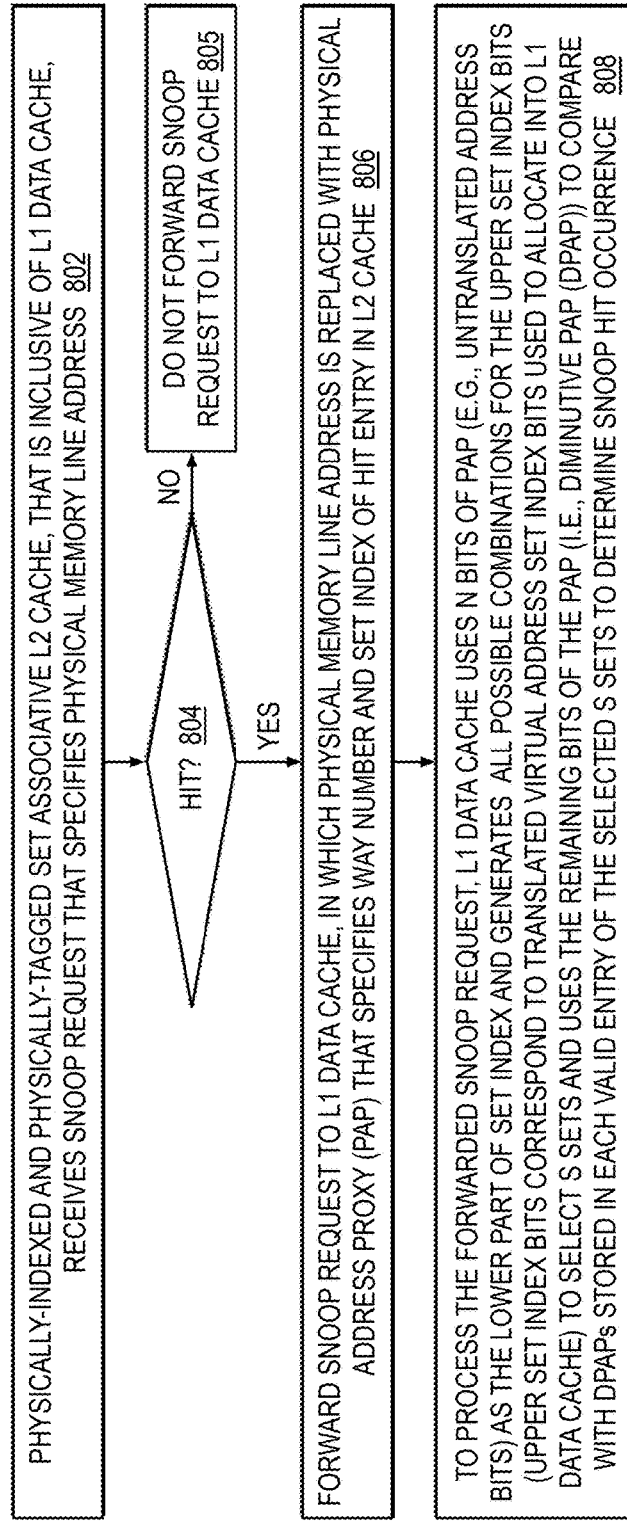
FIG. 8 is an example flowchart illustrating operation of the cache subsystem of FIG. 6 to process a snoop request in accordance with embodiments of the present disclosure.

FIG. 6 illustrates aspects of processing of a snoop request 601 by the cache subsystem 600, which is also described in FIG. 8, to ensure cache coherency between the L2 cache 107, L1 data cache 103 and other caches of a system that includes the core 100 of FIG. 1, such as a multi-processor or multi-core system. The snoop request 601 specifies a physical memory line address PA[51:6], of which PA[16:6] correspond to the L2 set index 602 to select a set of the L2 cache 107. Comparators 604 compare a tag portion 603 of the snoop request 601 against the four tags 605 of the selected set. The tag portion 603 corresponds to physical address bits PA[51:17]. Each of the four tags 605 is tag 404 of FIG. 4, which is the physical address bits PA[51:17] stored during an allocation into the L2 cache 107. If there is a tag match of a valid entry 401, the hit entry 401 is indicated on an L2way number 606, which is preferably a two-bit value encoded to indicate one of four ways, which is provided to snoop forwarding logic 607. The snoop forwarding logic 607 forwards the snoop request 601 to the L1 data cache 103 as forwarded snoop request 611.

The forwarded snoop request 611 is similar to the snoop request 601 except that the physical memory line address PA[51:6] is replaced with the PAP 699. The PAP 699 points to the snoop request 601 hit entry 401 in the L2 cache 107. That is, the PAP 699 is the physical address bits PA[16:6] that select the set of the L2 cache 107 that contains the hit entry 401 combined with the L2way number 606 of the hit entry 401. The PAP 699 is significantly fewer bits than the physical memory line address PA[51:6], which may provide significant advantages such as improved timing and reduced storage requirements, as described in more detail below. In the embodiment of FIG. 6, the PAP 699 is thirteen bits, whereas the physical memory line address is 46 bits, for a saving of 33 bits per entry of the L1 data cache 103, although other embodiments are contemplated in which the different bit savings are enjoyed.

In the embodiment of FIG. 6, the untranslated address bits PA[11:6] are used as the lower six bits [5:0] of the L1 set index 612. During a snoop request, the upper two bits [7:6] of the L1 set index 612 are generated by the L1 data cache 103. More specifically, for the upper two bits [7:6] of the L1 set index 612, the L1 data cache 103 generates all four possible combinations of the two bits. Thus, four sets of the L1 data cache 103 are selected in the embodiment of FIG. 6. The upper two bits [7:6] of the L1 set index 612 for processing of the forwarded snoop request 611 correspond to virtual address bits VA[13:12] of a load/store address during an allocation or lookup operation. Comparators 614 compare a dPAP 613 portion of the PAP 699 of the forwarded snoop request 611 against the dPAPs 209 of each entry 201 of each way of each of the four selected sets of the L1 data cache 103. In the embodiment of FIG. 6, sixteen dPAPs 209 are compared. The dPAP 613 portion of the PAP 699 is physical address bits PA[16:12] used to select the set of the L2 cache 107 that contains the hit entry 401 combined with the L2way number 606 of the hit entry 401. The sixteen dPAPs 209 are the dPAPs 209 of the sixteen selected entries 201. If there is a dPAP match of one or more valid entries 201, the hit entries 201 are indicated on an L1 hit indicator 616, received by control logic 617, that specifies each way of each set having a hit entry 201. Because the L1 data cache 103 is a virtually-indexed virtually-tagged cache, it may be holding multiple copies of the cache line being snooped and may therefore detect multiple snoop hits. In one embodiment, the L1 hit indicator 616 comprises a 16-bit vector. The control logic 617 uses the L1 hit indicator 616 to reply to the L2 cache 107, e.g., to indicate a miss or to perform an invalidation of each hit entry 201, as well as a write back of any modified cache lines to memory.

In one embodiment, the multiple sets (e.g., four sets in the embodiment of FIG. 6) are selected in a time sequential fashion as are the tag comparisons performed by the comparators 614. For example, rather than having four set index inputs 612 as shown in FIG. 6, the L1 data cache 103 may have a single set index input 612, and each of the four L1 set index values corresponding to the four different possible values of the two VA[13:12] bits are used to access the L1 data cache 103 in a sequential fashion, e.g., over four different clock cycles, e.g., in a pipelined fashion. Such an embodiment may have the advantage of less complex hardware in exchange for potentially reduced performance.

The smaller PAP (i.e., smaller than the physical memory line address PA[51:6]), as well as even smaller dPAPs, may improve timing because the comparisons that need to be performed (e.g., by comparators 614) are considerably smaller than conventional comparisons. To illustrate, assume a conventional processor whose first-level data cache stores and compares physical address tags, e.g., approximately forty bits. In contrast, the comparisons of dPAPs may be much smaller, e.g., seven bits in the embodiment of FIG. 6. Thus, the comparisons made by the comparators 614 of the embodiment of FIG. 6 may be approximately an order of magnitude smaller and therefore much faster than a conventional processor, which may improve the cycle time for a processor that compares dPAPs rather than full physical addresses. Second, there may be a significant area savings due to less logic, e.g., smaller comparators, and less storage elements, e.g., seven bits to store a dPAP in an L1 cache entry 201 rather than a large physical address tag. Still further, the much smaller dPAP comparisons may be sufficiently faster and smaller to make feasible an embodiment in which the comparisons of the ways of multiple selected sets are performed in parallel (e.g., sixteen parallel comparisons in the embodiment of FIG. 6). Finally, the smaller PAPs may further improve timing and area savings in other portions of the core 100 in which PAPs may be used in place of physical memory line addresses for other purposes, such as in entries of the load/store queue 125 for making decisions whether to perform a speculative store-to-load forward operation and for performing store-to-load forwarding violation checking at load/store commit time, or in entries of the write combine buffer 109 to determine whether store data of multiple store operations may be combined in an entry of the write combine buffer 109.

Figure 7:
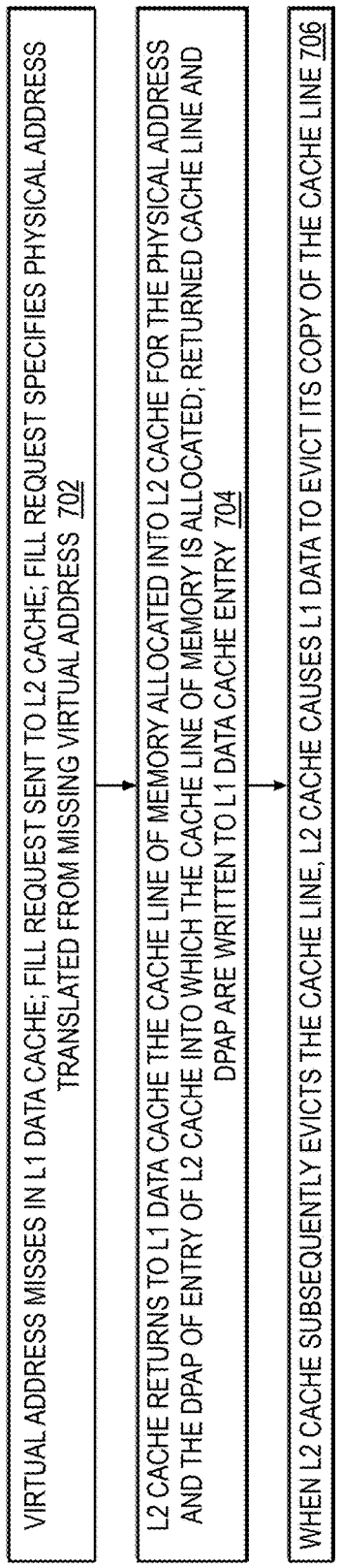
FIG. 7 is an example flowchart illustrating operation of the cache subsystem of FIG. 6 to process a miss in the L1 data cache in furtherance of an inclusive cache policy in accordance with embodiments of the present disclosure.

FIG. 7 is an example flowchart illustrating operation of the cache subsystem 600 of FIG. 6 to process a miss in the L1 data cache 103 in furtherance of an inclusive cache policy in accordance with embodiments of the present disclosure. Operation begins at block 702.

At block 702, a virtual address (e.g., VA 321 of FIG. 2 of a load/store operation) misses in the L1 data cache 103. In response, the cache subsystem 600 generates a cache line fill request to the L2 cache 107. The fill request specifies a physical address that is a translation of the missing virtual address obtained from the DTLB 141 of FIG. 1, which obtains the physical address from the TWE 145 of FIG. 1 if the physical address is missing in the DTLB 141. Operation proceeds to block 704.

At block 704, the L2 cache 107 looks up the physical address to obtain the requested cache line that has been allocated into the L2 cache 107. (If the physical address is missing, the L2 cache 107 fetches the cache line at the physical address from memory (or from another cache memory higher in the cache hierarchy) and allocates the physical address into an entry 401 of the L2 cache 107.) The L2 cache 107 then returns a copy of the cache line to the L1 data cache 103 as well as the dPAP (e.g., dPAP 323 of FIG. 3) of the entry 401 of the L2 cache 107 into which the cache line is allocated. The L1 data cache 103 writes the returned cache line and dPAP into the respective cache line data 202 and dPAP 209 of FIG. 2 of the allocated entry 201. Operation proceeds to block 706.

At block 706, at some time later, when the L2 cache 107 subsequently evicts its copy of the cache line (e.g., in response to a snoop request or when the L2 cache 107 decides to replace the entry 401 and allocate it to a different physical address), the L2 cache 107 also causes the L1 data cache 103 to evict its copy of the cache line. Thus, in the manner of FIG. 7, the L2 cache 107 is inclusive of the L1 data cache 103. Stated alternatively, as long as the cache line remains in the L1 data cache 103, the L2 cache 107 also keeps its copy of the cache line.

FIG. 8 is an example flowchart illustrating operation of the cache subsystem 600 of FIG. 6 to process a snoop request in accordance with embodiments of the present disclosure. Operation begins at block 802.

At block 802, a physically-indexed physically-tagged set associative L2 cache (e.g., L2 cache 107 of FIG. 6) that is inclusive of a lower-level data cache (e.g., L1 data cache 103 of FIG. 6) receives a snoop request (e.g., snoop request 601) that specifies a physical memory line address. Operation proceeds to block 804.

At block 804, the L2 cache 107 determines whether the physical memory line address hits in any of its entries 401. If so, operation proceeds to block 806; otherwise, operation proceeds to block 805 at which the L2 cache 107 does not forward the snoop request to the L1 data cache 103.

At block 806, the snoop request is forwarded to the L1 data cache 103, e.g., as a forwarded snoop request (e.g., forwarded snoop request 611). The forwarded snoop request replaces the physical memory line address of the original snoop request (e.g., PA[51:6] of FIG. 6) with the PAP (e.g., PAP 699 of FIG. 6) of the entry 401 of the L2 cache 107 that was hit, i.e., the way number (e.g., L2way 606 of FIG. 6) and the set index (e.g., L2 set index 602 of FIG. 6) that together point to the hit entry 401 of the L2 cache 107. Operation proceeds to block 808.

At block 808, the L1 data cache 103 uses N bits of the PAP (e.g., N=6 untranslated address bits such as PA[11:6] of FIG. 6) as lower set index bits to select one or more(S) sets of the L1 data cache 103. As described above with respect to FIG. 6, for the upper bits of the set index (e.g., two upper bits in FIG. 6), the L1 data cache 103 generates all possible combinations of the upper bits. The upper bits correspond to translated virtual address bits that are used to allocate into the L1 data cache 103, e.g., during a load/store operation (e.g., VA[13:12] 321 of FIG. 3). The L1 data cache 103 also uses the remaining bits of the PAP (i.e., not used in the L1 set index), which is the dPAP 613 portion of the PAP 699 of FIG. 6, to compare against the dPAPs 209 stored in each valid entry 201 of the selected sets to determine whether any snoop hits occurred in the L1 data cache 103 in response to the forwarded snoop request (e.g., as indicated on L1hit indicator 616 of FIG. 6). To process the forwarded snoop request, the L1 data cache 103 also performs an invalidation of each hit entry 201 as well as a write back of any modified cache lines to memory.

Figures 9, 10:
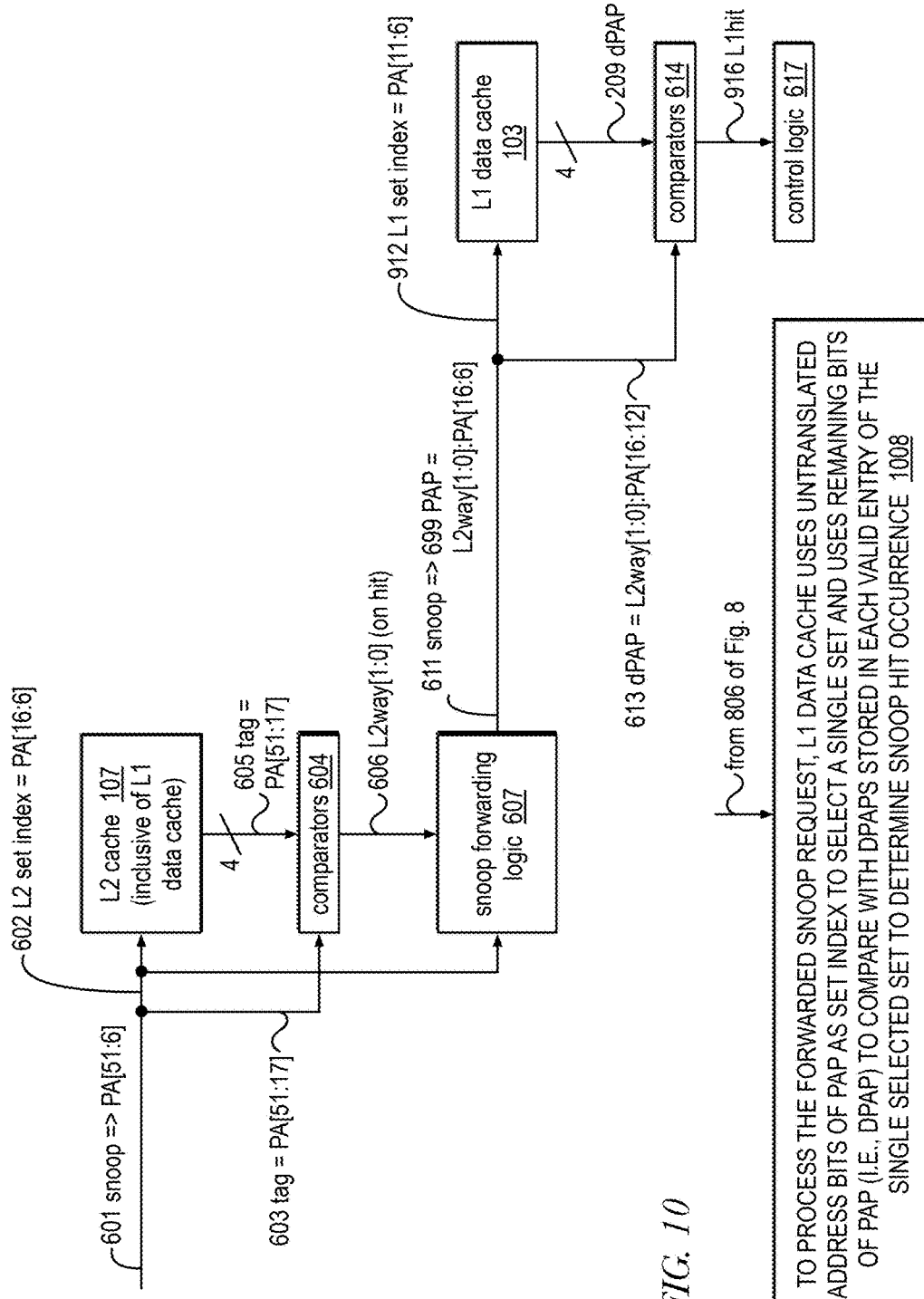
FIG. 9 is an example block diagram of a cache subsystem that employs PAPs to accomplish cache coherence in accordance with embodiments of the present disclosure.
FIG. 10 is an example flowchart portion illustrating operation of the cache subsystem of FIG. 9 to process a snoop request in accordance with embodiments of the present disclosure.

FIG. 9 is an example block diagram of a cache subsystem 900 that employs PAPs to accomplish cache coherence in accordance with embodiments of the present disclosure. The cache subsystem 900 of FIG. 9 is similar in many respects to the cache subsystem 600 of FIG. 6. However, in the cache subsystem 900 of FIG. 9, to process the forwarded snoop request 611, a single set of the L1 data cache 103 is selected rather than multiple sets. More specifically, the L1 data cache 103 uses untranslated bits (e.g., PA[11:6]) of the PAP 699 of the forwarded snoop request 611 that correspond to all bits of the L1 set index 912 to select a single set; the dPAP 613 is then used by comparators 614 to compare with the dPAPs 209 stored in each of the four ways of the single selected set to determine whether any snoop hits occurred in entries 201 of the L1 data cache 103 in response to the forwarded snoop request as indicated on L1hit indicator 916, as described in block 1008 of FIG. 10 in which operation flows to block 1008 from block 806 of FIG. 8 (rather than to block 808). In one embodiment, the L1 hit indicator 616 comprises a 4-bit vector. The embodiment of FIG. 9 may be employed when the L1 data cache 103 is sufficiently small and its cache lines size and set associative arrangement are such that the number of set index bits 912 are less than or equal to the number of untranslated address bits (excluding the cache line offset bits) such that corresponding bits of the L1 and L2 set indices correspond to untranslated address bits of the L1 data cache 103 virtual address 321 and the L2 cache 107 physical memory line address 521 such that a single set of the L1 data cache 103 may be selected to process a snoop request. For example, in the embodiment of FIG. 9, the L1 data cache 103 is a 16 KB cache memory having 4 ways that each store a 64-byte cache line; therefore, the L1 data cache 103 has 64 sets requiring a set index 912 of 6 bits that correspond to untranslated virtual address bits VA[11:6] that are mathematically equivalent to untranslated physical address bits PA[11:6] that correspond to the lower 6 bits of the L2 set index 602.

Figures 11, 12:
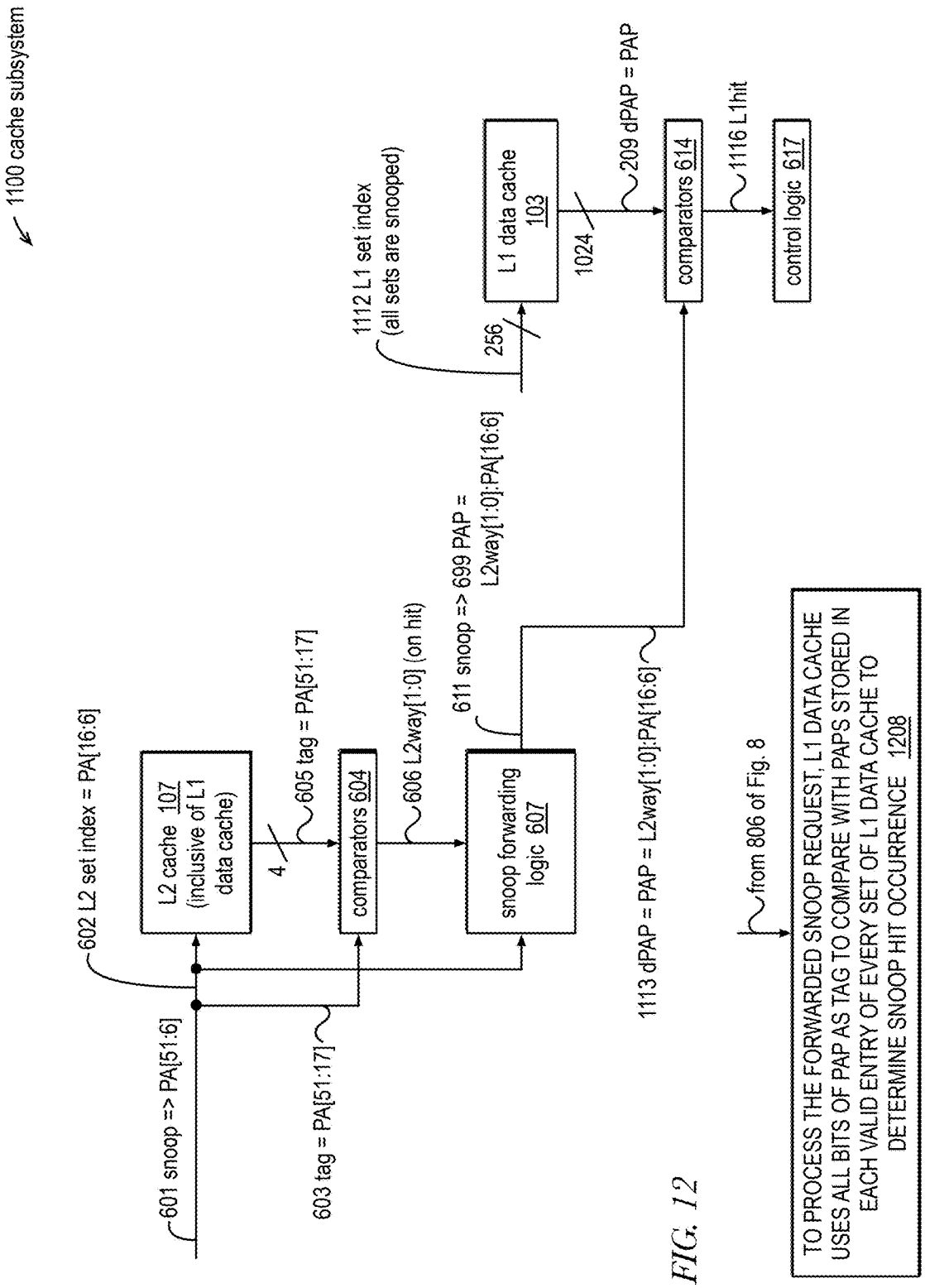
FIG. 11 is an example block diagram of a cache subsystem that employs PAPs to accomplish cache coherence in accordance with embodiments of the present disclosure.
FIG. 12 is an example flowchart portion illustrating operation of the cache subsystem of FIG. 11 to process a snoop request in accordance with embodiments of the present disclosure.

FIG. 11 is an example block diagram of a cache subsystem 1100 that employs PAPs to accomplish cache coherence in accordance with embodiments of the present disclosure. The cache subsystem 1100 of FIG. 11 is similar in many respects to the cache subsystem 600 of FIG. 6. However, in the cache subsystem 1100 of FIG. 11, all bits of the PAP 699 are used as the dPAP 1113 for processing snoop requests. More specifically, the dPAP 209 stored in an allocated entry of the L1 data cache 103 (e.g., at block 704 of FIG. 7) is the full PAP, no bits of the PAP 699 are used in the L1 set index 1112 to select sets to process a forwarded snoop request 611, and all bits of the PAP 699 provided by the forwarded snoop request 611, i.e., the dPAP 1113, are used by comparators 614 to compare with the dPAP 209 stored in the entries 201 of the L1 data cache 103. That is, in the embodiment of FIG. 11, the dPAP and the PAP are equivalent. Furthermore, in the embodiment of FIG. 11, all bits of the PAP stored in the dPAP field 209 of FIG. 2 of all sets of the L1 data cache 103 are compared by comparators 614 with the dPAP 1113, which is the PAP 699 of the forwarded snoop request 611, and the L1hit indicator 1116 specifies the hit entries 201, as described in block 1208 of FIG. 12 in which operation flows to block 1208 from block 806 of FIG. 8 (rather than to block 808). In one embodiment, the L1 hit indicator 1116 comprises a 1024-bit vector.

The embodiment of FIG. 11 may be employed when the address bits that correspond to the set index 326 used to access the L1 data cache 103 during an allocation operation (e.g., load/store operation) are not mathematically equivalent to the address bits that correspond to the set index 526 used to access the L2 cache 107. For example, the address bits that correspond to the set index 326 used to access the L1 data cache 103 during an allocation operation may be virtual address bits and/or a hash of virtual address bits or other bits such as a translation context of the load/store operation.

The embodiments described herein may enjoy the following advantages. First, the use of PAPs may improve timing because the comparisons that need to be performed are considerably smaller than conventional comparisons. To illustrate, assume a conventional processor that compares physical memory line address tags, e.g., on the order of forty bits. In contrast, the comparisons of PAPs or diminutive PAPs may be much smaller, e.g., single-digit number of bits. Thus, the comparisons may be much smaller and therefore much faster, which may improve the cycle time for a processor that compares PAPs or diminutive PAPs rather than physical cache line address tags. Second, there may be a significant area savings due to less logic, e.g., smaller comparators, and less storage elements, e.g., fewer bits to store a PAP or diminutive PAP rather than a physical memory line address in a cache entry, load/store queue entry, write combine buffer, etc.

Store-to-Load Forwarding Using PAPs

Embodiments are now described in which PAPs are used to make determinations related to store-to-load forwarding. Store-to-load forwarding refers to an operation performed by processors to increase performance and generally may be described as follows. Typically, when a load instruction is executed, the load unit looks up the load address in the cache, and if a hit occurs the cache data is provided to the load instruction. However, there may be an outstanding store instruction that is older than the load instruction and that has not yet written the store data to the cache for the same memory address as the load address. In this situation, if the cache data is provided to the load instruction it would be stale data. That is, the load instruction would be receiving the wrong data. One solution to solving this problem is to wait to execute the load instruction until all older store instructions have written their data to the cache. However, a higher performance solution is to hold the store data of outstanding store instructions (i.e., that have not yet written their store data into the cache) in a separate structure, typically referred to as a store queue. During execution of the load instruction the store queue is checked to see if the load data requested by the load instruction is present in the store queue. If so, the store data in the store queue is "forwarded" to the load instruction rather than the stale cache data.

Load and store instructions specify virtual load and store addresses. If forwarding is performed without comparing physical load and store addresses, i.e., forwarding based solely on virtual address comparisons, the forwarded store data may not be the correct requested load data since two different virtual addresses may be aliases of the same physical address. However, there are reasons to avoid comparing physical addresses for store-to-load forwarding purposes. First, the physical addresses are large and would require a significant amount of additional storage space per entry of the store queue. Second, timing is critical in high performance processors, and the logic to compare a large physical address is relatively slow. Historically, high performance processors speculatively perform store-to-load forwarding based on virtual address comparisons and use much fewer than the entire virtual addresses for fast comparisons, e.g., using only untranslated address bits of the virtual addresses. These high performance processors then perform checks later, either late in the execution pipeline or when the load instruction is ready to retire, to determine whether the incorrect data was forwarded to it. Third, even if the store physical addresses were held in the store queue, the load physical address is typically not available early in the load unit pipeline for use in comparing with the store physical addresses in the store queue thus resulting in a longer execution time of the load instruction, more specifically resulting in a longer load-to-use latency of the processor, which is highly undesirable with respect to processor performance.

FIG. 13 is an example block diagram of a store queue (SQ) entry 1301 of the SQ 125 of FIG. 1 that holds PAPs to accomplish store-to-load forwarding in accordance with embodiments of the present disclosure. The SQ entry 1301 includes store data 1302, a store PAP 1304, lower physical address bits PA[5:3] 1306, a byte mask 1308, and a valid bit 1309. The valid bit 1309 is true if the SQ entry 1301 is valid, i.e., the SQ entry 1301 has been allocated to a store instruction and its fields are populated with valid information associated with the store instruction. The store data 1302 is the data that is specified by the store instruction to be stored to memory. The store data is obtained from the register file 105 specified by the store instruction. The population of the SQ entry 1301 is described in more detail below with respect to FIG. 15.

The store PAP 1304 is a physical address proxy for a store physical line address to which the store data 1302 is to be written. The store instruction specifies a store virtual address. The store physical line address is a translation of a portion of the store virtual address, namely upper address bits (e.g., bits 12 and above in the case of a 4 KB page size). As described above, when a cache line is brought into the L2 cache 107 from a physical line address, e.g., by a load or store instruction, the upper address bits of the load/store virtual address specified by the load/store instruction are translated into a load/store physical line address, e.g., by the MMU 147 of FIG. 1. The cache line is brought into, i.e., allocated into, an entry of the L2 cache 107, which has a unique set index and way number, as described above.

The store PAP 1304 specifies the set index and the way number of the entry in the L2 cache 107 into which the cache line was allocated, i.e., the cache line specified by the physical line address of the load/store instruction that brought the cache line into the L2 cache 107, which physical line address corresponds to the store physical line address that is a translation of the upper bits of the store virtual address. The lower bits of the store virtual address (e.g., bits [11:0] in the case of a 4 KB page size) are untranslated address bits, i.e., the untranslated bits of the virtual and physical addresses are identical, as described above. The store physical address bits PA[5:3] 1306 correspond to the untranslated address bits [5:3] of the store virtual address. The store instruction also specifies a size of the store data to be written. In the example embodiment, the largest size of store data (and load data) is eight bytes. Hence, in the embodiment of FIG. 13, the size of the store data 1302 is up to eight bytes, and the store physical address bits PA[5:3] 1306 narrows down the location of the store data 1302 within a 64-byte cache line, for example. The store size and bits [2:0] of the store address may be used to generate the store byte mask 1308 that specifies, or encodes, which of the eight bytes are being written by the store instruction. Other embodiments are contemplated in which the bytes written by the store instruction are specified in a different manner, e.g., the size itself and bits [2:0] of the store address may be held in the SQ entry 1301 rather than the byte mask 1308.

Advantageously, each entry of the SQ 125 holds the store PAP 1304 rather than the full store physical line address, as described in more detail below. In the embodiment of FIG. 13, because in the example embodiment the L2 cache 107 is 4-way set associative, the store PAP 1304 specifies the 2 bits of the way number of the entry in the L2 cache 107 into which the cache line specified by the physical line address is allocated. Furthermore, in the embodiment of FIG. 13, because in the example embodiment the L2 cache 107 has 2048 sets, the store PAP 1304 specifies the eleven bits of the set index of the set of the entry in the L2 cache 107 into which the cache line specified by the physical line address is allocated, which corresponds to physical line address bits PA[16:6] in the embodiment. Thus, in the embodiment of FIG. 13, the store PAP 1304 is thirteen bits, in contrast to a full store physical line address, which may be approximately forty-six bits in some implementations, as described above, and in other implementations there may be more. Advantageously, a significant savings may be enjoyed both in terms of storage space within the SQ 125 and in terms of timing by providing the ability to compare PAPs rather than full physical line addresses when making store-to-load forwarding determinations, as described in more detail below.

FIG. 14 is an example block diagram of portions of the processor 100 of FIG. 1 used to perform store-to-load forwarding using PAPs in accordance with embodiments of the present disclosure. In the embodiment of FIG. 14, shown are the SQ 125, portions of the L1 data cache 103 (hashed tag array 334, tag hash logic 312, and comparator 348 (and mux, not shown, that is controlled based on the result of the comparator 348), e.g., of FIG. 3), byte mask logic 1491, a mux 1446, and forwarding decision logic 1499. The byte mask logic 1491, mux 1446, and forwarding decision logic 1499 may be considered part of the LSU 117 of FIG. 1. FIG. 14 illustrates the processing of a load instruction to which store data may be forwarded from an entry of the SQ 125. The load instruction specifies a load virtual address VA[63:0] 321 (e.g., of FIG. 3) and a load size 1489. The byte mask logic 1491 uses the load VA 321 and load size 1489 to generate a load byte mask 1493 that specifies the eight or less bytes of load data to be read from within an eight-byte aligned memory address range. The load byte mask 1493 is provided to the forwarding decision logic 1499. The load virtual address bits VA[5:3], which are untranslated and identical to the load physical address bits PA[5:3], are also provided to the forwarding decision logic 1499. The load virtual address bits VA[11:6], which are untranslated and identical to the load physical address bits PA[11:6], are also provided to the forwarding decision logic 1499.

As described above, the set index 326 portion of the load VA 321 selects a set of the hashed tag array 334, each way of the selected set is provided to comparator 348, and the tag hash logic 312 uses the load VA 321 to generate a hashed tag 324 provided to comparator 348 for comparison with each of the selected hashed tags 208 (of FIG. 2). Assuming a valid match, the comparator 348 provides the dPAP 209 (of FIG. 2) of the valid matching entry 201 of the L1 data cache 103, as described above. The dPAP 209 in conjunction with the load PA[11:6] bits form a load PAP 1495. In the embodiment of FIG. 13, the load PAP 1495 specifies the set index and the way number of the entry in the L2 cache 107 into which the cache line was allocated, i.e., the cache line specified by the physical line address of the load/store instruction that brought the cache line into the L2 cache 107, which physical line address corresponds to the load physical line address that is a translation of the upper bits of the load VA 321. The load PAP 1495 is provided to the forwarding decision logic 1499. If there is no valid match, then there is no load PAP available for comparison with the store PAP 1304 and therefore no store-to-load forwarding may be performed, and there is no valid L1 data out 327; hence, a cache line fill request is generated, and the load instruction is replayed when the requested cache line and dPAP are returned by the L2 cache 107 and written into the L1 data cache 103.

The SQ 125 provides a selected SQ entry 1399. The selected SQ entry 1399 may be selected in different manners according to different embodiments, e.g., according to the embodiments of FIGS. 18 and 19. The store data 1302 of the selected SQ entry 1399 is provided to mux 1446, which also receives the output data of the hitting entry of the L1 data cache 103, i.e., L1 data out 327, e.g., of FIG. 3. In the case of a hit in the L1 data cache 103, a forward control signal 1497 generated by the forwarding decision logic 1499 controls mux 1446 to select either the store data 1302 from the selected SQ entry 1399 or the L1 data out 327. The store PAP 1304, store PA[5:3] bits 1306, store byte mask 1308 and store valid bit 1309 of the selected SQ entry 1399 are provided to the forwarding decision logic 1499.

The forwarding decision logic 1499 determines whether the store data 1302 of the selected SQ entry 1399 overlaps the load data requested by the load instruction. More specifically, the SQ entry selection and forwarding decision logic 1499 generates a true value on the forward signal 1497 to control the mux 1446 to select the store data 1302 if the store valid bit 1309 is true, the load PAP 1495 matches the store PAP 1304, the load PA[5:3] matches the store PA[5:3] 1306, and the load byte mask 1493 and the store byte mask 1308 indicate the store data overlaps the requested load data, i.e., the requested load data is included in the valid bytes of the store data 1302 of the selected SQ entry 1399; otherwise, the forwarding decision logic 1499 generates a false value on the forward signal 1497 to control the mux 1446 to select the L1 data out 327. Stated alternatively, the store data overlaps the requested load data and may be forwarded if the following conditions are met: (1) the selected SQ entry 1399 is valid; (2) the load physical address and the store physical address specify the same N-byte-aligned quantum of memory, where N is the width of the store data field 1302 in a SQ entry 1301 (e.g., N=8 bytes wide), e.g., the load PAP 1495 matches the store PAP 1304 and the load PA[5:3] matches the store PA[5:3] 1306; and (3) the valid bytes of the store data 1302 of the selected SQ entry 1399 as indicated by the store byte mask 1308 overlap the load data bytes requested by the load instruction as indicated by the load byte mask 1493. To illustrate by example, assuming a valid selected SQ entry 1399, a PAP match and a PA[5:3] match, assume the store byte mask 1308 is a binary value 00111100 and the load byte mask 1493 is a binary value 00110000; then the store data overlaps the requested load data and the store data will be forwarded. However, assume the load byte mask 1493 is a binary value 00000011; then the store data does not overlap the requested load data and the store data will be forwarded, and instead the L1 data out 327 will be selected. An example of logic that may perform the byte mask comparison is logic that performs a Boolean AND of the load and store byte masks and then indicates overlap if the Boolean result equals the load byte mask. Other embodiments are contemplated in which the entry 201 of the L1 data cache 103 also holds other information such as permissions associated with the specified memory location so that the forwarding decision logic 1499 may also determine whether it is permissible to forward the store data to the load instruction. Although an embodiment is described in which the width of the store queue data field 1302 equals the largest possible size specified by a store instruction, other embodiments are contemplated in which the width of the store queue data field 1302 is greater than the largest possible size specified by a store instruction.

Advantageously, the forwarding decision logic 1499 may compare load PAP 1495 against the store PAP 1304 since they are proxies for the respective load physical line address and store physical line address, which alleviates the need for the forwarding decision logic 1499 to compare the load physical line address and store physical line address themselves. Comparing the PAPs may result in a significantly faster determination (reflected in the value of the forward control signal 1497) of whether to forward the store data 1302 and may even improve the load-to-use latency of the processor 100. Additionally, each SQ entry 1301 holds the store PAP 1304 rather than the store physical line address, and each L1 data cache 103 entry 201 holds the load PAP 1495 (or at least a portion of it, i.e., the dPAP 209) rather than the load physical line address, which may result in a significant savings in terms of storage space in the processor 100. Finally, unlike conventional approaches that, for example, make forwarding decisions based merely on partial address comparisons (e.g., of untranslated address bits and/or virtual address bits), the embodiments described herein effectively make a full physical address comparison using the PAPs.

Further advantageously, the provision of the load PAP by the virtually-indexed virtually-tagged L1 data cache 103 may result in a faster determination of whether to forward the store data because the load PAP is available for comparison with the store PAP sooner than in a physically-accessed cache design in which the virtual load address is first looked up in a translation lookaside buffer. Still further, using the hashed tag array 334 to hold and provide the PAP for the load instruction may result in the load PAP being available for comparison with the store PAP sooner than if a full tag comparison is performed, again which may result in a faster determination of whether to forward the store data. Finally, a faster determination of whether to forward the store data may be obtained because the SQ 125 provides a single selected SQ entry 1399 which enables the load PAP to be compared against a single store PAP rather than having to perform a comparison of the load PAP with multiple store PAPs. These various speedups in the store forwarding determination may, either separately or in combination, improve the load-to-use latency of the processor 100, which is an important parameter for processor performance.

FIG. 15 is an example flowchart illustrating processing of a store instruction, e.g., by the processor 100 of FIG. 14, that includes writing a store PAP into a store queue entry in accordance with embodiments of the present disclosure. As described above, the L2 cache 107 is inclusive of the L1 data cache 103 such that when a cache line is brought into an entry of the L1 data cache 103, the cache line is also brought into an entry of the L2 cache 107 (unless the cache line already resides in the L2 cache 107). As described above, e.g., with respect to FIG. 7, when the cache line is brought into the entry 401 of the L2 cache 107, the dPAP 209 used to specify the allocated L2 entry 401 is written into the entry 201 allocated into the L1 data cache 103. As described above, the dPAP 209 is the PAP that specifies the L2 entry 401 less any bits of the L2 set index of the PAP used in the set index of the L1 data cache 103. Stated alternatively, the dPAP is the L2 way number of the L2 entry 401 along with any bits of the L2 set index of the entry 401 not used in the set index of the L1 data cache 103. Operation begins at block 1502.

At block 1502, the decode unit 112 of FIG. 1 encounters a store instruction and allocates a SQ entry 1301 for the store instruction and dispatches the store instruction to the instruction schedulers 121 of FIG. 1. The store instruction specifies a register of the register file 105 of FIG. 1 that holds the store data to be written to memory. The store instruction also specifies a store virtual address, e.g., store VA 321 of FIG. 3 (the store VA 321 may include all 64 bits, i.e., including bits [5:0], even though FIG. 3 only indicates bits [63:6]) and a size of the data, e.g., one, two, four, or eight bytes. Operation proceeds to block 1504.

At block 1504, the LSU 117 executes the store instruction. The store virtual address 321 hits in the L1 data cache 103, at least eventually. If the store virtual address 321 initially misses in the L1 data cache 103 (e.g., at block 702 of FIG. 7), a cache line fill request will be generated to the L2 cache 107, which involves the DTLB 141 translating the store virtual address 321 into a store physical address. A portion of the store physical address is the store physical line address, e.g., store PA[51:6] that is used in the lookup of the L2 cache 107 to obtain the requested cache line and, if missing in the L2 cache 107 (and missing in any other higher levels of the cache hierarchy, if present), used to access memory to obtain the cache line. The L2 cache 107 returns the cache line and the PAP that is a proxy for the store physical line address. More specifically, the PAP specifies the way number and set index that identifies the entry 401 of the L2 cache 107 that is inclusively holding the requested cache line. The dPAP portion of the PAP is written along with the cache line to the entry of the L1 data cache 103 allocated to the store instruction (e.g., at block 704 of FIG. 7). The store instruction is replayed when the requested cache line and dPAP are returned by the L2 cache 107 and written into the L1 data cache 103. Upon replay, the store virtual address 321 hits in the L1 data cache 103. The hitting entry 201 of the L1 data cache 103 provides the store dPAP 209 that is used along with untranslated bits of the store virtual address 321 (e.g., VA[11:6], which are identical to store physical address bits PA[11:6]) to form a store PAP that is a physical address proxy of the store physical line address, i.e., the store PAP points to the entry 401 of the L2 cache 107 that holds the copy of the cache line held in the entry 201 of the L1 data cache 103 hit by the store virtual address 321. The store physical line address is the upper bits (e.g., [51:6]) of the store physical address. Operation proceeds to block 1506.

At block 1506, the LSU 117 obtains the store data from the register file 105 and writes it into the store data field 1302 of the SQ entry 1301 allocated at block 1502. The LSU 117 also forms the store PAP using the store dPAP 209 obtained from the L1 data cache 103 at block 1504 and lower untranslated address bits of the store virtual address 321 (e.g., store VA[11:6]). The LSU 117 then writes the store PAP into the store PAP field 1304 of the allocated SQ entry 1301. Finally, the LSU 117 writes into the allocated SQ entry 1301 additional information that determines the store physical address and store data size, which in the embodiment of FIGS. 13 and 14 includes writing store address bits [5:3] into the PA[5:3] field 1306 and writing a store byte mask into the byte mask field 1308. The store byte mask indicates which bytes within an eight-byte-aligned quantum of memory the store data are to be written in an embodiment in which the store byte mask of eight bits. As described above, the SQ entry 1301 is configured to hold the store PAP 1304 rather than the full store physical line address, which advantageously may reduce the amount of storage needed in the SQ 125.

FIG. 16 is an example flowchart illustrating processing of a load instruction, e.g., by the processor 100 of FIG. 14, that includes using a load PAP and a store PAP from a store queue entry to decide whether to forward store data to the load instruction from the store queue entry in accordance with embodiments of the present disclosure. Operation begins at block 1602.

At block 1602, a load instruction is issued to the LSU (e.g., 117). The LSU looks up the load virtual address (e.g., 321) in the L1 data cache (e.g., 103). In the embodiment of FIG. 14 (and FIGS. 18 and 19), the lookup includes looking up the load virtual address in the hashed tag array (e.g., 334). In the embodiment of FIG. 20, the lookup includes looking up the load virtual address in the tag array. Similar to the manner described above with respect to block 1504, the load virtual address eventually hits in the L1 data cache. The hit entry (e.g., 201) provides the dPAP (e.g., 209) for the load instruction. The load dPAP along with untranslated bits of the load virtual address (e.g., VA[11:6], which are identical to the load physical address PA[11:6]) are used to form the load PAP (e.g., 1495), e.g., as shown in FIG. 14. Additionally, a load byte mask (e.g., 1493 of FIG. 14) is generated (e.g., by byte mask logic 1491 of FIG. 14) from the load data size (e.g., 1489 of FIG. 14) and the lowest address bits (e.g., VA[2:0], which are identical to the load physical address PA[2:0]), e.g., as shown in FIG. 14. Operation proceeds to block 1604.

At block 1604, the SQ 125 provides a selected SQ entry (e.g., 1399), which includes the store data (e.g., 1302), store PAP (e.g., 1304), store lower physical address bits (e.g., PA[5:3]), store byte mask (e.g., 1308), and store valid bit (e.g., 1309), e.g., as shown in FIG. 14. As described with respect to FIG. 14, the SQ entry may be selected in different manners according to different embodiments, e.g., according to the embodiments of FIGS. 18 and 19. Operation proceeds to block 1606.

At block 1606, the store PAP and load PAP are used (e.g., by forwarding decision logic 1499 of FIG. 14)—along with additional information, e.g., the store lower address bits 1306 and load lower address bits (e.g., PA[5:3]) and store byte mask 1308 and load byte mask 1493 of FIG. 14—to determine whether to forward the store data (e.g., 1302) from the selected SQ entry to the load instruction or whether instead the cache data (e.g., L1 data out 327) is provided to the load instruction. That is, the store PAP and load PAP and the additional information are used to determine whether the store data of the selected SQ entry overlaps the load data requested by the load instruction. If the store data of the selected SQ entry overlaps the requested load data, then the store data is forwarded; otherwise, the data out of the L1 data cache is provided for the load instruction. Embodiments described herein use the load and store PAPs as proxies for the load and store physical line addresses to determine that the load and store have the same physical line address, which is required for the store data to overlap the requested load data. In contrast, conventional designs may forego a full physical line address comparison because of timing delays (e.g., instead making forwarding decisions based merely on partial address comparisons, e.g., of untranslated address bits and/or virtual address bits), whereas the embodiments described herein effectively make a full physical address comparison using the PAPs, but at a smaller timing cost because of the smaller PAP comparisons.

Figures 17, 18:
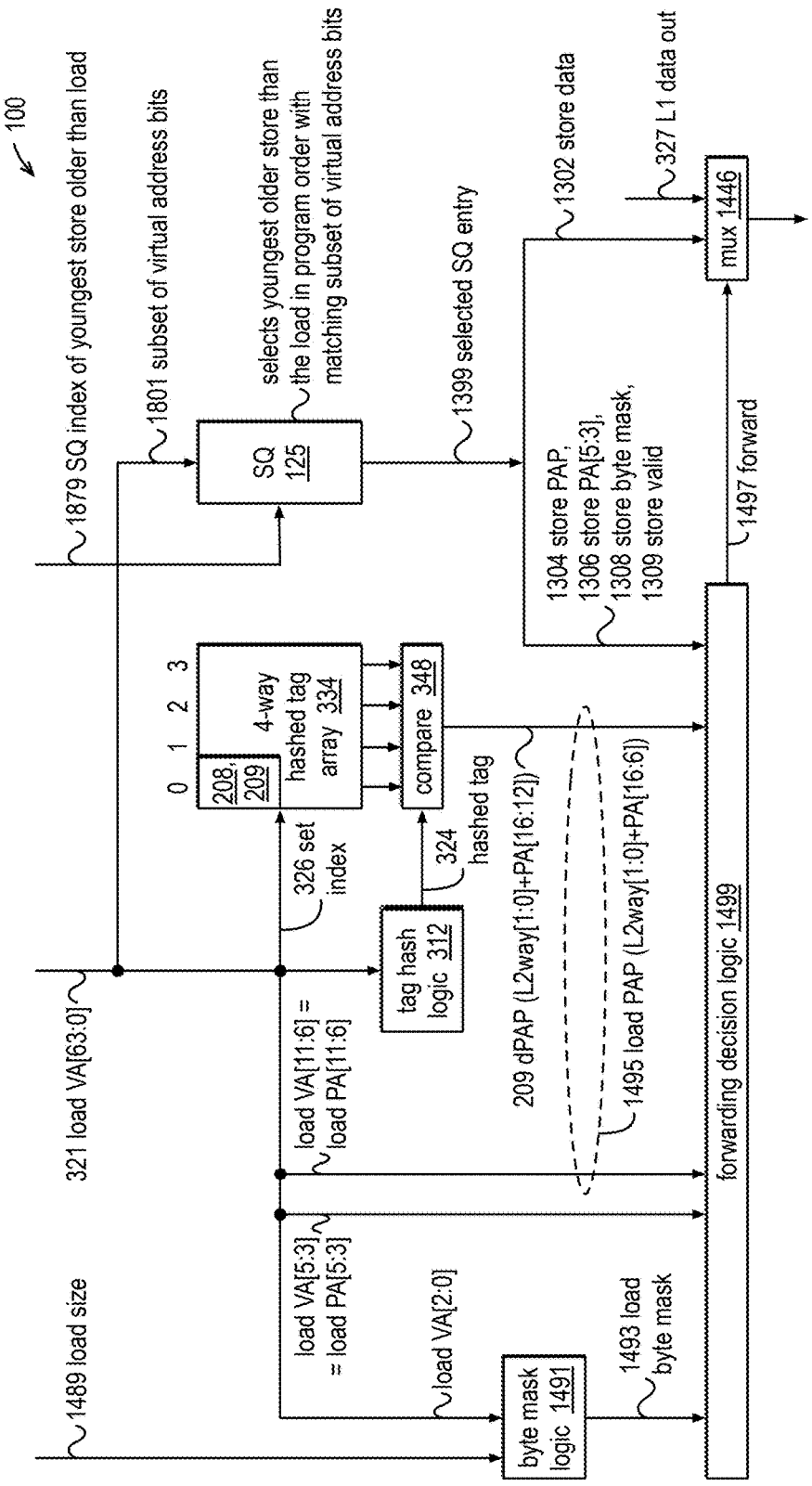
FIG. 17 is an example block diagram of a store queue entry of the store queue (SQ) of FIG. 1 that holds PAPs to accomplish store-to-load forwarding in accordance with embodiments of the present disclosure.
FIG. 18 is an example block diagram of portions of the processor of FIG. 1 used to perform store-to-load forwarding using PAPs in accordance with embodiments of the present disclosure.

FIG. 17 is an example block diagram of a SQ entry 1701 of the SQ 125 of FIG. 1 that holds PAPs to accomplish store-to-load forwarding in accordance with embodiments of the present disclosure. The SQ entry 1701 of FIG. 17 is similar in many respects to the SQ entry 1301 of FIG. 13. However, the SQ entry 1701 of FIG. 17 further includes a subset of virtual address bits 1711. In the embodiment of FIG. 18, the subset of virtual address bits 1711 is written, along with the other information of the SQ entry 1701 according to the operation of FIG. 15. That is, during execution of the store instruction the LSU 117 writes a corresponding subset of bits of the store virtual address 321 to the subset of virtual address bits field 1711 of the allocated SQ entry 1701, e.g., at block 1506, for subsequent use as described below with respect to FIG. 18.

FIG. 18 is an example block diagram of portions of the processor 100 of FIG. 1 used to perform store-to-load forwarding using PAPs in accordance with embodiments of the present disclosure. The embodiment of FIG. 18 is similar in many respects to the embodiment of FIG. 14, except that each entry 1701 of the SQ 125 also includes the subset of virtual address bits 1711 of FIG. 17. Additionally, in the embodiment of FIG. 18, the selected SQ entry 1399 (described with respect to FIG. 14) is selected using a subset of virtual address bits 1801 of the load virtual address 321, as shown. That is, the subset of the load virtual address bits 1801 are compared with the subset of virtual address bits 1711 of each valid entry of the SQ 125 for matches. If no matches are found, then no store-to-load forwarding is performed. The SQ 125 receives an indicator that indicates which entries 1701 of the SQ 125 are associated with store instructions that are older than the load instruction. Using the indicator, if one or more matches are found that are older in program order than the load instruction, logic within the SQ 125 selects as the selected SQ entry 1399 the youngest in program order from among the older matching SQ entries 1701. In one embodiment, the decode unit 112, which dispatches instructions-including all load and store instructions—to the execution units 114 in program order, generates and provides to the SQ 125, as the indicator, a SQ index 1879 for each load instruction which is the index into the SQ 125 of the SQ entry 1701 associated with the youngest store instruction that is older in program order than the load instruction. In an alternate embodiment, the index of the store instruction within the ROB 122 is held in each entry 1701 of the SQ 125, and the index of the load instruction within the ROB 122 (rather than the SQ index 1879) is provided to the SQ 125, as the indicator, for use, in conjunction with the ROB indices of the SQ entries 1701, in selecting the SQ entry 1701 associated with the matching youngest store instruction older in program order than the load instruction, i.e., selected SQ entry 1399. The SQ 125 provides the selected SQ entry 1399 to the forwarding decision logic 1499 and to the mux 1446, e.g., according to block 1604 of FIG. 16. That is, FIG. 18 describes an embodiment for selecting the selected SQ entry 1399, i.e., using virtual address bits and the indicator, and otherwise operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded. In an alternate embodiment, the load byte mask 1493 is provided to the SQ 125 (rather than to the forwarding decision logic 1499), and the logic within the SQ 125 compares the load byte mask 1493 against the store byte mask 1308 of each valid SQ entry 1701 to determine whether there is overlap of the requested load data by the store data 1302 of SQ entries 1701 whose subsets of virtual address bits 1711 match the load subset of virtual address bits 1801. That is, the logic within the SQ 125 additionally uses the byte mask compares to select the selected SQ entry 1399. In one embodiment, the subset of virtual address bits 1711 may be a hash of bits of the store virtual address 321 of the store instruction to which the SQ entry 1701 is allocated, and the subset of load virtual address bits 1801 used to compare with each valid entry 1701 of the SQ 125 may be a hash of bits of the load virtual address 321.

Figure 19:
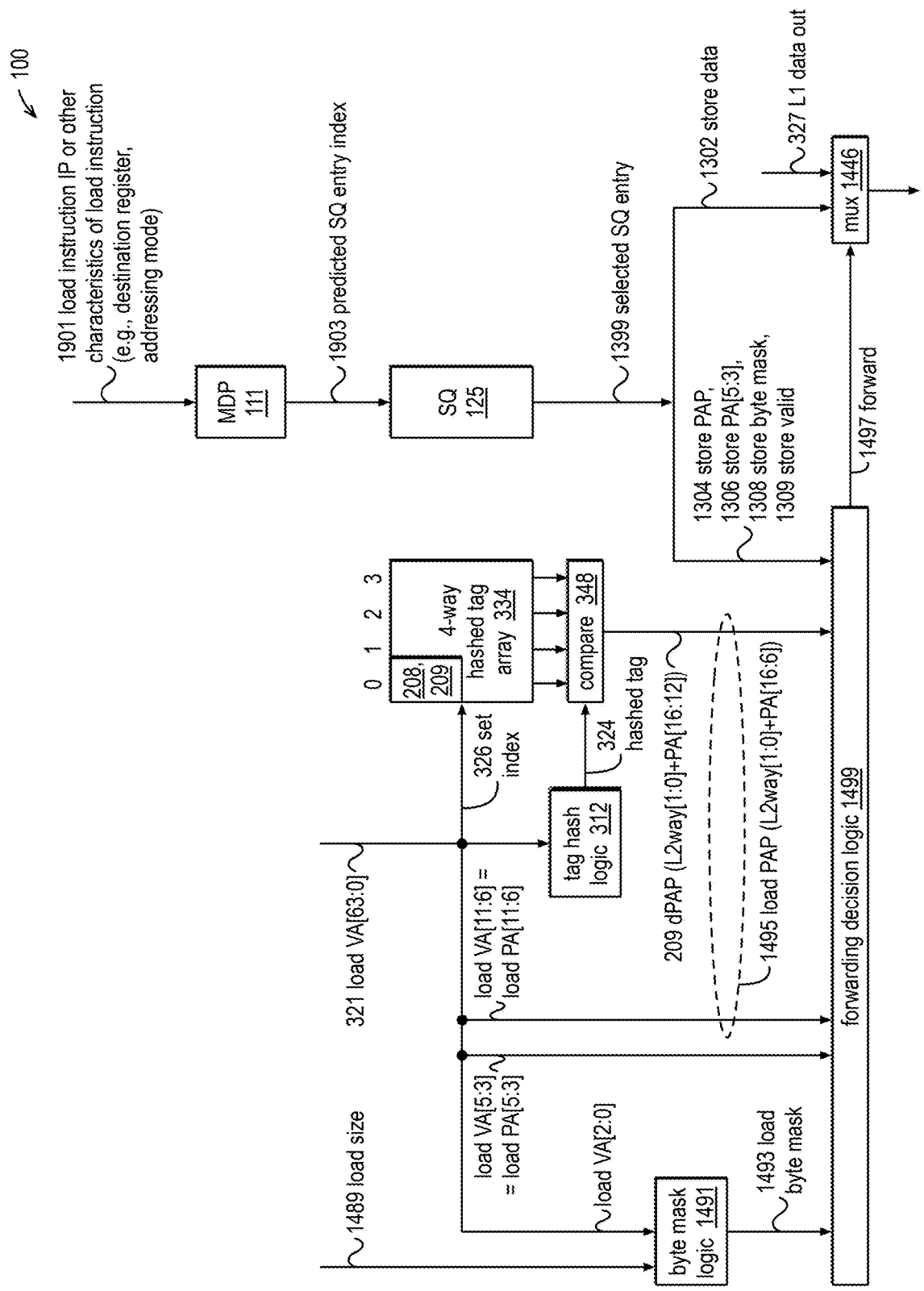
FIG. 19 is an example block diagram of portions of the processor of FIG. 1 used to perform store-to-load forwarding using PAPs in accordance with embodiments of the present disclosure.
Figure 20:
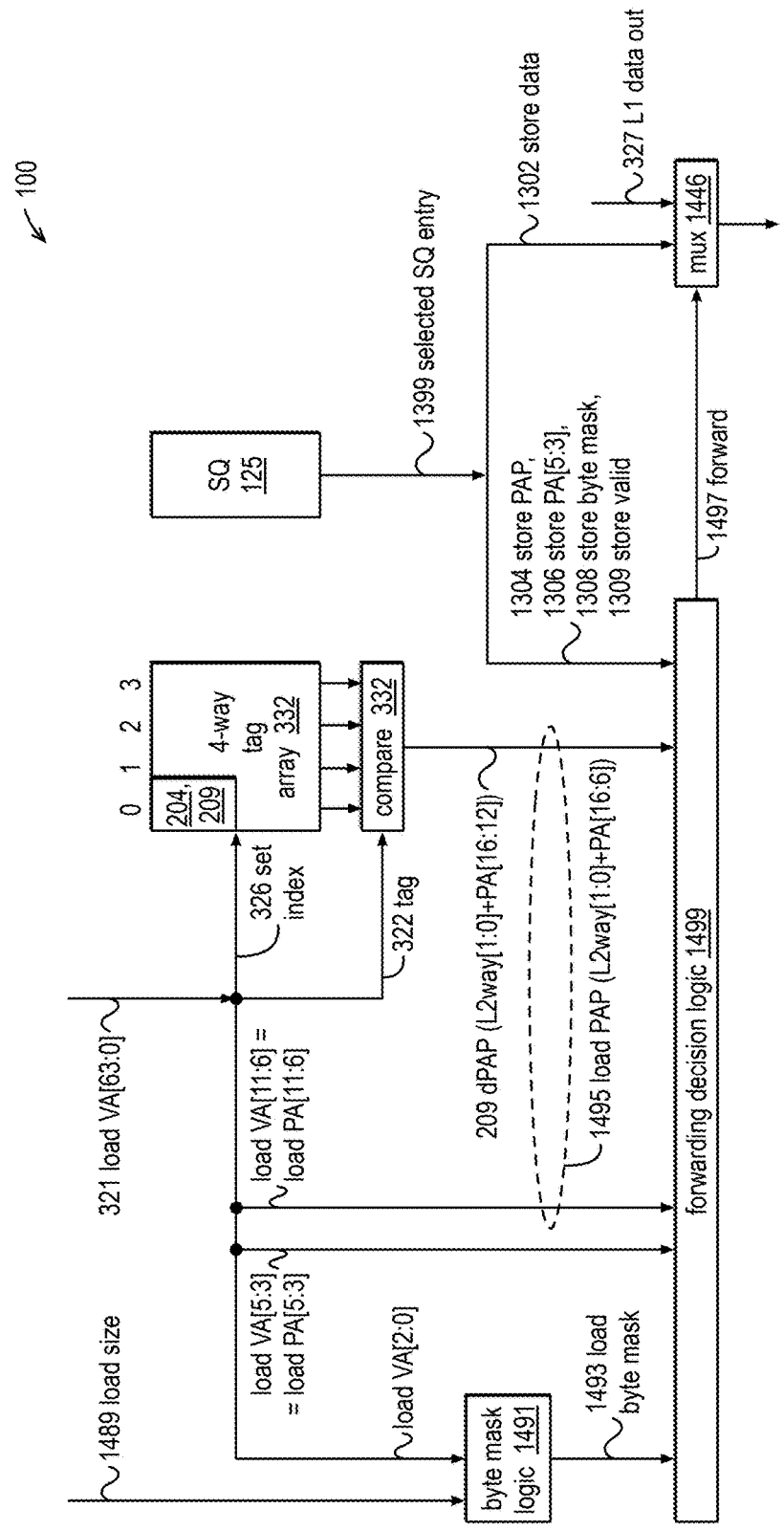
FIG. 20 is an example block diagram of portions of the processor of FIG. 1 used to perform store-to-load forwarding using PAPs in accordance with embodiments of the present disclosure.

FIG. 19 is an example block diagram of portions of the processor 100 of FIG. 1 used to perform store-to-load forwarding using PAPs in accordance with embodiments of the present disclosure. The embodiment of FIG. 19 is similar in many respects to the embodiment of FIG. 14, except that the embodiment of FIG. 19 uses the memory dependence predictor (MDP) 111 of FIG. 1 to provide a prediction of a store instruction from which to forward store data to the load instruction. In one embodiment, the MDP 111 receives an instruction pointer (IP) 1901 value of the load instruction, i.e., the address in memory from which the load instruction is fetched. In another embodiment, the MDP 111 receives information specifying other characteristics 1901 of the load instruction, such as a destination register of the store instruction or an addressing mode of the store instruction, i.e., a characteristic of the store instruction that may be used to distinguish the store instruction from other store instructions. The MDP 111 uses the received load instruction-specific information 1901 to generate a prediction of the store instruction from which store data should be forwarded to the load instruction. In the embodiment of FIG. 19, the prediction may be an index 1903 into the SQ 125 of the entry 1301 allocated to the predicted store instruction. The predicted SQ entry index 1903 is provided to the SQ 125 to select the selected SQ entry 1399. The SQ 125 provides the selected SQ entry 1399 to the forwarding decision logic 1499 and to the mux 1446, e.g., according to block 1604 of FIG. 16. That is, FIG. 19 describes an embodiment for selecting the selected SQ entry 1399, i.e., using the MDP 111, and otherwise operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded.

FIG. 20 is an example block diagram of portions of the processor 100 of FIG. 1 used to perform store-to-load forwarding using PAPs in accordance with embodiments of the present disclosure. The embodiment of FIG. 20 is similar in many respects to the embodiment of FIG. 14. However, the embodiment is absent a hashed tag array 334. Instead, in the embodiment of FIG. 20, the tag array 332 holds the dPAPs 209, and the tag 322 of the load VA 321 is compared with each of the selected tags 204 (of FIG. 2) to determine which dPAP 209 to provide for formation into the load PAP 1495. Otherwise, operation proceeds according to the manner described with respect to FIGS. 14 and 16, advantageously that the load and store PAPs, rather than full load and store physical line addresses, are used to determine whether the store data of the selected SQ entry 1399 overlaps the requested load data and may thus be forwarded.

Figure 21:
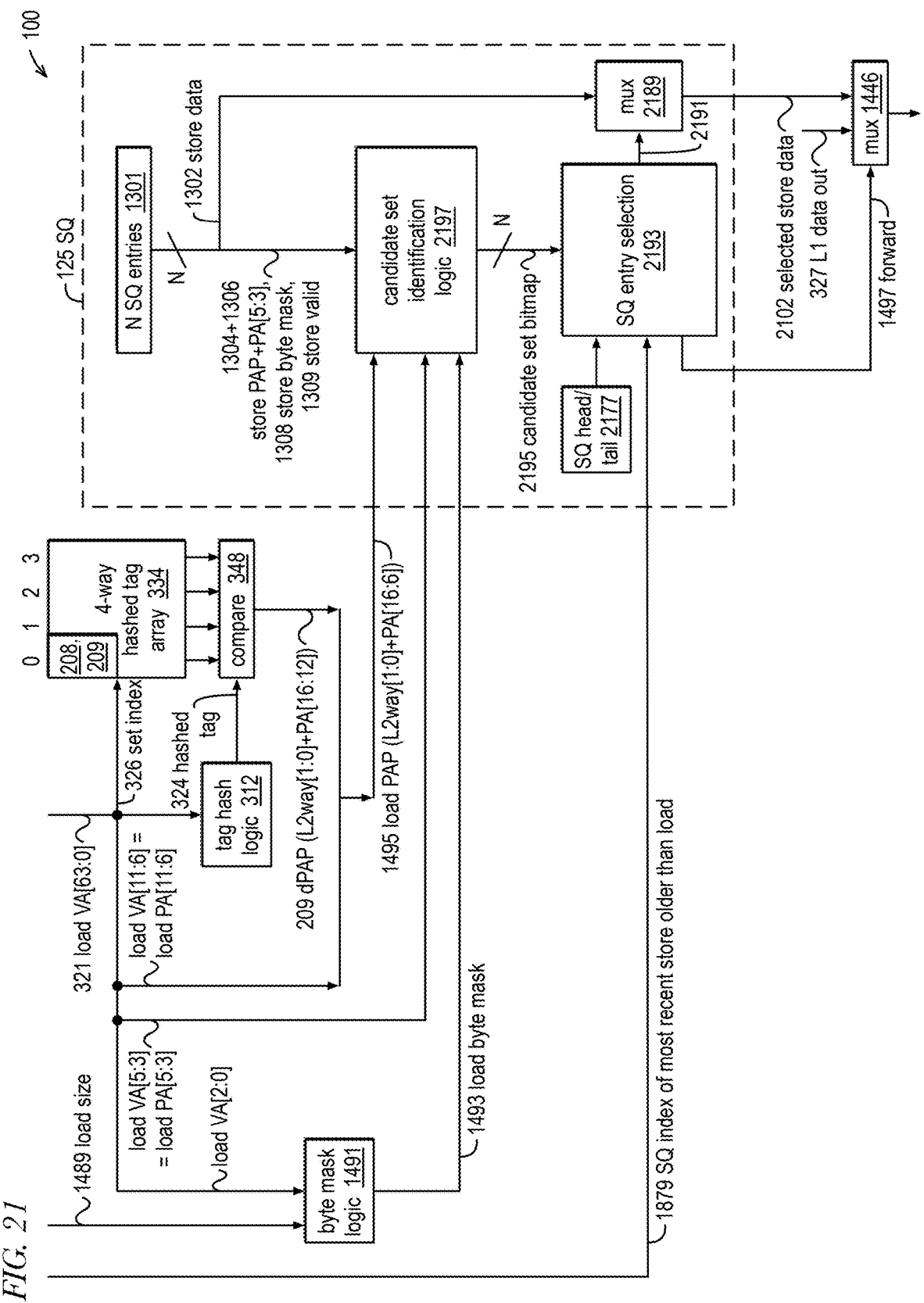
FIG. 21 is an example block diagram of portions of the processor of FIG. 1 used to perform store-to-load forwarding using PAPs in accordance with embodiments of the present disclosure.

FIG. 21 is an example block diagram of portions of the processor 100 of FIG. 1 used to perform store-to-load forwarding using PAPs in accordance with embodiments of the present disclosure. The embodiment of FIG. 21 is similar in many respects to the embodiment of FIG. 14, except that rather than using the load PAP to compare with a store PAP of a single selected SQ entry 1399 to determine whether the store data of the single selected SQ entry 1399 overlaps with the requested load data as in FIGS. 14 through 20, instead the load PAP is used to compare with the store PAP of all valid entries 1301 of the SQ 125 to select a SQ entry 1301 from which to forward store data to the load instruction.

The embodiment of FIG. 21 includes similar elements to FIG. 14 and additionally includes a SQ head/tail 2177 (i.e., the head and tail pointers that identify the set of valid SQ entries 1301), candidate set identification logic 2197, SQ entry selection logic 2193, and a mux 2189. The storage that stores all the SQ entries 1301 is also shown, the number of entries 1301 being denoted N in FIG. 21. The mux 2189 receives the store data 1302 of all N of the SQ entries 1301 and selects the store data indicated by a control signal 2191 generated by the SQ entry selection logic 2193 as described in more detail below. The candidate set identification logic 2197 receives all N SQ entries 1301 of the SQ 125. The candidate set identification logic 2197 also receives the load PAP 1495, the load lower address bits PA[5:3], and the load byte mask 1493. The candidate set identification logic 2197 compares the load PAP 1495 and load lower address bits PA[5:3] and load byte mask 1493 with the respective store PAP 1304 and store lower address bits PA[5:3] 1306 and store byte mask 1308 of each of the N entries 1301 of the SQ 125 to generate a candidate set bit vector 2195. The candidate set bit vector 2195 includes a bit for each of the N SQ entries 1301. A bit of the bit vector 2195 associated with a SQ entry 1301 is true if its store PAP 1304 and store lower address bits PA[5:3] 1306 match the load PAP 1495 and load lower address bits PA[5:3] and the store byte mask 1308 overlaps the load byte mask 1493.

The SQ entry selection logic 2193 receives the candidate set bit vector 2195, head and tail pointers 2177 of the SQ 125, and the SQ index of the most recent store older than the load 1879. Using the head and tail pointers 2177 of the SQ 125 and the SQ index of the most recent store older than the load 1879, the SQ entry selection logic 2193 selects, and specifies on mux 2189 control signal 2191, the SQ entry 1301 associated with the youngest store instruction in program order from among the SQ entries 1301 whose associated bit of the candidate set bit vector 2195 is true that is older in program order than the load instruction, if such a SQ entry 1301 exists. If such a SQ entry 1301 exists, the SQ entry selection logic 2193 generates the forward control signal 1497 to select the selected store data 2102 out of the mux 1446; otherwise, the mux 1446 selects the L1 data out 327.

In an alternate embodiment, the index of the load instruction within the ROB 122 (rather than the SQ index 1879) is provided, similar to the description with respect to FIG. 18, for use by the SQ entry selection logic 2193 in generating the mux 2189 control signal 2191 to select the store data 1302 from the SQ entry 1301 associated with the youngest store instruction older in program order than the load instruction from among the SQ entries 1301 whose associated bit of the candidate set bit vector 2195 is true.

Figure 22:
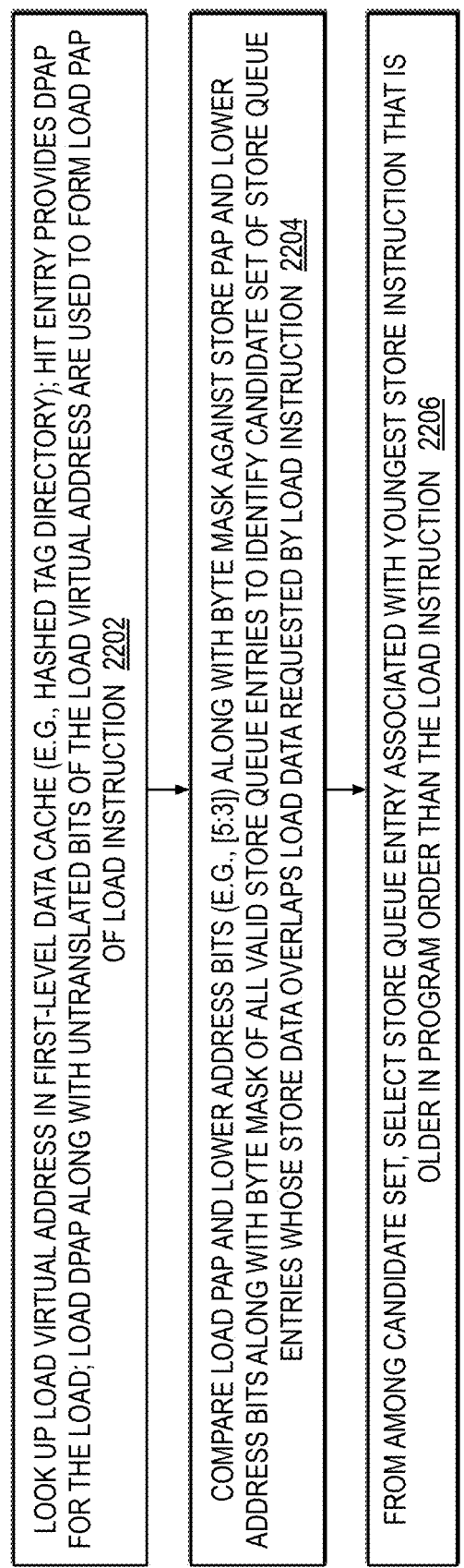
FIG. 22 is an example flowchart illustrating processing of a load instruction by the processor of FIG. 21 that includes using a load PAP and a store PAP of each entry of the store queue to decide whether to forward store data to the load instruction from a store queue entry in accordance with embodiments of the present disclosure.

FIG. 22 is an example flowchart illustrating processing of a load instruction by the processor 100 of FIG. 21 that includes using a load PAP and a store PAP of each entry of the store queue to decide whether to forward store data to the load instruction from a store queue entry in accordance with embodiments of the present disclosure. Operation begins at block 2202.

At block 2202, operation is similar to the operation described at block 1602 of FIG. 16. Operation proceeds to block 2204.

At block 2204, the load PAP (e.g., 1495) and load lower address bits (e.g., PA[5:3]) along with the load byte mask (e.g., 1493) are compared (e.g., by candidate set identification logic 2197 of FIG. 21) with the store PAP (e.g., 1304) and store lower physical address bits (e.g., PA[5:3]) along with the store byte mask (e.g., 1308) of each valid SQ entry (e.g., 1301) to identify a candidate set of SQ entries whose store data (e.g., 1302) overlaps the load data requested by the load instruction (e.g., indicated by candidate set bit vector 2195). Operation proceeds to block 2206.

At block 2206, from among the set of candidate SQ entries is selected (e.g., by mux 2189 controlled by SQ entry selection logic 2193) the store data from the SQ entry associated with youngest store instruction that is older in program order than the load instruction. Assuming such a SQ entry is found, the selected store data is forwarded to the load instruction; otherwise, the cache data (e.g., L1 data out 327) is provided to the load instruction. That is, the store PAP and load PAP and additional information (e.g., load and store lower address bits [5:3] and byte masks) are used to determine whether the store data of any of the SQ entries overlaps the load data requested by the load instruction. If the store data of the store instruction associated with one or more SQ entries overlaps the requested load data, and at least one of the overlapping store instructions is older than the load instruction, then the store data from the youngest of the older store instructions is forwarded; otherwise, the data out of the L1 data cache is provided for the load instruction. Embodiments described herein use the load and store PAPs as proxies for the load and store physical line addresses to determine that the load and candidate stores have the same physical line address, which is required for the store data to overlap the requested load data. In contrast, conventional designs may forego a full physical line address comparison because of timing delays (e.g., instead making forwarding decisions based merely on partial address comparisons, e.g., of untranslated address bits and/or virtual address bits), whereas the embodiments described herein effectively make a full physical address comparison using the PAPs, but at a smaller timing cost because of the smaller PAP comparisons.

Write Combining Using PAPs

One of the most precious resources in the processor is the cache memories. More specifically, the demand for access to the cache memories may often be very high. For this reason, a cache generally includes one or more wide data buses to read and write the cache, e.g., 16, 32, 64 bytes wide. However, the caches must also support the writing of small data, i.e., down to a single byte. This is because the size of the store data specified by some store instructions may be small, e.g., a single byte or two bytes, i.e., smaller than the wide busses to the cache. Furthermore, a program may perform a burst of small store instructions that specify addresses that are substantially sequential in nature. If each of these small store data is written individually to the cache, each tying up the entire wide cache bus even though only a single byte is being written on the bus, then the bus resources may be used inefficiently and congestion may occur at the cache, which may have a significant negative performance impact.

To alleviate the congestion and to improve the efficiency of the cache and of the processor, a technique commonly referred to as write-combining is often employed in high performance processors. Rather than writing each of the small store data to the cache individually, the store data are first written into a buffer before being written from the buffer to the cache. The processor looks for opportunities to combine the individual small store data into a larger block of data within the buffer that can be written from the buffer to the cache, thereby more efficiently using the wide cache bus and reducing congestion at the cache by reducing the number of writes to it. More specifically, the processor looks at the store addresses of the individual store data to determine whether the store addresses are in close enough proximity to be combined into an entry of the buffer. For example, assume a data block in an entry in the buffer is sixteen bytes wide and is expected to be aligned on a 16-byte boundary. The individual store instructions whose store addresses and store data sizes are such that their store data falls within the same 16-byte aligned block, i.e., 16-byte aligned memory range, may be combined into a given buffer entry.

More specifically, the store addresses that must be examined to determine whether they can be combined must be physical addresses because the combined blocks within the buffer are ultimately written to physical memory addresses. As described above, physical addresses can be very large, and comparison of physical addresses may be relatively time consuming and cause an increase in the processor cycle time, which may be undesirable. Additionally, in the case of a processor having a virtually-indexed virtually-tagged first-level data cache memory, conventionally the store addresses held in the store queue are virtual addresses. Consequently, the store physical address is not conventionally available when a decision needs to be made about whether the store data may be combined with other store data in the buffer. As a result, conventionally the store virtual address may need to be translated to the store physical address in order to make the write combining decision.

FIG. 23 is an example block diagram of a store queue entry 1301 of the store queue (SQ) 125 of FIG. 1 that holds PAPs to accomplish write-combining in accordance with embodiments of the present disclosure. The SQ entry 1301 is similar to the SQ entry 1301 of FIG. 13; however, the SQ entry 1301 of FIG. 23 also includes a store virtual address VA[63:12] field 2311. The store VA[63:12] field 2311 is populated with store VA[63:12] 321 of FIG. 3 when the store instruction is executed by the LSU 117. The store VA[63:12] field 2311 is subsequently used when the store instruction is committed, as described in more detail below. As described above, a store instruction is ready to be committed when there are no older instructions (i.e., older in program order than the store instruction) that could cause the store instruction to be aborted and the store instruction is the oldest store instruction (i.e., store instructions are committed in order), and a store instruction is committed when the store data 1302 held in the associated SQ entry 1301 is written into the L1 data cache 103 based on the store virtual address VA[63:12], PA[11:6] of the store PAP 1304, store PA[5:3] 1306, and the store byte mask 1308 held in the SQ entry 1301. A store instruction is being committed when the LSU 117 is writing the store data 1302 to the L1 data cache 103 and to the WCB 109, as described in more detail below. In one embodiment, only load and store instructions may be committed, whereas all other types of instructions commit and retire simultaneously.

FIG. 24 is an example block diagram of a write combining buffer (WCB) entry 2401 of the WCB 109 of FIG. 1 that holds PAPs to accomplish write combining in accordance with embodiments of the present disclosure. The WCB entry 2401 includes write data 2402, a write PAP 2404, lower physical address bits write PA[5:4] 2406, a write byte mask 2408, a valid bit 2409, a write VA[63:12] 2411 (virtual write address), and a non-combinable (NC) flag 2413. The population of the WCB entry 2401 is described in detail below with respect to FIGS. 25 through 28. The valid bit 2409 is true if the WCB entry 2401 is valid. A WCB entry 2401 is valid if the relevant information of one or more committed store instructions has been written to the WCB entry 2401, and the WCB entry 2401 has not yet been pushed out to the L2 cache 107. The relevant information of a store instruction written to the WCB entry 2401 is the store data 1302, store PAP 1304, store PA[5:4] 1306, store byte mask 1308 and store VA[63:12] 2311 of FIG. 23, which are written to the write data 2402, write PAP 2404, write PA[5:4] 2406, write byte mask 2408 and write VA[63:12] 2411 of the WCB entry 2401, respectively, e.g., at block 2812 of FIG. 28, and the valid bit 2409 is set to a true value. Furthermore, at block 2806 of FIG. 28, the store data 1302 is merged into the write data 2402, the store byte mask 1308 is merged into the write byte mask 2408, and none of the other fields of the WCB entry 2401 need to be updated. That is, the bytes of the store data 1302 whose corresponding bit of the store byte mask 1308 is true overwrite the relevant bytes of the write data 2402 (and the other bytes of the write data 2402 are not updated), and a Boolean OR of the store byte mask 1308 is performed with the appropriate portion of the write byte mask 2408, as described below with respect to block 2806, which accomplishes correct operation because store instructions are committed in program order.

The write data 2402 is the combined store data 1302 from the committed one or more store instructions. The write data 2402 is obtained by the WCB 109 from the LSU 117 when a store instruction is committed.

The write PAP 2404 is a physical address proxy for a write physical line address to which the write data 2402 is to be written. The write physical line address is a physical address aligned to the width of a cache line. The write physical line address is the physical memory address from which a cache line was inclusively brought into the L2 cache 107 when a copy of the cache line was brought into the L1 data cache 103, e.g., during execution of a load or store instruction, as described above. The cache line is brought into, i.e., allocated into, an entry of the L2 cache 107, which has a unique set index and way number, as described above. The write PAP 2404 specifies the set index and the way number of the entry 401 in the L2 cache 107 into which the cache line was allocated, i.e., the cache line specified by the physical line address of the load/store instruction that brought the cache line into the L2 cache 107. The store PAP 1304 of each of the store instructions combined into a WCB entry 2401 is identical since, in order to be combined, the store data 1302 of each of the store instructions must be written to the same cache line of the L2 cache 107, i.e., have the same store physical line address, and the store PAP 1304 is a proxy for the store physical line address. Thus, the WCB entry 2401 is able to include a single write PAP 2404 to hold the identical store PAP 1304 of all of the combined store instructions.

Referring briefly to FIG. 25, an example block diagram illustrating a relationship between a cache line and write blocks as used in performing writing combining using PAPs in accordance with one embodiment of the present disclosure is shown. Shown in FIG. 25 is a cache line 2502 within which are four write blocks 2504, denoted write block 0 2504, write block 1 2504, write block 2 2504, and write block 3 2504. In the example of FIG. 25, a cache block 2502 is 64 bytes wide and is aligned on a 64-byte boundary such that bits PA[5:0] of the physical line address that specifies the cache line 2502 are all zero. In the example of FIG. 25, a write block 2504 is sixteen bytes wide and is aligned on a 16-byte boundary such that bits PA[3:0] of the physical address that specifies the write block 2504, referred to as a "physical block address," are all zero. Furthermore, bits PA[5:4] of the physical block address specify which of the four write block locations within the cache line 2502 the write block 2504 belongs. More specifically, write block 0 2504 has PA[5:4]=00, write block 1 2504 PA[5:4]=01, write block 2 2504 PA[5:4]=10, and write block 3 2504 PA[5:4] =11, as shown.

Generally, the width in bytes of the write data 2402 in a WCB entry 2401 corresponds to the width in bytes of a write block and is referred to herein as 2^W (i.e., 2 to the power W), and the width in bytes of a cache line of the L2 cache 107 is referred to herein as 2^C. In the embodiment of FIGS. 24 and 25, W is four and C is six, i.e., the width 2^W of the write data 2402 is sixteen bytes and the width 2^C of a cache line in the L2 cache 107 is 64 bytes, although other embodiments are contemplated in which W is different than four, e.g., five or six, and C is different than six, e.g., seven or eight. However, W is less than or equal to C, and the memory address to which write data 2402 is written is 2^W-byte aligned. As may be observed, in embodiments in which W is less than C, the write data 2402 may belong in one of multiple write blocks of a cache line, as in the example of FIG. 25. More specifically, if W is four and C is six, when the write data 2402 is written through to the L2 cache 107, there are four possible 16-byte-aligned 16-byte blocks within the cache line to which the write data 2402 may be written. The possible aligned W-width blocks within the C-width cache line are referred to herein as "write blocks," and the physical address of a write block is referred to herein as a "physical block address." In the example embodiment of FIGS. 24 and 25 in which W is four and C is six, there are four possible write blocks and the combination of the write PAP 2404 and write PA[5:4] 2406 is a proxy for the write physical block address within the L2 cache 107, although other embodiments are contemplated as stated above. That is, the write block within the cache line is determined by the write PA[5:4] 2406. Because W is less than or equal to C, each store data 1302 combined into the write data 2402 of a WCB entry 2401 has the same write physical line address and belongs within the same cache line and has the same write physical block address and belongs within the same write block. In one embodiment, W is equal to C, i.e., the width of a WCB entry 2401 is the same as a cache line, in which case the write PA[5:4] bits 2406 are not needed to specify a write block within a cache line.

Referring again to FIG. 24, as described above, the write PA[5:4] 2406 is written with the store PA[5:4] bits 1306 of the store instruction for which the WCB entry 2401 is allocated, i.e., at block 2812. As described above, the write PA[5:4] specifies which of the four write blocks (e.g., 16-byte write blocks) within the cache line (e.g., 64-byte cache line) specified by the write PAP 2404 into which the write data 2402 is to be written. As described above, store PA[5:4] 1306 correspond to the untranslated address bits [5:4] of the store virtual address. The store PA[5:4] 1306 of each of the store instructions combined into a WCB entry 2401 is identical since, in order to be combined, the store data 1302 of each of the store instructions must be written to the same write block within the same cache line of the L2 cache 107, i.e., have the same write physical block address. Thus, the WCB entry 2401 is able to include a single write PA[5:4] 2406 to hold the identical store PA[5:4] 1306 of all of the combined store instructions.

The write byte mask 2408 indicates, or encodes, which bytes of the write data 2402 are valid. That is, the write byte mask 2408 indicates which bytes of the write data 2402 are to be written to the L2 cache 107. In the example embodiment, the size of a write block is sixteen bytes. Hence, in the embodiment of FIG. 24, the width W of the write data 2402 is sixteen bytes, the write byte mask 2408 is a 16-bit field, the width C of a cache line is 64 bytes, and the write byte mask 2408 specifies which bytes within a write block of a cache line of the L2 cache 107 the write data 2402 is to be written, and the write block of the cache line of the L2 cache 107 is specified by the write PA[5:4], as described above. As described above, the write byte mask 2408 is initially written at block 2812 of FIG. 28 with the store byte mask 1308 of the store instruction being committed, and the write byte mask 2408 may be subsequently merged at block 2806 of FIG. 28 with the store byte mask 1308 of a combining store instruction.

The NC flag 2413 is set to a true value if the WCB entry 2401 is not allowed to be combined with a store instruction. That is, a store instruction that is being committed may not be combined with a WCB entry 2401 whose NC flag 2413 is true. The NC flag 2413 may be set to true because a store instruction, or some other instruction in the program, indicates that the processor 100 may not weakly-order writes with respect to the store instruction. In other words, the processor 100 needs to enforce the order in which the store data of the store instruction is written to memory relative to the store data of preceding and/or following store instructions. More specifically, the processor 100 needs to enforce write ordering to some degree beyond merely enforcing writes in program order that are to the same physical memory address. For example, an instruction that performs an atomic read-modify-write operation may require strict write ordering, e.g., an instruction that atomically adds a value to a memory location. For another example, a fence instruction may indicate that all stores older than the fence must be written before all stores younger than the fence. For another example, the store instruction may indicate that it is to a noncacheable region of memory (in which case its store data 1302 will not be written to the L1 data cache 103 nor to the L2 cache 107) and should therefore be written in program order with respect to preceding and/or following store instructions. Weakly-ordered writes from the WCB 109 are described in more detail below with respect to FIG. 26.

If the store instruction or other program instruction indicates the processor 100 may not weakly-order writes with respect to the store instruction, the WCB 109 allocates a WCB entry 2401 for the store instruction and sets to true the NC flag 2413 in the allocated WCB entry 2401. The WCB 109 does not attempt to combine a committed store instruction with a WCB entry 2401 whose NC flag 2413 is true. Additionally, a true value of the NC flag 2413 also operates as a fence to prevent the WCB 109 from combining a committed store instruction with any WCB entry 2401 that is older than the youngest WCB entry 2401 whose NC flag 2413 is true. Stated alternatively, the WCB 109 only combines a committed store instruction with WCB entries 2401 that are younger than the youngest WCB entry 2401 whose NC flag 2413 is true. The age of a WCB entry 2401 is described in more detail below, but generally refers to the temporal order in which a WCB entry 2401 is allocated and de-allocated, rather than to the program order of one or more store instructions written into the WCB entry 2401. In one embodiment, the NC flag 2413 may also be set to true when the entry 401 of the L2 cache 107 that is pointed to by the write PAP 2404 is filled with a new cache line, which may have a physical line address that is different from the physical line address for which the write PAP 2404 is a proxy.

Advantageously, each entry of the WCB 109 holds the write PAP 2404 rather than the full physical line address associated with the combined store instructions, as described in more detail below. In the embodiment of FIG. 24, because in the example embodiment the L2 cache 107 is 4-way set associative, the write PAP 2404 specifies the 2 bits of the way number of the entry in the L2 cache 107 into which the cache line specified by the physical line address is allocated. Furthermore, in the embodiment of FIG. 24, because in the example embodiment the L2 cache 107 has 2048 sets, the write PAP 2404 specifies the eleven bits of the set index of the set of the entry in the L2 cache 107 into which the cache line specified by the physical line address is allocated, which correspond to physical line address bits PA[16:6] in the embodiment. Thus, in the embodiment of FIG. 24, the write PAP 2404 is thirteen bits, in contrast to a full physical line address, which may be approximately forty-six bits in some implementations, as described above, and in other implementations there may be more. Advantageously, a significant savings may be enjoyed both in terms of storage space within the WCB 109 and in terms of timing by providing the ability to compare PAPs rather than full physical line addresses when making write-combining determinations, as described in more detail below.

Figure 26:
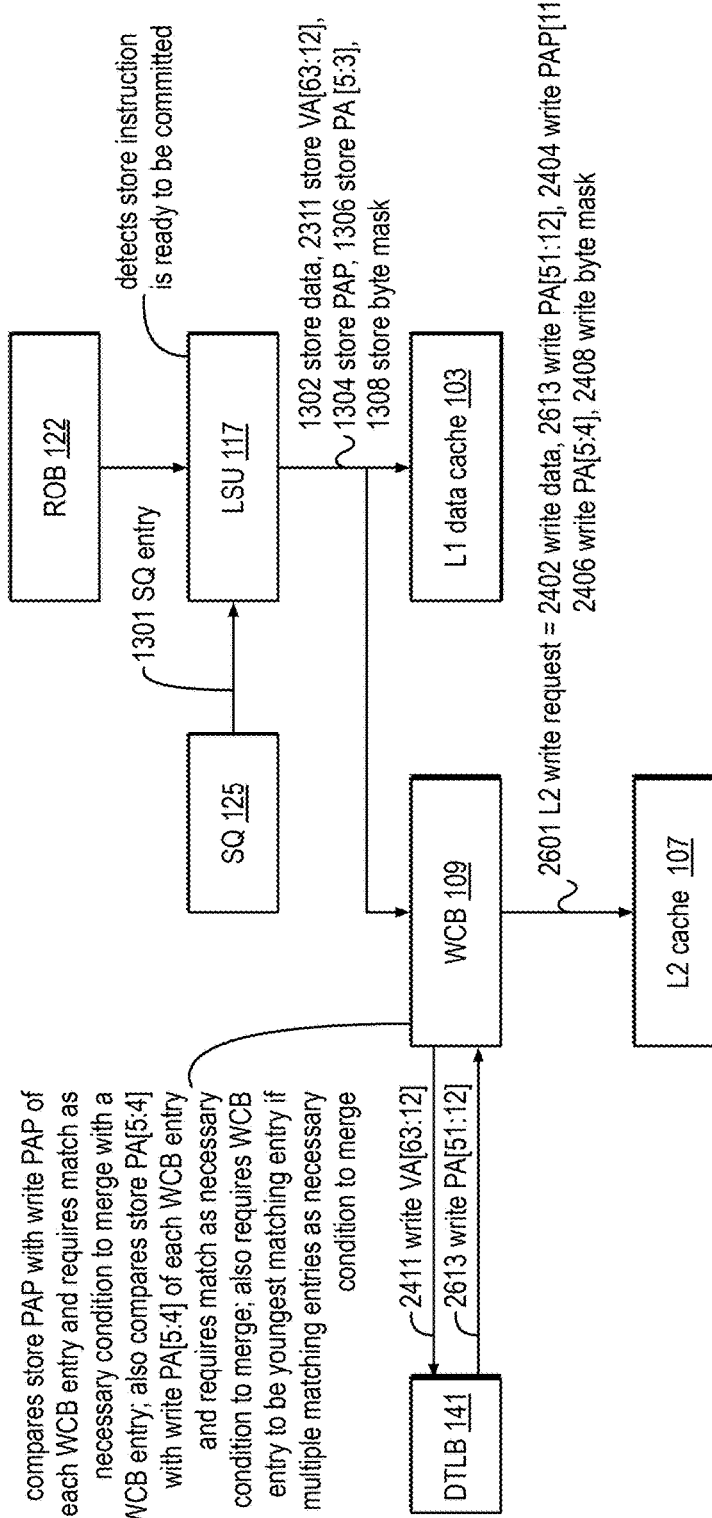
FIG. 26 is an example block diagram illustrating portions of the processor of FIG. 1 that perform writing combining using PAPs in accordance with embodiments of the present disclosure.

FIG. 26 is an example block diagram illustrating portions of the processor 100 of FIG. 1 that perform writing combining using PAPs in accordance with embodiments of the present disclosure. FIG. 26 includes the ROB 122, LSU 117, SQ 125, L1 data cache 103, WCB 109, DTLB 141, and L2 cache 107 of FIG. 1. As described above, the ROB 122 keeps track of the state of processing of each pending instruction and is used to retire instructions in program order. The LSU 117 is in communication with the ROB 122 to obtain the state of load and store instructions. More specifically, the LSU 117 includes logic that detects when load and store instructions are ready to be committed. As described above, a store instruction is ready to be committed when there are no older instructions in program order than the store instruction that could cause the store instruction to be aborted. The LSU 117 commits a store instruction by writing its store data 1302 to memory. In one embodiment, writing the store data 1302 to memory means writing the store data 1302 to the L1 data cache 103 and writing the store data 1302 through to the L2 cache 107. The store data 1302 is written through to the L2 cache 107 via the WCB 109, and the write to the WCB 109 is performed using the store PAP 1304 and write PAPs 2404, as described herein. In one embodiment, the L1 data cache 103 is a write-through cache, and if the cache line implicated by the store instruction that is being committed is no longer present in the L1 data cache 103, the L1 data cache 103 is not updated with the store data 1302. That is, the LSU 117 does not generate a fill request for the implicated cache line and does not update the L1 data cache 103 with the store data 1302. In one embodiment, the L2 cache 107 is a write-back cache, and if the cache line implicated by the store instruction that is being committed is no longer present in the L2 cache 107, the L2 cache 107 generates a fill request to fill the implicated cache line and then updates the filled cache line with the store data 1302.

The LSU 117 obtains from the SQ 125 the SQ entry 1301 associated with the store instruction that is being committed and then writes the store data 1302 to the L1 data cache 103. In the embodiment of FIG. 26, the LSU 117 provides the store VA[63:12] 2311, untranslated address bits PA[11:6] of the store PAP 1304, untranslated store bits PA[5:3], and the store byte mask 1308 to the L1 data cache 103. write the store data 1302 to memory.

The LSU 117 also writes the store data 1302 to the L2 cache 107 via the WCB 109. In the embodiment of FIG. 26, the LSU 117 provides the store data 1302, store PAP 1304, store PA[5:3] 1306, store byte mask 1308, and store VA[63:12] 2311 to the WCB 109 for either writing into the respective write data 2402, write PAP 2404, write PA[5:4] 2406, write byte mask 2408, and write VA[63:12] fields of a newly allocated WCB entry 2401 (e.g., at block 2812 of FIG. 28), or for merging the store data 1302 and store byte mask 1308 into the respective write data 2402 and write byte mask 2408 fields of a matching WCB entry 2401 (e.g., at block 2806 of FIG. 28).

The WCB 109 writes out WCB entries 2401 to the L2 cache 107 based on the age of the valid WCB entries 2401. That is, when the WCB 109 decides to write out a WCB entry 2401 to the L2 cache 107, the WCB 109 writes out the oldest WCB entry 2401. The age of a WCB 109 is determined by the order in which it was allocated. In one embodiment, the WCB 109 is configured as a first-in-first-out (FIFO) buffer with respect to the age of each WCB entry 2401. The age of a WCB entry 2401 within the WCB 109 does not (necessarily) correspond to the age in program order of the one or more store instructions merged into it, but instead corresponds to the order in which the WCB entry 2401 was allocated relative to the other valid WCB entries 2401 in the WCB 109. To illustrate by example, assume three store instructions A, B and C which have the program order A, B, C (which is also the same order in which the LSU 117 commits them). Assume the WCB 109 is empty, and A and C are to the same write block, but B is to a different write block. Assume that when A is committed, the WCB 109 allocates an entry 0 for A, and when B is committed, the WCB 109 allocates entry 1 for B. When C is committed, the WCB 109 will combine C with A into entry 0. Now entry 0 has the merged store data of both A and C. That is, even though B is ahead of C in program order, C effectively jumps ahead of B in write order, since entry 0 will be written to the L2 cache 107 before entry 1. This paradigm of weakly-ordered writes is supported by many instruction set architectures such as RISC-V, x86, and others. That is, writes to different addresses can be performed out of program order unless otherwise indicated by the program, e.g., unless a store instruction specifies that the write of its store data to memory must not be reordered with respect to earlier or later stores in program order. However, writes to the same address must be performed in program order, i.e., may not be weakly ordered.

The WCB 109 compares the store PAP 1304 of the store instruction being committed with the write PAP 2404 of each WCB entry 2401 (e.g., at block 2802 of FIG. 28) and requires a match as a necessary condition for combining the store instruction with a WCB entry 2401. In embodiments in which the width of the write data 2402 of a WCB entry 2401 is less than the width of a cache line (e.g., as in the embodiment of FIGS. 24 through 26), the WCB 109 compares the store PA[5:4] 1306 of the store instruction being committed with the write PA[5:4] 2406 of each WCB entry 2401 and requires a match as a necessary condition for combining the store instruction with a WCB entry 2401. Additionally, the WCB 109 requires as a necessary condition that a matching WCB entry 2401 is combinable (e.g., at decision block 2804 of FIG. 28). More specifically, to be combinable, the NC flag 2413 of the WCB entry 2401 must be false and there must not be any younger WCB entries 2401 whose NC flag 2413 is true. That is, a store instruction being committed is not allowed to skip over a WCB entry 2401 whose NC flag 2413 is true in order to combine with a WCB entry 2401 older than the WCB entry 2401 whose NC flag 2413 is true. Still further, if there are multiple matching and combinable WCB entries 2401, the WCB 109 requires as a necessary condition that the WCB entry 2401 into which the store data 1302 is merged is a youngest of the multiple matching WCB entries 2401 (e.g., at block 2806 of FIG. 28). If there is exactly one matching and combinable WCB entry 2401, it is the youngest matching and combinable entry. Finally, the WCB 109 requires as a necessary condition that the store instruction itself is combinable (e.g., at decision block 2801 of FIG. 28), e.g., that strict write ordering is not required for the store instruction. If any of the necessary conditions are not met, then the WCB 109 allocates a WCB entry 2401 for the store instruction being committed (e.g., at block 2812 of FIG. 28).

Once the WCB 109 is ready to write the oldest WCB entry 2401 to the L2 cache 107, the WCB 109 sends the write VA[63:12] 2411 from the oldest WCB entry 2401 to the DTLB 141 for translation into a write PA[51:12] 2613, which the DTLB 141 provides to the WCB 109 (e.g., at block 2814 of FIG. 2). The WCB 109 then generates an L2 write request 2601 to the L2 cache 107 that includes the write data 2402, the write PA[51:12], bits PA[11:6] of the write PAP 2404, the write PA[5:4] 2406, and the write byte mask 2408 of the oldest WCB entry 2401 (e.g., at block 2816 of FIG. 2).

Figure 27:
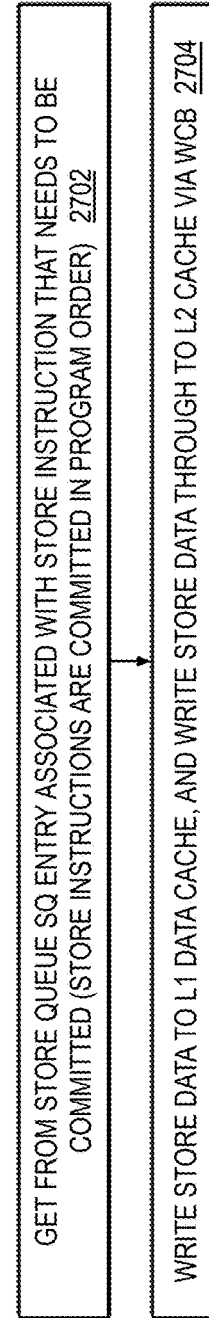
FIG. 27 is an example flowchart illustrating operation of the processor of FIG. 26 to commit a store instruction in accordance with embodiments of the present disclosure.

FIG. 27 is an example flowchart illustrating operation of the processor 100 of FIG. 26 to commit a store instruction in accordance with embodiments of the present disclosure. As described above, when a store instruction is executed, information about the store instruction is placed into an entry 1301 in the SQ 125. Typically, the store data is not immediately written to the L1 data cache 103. One reason is the store instruction may have been speculatively executed, i.e., the possibility exists that a subsequent event will require the store instruction to be flushed. For example, the processor 100 may detect that a branch instruction older than the store instruction was mis-predicted, or detect that incorrect data was forwarded to a load instruction that may then have been incorrectly consumed by the store instruction. So, the store instruction is held in an entry 1301 of the SQ 125 until the store instruction is ready to be committed, i.e., until there is no longer any possibility that the store instruction will need to be flushed. Store instructions that are ready to be committed are committed in program order. Operation begins at block 2702.

At block 2702, a store instruction needs to be committed. In one embodiment, logic within the LSU 117 detects that the store instruction associated with a SQ entry 1301 needs to be committed. The logic may receive information from the ROB 122 that indicates the store instruction is ready to be committed. The logic commits store instructions in program order. The LSU 117 obtains the SQ entry 1301 associated with the store instruction that is being committed. In one embodiment, the LSU 117 uses an index into the SQ 125 to obtain the SQ entry 1301 associated with the store instruction that is being committed. Operation proceeds to block 2704.

At block 2704, the LSU 117 writes the store data 1302 from the SQ entry 1301 to the L1 data cache 103, e.g., as data in 325 of FIG. 3. Additionally, the LSU 117 writes through the store data 1302 to the L2 cache 107 via the WCB 109, which is described in more detail below with respect to FIG. 28.

Figure 28:
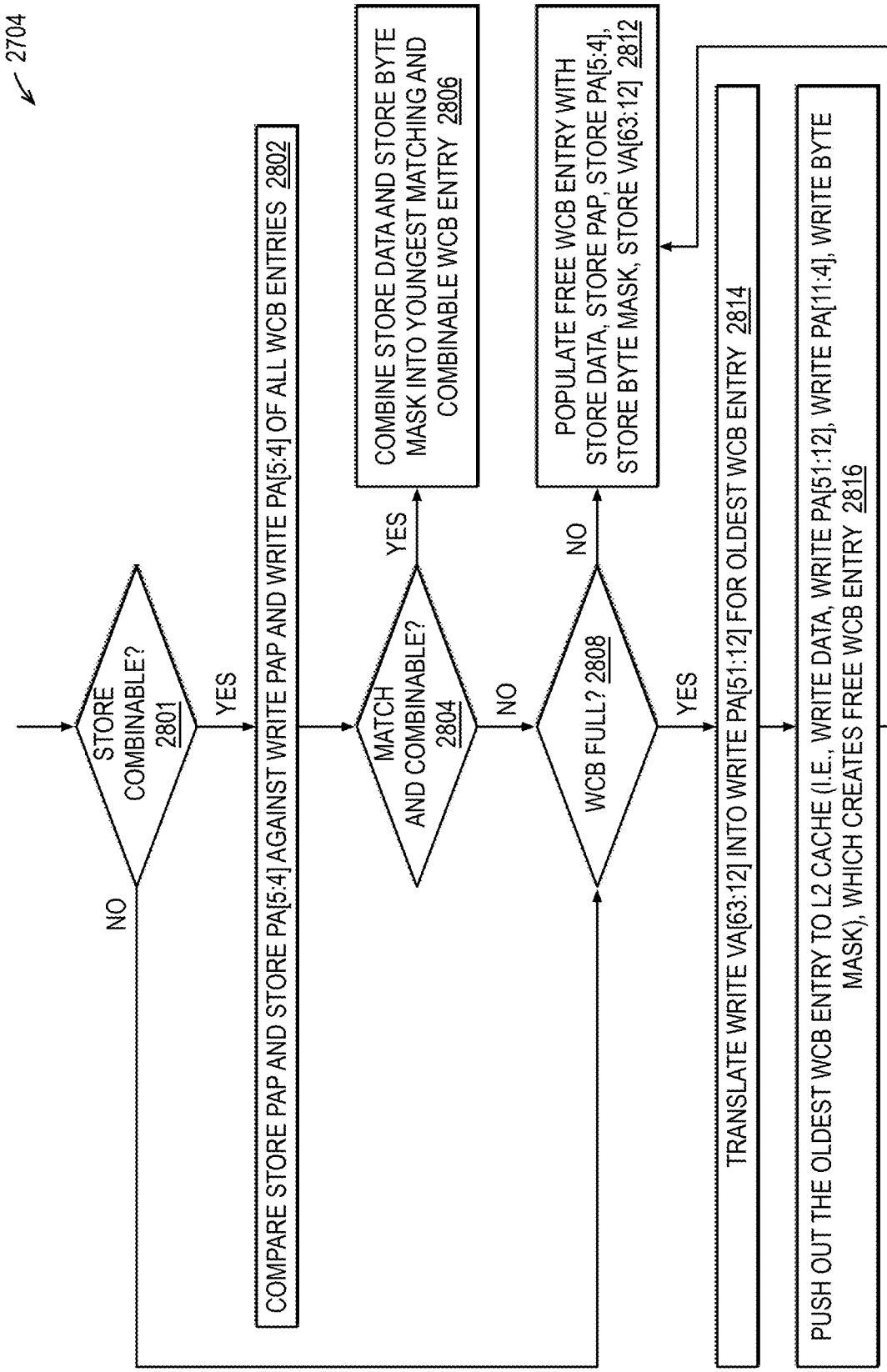
FIG. 28 is an example flowchart illustrating operation of the WCB of FIG. 26 to use PAPs to perform write combining in accordance with embodiments of the present disclosure.

FIG. 28 is an example flowchart illustrating operation of the WCB 109 of FIG. 26 to use PAPs to perform write combining in accordance with embodiments of the present disclosure. More specifically, FIG. 28 illustrates in more detail the portion of block 2704 of FIG. 27 in which the store data is written through to the L2 cache 107 via the WCB 109. Operation begins at decision block 2801.

At decision block 2801, if the store instruction indicates it is not combinable, e.g., needs to be ordered, operation proceeds to decision block 2808; otherwise, Operation proceeds to block 2802.

At block 2802, the WCB 109 compares the store PAP 1304 and store PA[5:4] with the write PAP 2404 and write PA[5:4] of each valid entry of the WCB 109. Operation proceeds to decision block 2804.

At decision block 2804, if the store PAP 1304 and store PA[5:4] match the write PAP 2404 and write PA[5:4] of one or more combinable valid entries 2401 of the WCB 109, operation proceeds to block 2806; otherwise, operation proceeds to decision block 2808. That is, in addition to the PAP and PA[5:4] matches, an additional condition required for operation to proceed to block 2806 is that a matching WCB entry 2401 be combinable. A WCB entry 2401 is combinable if the NC flag 2413 is false and there are no younger WCB entries 2401 whose NC flag 2413 is true.

At block 2806, the youngest matching and combinable WCB entry 2401 is selected for combining with the store instruction. If there is exactly one matching and combinable WCB entry 2401, it is selected as the youngest matching and combinable entry. The WCB 109 combines the store data 1302 with the selected WCB entry 2401 by writing each byte of the store data 1302 having a true-valued corresponding bit of the store byte mask 1308 to the corresponding byte of the appropriate half of the write data 2402, and the WCB 109 combines the store byte mask 1308 with the selected WCB entry 2401 by performing a Boolean OR with the write byte mask 2408.

At decision block 2808, if the WCB 109 is full (i.e., all entries 2401 of the WCB 109 are currently valid), operation proceeds to block 2814 to free an entry in the WCB 109; otherwise, operation proceeds to block 2812.

At block 2812, the WCB 109 allocates and populates a free WCB entry 2401 by writing the store data 1302, store PAP 1304, store PA[5:4] 1306, store byte mask 1308, and store VA[63:12] to the write data 2402, write PAP 2404, write PA[5:4] 2406, write byte mask 2408, and write VA[63:12]. If the store instruction, or some other instruction in the program, indicated the store instruction is not combinable (e.g., at decision block 2801), the WCB 109 sets the NC flag 2413 to true.

At block 2814, room needs to be made in the WCB 109 for the store instruction that is being committed. Therefore, the oldest entry 2401 in the WCB 109 needs to be pushed out to the L2 cache 107. The WCB 109 provides the write VA[63:12] 2411 from the oldest WCB entry 2401 to the DTLB 141 for translation into a write PA[51:12] 2613, which the DTLB 141 provides to the WCB 109. Operation proceeds to block 2816.

At block 2816, the WCB 109 pushes out the oldest entry 2401 of the WCB 109 to the L2 cache 107. That is, the WCB 109 writes the write data 2402 to the L2 cache 107 at the physical address specified by the write PA[51:12] 2613, the write PA[11:6] (i.e., bits [11:6] of the write PAP 1304), write PA[5:4] 2406, and the write byte mask 2408. The oldest/ pushed out WCB entry 2401 is now free for use by a new store instruction that is to be committed. Operation proceeds to block 2812 to populate the newly freed WCB entry 2401 (which is now the youngest entry 2401 in the WCB 109) with the store instruction that is being committed. In one embodiment, each WCB entry 2401 also includes a timeout value (not shown) that is initially set to zero and that is periodically incremented (or alternatively initially set to a predetermined value and periodically decremented). When the timeout value of an entry (i.e., the oldest entry) exceeds a predetermined value (or alternatively reaches zero), the WCB 109 requests the DTLB 141 to translate the write VA 2411 of the oldest entry 2401 into the write PA 2613 as described above with respect to block 2814, and the WCB 109 pushes the entry 2401 out of the WCB 109 to the L2 cache 107 per block 2816.

As may be observed from the foregoing, holding write PAPs in the WCB to facilitate write-combining may provide various advantages over conventional solutions. First, the comparisons of the write PAPs with the store PAP to make write combining determinations may be significantly faster than the full physical line address comparisons performed by a conventional processor. Second, the write PAPs held in the WCB consume less storage space than a full physical line address. Third, holding write PAPs in the WCB to facilitate write-combining may enable the employment of a virtually-indexed virtually-tagged first level cache, which may have significant advantages, particularly in terms of performance. For example, one solution a conventional processor with a virtual cache may employ is to compare the virtual line address of the store instruction with the virtual line address stored in each entry of the conventional WCB. However, such as solution is burdened with the requirement to deal with the possibility that the multiple virtual line addresses held in the WCB entries may be synonyms of a single physical line address. In contrast, the embodiments described that hold the write PAPs are not burdened with that requirement. For another example, another solution a conventional processor with a virtual cache may employ is to hold physical line addresses in each WCB entry and to translate the store virtual line address to a store physical line address each time a store instruction is being committed to compare the store physical line address with the physical line address held in each WCB entry. In contrast, embodiments described herein facilitate the translation of a single write virtual line address (which is the same as the store virtual line address of each store instruction combined into the WCB entry) when the WCB entry is ready to be written to memory, rather than requiring a virtual to physical translation each time a store instruction is being committed. This is particularly advantageous in that it may reduce the amount of power consumed by the TLB and may be less complex than the conventional solution.

Using PAPs to Perform Store-to-Load Forwarding Correctness Checks

Embodiments will now be described in which PAPs are used to perform store-to-load forwarding correctness checks (also referred to herein as forwarding correctness checks). Embodiments are described in which the LSU 117 executes a load instruction, which involves making a store-to-load forwarding decision (e.g., using PAPs as described above), and subsequently as store instructions older than the load instruction are committed, a check is made at each store instruction commit-using PAP comparisons rather than full physical memory line address comparisons—to determine whether the forwarding decision was correct for the load instruction relative to the store instruction being committed. Forwarding correctness state within the load queue entry associated with each load instruction may be updated based on the correctness check made for each store instruction as it commits. Once all older store instructions have committed, a final determination of the correctness of the forwarding decision can be observed from the final state of the forwarding correctness state based on the individual forwarding correctness checks associated with the commits of the older store instructions. Advantageously, comparisons of the PAPs rather than full physical memory line address comparisons may provide significant savings in terms of storage space within the load queue (LQ) 125 and in terms of timing when making store-to-load forwarding checks.

Figure 29:
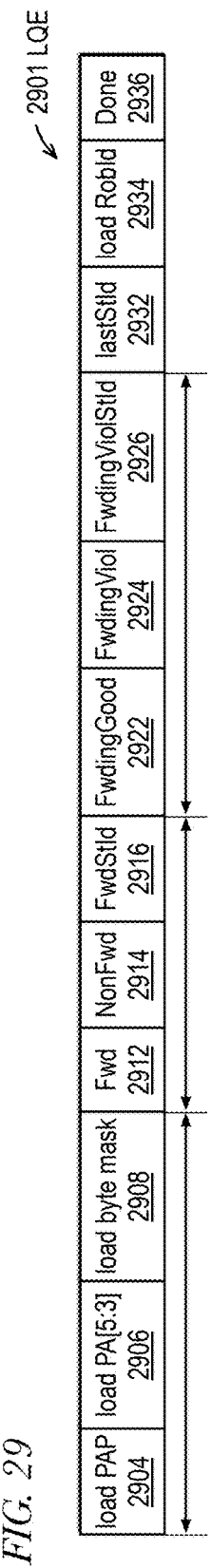
FIG. 29 is an example block diagram of a load queue (LQ) entry of the LQ of FIG. 1 in accordance with embodiments of the present disclosure.

FIG. 29 is an example block diagram of a load queue (LQ) entry 2901 of the LQ 125 of FIG. 1 in accordance with embodiments of the present disclosure. Each LQ entry 2901 holds a PAP to accomplish store-to-load forwarding correctness checks as described in detail below. The LQ entry 2901 includes the following fields which are described in more detail below: load PAP 2904, load PA[5:3] 2906, load byte mask 2908, Fwd flag 2912, NonFwd flag 2914, FwdStId 2916, FwdingGood flag 2922, Fwding Viol flag 2924, Fwding ViolStId 2926, lastStId 2932, load RobId 2934, and Done flag 2936. The load PAP 2904, load PA[5:3] 2906, and load byte mask 2908 are referred to collectively as the load address/size information. The Fwd flag 2912, NonFwd flag 2914, and FwdStId 2916 are referred to collectively as the forwarding behavior information. The FwdingGood flag 2922, FwdingViol flag 2924, and Fwding ViolStId 2926 are referred to collectively as the forwarding correctness information. The forwarding behavior information and the forwarding correctness information are referred to collectively as the forwarding information.

As described above, the load and store queues 125 of FIG. 1 may be separate memory queue structures or they may be combined into a single memory queue structure rather than separate memory queue structures; hence, the term load/store queue may refer to a combined embodiment, and the term load/store queue may also refer to a separate load queue or a separate store queue. A load instruction loads load data received from the L1 data cache 103 or forwarded from a SQ entry 1301 into a physical register of the physical register file 105 that is the destination register specified by the load instruction. The population of some fields of the LQ entry 2901 is performed prior to dispatch of the load instruction, other fields during execution of the load instruction, and other fields while one or more store instructions older than the load instruction are being committed, as described in more detail below.

The load instruction specifies a load virtual address, e.g., load VA 321 of FIG. 3. The load PAP 2904 is a physical address proxy for a load physical memory line address that is a translation of the load virtual memory line address (i.e., load VA[63:6] 321) and specifies the set index and way of the entry 401 of the L2 cache 107 into which a cache line specified by the load physical memory line address is allocated. More specifically, the load physical memory line address is a translation of a memory page address portion of the load virtual address, namely upper address bits (e.g., bits 12 and above in the case of a 4 KB page size), along with the remaining untranslated address bits that specify a memory line within the memory page (e.g., VA[11:6]). As described above, when a cache line is brought into the L2 cache 107 from a physical memory line address, e.g., by a load or store instruction, the upper address bits of the load/store virtual address specified by the load/store instruction are translated into a load/store physical memory line address, e.g., by the MMU 147 of FIG. 1. The cache line is brought into, i.e., allocated into, an entry of the L2 cache 107, which has a unique set index and way number, as described above.

The load PAP 2904 specifies the set index and the way number of the entry 401 in the L2 cache 107 into which the cache line was allocated, i.e., the cache line specified by the physical memory line address of the load/store instruction that brought the cache line into the L2 cache 107. The lower bits of the load virtual address (e.g., bits [11:0] in the case of a 4 KB page size) are untranslated address bits, i.e., the untranslated bits of the virtual and physical addresses are identical, as described above. The load physical address bits PA[5:3] 2906 correspond to the untranslated address bits [5:3] of the load virtual address. The load instruction also specifies a size of the load data to be read. In the example embodiment, the largest size of load data is eight bytes. Hence, in the embodiment of FIG. 29, the size of the load data is up to eight bytes, and the load physical address bits PA[5:3] 2906 narrows down the location of the load data within a 64-byte cache line, for example. That is, the address bits PA[5:3] 2906 specify the offset of an eight byte-aligned eight-byte data word with a 64-byte-aligned 64-byte memory line. The load size and bits [2:0] of the load address may be used to generate the load byte mask 2908 that specifies, or encodes, which of the eight bytes are being read by the load instruction. Other embodiments are contemplated in which the bytes read by the load instruction are specified in a different manner, e.g., the size itself and bits [2:0] of the load address may be held in the LQ entry 2901 rather than the load byte mask 2908.

Advantageously, each entry of the LQ 125 holds the load PAP 2904 rather than the full load physical memory line address. In the embodiment of FIG. 29, because in the example embodiment the L2 cache 107 is 4-way set associative, the load PAP 2904 specifies the 2 bits of the way number of the entry in the L2 cache 107 into which the cache line specified by the physical memory line address is allocated. Furthermore, in the embodiment of FIG. 29, because in the example embodiment the L2 cache 107 has 2048 sets, the load PAP 2904 specifies the eleven bits of the set index of the set of the entry in the L2 cache 107 into which the cache line specified by the physical memory line address is allocated, which corresponds to physical memory line address bits PA[16:6] in the embodiment. Thus, in the embodiment of FIG. 29, the load PAP 2904 is thirteen bits, in contrast to a full load physical memory line address, which may be approximately forty-six bits in some implementations, as described above, and in other implementations there may be more. Advantageously, a significant savings may be enjoyed both in terms of storage space within the LQ 125 and in terms of timing by providing the ability to compare PAPs rather than full physical memory line addresses when making store-to-load forwarding checks.

The Fwd flag 2912 is true if the LSU 117 forwarded store data to the load instruction from a SQ entry 1301 and is false otherwise. The NonFwd flag 2914 is true if the LSU 117 tried to forward store data to the load instruction but failed and instead provided the load data from the L1 data cache 103, as described in more detail below with respect to FIG. 30, and is false otherwise. The LSU 117 only sets to true one of Fwd 2912 and NonFwd 2914, never both. If the LSU 117 did not try to forward from a store instruction, Fwd 2912 and NonFwd 2914 are both false. The FwdStId 2916 specifies the SQ entry 1301 from which the LSU 117 forwarded or tried to forward store data to the load instruction. In one embodiment, the FwdStId 2916 is valid if either the Fwd flag 2912 or the NonFwd flag 2914 is true. That is, even if the LSU 117 tried but failed to forward store data and instead provided the load data from the L1 data cache 103, the FwdStId 2916 specifies the SQ entry 1301 from which the LSU 117 tried to forward but failed.

The FwdingGood flag 2922, Fwding Viol flag 2924, and Fwding ViolStId 2926 may be updated each time a store instruction is committed that is older than the load instruction. The FwdingGood flag 2922, if true, tentatively indicates correct forwarding behavior by the load instruction based on the commit of all the older store instructions committed thus far. The FwdingViol flag 2924, if true, tentatively indicates incorrect forwarding behavior by the load instruction based on the commit of all the older store instructions committed thus far. As described in more detail below, the FwdingGood flag 2922 and Fwding Viol flag 2924 may not accurately indicate correct/incorrect forwarding until all older store instructions have committed. The LSU 117 only sets to true one of FwdingGood 2922 and Fwding Viol 2924, never both. The FwdingGood flag 2922 and FwdingViol flag 2924 are set to false when the LQ entry 2901 is allocated. In one embodiment, at execution of the load instruction, the FwdingGood flag 2922 is set to true and the Fwding Viol flag 2924 is set to false. At store commit time, if one of the FwdingGood flag 2922 and Fwding Viol flag 2924 is updated to a value, then the other is also updated with the opposite value. The Fwding ViolStId 2926, if the Fwding Viol flag 2924 is true, specifies the SQ entry 1301 of the relevant store instruction associated with the store-to-load forwarding violation. In one embodiment, the Fwding ViolStId 2926 may be used to update the predictor that makes store-to-load forwarding predictions.

The lastStId 2932 is populated with the identifier of the SQ entry 1301 allocated to the youngest store instruction in program order that is older than the load instruction. The load RobId 2934 is populated with the entry in the ROB 122 allocated to the load instruction. In one embodiment, the lastStId 2932 and load RobId 2934 are populated by the decode unit 112 before the load instruction is dispatched to the scheduler 121. The LSU 117 sets the Done flag 2936 when the LSU 117 completes execution of the load instruction, which includes populating the load address/size information and the forwarding behavior information and providing load data for the load instruction, e.g., via the output of mux 1446 of FIG. 18. In one embodiment, a LQE 2901 is valid when it has been allocated for a load instruction and not yet deallocated (which in one embodiment is determined by head and tail pointers of the load queue 125) and its Done flag 2936 is true.

Figure 30:
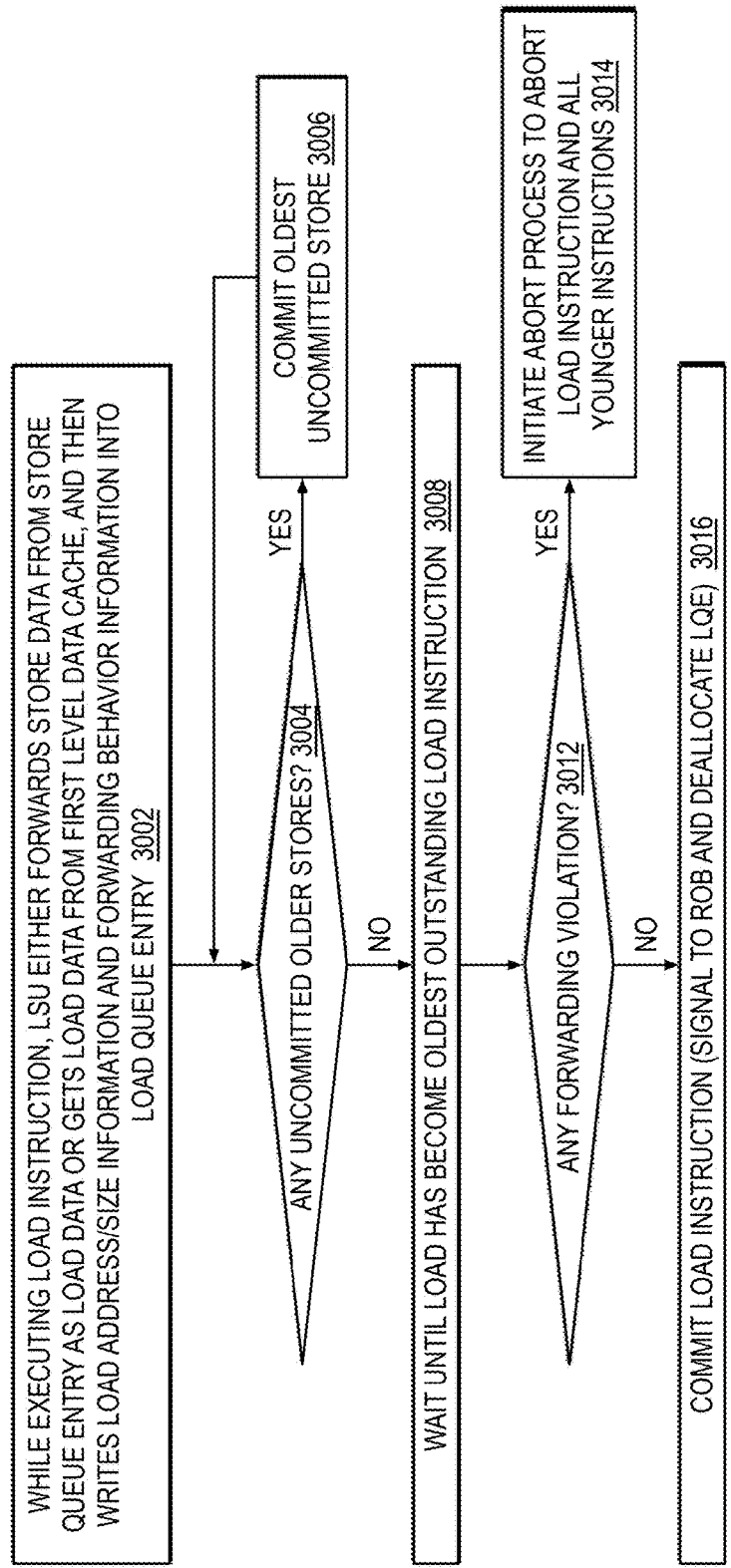
FIG. 30 is an example flowchart illustrating operation of the LSU to process a load instruction in accordance with embodiments of the present disclosure.

FIG. 30 is an example flowchart illustrating operation of the LSU 117 to process a load instruction in accordance with embodiments of the present disclosure. To simplify for the purpose of clarity, operation of the LSU 117 is described in FIG. 30 from the perspective of a given load instruction; however, as described above, the LSU 117 may execute multiple load and store instructions concurrently, speculatively, and out-of-order. Operation begins at block 3002.

At block 3002, the LSU 117 executes a load instruction. The LSU 117 either obtains the load data for the load instruction from the L1 data cache 103 or forwards store data from a SQ entry 1301 to the load instruction as the load data. The latter operation is store-to-load forwarding, as described in detail above. In one embodiment, as described above, a predictor (e.g., MDP 111) makes a forwarding prediction for each load instruction that indicates either that no store-to-load forwarding should be performed, or that the load instruction should check for and try to forward from a suitable older store instruction. The LSU 117 then writes the load address/size information and forwarding behavior information to the LQE 2901 associated with the load instruction. The load PAP 2904 is populated with the load PAP 1495 provided by the L1 data cache 103 in response to the virtual load address 321 specified by the load instruction, the load PA[5:3] 2906 is populated with load VA[5:3] specified by the load instruction, and the load byte mask 2908 is populated with the load byte mask 1493, which are described with respect to FIG. 14, for example. If the forwarding prediction indicates the LSU 117 should forward from a store instruction and the LSU 117 actually forwards store data to the load instruction from a SQ entry 1301, the LSU 117 sets the Fwd flag 2912 to true and populates the FwdStId 2916 with the identifier of the SQ entry 1301 from which the store data was forwarded; otherwise, the LSU 117 sets the Fwd flag 2912 to false. If the forwarding prediction indicates the LSU 117 should forward from a store instruction and the LSU 117 tries to forward from an older store instruction and fails because it determines the store instruction is not suitable and instead provides the load data from the L1 data cache 103, the LSU 117 sets the NonFwd flag 2914 to true and populates the FwdStId 2916 with the identifier of the SQ entry 1301 from which the LSU 117 tried to forward store data but failed; otherwise, the LSU 117 sets the NonFwd flag 2914 to false. An example situation in which the LSU 117 tries to forward from the predicted store instruction and fails because it determines the store instruction is not suitable and instead provides the load data from the L1 data cache 103 is when the store data of the predicted store instruction does not overlap the load data requested by the load instruction. As described above, e.g., with respect to FIG. 14, the store data overlaps the requested load data if the selected SQ entry 1399 is valid, the load PAP 1495 matches the store PAP 1304 and the load PA[5:3] matches the store PA[5:3] 1306, and the valid bytes of the store data 1302 of the selected SQ entry 1399 as indicated by the store byte mask 1308 overlap the load data bytes requested by the load instruction as indicated by the load byte mask 1493, i.e., for each true bit of the load byte mask 1493, the corresponding bit of the store byte mask 1308 is also true. Another example situation in which the LSU 117 tries to forward from the predicted store instruction and fails because it determines the store instruction is not suitable and instead provides the load data from the L1 data cache 103 is when the SQ entry 1301 the LSU 117 is trying to forward from is not valid (e.g., the valid bit 1309 is clear, i.e., there is no valid store data 1302 and no valid store PAP 1304, store PA 1306 and store byte mask 1308 to compare) when the load instruction is successfully executed. In one embodiment, the FwdStId 2916 is simply populated with the SQ entry 1301 identifier associated with the store instruction that the load instruction tried to forward from. In one embodiment, at execution of the load instruction, the FwdingGood flag 2922 is set to true and the Fwding Viol flag 2924 is set to false. Operation proceeds to decision block 3004.

At decision block 3004, the LSU 117 determines whether there are any uncommitted store instructions older than the load instruction. If so, operation proceeds to block 3006; otherwise, operation proceeds to block 3008.

Figure 31A:
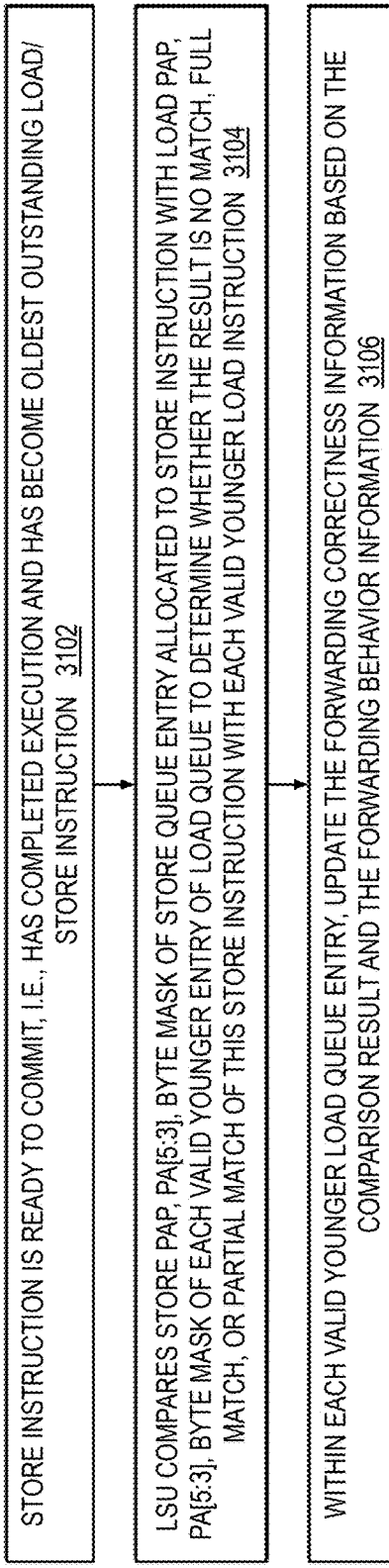
FIG. 31A is an example flowchart illustrating operation of the LSU to commit a store instruction that is oldest in program order in accordance with embodiments of the present disclosure.

At block 3006, the LSU 117 commits the oldest uncommitted store instruction, as described in detail with respect to FIG. 31A. Briefly, committing the oldest uncommitted store instruction includes using PAP comparisons—rather than full physical memory line address comparisons—to make a forwarding correctness check and, in most cases, to update the forwarding correctness fields of the LQ entry 2901 based on the forwarding correctness check.

At block 3008, the LSU 117 waits until the load instruction has become the oldest outstanding load instruction. In one embodiment, each clock cycle the LSU 117 checks the LSQ 125 head and tail pointers and the entries 1301/2901 at the head pointers to determine whether there is an outstanding load/store instruction that is ready to be committed. Thus, although the operations at decision block 3004 and block 3008 are shown as occurring sequentially, they may be performed concurrently. For example, as soon as the load instruction executes, it may be that there are no outstanding older load/store instructions, in which case the load instruction immediately becomes ready to commit. In one embodiment, the load instruction may be among a group of oldest load instructions that are committed together in the same clock cycle. Operation proceeds to decision block 3012.

At decision block 3012, the LSU 117 examines the forwarding correctness information to determine whether any forwarding violation occurred. If so, operation proceeds to block 3014; otherwise, operation proceeds to block 3016. In one embodiment, the LSU 117 determines that a forwarding violation occurred if the Fwding Viol flag 2924 is true.

At block 3014, the LSU 117 signals to the PCL 132 the need for an abort of the load instruction and all instructions younger than the load instruction. In response, the PCL 132 initiates an abort process to flush the load instruction and all instructions younger than the load instruction. Subsequently, the PCL 132 restarts instruction fetch at the load instruction so that the load instruction (and subsequent instructions) may be re-executed. The store-to-load forwarding predictor may also be updated, e.g., based on the forwarding correctness fields from the LQ entry 2901. Upon re-execution of the load instruction, typically the store-to-load forwarding behavior will be correct, e.g., since the predictor will have been updated based on the incorrect forwarding behavior of the earlier execution instance of the load instruction. In an alternate embodiment, even if the load instruction has not yet become the oldest outstanding load instruction at block 3008, if a forwarding violation occurred with respect to the load instruction and a forwarding violation occur did not occur for all older load instructions, if any, then the LSU 117 signals to the PCL 132 the need for an abort.

At block 3016, the LSU 117 commits the load instruction. In one embodiment, committing the load instruction includes signaling to the PCL 132 (e.g., to update the ROB 122 entry associated with the load instruction) and deallocating the LQ entry 2901 previously allocated to the load instruction. In one embodiment, committing and retiring the load instruction are not separate events, in which case committing the load instruction also includes committing to architectural state the physical register in the register file 105 of FIG. 1 specified as the destination register of the load instruction.

FIG. 31A is an example flowchart illustrating operation of the LSU 117 to commit a store instruction that is oldest in program order in accordance with embodiments of the present disclosure. Operation begins at block 3102.

At block 3102, a store instruction is ready to be committed. That is, the store instruction has completed execution, does not need to be aborted, and has become the oldest load/store instruction among all outstanding load and store instructions. Committing the store instruction includes the LSU 117 writing the store data 1302 from the SQ entry 1301 to the L1 data cache 103, e.g., as described above with respect to block 2704 of FIG. 27. Operation proceeds to block 3104.

At block 3104, the store instruction that is being committed still has an allocated SQ entry 1301. The LSU 117 compares the store PAP 1304, store PA[5:3], and store byte mask 1308 from the SQ entry 1301 with the load PAP 2904, load PA[5:3] 2906, and load byte mask 2908 of each valid entry 2901 of the load queue 125 associated with a load instruction that is younger in program order than the store instruction that is being committed. In one embodiment, the result of the comparison indicates either no match, a full match, or a partial match. A no match result means none of the bytes to be read by the load instruction are available in the store data 1302 of the SQ entry 1301. A no match result may occur because the store PAP 1304 and the load PAP 2904 do not match. A no match result may occur because the store PA[5:3] 1306 and the load PA[5:3] 2906 do not match. A no match result may occur because none of the true bits of the load byte mask 2908 have a corresponding true bit in the store byte mask 1308. A full match result means all the bytes to be read by the load instruction are available in the store data 1302 of the SQ entry 1301. A full match result occurs when the store PAP 1304 and the load PAP 2904 match, the store PA[5:3] 1306 and the load PA[5:3] 2906 match, and all of the true bits of the load byte mask 2908 have a corresponding true bit in the store byte mask 1308. A partial match result means at least one but less than all the bytes to be read by the load instruction are available in the store data 1302 of the SQ entry 1301. A partial match result occurs when the store PAP 1304 and the load PAP 2904 match, the store PA[5:3] 1306 and the load PA[5:3] 2906 match, and at least one but not all of the true bits of the load byte mask 2908 have a corresponding true bit in the store byte mask 1308. In one embodiment, the LSU 117 is configured such that store-to-load forwarding is not allowed if the store instruction is not able to provide all the requested load data. In such an embodiment, when the load instruction is being executed, if the LSU 117 detects a partial match result between the predicted store PAP 1304, store PA[5:3] 1306, and store byte mask 1308 and the load PAP 1495, load PA[5:3] and load byte mask 1493, then the LSU 117 replays the load instruction (i.e., the load instruction does not complete its execution) and a memory dependence operand is created in the scheduler 121 that causes the scheduler 121 to wait to re-issue the load instruction for execution until the predicted store instruction has committed its store data to the L1 data cache 103 (or in an alternate embodiment, until the youngest store instruction older than the load instruction has committed its store data to the L1 data cache 103), as described in more detail below with respect to FIGS. 31C through 31F. Advantageously, the comparisons are performed using the store PAP 1304 of the store instruction being committed and the load PAP 2902 of each valid younger LQE 2901. Comparisons of PAPs are performed rather than comparisons of physical memory line addresses, which has the advantages of reduced storage space within the LSQ 125 over an implementation that stores the full load/store physical memory line address and PAP comparisons that are faster than full physical memory line address comparisons, as described above. Operation proceeds to block 3106.

At block 3106, for each valid younger LQ entry 2901, the LSU 117 updates the forwarding correctness information, as needed, based on the result of the associated comparison made at block 3104 and based on the forwarding behavior information. Recall that for a given load instruction associated with a valid younger LQ entry 2901, the whole operation 3006 of FIGS. 30 and 31, including the operation at block 3106 to update the forwarding correctness information, may be performed multiple times since multiple older store instructions may be committed before the load instruction becomes the oldest load/store instruction and is committed. Consequently, the forwarding correctness information may be updated with each store instruction commit, e.g., Fwding Viol 2924 may be set to true and FwdingGood 2922 may be set to false as the operation at block 3106 is performed for a first older store instruction that is committed, however FwdingViol 2924 may be set to false and FwdingGood 2922 may be set to true as the operation at block 3106 is performed for a second older store instruction that is committed, and then FwdingViol 2924 may be set to true and FwdingGood 2922 may be set to false as the operation at block 3106 is performed for a third older store instruction that is committed, and this updating may occur multiple times until all older store instructions have been committed. However, it is the resting state of the forwarding correctness information that is ultimately used at block 3012 of FIG. 30 to determine whether a forwarding violation occurred. Updating of the forwarding correctness information for a LQE 2901 will now be described according to one embodiment.

If the comparisons at block 3104 indicate no match, then the LQ entry 2901 forwarding correctness fields are not updated. This is because the LSU 117 will not have forwarded from, although it may have tried to forward from (i.e., the prediction may have indicated to try to forward from), this store instruction because at execution of the load instruction the LSU 117 will have detected no match. If the comparisons at block 3104 indicate a full match or a partial match, then the LSU 117 checks for either a forwarding violation or no forwarding violation situation, as described in the next paragraph, by examining Fwd 2912 and NonFwd 2914 and comparing FwdStId 2916 with the SQ entry 1301 identifier of the store instruction being committed (which is referred to henceforth as CmtStId). The comparison of FwdStId 2916 and CmtStId may indicate the LSU 117 forwarded from this store, i.e., from store instruction being committed (FwdStId 2916 matches CmtStId), the LSU 117 forwarded from a younger store than the store instruction being committed (FwdStId 2916 is younger than CmtStId), or the LSU 117 forwarded from an older store than the store instruction being committed (FwdStId 2916 is older than CmtStId). In the case of a forwarding violation, the LSU 117 sets FwdingGood 2922 to false, FwdingViol 2924 to true, and FwdingViolStId 2926 to CmtStId. If the forwarding violation check indicates no forwarding violation, then the LSU 117 sets FwdingGood 2922 to true and FwdingViol 2924 to false, although in some cases the LSU 117 simply does not update the LQ entry 2901, as described below.

If the comparisons at block 3104 indicate a full match or a partial match, then the following checks are performed. If Fwd 2912 and NonFwd 2914 are both false, then a forwarding violation has been detected. If Fwd 2912 is true and FwdStId 2916 matches CmtStId, then no forwarding violation is detected. If NonFwd 2914 is true and FwdStId 2916 matches CmtStId, then no forwarding violation is detected. This is because, as described above with respect to block 3104, the LSU 117 detected the store instruction is not able to provide all the requested load data (i.e., detected a partial match), set NonFwd 2914 to true, and replayed the load instruction. If Fwd 2912 or NonFwd 2914 is true and the LSU 117 forwarded from an older store than the store instruction being committed, then a forwarding violation is detected. If NonFwd 2914 is true and the LSU 117 forwarded from a younger store than the store instruction being committed, then a forwarding violation is detected. If Fwd 2912 is true and the LSU 117 forwarded from a younger store than the store instruction being committed, then the LSU 117 does not update the forwarding correctness information since the forwarding correctness information will be updated when the younger store instruction is committed.

Figure 31B:
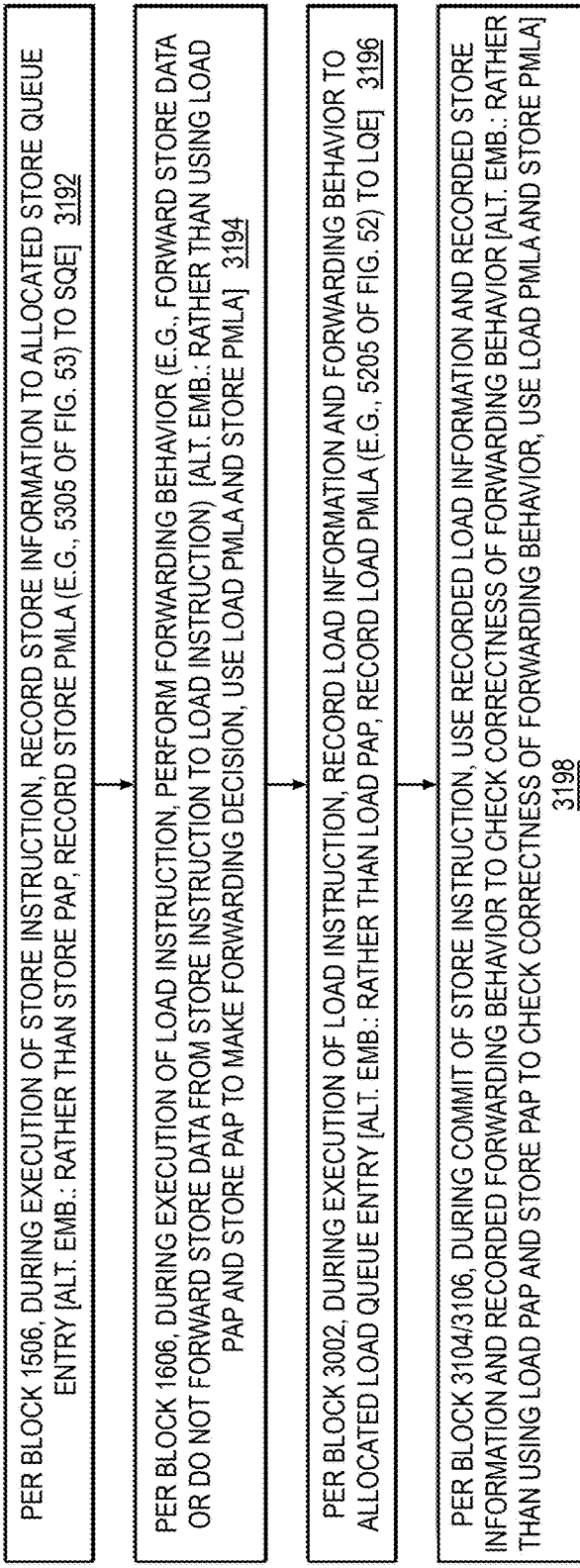
FIG. 31B is an example flowchart illustrating operation of the LSU to commit a store instruction and perform a forwarding behavior correctness check during commit of the store instruction in accordance with embodiments of the present disclosure.

Embodiments have been described in which the LSU 117 performs store-to-load forwarding behavior correctness checks using load and store PAPs (e.g., load PAP 2904 and store PAP 1304). FIG. 31B described below summarizes the forwarding behavior correctness checks. In the description of FIG. 31B, alternate embodiments will also be described in which the LSU 117 performs store-to-load forwarding behavior correctness checks similar to the process described above, but in which the LSU 117 uses load and store physical memory line addresses (PMLAs), rather than load and store PAPs, to perform the forwarding behavior correctness checks. Advantageously, embodiments described above and below, regardless of whether the processor employs PAPs or PMLAs to perform the forwarding behavior correctness checks, perform forwarding behavior correctness checks at commit of each store instruction, rather than at execution of each store instruction as performed by conventional solutions, and therefore may provide an opportunity to employ a load queue 125 with fewer content-addressable memory (CAM) ports than a conventional processor, which may reduce the amount of power consumed and area over a conventional solution, as described below.

Conventional high-performance superscalar out-of-order execution processors exist that perform forwarding behavior correctness checks at store execution time as follows. When a load instruction executes, the conventional processor uses the load address (e.g., untranslated address bits of the load address and perhaps additional virtual load address bits, since the full physical load address may not be available soon enough) to CAM against the store queue to pick a qualified store instruction to forward from. More specifically, if the CAM indicates the load address matches the store address of a store queue entry of an older outstanding store instruction and the load and store sizes are such that the store can provide store data to the load instruction, then the conventional processor picks the matching store instruction to forward from. In the case of multiple qualified older store instructions, the conventional processor picks the youngest of them. However, it is possible that the picked store instruction was not the correct store instruction to forward from. For example, because of out-of-order execution, it is possible that at the time the load instruction executed there was a qualified store instruction that had not yet executed, and therefore had not written its store address and store size to an entry in the store queue to CAM against, that should have been picked to forward from. For another example, if the CAM of the store queue was not made using the full physical addresses of the load and store instructions, then it is possible the picked store instruction should not have been forwarded from because there was not in fact an address match.

Because of the possibility that the picked store instruction was not the correct store instruction to forward from, when each store instruction executes, the conventional processor uses the store address to CAM against the load queue to see if there are any load instructions that should have forwarded from this store instruction but did not. That is, the conventional processor performs its forwarding behavior correctness checks when it executes each store instruction. Because conventional high-performance superscalar processors are designed to execute multiple (N) store instructions per clock cycle, i.e., concurrently, each of the concurrently executed store instructions needs to be able to CAM against the load queue at the same time. This requires N CAM ports in the load queue. For example, a conventional high-performance superscalar processor might execute 4 store instructions concurrently, in which case the load queue requires at least 4 CAM ports, which may imply a significant amount of power consumption and area. Embodiments are described above and below that may facilitate the inclusion of fewer load queue CAM ports and therefore reduce power consumption and area.

In one embodiment, the LSU 117 includes a store commit pipeline used to commit a store instruction, e.g., as described above with respect to FIGS. 23-31A, and more specifically blocks 3104 and 3106 of FIG. 31A. The store commit pipeline uses a CAM port of the load queue 125 to CAM store address and size information (e.g., the store PAP 1304/store PMLA 5305 (and store PA[5:3] 1306 and store byte mask 1308)) of the store instruction being committed against the load address and size information (e.g., load PAP 2904/load PMLA 5205 (and load PA[5:3] 2906 and load byte mask 2908)) of each valid younger entry of the load queue 125 to detect matches. Advantageously, because the processor 100 performs store-to-load forwarding checking when a store instruction commits, rather than when a store instruction executes like a conventional processor, and because in one embodiment the processor 100 is configured to commit fewer store instructions per clock cycle than it is configured to execute (let N be the maximum number of store instructions the processor 100 is configured to execute per clock cycle and Q be the maximum number of store instructions the processor 100 is configured to commit per clock cycle), the embodiments of the load queue 125 need only include Q CAM ports, rather than N. This may result in a significant power and area savings. In one embodiment, in instances in which certain alignment requirements of two program order adjacent store instructions are satisfied, the two store instructions may be committed together as a pair using the same CAM port.

FIG. 31B is an example flowchart illustrating operation of the LSU 117 to commit a store instruction and perform a forwarding behavior correctness check during commit of the store instruction in accordance with embodiments of the present disclosure. Operation begins at block 3192.

At block 3192, during execution of a store instruction, the LSU 117 records (i.e., populates or writes) store information to a SQ entry 1301 allocated to the store instruction as described with respect to block 1506 of FIG. 15. The store information may include the store PAP 1304, store PA 1306, and store byte mask 1308 of FIG. 13 (and store VA 2311 of FIG. 23). In an alternate embodiment, rather than recording a store PAP 1304, the LSU 117 records a store physical memory line address (e.g., store PMLA 5305 of FIG. 53) to the SQ entry 1301 that may be used to perform forwarding behavior correctness checks, e.g., at block 3198 below. Operation proceeds to block 3194.

At block 3194, during execution of a load instruction, the LSU 117 performs forwarding behavior as described with respect to block 1606 of FIG. 16. That is, the LSU 117 selectively forwards or does not forward store data 1302 from a store instruction to the executing load instruction. The forwarding behavior decision may be made based on a load PAP (e.g., load PAP 1495 of FIG. 14) and one or more store PAPs (e.g., the store PAP 1304 of FIG. 13) included in the store information recorded at block 3192 for outstanding store instructions older than the load instruction. In an alternate embodiment, rather than making the forwarding behavior decision based on a load PAP and one or more store PAPs, the LSU 117 makes the forwarding behavior decision based on a load physical memory line address (e.g., a PMLA provided by a TLB during execution of the load instruction (e.g., by L1 TLB 5141 of FIG. 51)) and one or more store physical memory line addresses (e.g., store PMLA 5305 of FIG. 53). Operation proceeds to block 3196.

At block 3196, during execution of the load instruction, the LSU 117 records (i.e., populates or writes) load information to a LQ entry 2901 allocated to the load instruction as described with respect to block 3002 of FIG. 30. The load information may include the load PAP 2904, load PA 2906, and load byte mask 2908 of FIG. 29. In an alternate embodiment, rather than recording a load PAP 2904, the LSU 117 records a load physical memory line address (e.g., load PMLA 5205 of FIG. 52) to the LQ entry 2901 that may be used to perform forwarding behavior correctness checks, e.g., at block 3198 below. The LSU 117 also records to the LQ entry 2901 forwarding behavior information (e.g., Fwd flag 2912, NonFwd flag 2914, FwdStId 2916 of FIG. 29) that describes the forwarding behavior. Operation proceeds to block 3198.

At block 3198, during commit of a store instruction, the LSU 117 uses the store information recorded at block 3192 for the store instruction and the load information recorded at block 3196 for each outstanding load instruction younger than the store instruction and the forwarding behavior recorded at block 3196 to check the correctness of the forwarding behavior performed at block 3194 as described with respect to blocks 3104 and 3106 of FIG. 31A. The forwarding behavior correctness check may be performed using a store PAP (e.g., store PAP 1304 of FIG. 13) and load PAPs (e.g., load PAP 2904 of FIG. 29). In an alternate embodiment, rather than performing the forwarding behavior correctness check based on a store PAP and load PAPs, the LSU 117 performs the forwarding behavior correctness check based on a store physical memory line address (e.g., store PMLA 5305 of FIG. 53) and load physical memory line addresses (e.g., load PMLA 5205 of FIG. 52). As described above, committing the store instruction includes writing the store data 1302 to the L1 data cache 103 and deallocating the SQ entry 1301 previously allocated to the store instruction. Further, the LSU 117 performs the forwarding behavior correctness check at block 3198 not only at commit of a single store instruction, but also at commit of each additional store instruction older than the load instruction, if any, and selectively updates the forwarding correctness information, i.e., depending upon whether the additional older store instruction is relevant to the correctness of the forwarding behavior, as described above, e.g., with respect to FIG. 31A. Performing the forwarding behavior correctness check may also include recording to the LQ entry 2901 forwarding correctness information (e.g., FwdingGood indicator 2922, Fwding Viol indicator 2924, and Fwding ViolStId 2926 of FIG. 29). Further, if after all store instructions older than the load instruction have committed, the accumulated forwarding behavior correctness checks of the older committed store instructions indicate the forwarding behavior decision made at block 3194 was incorrect, the LSU 117 signals the need for an abort of the load instruction, as described above, e.g., with respect to FIG. 30. Further, the LSU 117 performs the forwarding behavior correctness check at block 3198 for each entry 2901 of the load queue 125 whose load instruction is younger than the store instruction being committed, as described above, e.g., with respect to FIG. 31A.

Figure 31C:
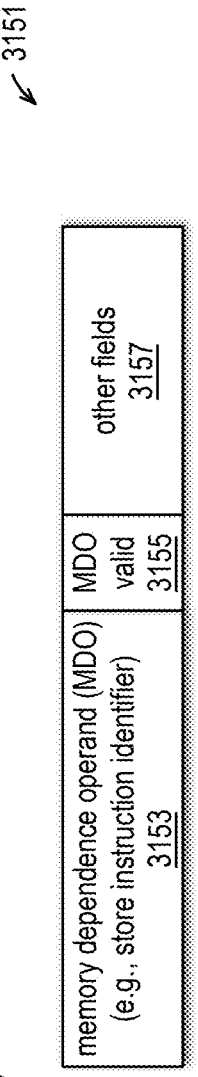
FIG. 31C is example block diagram illustrating an entry of a structure of the processor from which a load instruction may be issuable for re-execution after having been issued and executed and determined to be unforwardable in accordance with embodiments of the present disclosure.

FIG. 31C is an example block diagram illustrating an entry 3151 of a structure, e.g., scheduler 121 of FIG. 1 or other re-execution structure (not shown), of the processor 100 from which a load instruction may be issuable for re-execution after having been issued and executed and determined to be unforwardable in accordance with embodiments of the present disclosure. An unforwardable load instruction, in the present context, is a load instruction for which it is determined during execution of the load instruction that an entry 1301 of the store queue 125 holds store data 1302 that includes some but not all bytes of load data requested by the load instruction. The re-execution structure entry 3151 includes a memory dependence operand (MDO) 3153, an MDO valid bit 3155, and other fields 3157.

The MDO valid bit 3155, if true, indicates the memory dependence operand 3153 is valid. More specifically, the presence of a valid memory dependence operand 3153 in a valid re-execution structure entry 3151 indicates that the instruction associated with the entry 3151 has a dependence upon the availability of a memory operand, and the instruction is ineligible to be issued for re-execution until the dependence is satisfied. In one embodiment, the entry 3151 may also include a type field that specifies the type of the memory dependence operand. In the case of an unforwardable load instruction, the memory operand upon which the load instruction is dependent is the store data that is written to the L1 data cache 103 at commit of a store instruction identified in the memory dependence operand 3153. That is, the load instruction is not eligible to re-execute until the store instruction whose identifier is in the memory dependence operand 3153 updates the L1 data cache 103 with its store data. In one embodiment, the identifier of the store instruction is an index into the store queue 125 of the SQ entry 1301 allocated to the identified store instruction. In an alternate embodiment, the identifier of the store instruction is an index into the ROB 122 of the ROB entry allocated to the identified store instruction.

The other fields 3157 may include other indications of operand dependencies (e.g., register operand dependencies) of the instruction that must be satisfied before the instruction is eligible to be re-executed. The other fields 3157 may also include a valid bit (distinct from MDO valid bit 3155) that indicates whether the entry 3151 is valid. In an embodiment in which the re-execution structure is the scheduler 121, the other fields 3157 may include an Issued bit that indicates whether or not the instruction has been issued. The Issued bit is initially clear when the entry 3151 is allocated to the instruction, the Issued bit is set once the instruction is issued for execution, and the Issued bit is cleared if the instruction does not complete its execution, e.g., its execution is canceled as described below with respect to block 3162. In one embodiment, the entry 3151 is not deallocated, i.e., remains allocated, until the instruction completes its execution; as a result, the instruction remains in the scheduler 121 to be subsequently re-issued and re-executed until the instruction completes its execution. Use of the re-execution structure entry 3151 and specifically the memory dependence operand 3153 and MDO valid bit 3155 will be described in more detail below with respect to FIG. 31D.

Figure 31D:
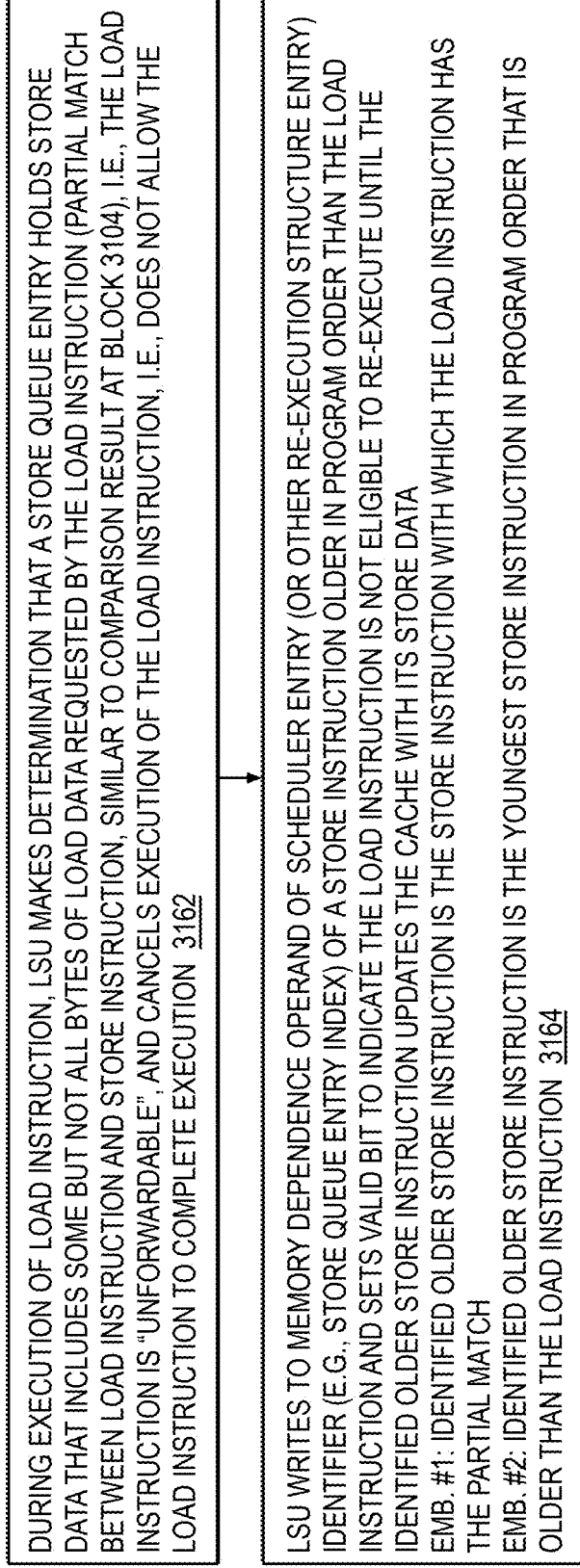
FIG. 31D is an example flowchart illustrating the handling of an unforwardable load instruction during execution of the load instruction in accordance with embodiments of the present disclosure.

FIG. 31D is an example flowchart illustrating the handling of an unforwardable load instruction during execution of the load instruction in accordance with embodiments of the present disclosure. Operation begins at block 3162.

At block 3162, during execution of a load instruction, the LSU 117 makes a determination (e.g., during the store-to-load-forwarding determination made according to the operation described above with respect to FIG. 16) that an entry 1301 of the store queue 125 is holding store data that includes some but not all bytes of the load data requested by the load instruction, i.e., the load instruction is an unforwardable load instruction. More specifically, the LSU 117 performs a comparison of the load PAP 1495, load PA[5:3], and load byte mask 1493 of the load instruction (e.g., of FIG. 14) with the store PAP 1304, store PA[5:3] 1306, and store byte mask 1308 from the SQ entry 1301 of the store instruction that the load instruction is predicted to forward from (e.g., by comparison of a subset of virtual address bits as described with respect to FIG. 18, or by the MDP 111 as described with respect to FIG. 19) and detects a partial match, i.e., the load PAP 1495 and the store PAP 1304 match, the load PA[5:3] and the store PA[5:3] 1306 match, and at least one but not all of the true bits of the load byte mask 1493 have a corresponding true bit in the store byte mask 1308. In an alternate embodiment, rather than making the comparison and unforwardable determination based on the load PAP 1495 and the store PAP 1304, the LSU 117 makes the comparison and unforwardable determination based on a load physical memory line address (e.g., a PMLA provided by a TLB during execution of the load instruction (e.g., by L1 TLB 5141 of FIG. 51)) and a store physical memory line address (e.g., store PMLA 5305 of FIG. 53). As a result of the determination that the load instruction is an unforwardable load instruction, the LSU 117 cancels execution of the load instruction, i.e., the LSU 117 does not allow the load instruction to complete execution. Operation proceeds to block 3164.

At block 3164, the LSU 117 writes the identifier of a store instruction that is older in program order than the load instruction to the memory dependence operand 3153 of the re-execution structure entry 3151 associated with the load instruction and sets the MDO valid bit 3155 to indicate that the load instruction is not eligible to re-execute until the identified older store instruction updates the cache with its store data. In one embodiment, the re-execution structure is the scheduler 121, although as described above, the re-execution structure may be a separate structure from the scheduler 121. In one embodiment in which the re-execution structure is the scheduler 121, the entry 3151 is the same entry of the scheduler 121 from which the load instruction is initially issued to the LSU 117 for execution. In one embodiment, the identifier of the identified older store instruction is the index into the store queue 125 of the SQ entry 1301 allocated to the identified older store instruction. In one embodiment, the identified older store instruction is the store instruction with which the load instruction has the partial match as determined at block 3162. In an alternate embodiment, the identified older store instruction is the youngest store instruction in program order that is older than the load instruction.

Figure 31E:
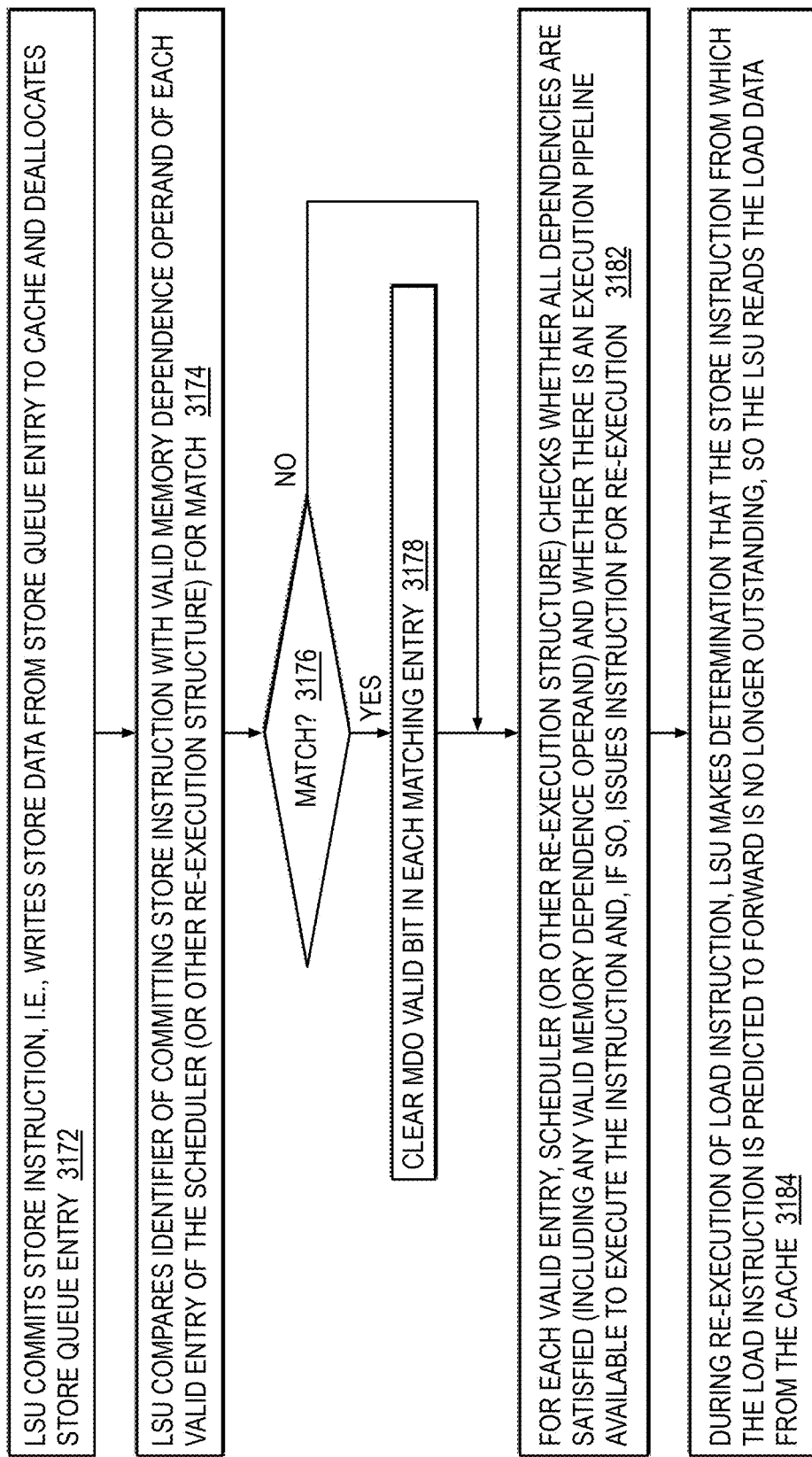
FIG. 31E is an example flowchart illustrating the handling of an unforwardable load instruction during commit of a store instruction upon which the unforwardable load instruction may be dependent in accordance with embodiments of the present disclosure.

FIG. 31E is an example flowchart illustrating the handling of an unforwardable load instruction during commit of a store instruction upon which the unforwardable load instruction may be dependent in accordance with embodiments of the present disclosure. Operation begins at block 3172.

At block 3172, the LSU 117 commits a store instruction. That is, the LSU 117 writes to the L1 data cache 103 the store data from the SQ entry 1301 allocated to the store instruction and deallocates the SQ entry 1301. Operation proceeds to block 3174.

At block 3174, in the case of an unforwardable load instruction (e.g., as indicated by the type of the memory dependence operand), the LSU 117 compares the identifier of the store instruction being committed (e.g., the index of the SQ entry 1301 that was allocated to the store instruction) with the valid memory dependence operand 3153 (i.e., has a true MDO valid bit 3155) of each valid entry 3151 of the re-execution structure for a match. Operation proceeds to decision block 3176.

At decision block 3176, if there is a match for a given entry 3151, operation proceeds to block 3178; otherwise, operation proceeds to block 3182.

At block 3178, the LSU 117 clears the MDO valid bit 3155 of the matching entry 3151 to indicate that the instruction associated with the entry 3151, in this case the load instruction whose memory dependence operand 3153 was written and whose MDO valid bit 3155 was set at block 3164, is no longer ineligible to re-execute because of the previous dependency on the identified older store instruction, which is because the older store instruction identified in the memory dependence operand 3153 has updated the L1 data cache 103 with its store data. Operation proceeds to block 3182.

At block 3182, the scheduler 121 (or other re-execution structure) checks each valid entry 3151 to see whether all dependencies indicated by the valid entry 3151 are satisfied, including any dependency indicated by the memory dependence operand 3153, in which case the instruction associated with the entry 3151 is eligible to be re-executed, in this case the load instruction whose memory dependence operand 3153 was written and whose MDO valid bit 3155 was set at block 3164 and whose MDO valid bit 3155 was cleared at block 3178. Additionally, if the load instruction is eligible to be re-executed, the scheduler 121 checks to see if there is an LSU 117 pipeline available to execute the load instruction and, if so, issues the load instruction for re-execution to the available LSU 117 pipeline. Operation proceeds to block 3184.

At block 3184, during re-execution of the load instruction, the LSU 117 makes a determination that the store instruction from which the load instruction is predicted to forward is no longer outstanding, so the LSU 117 reads the load data from the L1 data cache 103 and sets the NonFwd flag 2914 to true, as described above with respect to block 3002 of FIG. 30.

Advantageously, the embodiments described with respect to FIGS. 31C through 31E, by identifying a specific older store instruction and then re-executing the unforwardable load instruction after the identified older store instruction has written its store data to cache, may advantageously avoid the need to perform an abort process to remedy a store-to-load forwarding violation, or at least reduce the likelihood of the need to perform the abort process. Avoiding an abort process may be advantageous because the effect of re-execution involves consumption of a second execution bandwidth of an LSU 117 pipeline and a preceding delay until the identified store instruction writes the cache, which may have a small negative impact on program performance relative to an abort process, whereas an abort process may affect many other instructions besides the load instruction (i.e., all instructions younger than the load instruction), and the abort process involves consumption of a second execution bandwidth of an execution pipeline the for all the aborted instructions, and the abort process involves the delay of re-fetching, re-decoding, re-dispatching, and re-executing all the aborted instructions. In the embodiment in which the identified store instruction is the youngest store instruction older than the load instruction, the load instruction is advantageously guaranteed to not cause a store-to-load forwarding violation and its concomitant abort since upon re-execution all older store instructions will have been committed such that the LSU 117 will correctly read the load data from the L1 data cache 103. The embodiment in which the identified store instruction is the store instruction with which the load instruction has the partial match may have the advantage of reduced re-execution delay relative to the first embodiment and may have the disadvantage that there is still a possibility the load instruction will cause a store-to-load forwarding violation, e.g., by reading the load data from the L1 data cache 103 and subsequently determining through the store commit-time store-to-load forwarding checking that the load instruction has a partial match or full match with an older store instruction younger than the store instruction with which there was a partial match, i.e., younger than the predicted store instruction.

PAP Reuse Management

Figure 32:
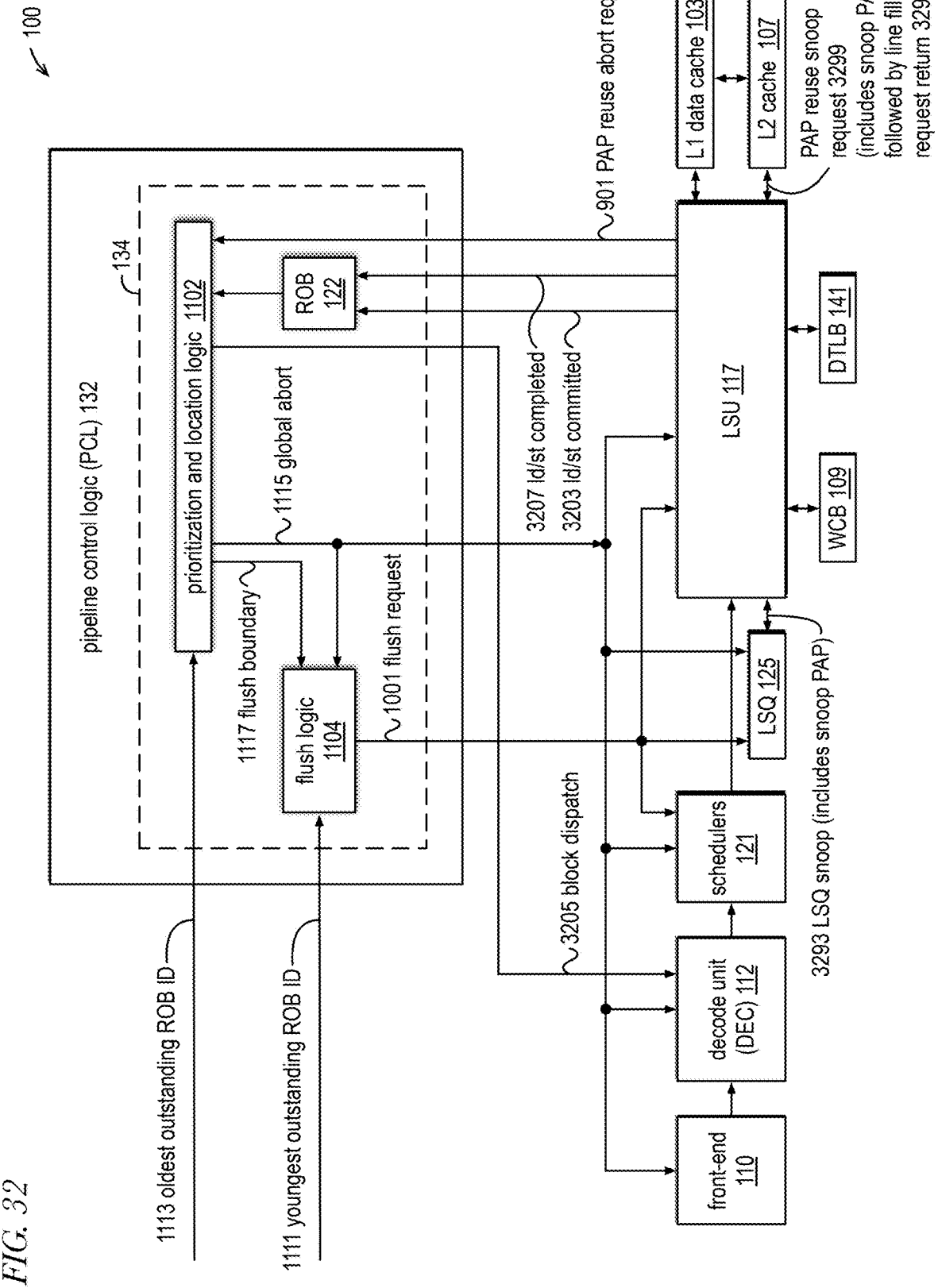
FIG. 32 is an example block diagram illustrating portions of the processor of FIG. 1 that manage PAP reuse in accordance with embodiments of the present disclosure.

FIG. 32 is an example block diagram illustrating portions of the processor 100 of FIG. 1 that manage PAP reuse in accordance with embodiments of the present disclosure. As described above, a PAP is a proxy for a physical memory line address, and a PAP uniquely identifies an entry 401 in the L2 cache 107 into which a line of memory at the physical memory line address is allocated. That is, the set index and way number of the PAP uniquely identify the entry 401. Because two different physical memory line addresses may map to the same L2 cache entry 401, two different physical memory line addresses may map to a given PAP. This may occur when a first physical memory line address is allocated into an entry of the L2 cache 107 and a PAP is formed as a proxy for the first physical memory line address, and subsequently the first physical memory line address is removed from the entry of the L2 cache 107 and a second, i.e., different, physical memory line address is allocated into the L2 cache 107. At this point, if the processor 100 were to begin to use the PAP as a proxy for the second physical memory line address while the same PAP is still being used as a proxy for the first physical memory line address, incorrect results could be generated by the processor 100. PAP reuse management refers to the handling of such occurrences by the processor 100 to assure correct operation, i.e., to the reuse of PAPs.

As an example of incorrect operation that could occur if the processor 100 did not properly perform PAP reuse management, assume a PAP is held as a store PAP 1304 in a SQ entry 1301 allocated to a store instruction that has completed its execution and that specifies a virtual memory line address that translates into a first physical memory line address. That is, the store PAP 1304 is being used as a proxy for the first physical memory line address that specifies the location of the line of memory to which the store data 1302 held in the SQ entry 1301 is waiting to be written. Further, assume the processor 100 were to assign the same PAP as a proxy for a load instruction that specifies a virtual memory line address that translates into a second physical memory line address that is different from the first physical memory line address, and assume the processor 100 were to store the same PAP into the L1 data cache entry 201 allocated to the virtual memory line address specified by the load instruction-which the processor 100 does not do because this could cause incorrect results, but is being assumed in order to illustrate the need for proper PAP reuse management. Still further, assume during execution of the load instruction the LSU 117 compares the load PAP 1495 of the load instruction (received from the L1 data cache entry 201 upon which the load virtual memory line address hits) with the store PAP 1304 of the store instruction and detects a match and decides to forward the store data 1302 to the load instruction. This could produce incorrect results because the load instruction would receive the incorrect data since the load and store instructions are referencing two different physical memory line addresses. Similarly, the store-to-load forwarding checks performed when the store instruction commits would fail to catch the fact that the store data was incorrectly forwarded because the store PAP 1304 would match the load PAP 2904, even though their actual physical memory line addresses do not match. PAP reuse management, as described below, prevents such occurrences and assures correct results are obtained, while still enjoying the benefits of the use of PAPs, as described herein, e.g., less space to store smaller PAPs rather than larger physical memory line addresses in the various structures (e.g., L1 data cache 103, SQ 125, LQ 125, WCB 109) and faster comparisons of smaller PAPs than larger physical memory line addresses.

As another example of incorrect operation that could occur if the processor 100 did not properly perform PAP reuse management, assume a PAP is held as a write PAP 2404 in a WCB entry 2401 and the write PAP 2404 is a proxy for a first physical memory line address. That is, the write PAP 2404 is being used as a proxy for the first physical memory line address that specifies the location of the line of memory to which the write data 2402 held in the WCB entry 2401 is waiting to be written. Further, assume the processor 100 were to assign the same PAP as a proxy for a store instruction that specifies a virtual memory line address that translates into a second physical memory line address that is different from the first physical memory line address, and assume the processor 100 were to store the same PAP into the store PAP 1304 of the SQ entry 1301 allocated to the store instruction-which again the processor 100 does not do because this could cause incorrect results, but is being assumed in order to illustrate the need for proper PAP reuse management. Still further, assume during commit of the store instruction the WCB 109 compares the store PAP 1304 of the store instruction being committed with the write PAP 2404 of the WCB entry 2401 and detects a match and decides to combine the store data 1302 into the WCB entry 2401. This could produce incorrect results because the store instruction being committed and the one or more older store instructions whose store data were previously combined into the WCB entry 2401 are referencing two different physical memory line addresses. PAP reuse management, as described below, prevents such occurrences and assures correct results are obtained, while still enjoying the benefits of the use of PAPs, as described herein.

The processor 100 of FIG. 32 includes the PCL 132, front-end 110, decode unit 112, schedulers, load and store queues (LSQ) 125, LSU 117, WCB 109, DTLB 141, L1 data cache 103, and L2 cache 107 of FIG. 1. The LSU 117 also generates a PAP reuse abort request 901 to the PCL 132. The PCL 132 generates a global abort signal 1115 provided to the front-end 110, the decode unit 112, the schedulers 121, the LSQ 125, and the LSU 117. The PCL 132 also generates a block dispatch signal 3205 received by the decode unit 112. The PCL 132 also generates a flush request signal 1001 received by the schedulers 121, LSU 117, and LSQ 125. The LSU 117 also generates an LSQ snoop 3293 received by the LSQ 125. The generation of each of these signals and their uses is described in more detail below, including a more detailed description of logic blocks of the PCL 132.

A load/store instruction is outstanding when the processor 100 has allocated the resources necessary for it to execute (e.g., ROB 122 entry and SQ entry 1301 or LQ entry 2901), the decode unit 112 has dispatched the load/store instruction to the back-end 130 (i.e., in program order to the schedulers 121), and the load/store instruction has not yet been committed. The LSU 117 generates a ld/st completed signal 3207 to the PCL 132 to indicate that a load/store instruction has completed its execution. In response, the PCL 132 sets a completed flag in the identified entry of the ROB 122 to true. A load/store instruction has completed execution when it hits in the L1 data cache 103 and receives a PAP from the L1 data cache 103 and writes the PAP to the entry 2901/1301 allocated for it in the load/store queue 125, i.e., the PAP held in the allocated entry 2901/1301 is valid. However, a load/store instruction may execute but not complete execution. That is, the scheduler 121 may issue a load/store instruction to the LSU 117 to be executed and the LSU 117 may execute the load/store instruction; however, the load/store instruction may not complete execution during that execution instance for various reasons. For example, the load/store instruction may miss in the L1 data cache 103 and need to be replayed, i.e., sent back to the scheduler 121 until the L1 data cache 103 has been filled with a cache line implicated by the virtual address specified by the load/store instruction that missed in the L1 data cache 103, at which time the load/store instruction will be ready to be re-issued for execution. In other words, just because a load/store instruction is executed does not mean it has completed its execution.

The LSU 117 generates a ld/st committed signal 3203 to the PCL 132 to indicate that a load/store instruction has been committed. In response, the PCL 132 sets a committed flag in the identified entry of the ROB 122 to true. A load/store instruction is ready to be committed when there are no older outstanding instructions (i.e., older in program order than the load/store instruction) that could cause the load/store instruction to be aborted and the load/store instruction is the oldest outstanding load/store instruction (i.e., load/store instructions are committed in program order). In one embodiment, the ld/st committed signal 3203 and the ld/st completed signal 3207 each specify the ROB identifier of the committed/completed load/store instruction. As described above, a store instruction that is older than a load instruction can cause the load instruction to need to be aborted. This is because the LSU 117 may have incorrectly forwarded store data from the store instruction to the load instruction, as determined during store-to-load forwarding checks, as described above. Therefore, a load instruction is not ready to be committed until the youngest store instruction that is older than the load instruction in program order commits. Furthermore, a store instruction that is younger than an uncommitted load instruction is not ready to be committed since the load instruction could still be aborted which would require the store instruction to also be aborted. Thus, the LSU 117 requires that a load/store instruction must be the oldest outstanding load/store instruction in order to be ready to be committed.

To commit a load instruction, the LSU 117 deallocates the entry in the load queue (LQ) 125 that has been allocated for the load instruction (e.g., previously by the decode unit 112), i.e., the LSU 117 frees up the entry for use by another load instruction. In one embodiment, the processor 100 retires a load instruction by promoting to architectural state the destination register specified by the load instruction within the physical register file 105. In some instances, retirement of a load/store instruction may occur simultaneously with commitment of the load/store instruction, whereas in other instances, retirement of a load/store instruction may occur after commitment of the load/store instruction.

To commit a store instruction, the LSU 117 performs forwarding correctness checks, as described above. Additionally, the LSU 117 writes the store data 1302 held in the associated SQ entry 1301 to the L1 data cache 103, if necessary, e.g., unless the cache line implicated by the store instruction that is being committed is no longer present in the L1 data cache 103. Still further, the LSU 117 writes the store data 1302 into the WCB 109, which may include combining the store data 1302 with store data of an older store instruction, as described above. (In an embodiment in which the L1 data cache 103 is a write-back cache, the store data 1302 need not be written to the WCB 109.) Finally, the LSU 117 deallocates the entry in the store queue (SQ) 125 that has been allocated for the store instruction (e.g., previously by the decode unit 112), i.e., the LSU 117 frees up the entry for use by another store instruction.

Figure 33:
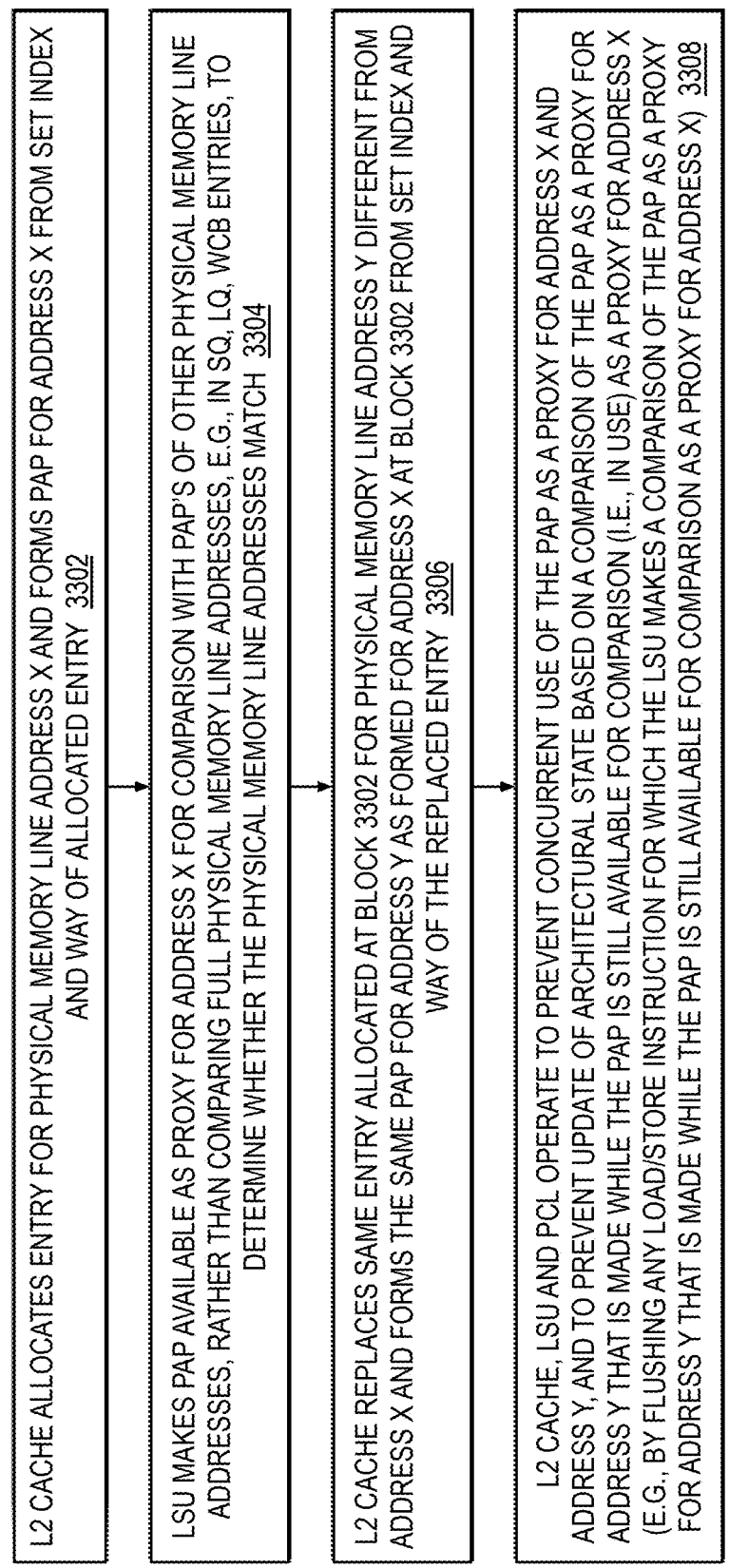

The L2 cache 107, LSU 117, and PCL 132 operate together to prevent the processor 100 from updating architectural state based on any comparison of the PAP as a proxy for the second physical memory line address that was made while the PAP is still available for comparison as a proxy for the first physical memory line address (e.g., as described with respect to FIG. 33). Stated alternatively, the L2 cache 107, LSU 117, and PCL 132 operate together to prevent the processor 100 from concurrently using a PAP as a proxy for the first and the second physical memory line addresses. More specifically, the LSU 117 generates a PAP reuse abort request 901 (e.g., as described with respect to block 3414 of FIG. 34) to the PCL 132 when the LSU 117 detects that a second physical memory line address, e.g., at address Y, misses in the L2 cache 107 and the PAP associated with the entry 401 of the L2 cache 107 to be replaced or invalidated in response to the miss is already in use as a proxy for a first physical memory line address, e.g., address X, different from the second physical memory line address by an outstanding load/store instruction that has completed execution (e.g., as described with respect to block 3406 of FIG. 34). The LSU 117 generates the PAP reuse abort request 901 to prevent the processor 100 from updating architectural state based on any comparison of the PAP as a proxy for the second physical memory line address that was made while the PAP is still available for comparison as a proxy for the first physical memory line address (e.g., as described with respect to block 3416 of FIG. 34) and to prevent concurrent use of the PAP as a proxy for the first and the second physical memory line addresses.

In response to the PAP reuse abort request 901, the PCL 132 performs an abort process that includes non-selectively flushing all instructions from the in-order front-end 110 and mid-end 120 of the processor 100, restoring microarchitectural state of the processor 100 to its appropriate state, and selectively flushing from the out-of-order back-end 130 all instructions younger than a flush boundary 1117 and, in a first embodiment, temporarily preventing dispatch of instructions until instructions older than the flush boundary 1117 have committed, as described below in more detail. In an alternate embodiment, the flush boundary 1117 is selected such that the dispatch prevention is not needed, as described in more detail below. A flush of an instruction includes invalidating, or removing, the instruction (e.g., clearing a valid bit associated with the instruction as it flows down a pipeline and/or sits in a storage structure) from all pipelines (e.g., pipelines of the EUs 114) and relevant storage structures (e.g., entries in the scheduler 121, entries in the load/store queue 125). A flush of an instruction also includes invalidating the entry in the ROB 122 allocated to the instruction.

The PCL 132 includes prioritization and location logic 1102 and flush logic 1104 that are part of the abort and exception-handling logic 134. The prioritization and location logic 1102 receives the PAP reuse abort request 901 in addition to the oldest outstanding ROB ID 1113. The flush logic 1104 receives the youngest outstanding ROB ID 1111 as well as the flush boundary 1117 and the global abort 1115 from the prioritization and location logic 1102. The abort process begins with the prioritization and location logic 1102 determining and providing the flush boundary 1117, asserting the block dispatch signal 3205 that is received by the decode unit 112, and asserting the global abort signal 1115 that is received by the front-end 110, decode unit 112, schedulers 121, LSU 117, and load and store queues 125. In response to the global abort 1115 and flush boundary 1117, the flush logic 1104 generates one or more flush requests 1001 to the schedulers 121, LSU 117, and load and store queues 125 to accomplish the selective flushing of the back-end 130, i.e., to flush all instructions younger in program order than the flush boundary 1117. The global abort signal 1115 includes information needed by various units of the processor 100 to accomplish the abort process.

The prioritization and location logic 1102 may concurrently receive abort requests from multiple sources of the processor 100, e.g., different abort request types from different execution units 114. The prioritization and location logic 1102 prioritizes the abort requests to select a highest priority abort request. The prioritization and location logic 1102 also locates the flush boundary 1117 appropriate for the selected highest priority abort request. The flush boundary 1117 is a location in between two instructions in the program order. In the case of a PAP reuse abort request 901, in a first embodiment, the prioritization and location logic 1102 locates the flush boundary 1117 just before the oldest in program order load/store instruction that has not yet completed its execution, as described in more detail below. In an alternate embodiment, the prioritization and location logic 1102 locates the flush boundary 1117 just before the oldest in program order load/store instruction that has completed its execution and whose load/store PAP 2904/1304 matches the PAP of the entry 401 being removed from the L2 cache 107, also referred to as the removal PAP. A removal of an entry in the cache can occur in the following circumstances. First, a removal occurs when the cache replaces the entry with a copy of a line of memory specified by a different physical memory line address. Second, a removal occurs when the cache invalidates the entry, which may occur in response to an external snoop request that specifies the physical memory line address held in the cache entry. In both circumstances, if the cache line has been modified, the cache writes the modified cache line held in the entry back to memory before replacing or invalidating the entry. Third, a cache maintenance instruction may either flush or invalidate a line from the cache, in which a flush cache maintenance instruction writes back the modified cache line before invalidating the cache entry. All instructions younger than the flush boundary 1117 are flushed during the abort process. Once the prioritization and location logic 1102 selects the highest priority abort request and locates the flush boundary 1117, it generates the global abort signal 1115 to begin the abort process. In response to the global abort signal 1115, the front-end 110 and the decode unit 112 non-selectively flush all instructions therein, and the schedulers 121 stop issuing instructions to the execution units 114 for execution. In the first flush boundary embodiment, the PCL 132 continues to generate the block dispatch signal 3205 to block dispatch of instructions to the back-end 130 until all load/store instructions after the flush boundary 1117 are committed.

The PCL 132 generates the flush request signal 1001 to flush one or more instructions. The flush request 1001 may include a ROB ID that specifies the location in the ROB 122, and thus the instruction's location in program order, of at least one instruction that is requested to be flushed from the back-end 130. Embodiments may include a single flush request in which the single instruction specified by the ROB ID is flushed, a flash flush request in which all instructions younger than and including the instruction specified by the ROB ID are flushed, or a hybrid flush request in which the number of instructions specified in the flush request 1001 that are younger than and including the instruction whose location is specified by the ROB ID are flushed. The abort processing may be performed similarly to abort processing embodiments described in U.S. patents application Ser. No. 17/204,662 (VENT.0104) and Ser. No. 17/204,701 (VENT.0123), filed Mar. 17, 2021, each of which is hereby incorporated by reference in its entirety.

The L2 cache 107 sends a PAP reuse snoop request 3299 to the LSU 117 followed by a line fill request return 3297. The PAP reuse snoop request 3299 specifies a PAP (e.g., formed at block 3404), e.g., the removal PAP. In response to the PAP reuse snoop request 3299, the LSU 117 determines whether the PAP is already in use, i.e., is available for comparison with other PAPs, as a proxy for a physical memory line address different from the physical memory line address that missed in the L2 cache 107 by snooping the LSQ 125, e.g., as described in more detail below with respect to block 3406 of FIG. 34. If so, the LSU 117 generates a PAP reuse abort request 901 to prevent update of architectural state based on a comparison using the PAP as a proxy for the physical memory line address that missed in the L2 cache 107 when the PAP is already in use as a proxy for a different physical memory line address and to prevent concurrent use of the PAP as a proxy for the first and the second physical memory line addresses, as described in more detail below. The line fill request return 3297 returns to the L1 data cache 103 a line of memory at a physical memory line address specified by the line fill request, along with a PAP that is a proxy for the physical memory line address specified by the line fill request.

FIG. 33 is an example flowchart illustrating operation of the processor 100 of FIG. 1 to manage PAP reuse in accordance with embodiments of the present disclosure. Operation begins at block 3302.

At block 3302, the L2 cache 107 allocates an entry 401 for a physical memory line address, which in the example will be denoted address X. That is, the L2 cache 107 selects an entry 401, having a unique set index and way combination, into which a cache line at address X will be filled, i.e., written. The L2 cache 107 forms a PAP for address X from the set index and way of the allocated entry 401. In one embodiment, e.g., as described above, the PAP includes physical address bits PA[16:6] and the two bits of the way number L2way [1:0], although other embodiments are contemplated in which the PAP is formed in other manners. For example, if the L2 cache 107 has more than four ways, e.g., eight ways, then the PAP includes more bits to specify the way. For another example, if the L2 cache 107 has more than 2048 sets, then the PAP includes more bits to specify the set index. For yet another example, embodiments are contemplated in which the L2 cache 107 hashes bits of the virtual address 321 to generate the set index bits. Operation proceeds to block 3304.

At block 3304, the LSU 117 makes the PAP formed at block 3302 available as a proxy for address X for comparison with PAPs that are proxies of other physical memory line addresses. For example, the LSU 117 may make the PAP available within a SQ entry 1301 (store PAP 1304) for comparison with a load PAP (e.g., PAP 1495 of FIG. 14) of a load instruction during its execution to determine whether store data of the SQ entry 1301 should be forwarded to the load instruction, as described above in detail. For another example, the LSU 117 may make the PAP available within a LQ entry 2901 (load PAP 2904) for comparison with the store PAP 1304 of a SQ entry 1301 during commit of a store instruction to perform store-to-load forwarding checking, as described above in detail. For another example, the LSU 117 may make the store PAP 1304 available from a SQ entry 1301 for a store instruction that is being committed for comparison with a write PAP 2404 of a WCB entry 2401 to determine whether the store data of the store instruction may be combined with the store data of older store instructions before being written to the L2 cache 107. In each of these examples, the processor 100 is making a comparison of PAPs to determine whether there are physical memory line address matches rather than making a comparison of the physical memory line addresses themselves. Advantageously, a PAP comparison is faster than and requires less storage space than a physical memory line address. As described above, e.g., at FIG. 7, the PAP formed at block 3302 is provided by the L2 cache 107 to the L1 data cache 103 where it is stored. During execution of a load instruction, the PAP is provided by the L1 data cache 103 and written into a LQ entry 2901. During execution of a store instruction, the PAP is provided by the L1 data cache 103 and written into a SQ entry 1301. The PAP may also be used by the L1 data cache 103 to service a snoop request received from the L2 cache 107, as described above with respect to FIG. 8. Operation proceeds to block 3306.

At block 3306, the L2 cache 107 replaces the same entry 401 previously allocated for address X at block 3302 with a cache line of memory at a different physical memory line address, which in the example will be denoted address Y. That is, physical memory line addresses X and Y map to the same set of the L2 cache 107 and the replacement algorithm of the L2 cache 107 selected the same way within the selected set for address Y to replace that was selected for address X at block 3302. In other words, in the example embodiment, physical address bits PA[16:6] of addresses X and Y are identical, and the replacement algorithm selected the same way in both instances. Consequently, the L2 cache 107 forms a PAP for address Y from the set index and way of the entry 401 selected for replacement, which is the same PAP value formed at block 3302. Additionally, because the L2 cache 107 is inclusive of the L1 data cache 103, as described above with respect to block 706 of FIG. 7, the L2 cache 107 causes the L1 data cache 103 to evict its copy of the cache line replaced in the L2 cache 107 here at block 3306 (e.g., in response to receiving the PAP reuse snoop request at block 3406 described below). Operation proceeds to block 3308.

At block 3308, the L2 cache 107, LSU 117, and PCL 132 operate to prevent update of architectural state based on any comparison of the PAP as a proxy for the physical memory line address Y that was made while the PAP is still available for comparison as a proxy for physical memory line address X and to prevent concurrent use of the PAP as a proxy for physical memory line addresses X and Y. As described in more detail with respect to FIG. 34 and the remaining Figures, this may involve flushing any load/store instruction for which the LSU 117 makes a comparison of the PAP as a proxy for address Y that is made while the PAP is still available for comparison as a proxy for address X, e.g., via an abort process initiated by a PAP reuse abort request 901 made by the LSU 117.

Figure 34:
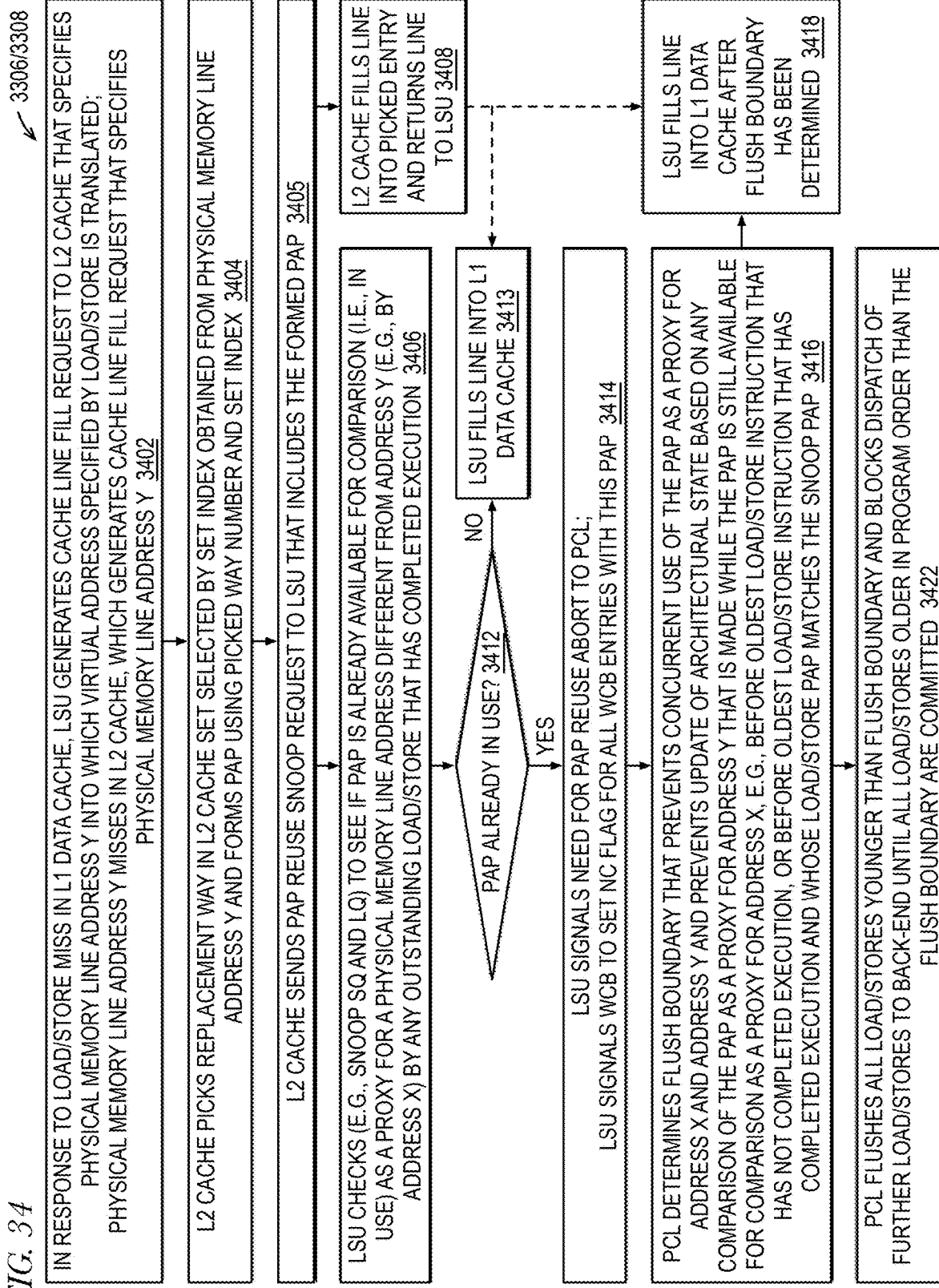

FIG. 34 is an example flowchart illustrating operation of the processor 100 of FIG. 1 to manage PAP reuse in accordance with embodiments of the present disclosure. More specifically, FIG. 34 illustrates operation at blocks 3306 and 3308 of FIG. 33 in more detail in the case of a load/store instruction miss in the L1 data cache 103 that precipitates the replacement of an L2 cache entry 401 at block 3306. Operation begins at block 3402.

At block 3402, in response to a miss of a virtual address specified by a load/store instruction in the L1 data cache 103, the LSU 117 generates a cache line fill request to the L2 cache 107 that specifies physical memory line address Y of block 3306 of FIG. 33 into which the virtual address is translated. During processing of the fill request, address Y misses in the L2 cache 107. In response to the miss, the LSU 117 generates a cache line fill request to memory (or a higher-level cache, e.g., L3 cache) that specifies physical memory line address Y. Operation proceeds to block 3404.

At block 3404, the L2 cache 107 picks a replacement way in the set of the L2 cache 107 selected by the set index obtained from address Y, e.g., PA[16:6]. The L2 cache 107 forms a PAP using the set index and way of the entry 401 selected for replacement. In one embodiment, the operation at block 3404 is described with respect to FIG. 35. Operation proceeds to block 3405.

At block 3405, the L2 cache 107 then sends a PAP reuse snoop request 3299 to the LSU 117 that specifies the PAP formed at block 3404 so the LSU 117 can determine whether it needs to generate a PAP reuse abort because the PAP is already in use. In one embodiment, the PAP reuse snoop request 3299 also instructs the L1 data cache 103 to evict any entry 201 of the L1 data cache 103 having the formed PAP, which is in use as a proxy for the physical memory line address (e.g., physical memory line address X) at which a copy of a line of memory is being removed from the L2 cache 107 and L1 data cache 103 (assuming the line at physical memory line address X is in the L1 data cache 103), in furtherance of the policy that the L2 cache 107 is inclusive of the L1 data cache 103. Operation proceeds to block 3406.

At block 3406, the LSU 117 checks to see if the formed PAP specified in the PAP reuse snoop request 3299 is already in use as a proxy for a physical memory line address different from address Y, e.g., address X, by any outstanding load/store instruction that has completed execution. That is, the LSU 117 checks to see if the formed PAP is available for comparison as a proxy for a physical memory line address different from address Y by any outstanding load/store instruction that has completed execution. In one embodiment, the LSU 117 makes the check by snooping the store queue 125 and load queue 125 (e.g., LSQ snoop 3293 of FIG. 32) to compare the formed PAP against the store PAP 1304 and the load PAP 2904 of each entry of the load/store queue 125 that is associated with an outstanding load/store instruction that has completed execution. If the LSU 117 detects a valid match, then the PAP is already in use, i.e., is available for comparison as a proxy for a physical memory line address different from address Y by an outstanding load/store instruction that has completed execution. The formed PAP, also referred to as the removal PAP, is included in the LSQ snoop 3293, and the LSQ 125 responds to the LSU 117 with a match indication. Additionally, as described above, the L1 data cache 103 evicts any copy of the cache line being replaced in the L2 cache 107 (i.e., the cache line is at physical memory line address X, for which the formed PAP is a proxy), e.g., at block 3408. In one embodiment, the eviction is performed as part of the PAP reuse snoop request 3299, i.e., the LSU 117 looks up the specified PAP in the L1 data cache 103 and evicts all matching entries 201. In an alternate embodiment, the L2 cache 107 sends a separate request to evict any copy of the cache line in the L1 data cache 103. Operation proceeds concurrently to block 3408 and to decision block 3412.

At block 3408, the L2 cache 107 obtains the line of memory specified by address Y (e.g., from system memory or from a higher-level cache) and fills the new line of memory into the entry 401 of the L2 cache 107 selected for replacement at block 3404. The L2 cache 107 also returns the obtained line of memory, along with the formed PAP, to the L1 data cache 103 in response to the cache line fill request generated at block 3402. Specifically, the L2 cache 107 sends the cache line fill request return 3297 at block 3408 after sending the PAP reuse snoop request 3299 at block 3405. In one embodiment, the PAP reuse snoop request 3299 and the cache line fill request return 3297 are sent on the same bus to the L1 data cache 103, which ensures ordering of the PAP reuse snoop request 3299 and the fill request return 3297. The ordering facilitates that at block 3416 described below, the PCL 132 can reliably determine the flush boundary needed to ensure that any load/store instructions that use the PAP as proxies for address Y to perform physical memory line address comparisons while the PAP is still available for comparison as a proxy for address X are flushed, which effectively prevents concurrent use of the PAP as a proxy for the removed physical memory line address and the filled physical memory line address. Operation proceeds concurrently to blocks 3413 and 3418.

At decision block 3412, if the PAP is already in use, i.e., is available for comparison as a proxy for a physical memory line address different from address Y, operation proceeds to block 3414; otherwise, operation proceeds to block 3413.

At block 3413, in response to the cache line fill request return 3297 made by the L2 cache 107 at block 3408, the L1 data cache 103 fills the returned cache line and returned PAP into an entry 201 allocated to the virtual address specified by the load/store instruction at block 3402. In the case at block 3413, the PAP was not already in use, so no PAP reuse abort process needs to be performed.

At block 3414, the LSU 117 signals to the PCL 132 the need for a PAP reuse abort 901. Additionally, the LSU 117 signals to the WCB 109 to set the NC flag 2413 to true for any WCB entry 2401 whose write PAP 2404 matches the PAP provided by the LSU 117, i.e., the PAP received in the PAP reuse snoop request 3299. Operation proceeds to block 3416.

At block 3416, the PCL 132 determines the flush boundary 1117 in response to the PAP reuse abort 901. The flush boundary 1117 is chosen so as to prevent concurrent use of the formed PAP as a proxy for different physical memory line addresses (e.g., physical memory line addresses X and Y) and to prevent the update of architectural state that is based on any comparison of the PAP as a proxy for address Y that is made while the PAP is still available for comparison as a proxy for address X, i.e., is still in use as a proxy for address X. In a first embodiment, the flush boundary 1117 is chosen to be before the oldest load/store instruction that has not yet completed execution. A load/store instruction cannot complete execution until it hits in the L1 data cache 103 and has received its PAP. If the load/store instruction misses in the L1 data cache 103, the load/store instruction goes back to the scheduler 121, which will subsequently re-issue the load/store instruction, e.g., once the missing cache line and PAP are filled. The load/store instruction has completed execution once it receives the PAP from the L1 data cache 103 and writes the PAP to the entry 2901/1301 allocated for it in the load/store queue 125, i.e., the PAP written to the allocated entry 2901/1301 is available for comparison, i.e., is in use as a proxy for a physical memory line address. In an alternate embodiment, the flush boundary 1117 is chosen to be before the oldest load/store instruction that has completed execution and whose load/store PAP 2904/1304 matches the PAP specified in the PAP reuse snoop request 3299 and LSQ snoop 3293. In one embodiment, the PAP reuse abort request 901 may specify the ROB identifier of the oldest load/store instruction associated with a LSQ entry 2901 whose load PAP 2904 matches the snoop PAP, and the PCL 132 may determine the flush boundary at before the instruction specified by the received ROB identifier. Below are descriptions of how the embodiments prevent concurrent use of the formed PAP as a proxy for different physical memory line addresses and prevents the update of architectural state that is based on any comparison of the PAP as a proxy for address Y that is made while the PAP is still available for comparison as a proxy for address X. In one embodiment, the LSU 117 controls the update of both the load and store queues 125 and effectively the ROB 122 regarding indications of whether a load/store instruction has completed execution, i.e., whether a load/store instruction has a valid load/store PAP 2904/1304 that is in use as a proxy for a load/store physical memory line address. That is, the LSU 117 updates the indications in the load/store queue entries 2901/1301 of whether or not a load/store instruction has completed execution (e.g., Done flag 2936 in LQ entry 2901 that indicates load PAP 2904 is valid, and similar indicator (not shown) in the SQ entry 1301 that indicates the store PAP 1304 is valid). Furthermore, via ld/st completed signal 3207, the LSU 117 effectively controls the update of indications in the ROB 122 entries of whether or not a load/store instruction has completed execution. Finally, the LSU 117 and PCL 132 are configured such that the execution completion status in the load and store queues 125 viewed by the LSU 117 at the time the LSQ snoop 3293 occurs matches the execution completion status in the ROB 122 viewed by the PCL 132 at the time the PCL 132 determines the flush boundary 1117 in response to the PAP reuse abort request 901. Operation proceeds concurrently to blocks 3418 and 3422.

At block 3418, in response to the cache line fill request return 3297 made by the L2 cache 107 at block 3408, the L1 data cache 103 fills the returned cache line and returned PAP into an entry 201 allocated to the virtual address specified by the load/store instruction at block 3402. In one embodiment, the LSQ snoop 3293 is performed before the fill of the new line into the entry 201 of the L1 data cache 103. In another embodiment, the LSQ snoop 3293 is performed after but in an atomic manner with the fill of the new line into the entry 201 of the L1 data cache 103. The atomic manner means the snoop and fill are performed such that no load/store instruction is able to hit on the entry 201 after the fill and before the snoop. In one embodiment, the LSQ snoop 3293 at block 3406 is performed after the removal (i.e., eviction) of the entry 201 of the L1 data cache 103. In another embodiment, the LSQ snoop 3293 is performed before but in an atomic manner with the removal of the entry 201 of the L1 data cache 103. The atomic manner means the snoop and removal are performed such that no load/store instruction is able to hit on the entry 201 after the snoop and before the removal. The performance of the LSQ snoop 3293 after the removal or atomically therewith and before the fill or atomically therewith ensures that the state of the LSQ 125 captured by the LSQ snoop 3293 reflects any uses of the formed PAP as a proxy for physical memory line address X by outstanding load/store instructions that have completed execution and does not reflect any uses of the formed PAP as a proxy for physical memory line address Y by outstanding load/store instructions that could complete execution after the fill, which enables the LSU 117 to determine whether or not to signal the need for a PAP reuse abort 901 at block 3414 to prevent mixing of old and new uses of the PAP.

At block 3422, the PCL 132 flushes (e.g., via flush request signal 1001) all load/store instructions younger than the flush boundary 1117 determined at block 3416. Additionally, in the first embodiment in which the flush boundary is determined before the oldest load/store instruction that has not completed execution, the PCL 132 blocks dispatch (e.g., via block dispatch signal 3205) of further load/store instructions (e.g., load/store instructions that may be flushed and then re-fetched and decoded) to the back-end 130 (i.e., to scheduler 121) until all load/store instructions after the flush boundary 1117 are committed.

Once the returned PAP is filled into the entry 201 of the L1 data cache 103 at block 3418, the PAP is now available to be reused as a proxy for address Y. For example, an illegal PAP reuse event may occur in which, after the PAP is filled into the entry 201 at block 3418, a load/store instruction gets issued to the LSU 117 for execution, hits in the L1 data cache 103, and uses the received PAP as a proxy for physical memory line address Y in PAP comparisons, e.g., for store-to-load forwarding, store-to-load forwarding checks, and store data write combining. So, the L2 cache 107, LSU 117, and PCL 132 work in combination to try to prevent an illegal PAP reuse event from happening, e.g., by blocking dispatch of load/store instructions by the decode unit 112 until all load/store instructions older than the flush boundary are committed.

However, in some embodiments there may be a small window, discussed in more detail below, during which an illegal PAP reuse event may occur. In the unlikely illegal PAP reuse event, the PCL 132 flushes any load/store instruction associated with an illegal PAP reuse event before it updates architectural state. The load/store instruction is instead subsequently re-fetched and re-executed and may then be able to update architectural state on the re-execution. During the re-execution of the load/store instruction, the PAP is no longer in use as a proxy for address X such that the load/store instruction is free to use the PAP as a proxy for physical memory line address Y in PAP comparisons. In the first flush boundary embodiment, the PAP is no longer in use as a proxy for address X because any load/store instruction using the PAP as a proxy for address X either was younger than the flush boundary and therefore flushed, or was older than the flush boundary and therefore was allowed to commit before any load/store instructions that will use the PAP as a proxy for address Y are allowed to be dispatched and executed. In the alternate flush boundary embodiment, the PAP is no longer in use as a proxy for address X because any load/store instruction using the PAP as a proxy for address X was younger than the flush boundary and therefore flushed.

The small window alluded to above may occur between the time that the PAP is filled into the L1 data cache 103 at block 3418 and the completion of the abort process that begins at block 3422. However, the L2 cache 107, LSU 117 and PCL 132 are designed to determine the flush boundary 1117 to prevent any load/store instruction associated with an illegal PAP reuse from updating architectural state. As described above, in one embodiment PCL 132 examines the state of outstanding instructions in the ROB 122 to determine the flush boundary 1117 at the point before the oldest load/store instruction that has not completed execution. A load/store instruction cannot be marked in the ROB 122 as having completed execution until it has hit in the L1 data cache 103 and received its PAP. Hence, as long as the PCL 132 determines the flush boundary 1117 at block 3416 before the PAP is filled into the L1 data cache 103 at block 3418, any load/store instruction potentially associated with an illegal PAP reuse will not have completed its execution and will therefore be behind the flush boundary 1117. In one embodiment, this is accomplished by the L2 cache 107, LSU 117, and PCL 132 being designed such that the number of clocks J from when the LSU 117 receives the PAP reuse snoop request 3299 from the L2 cache 107 until the PCL 132 determines the flush boundary 1117 in response to the PAP reuse abort request 901 is no greater than the number of clocks K from the time the LSU 117 receives the cache line fill request return 3297 from the L2 cache 107 until the time the L1 data cache 103 can provide the returned PAP in response to a hit of a virtual address specified by a load/store instruction that subsequently executes after the returned PAP is written to the L1 data cache 103. Choosing the flush boundary 1117 before the oldest load/store instruction that has not yet completed execution enables forward progress to be made, e.g., to avoid a livelock, while ensuring there is no update of architectural state that is based on a comparison of the PAP as a proxy for address Y made while the PAP is still in use as a proxy for address X. More specifically, any load/store instructions that are using the PAP as a proxy for address X that are older than the flush boundary will be allowed to commit, whereas any load/store instructions that have not completed execution, and therefore could subsequently use the PAP as a proxy for address Y, will be flushed and blocked from dispatch, which prevents them from hitting in the L1 data cache 103 and receiving the PAP for use as a proxy for address Y, until all load/store instructions using the PAP as a proxy for address X have committed and are therefore are no longer using the PAP as a proxy for address X. In an alternate embodiment, the processor 100 includes logic to detect a potential livelock condition and to prevent a livelock from occurring. For example, the livelock detection and prevention logic may detect that the operation of FIG. 34 has occurred a predetermined number of times within a predetermined number of clock cycles. In response, the logic may temporarily place the processor 100 into a low performance mode (e.g., a mode that does not allow out of order execution).

As stated above, in an alternate embodiment, the flush boundary 1117 is determined to be before the oldest load/store instruction that has completed execution and whose load/store PAP 2904/1304 matches the PAP specified in the PAP reuse snoop request 3299 (and LSQ snoop 3293). In the alternate embodiment, because the flush boundary 1117 is determined to be before the oldest matching load/store instruction that has completed execution, all load/store instructions that are using the PAP as a proxy for address X will be flushed (since they have completed execution), and when re-fetched and re-dispatched and re-executed they will use the PAP as a proxy for address Y. Additionally, any load/store instructions younger than the flush boundary that had not completed execution will be flushed and, upon their re-fetch and re-dispatch and re-execution, will use the PAP as a proxy for address Y. As a result, the PCL 132 need not block dispatch until all load/store instructions using the PAP as a proxy for address X have committed since the load/store instructions using the PAP as a proxy for address X will all have been flushed and will subsequently use the PAP as a proxy for address Y.

Figure 35:
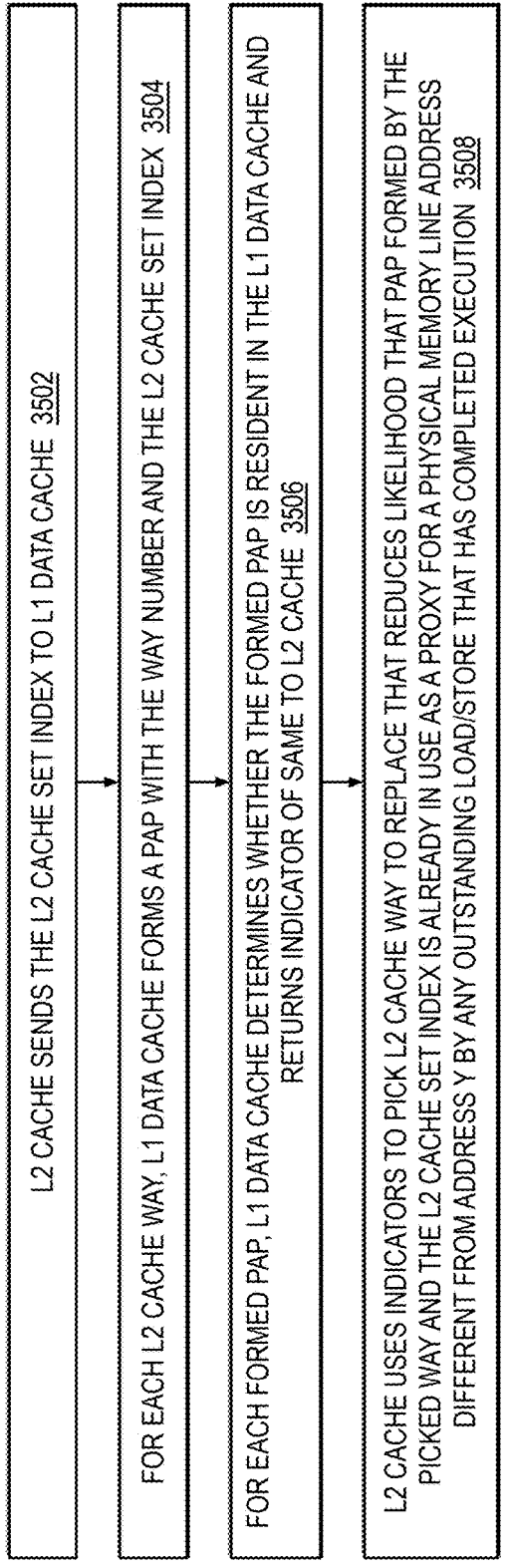

FIG. 35 is an example flowchart illustrating operation of the processor 100 of FIG. 1 to manage PAP reuse in accordance with embodiments of the present disclosure. More specifically, FIG. 35 illustrates operation at block 3404 of FIG. 34 in more detail. Operation begins at block 3502.

At block 3502, per block 3402 of FIG. 34, physical memory line address Y has missed in the L2 cache. That is, a set index that selects a set of the L2 cache 107 was obtained from address Y, and the tag portion of address Y did not match the tag 404 of any of the L2 cache entries 401 in any way of the selected set. Therefore, the L2 cache 107 sends the L2 set index to the L1 data cache 103. Operation proceeds to block 3504.

At block 3504, for each possible way number of the L2 cache 107, the L1 data cache 103 effectively forms a PAP with the way number and the received L2 set index. For example, in an embodiment in which the L2 cache 107 has four ways, the L1 data cache 103 forms four possible PAPs using the four possible way numbers each concatenated with the L2 set index. Operation proceeds to block 3506.

At block 3506, for each of the PAPs formed at block 3504, the L1 data cache 103 determines whether the formed PAP is resident in the L1 data cache 103. In one embodiment, the PAP residency determination for each formed PAP is as follows. The untranslated bits PA[11:6] of the L2 set index (e.g., corresponding untranslated bits PA[11:6] of physical memory line address Y), along with the four possible values of the upper two bits of the L1 data cache 103 set index are used to select four sets of the L1 data cache 103 (similar to the manner described above with respect to FIG. 6), which implicates sixteen entries 201 of the L1 data cache 103. The dPAP 209 of each of the sixteen entries 201 is compared against four different formed dPAPs to generate 16×4=64 match results. The four formed dPAPs are formed using the four different possible L2 way values (i.e., 00, 01, 10, 11) concatenated with the upper five bits of the L2 set index sent from the L2 cache 107 at block 3502. The sixteen match results associated with each of the four formed dPAPs are Boolean OR'ed together to generate a single-bit PAP residency indicator associated with the formed dPAP. If the single-bit PAP residency indicator is true, this indicates the associated formed PAP is resident in the L1 data cache 103, which indicates a high likelihood that the formed PAP is in use as a proxy for a physical memory line address different than address Y, e.g., address X. The four single-bit PAP residency indicators are sent as a 4-bit indicator to the L2 cache 107. Operation proceeds to block 3508.

At block 3508, the L2 cache 107 uses the indicators sent at block 3506 to pick the way of the L2 cache 107 to replace that reduces the likelihood that the PAP formed by the picked way and the L2 cache set index is already in use as a proxy for a physical memory line address different from address Y. In one embodiment, the PAP residency determination may be performed according to FIG. 36 described below. The PAP residency determination may be conceptualized effectively as an approximation of the check performed at block 3406 of FIG. 34 to determine whether the PAP is already in use as a proxy for a physical memory line address different from address Y. Advantageously, typically the time required for the L1 data cache 103 to make the PAP residency determination is hidden behind the time needed for the L2 cache 107 to go get the missing cache line from system memory or a third level cache memory. Furthermore, there may be many instances in which the PAP residency determination indicates there is at least one way of the selected L2 cache set for which the formed PAP is not resident in the L1 data cache 103, indicating a high likelihood that the formed PAP is not already in use.

Figure 36:
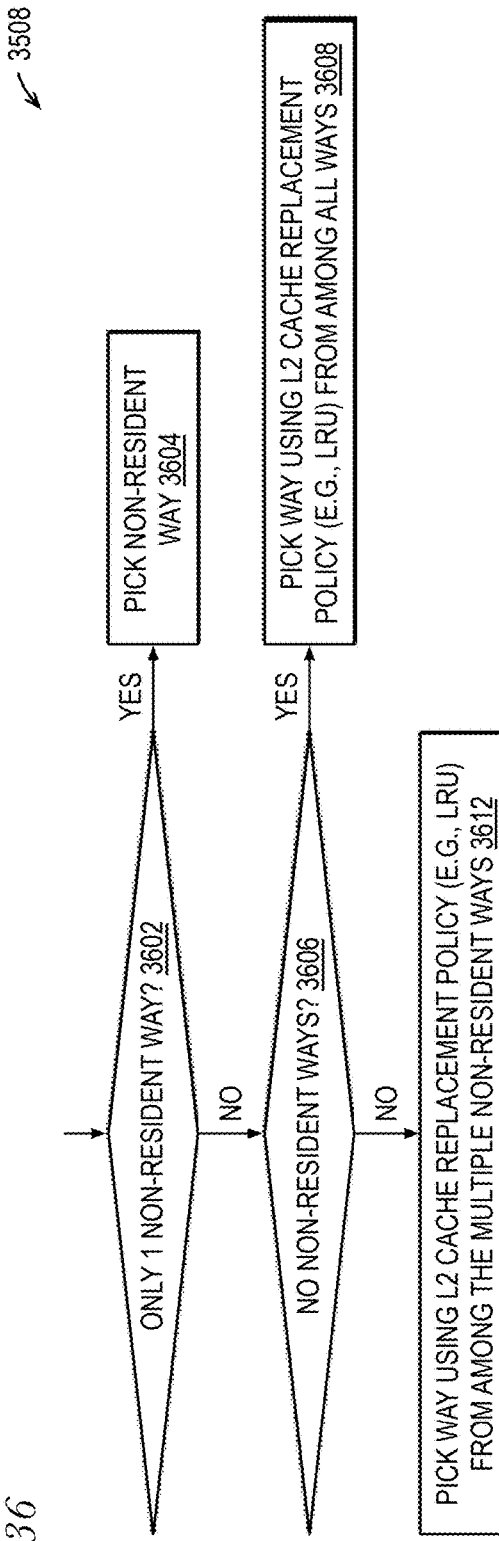

FIG. 36 is an example flowchart illustrating operation of the processor 100 of FIG. 1 to manage PAP reuse in accordance with embodiments of the present disclosure. More specifically, FIG. 36 illustrates operation at block 3508 of FIG. 35 in more detail. Operation begins at decision block 3602.

At decision block 3602, if the PAP residency indicator indicates there is only one way of the L2 cache 107 that could be used along with the L2 set index sent at block 3502 to form a PAP that is not resident in the L1 data cache 103, operation proceeds to block 3604; otherwise, operation proceeds to decision block 3606.

At block 3604, the L2 cache 107 picks for replacement the single non-resident way indicated in the PAP residency indicator.

At decision block 3606, if the PAP residency indicator indicates there are no ways of the L2 cache 107 that could be used along with the L2 set index sent at block 3502 to form a PAP that is not resident in the L1 data cache 103, operation proceeds to block 3608; otherwise, operation proceeds to block 3612.

At block 3608, the L2 cache 107 picks for replacement using its normal replacement policy (e.g., least recently used (LRU)) from among all ways of the set of the L2 cache 107 selected by the L2 set index.

At block 3612, the L2 cache 107 picks for replacement using its normal replacement policy (e.g., least recently used (LRU)) from among only the ways of the set of the L2 cache 107 selected by the L2 set index that the PAP residency indication indicates are not resident in the L1 data cache 103. Thus, for example, if the PAP residency indication indicates ways 0, 1, and 3 are not resident in the L1 data cache 103, then the L2 cache 107 picks one of ways 0, 1, and 3 (e.g., the LRU way among ways 0, 1, and 3) to replace, but does not pick way 2 since it is highly likely the PAP associated with way 2 is already in use as a proxy for a physical memory line address different from address Y.

FIG. 37 is an example flowchart illustrating operation of the processor 100 of FIG. 1 to manage PAP reuse in accordance with embodiments of the present disclosure. More specifically, FIG. 37 illustrates operation at blocks 3306 and 3308 of FIG. 33 in more detail in the case of a prefetch request that misses in the L1 data cache 103 that precipitates the replacement of an L2 cache entry 401 at block 3306. The operation according to FIG. 37 is similar in many respects to the operation of FIG. 34. Operation begins at block 3702.

At block 3702, in response to miss of a virtual address specified by a prefetch request in the L1 data cache 103, the LSU 117 generates a cache line fill request to the L2 cache 107 that specifies physical memory line address Y of block 3306 of FIG. 33 into which the virtual address is translated. During processing of the fill request, address Y misses in the L2 cache 107. In response to the miss, the LSU 117 generates a cache line fill request to memory (or a higher level cache, e.g., L3 cache) that specifies physical memory line address Y. Operation proceeds to block 3404 and continues through blocks 3405 through 3422 similar to the manner described above with respect to FIG. 34.

Figure 38A:
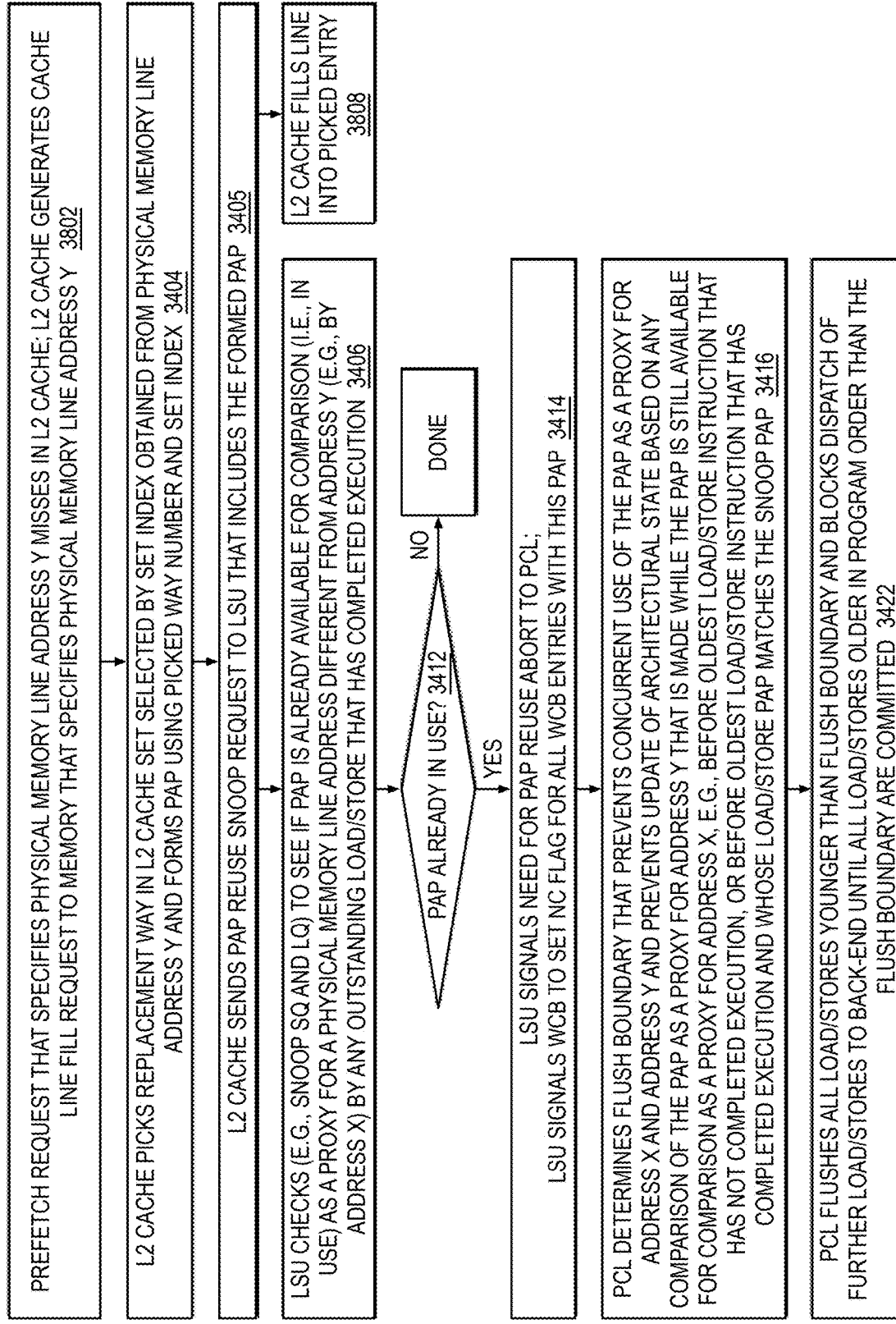
FIGS. 38A and 38B are example flowcharts illustrating operation of the processor of FIG. 1 to manage PAP reuse in accordance with embodiments of the present disclosure.

FIG. 38A is an example flowchart illustrating operation of the processor 100 of FIG. 1 to manage PAP reuse in accordance with embodiments of the present disclosure. More specifically, FIG. 38A illustrates operation at blocks 3306 and 3308 of FIG. 33 in more detail in the case of a prefetch request that specifies a physical memory line address Y that misses in the L2 cache 107 that precipitates the replacement of an L2 cache entry 401 at block 3306. The operation according to FIG. 38A is similar in many respects to the operation of FIG. 34. Operation begins at block 3802.

At block 3802, a prefetch request to the L2 cache 107 that specifies physical memory line address Y of block 3306 of FIG. 33 misses in the L2 cache 107. In response to the miss, the LSU 117 generates a cache line fill request to memory (or a higher level cache, e.g., L3 cache) that specifies physical memory line address Y. Operation proceeds to block 3404 and continues through blocks 3405, 3406, 3212, 3414, 3416, and 3422 similar to the manner described above with respect to FIG. 34. However, from block 3405 operation proceeds concurrently to block 3406 and block 3808.

At block 3808, the L2 cache 107 obtains the line of memory specified by address Y (e.g., from system memory or from a higher level cache) and fills the line of memory into the entry 401 selected for replacement at block 3404. However, unlike operation at block 3408 of FIG. 34, in the operation of FIG. 38A the L2 cache 107 does not return the obtained line of memory, along with the formed PAP, to the L1 data cache 103 since there was no cache line fill request generated. Additionally, FIG. 38A does not include block 3413 nor block 3418.

Figure 38B:
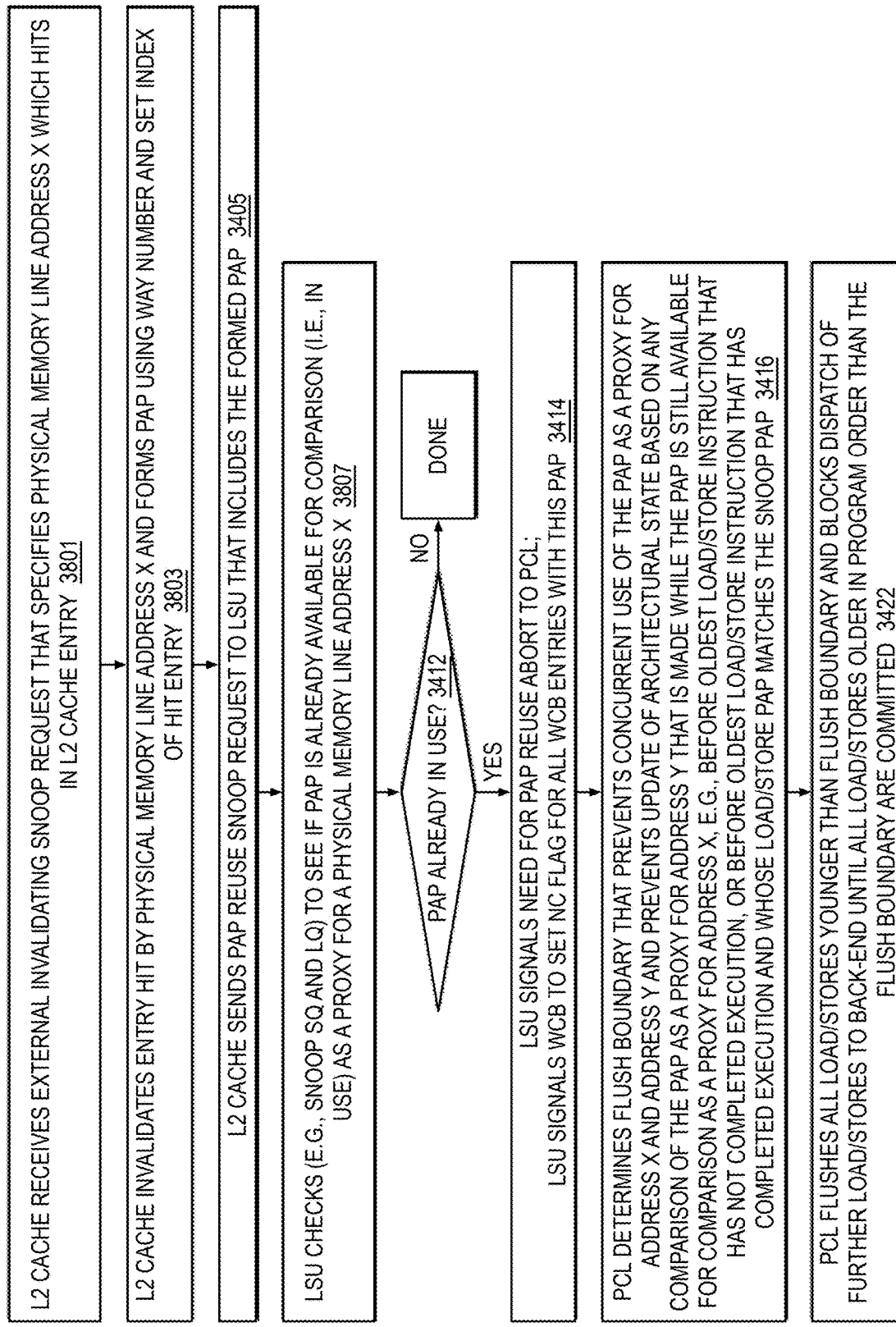

As described above, a PAP is a proxy for a physical memory line address, and a PAP uniquely identifies an entry 401 in the L2 cache 107 into which a line of memory at the physical memory line address is allocated. That is, the set index and way number of the PAP uniquely identify the entry 401. Because the L2 cache 107 is set associative, at two different instances in time, i.e., not concurrently, a physical memory line address may get allocated into two different entries 401 of the L2 cache 107. Consequently, the two different PAPs of the two different entries 401 of the L2 cache 107 may be used as a proxy for the physical memory line address at the two different instances in time. This may occur when the physical memory line address is allocated into a first entry of the L2 cache 107 (a first way of the selected set, e.g., way 1) and a first PAP is formed as a proxy for the physical memory line address, and subsequently the physical memory line address is removed from the first entry 401 (e.g., by an external snoop that specifies the physical memory line address), and subsequently the physical memory line address is allocated into a second entry of the L2 cache 107 (a second way of the selected set, e.g., way 3) and a second PAP is formed as a proxy for the physical memory line address. At this point, if the processor 100 were to begin to use the second PAP as a proxy for the physical memory line address while the first PAP is still being used as a proxy for the physical memory line address, incorrect results could be generated by the processor 100. FIG. 38B describes PAP reuse management by the processor 100 to prevent such occurrences to assure correct operation.

FIG. 38B is an example flowchart illustrating operation of the processor 100 of FIG. 1 to manage PAP reuse in accordance with embodiments of the present disclosure. More specifically, FIG. 38B illustrates PAP management in the case of an external snoop request that specifies a physical memory line address X that hits in the L2 cache 107 that precipitates the invalidation of an L2 cache entry 401. The operation according to FIG. 38B is similar in many respects to the operation of FIG. 38A. Operation begins at block 3801.

At block 3801, the L2 cache 107 receives an invalidating external snoop request (e.g., as described above with respect to FIG. 6) that specifies a physical memory line address, referred to here as address X, which hits on an entry 401 in the L2 cache 107. Operation proceeds to block 3803.

At block 3803, the L2 cache 107 invalidates the hit entry 401. Additionally, the L2 cache 107 forms a PAP using the set index and the way of the hit entry 401, i.e., the invalidated entry 401. Unlike operation at block 3404 of FIG. 38A in which the L2 cache 107 picks a way to replace, at block 3803 the invalidated entry 401 is determined by the external snoop request (i.e., physical memory line address X), and the L2 cache 107 simply forms the PAP based on the set index and way of the invalidated entry 401. Operation proceeds to block 3405.

At block 3405, the L2 cache 107 then sends a PAP reuse snoop request 3299 to the LSU 117 that specifies the PAP formed at block 3803 so the LSU 117 can determine whether it needs to generate a PAP reuse abort because the PAP is already in use, similar to the manner described with respect to block 3405 of FIG. 34. Once physical memory line address X is no longer in the L2 cache 107 (e.g., due to its invalidation at block 3803), it is possible that physical memory line address X subsequently will be filled into a different way of the same set of the L2 cache 107. In such case, a new PAP may be used as a proxy for physical memory line address X that is different than the old PAP used as a proxy for physical memory line address X prior to the invalidation of the entry 401 hit upon by the external snoop request. Because the possibility exists that uncommitted load/store instructions are still using the old PAP as a proxy for physical memory line address X, the L2 cache 107 sends the PAP reuse snoop request 3299 to find out and, if so, generate a PAP reuse abort. Operation proceeds to block 3807.

At block 3807, the LSU 117 checks to see if the formed PAP specified in the PAP reuse snoop request 3299 is already in use as a proxy for physical memory line address X by any outstanding load/store instruction that has completed execution, e.g., via LSQ snoop 3293, similar to the manner described above with respect to block 3406 of FIG. 34. As described above, the L1 data cache 103 evicts any copy of the cache line at physical memory line address X being invalidated in the L2 cache 107. Operation proceeds to decision block 3412 and proceeds through blocks 3414, 3416 and 3422 as in FIG. 38A similar to the manner described. Unlike FIG. 38A, there is no block 3808 in FIG. 38B, i.e., there is no fill into the L2 cache 107.

Although FIG. 38B describes the invalidation of an entry 401 of the L2 cache 107 caused by an external snoop, a similar process may be performed by the processor 100 in response to other events that invalidate an entry 401 of the L2 cache 107, such as execution of a cache management operation that invalidates/flushes the entry 401 or an operation that flushes the entry 401 for power management purposes.

Generational PAPs

As may be observed from the above description, there may be a performance penalty incurred in instances in which an abort process is performed in response to a need for a PAP reuse abort request. Although the frequency of occurrence of such instances is likely to be relatively small, nevertheless embodiments are now described that may reduce the likelihood. More specifically, the notion of generational PAPs (GPAPs) is described. GPAPs may reduce the likelihood that a PAP is already in use as a proxy for a first physical memory line address when a different second physical memory line address replaces the entry in the L2 cache allocated to the first physical memory line address. Each L2 cache entry is configured to store a generational identifier (GENID) that is incremented each time the entry is replaced, and the GENID is used-along with the set index and way number of the entry—to form the GPAP, as will now be described in more detail.

Figure 39:
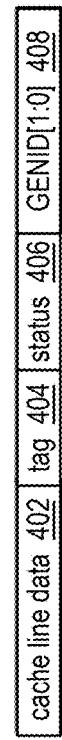
FIG. 39 is an example block diagram of an alternate embodiment of a cache entry of the L2 cache of FIG. 1 that employs GPAPs in accordance with embodiments of the present disclosure.

FIG. 39 is an example block diagram of an alternate embodiment of a cache entry 401 of L2 cache 107 of FIG. 1 that employs GPAPs in accordance with embodiments of the present disclosure. The L2 cache entry 401 of FIG. 39 is similar in many respects to the L2 cache entry 401 of FIG. 4. However, the L2 cache entry 401 of FIG. 39 also includes a GENID[1:0] field 408, as shown, also referred to as GENID 408. In the embodiment of FIG. 39, the GENID 408 is two bits. However, other embodiments are contemplated in which the GENID 408 is only one bit or is more than two bits. As described in more detail below, the GENID 408 is incremented each time the L2 cache entry 401 is replaced. The GENID 408 is used to form a GPAP which is used-rather than a PAP—as a proxy for a physical memory line address. Correspondingly, each of the L1 data cache entry 201, SQ entry 1301, LQ entry 2901, and WCB entry 2401 is also modified to hold a GPAP-rather than a PAP—for comparisons, as described below with respect to FIGS. 41, 43, and 45. In other words, in each place where a PAP was held or compared in the embodiments described with respect to FIGS. 1 through 38B, a GPAP is held and compared instead in order to reduce the PAP reuse abort likelihood. Advantageously, by slightly increasing the amount of storage required to hold the small GENID 408, the likelihood of incurring a PAP reuse abort may be decreased.

Figure 40:
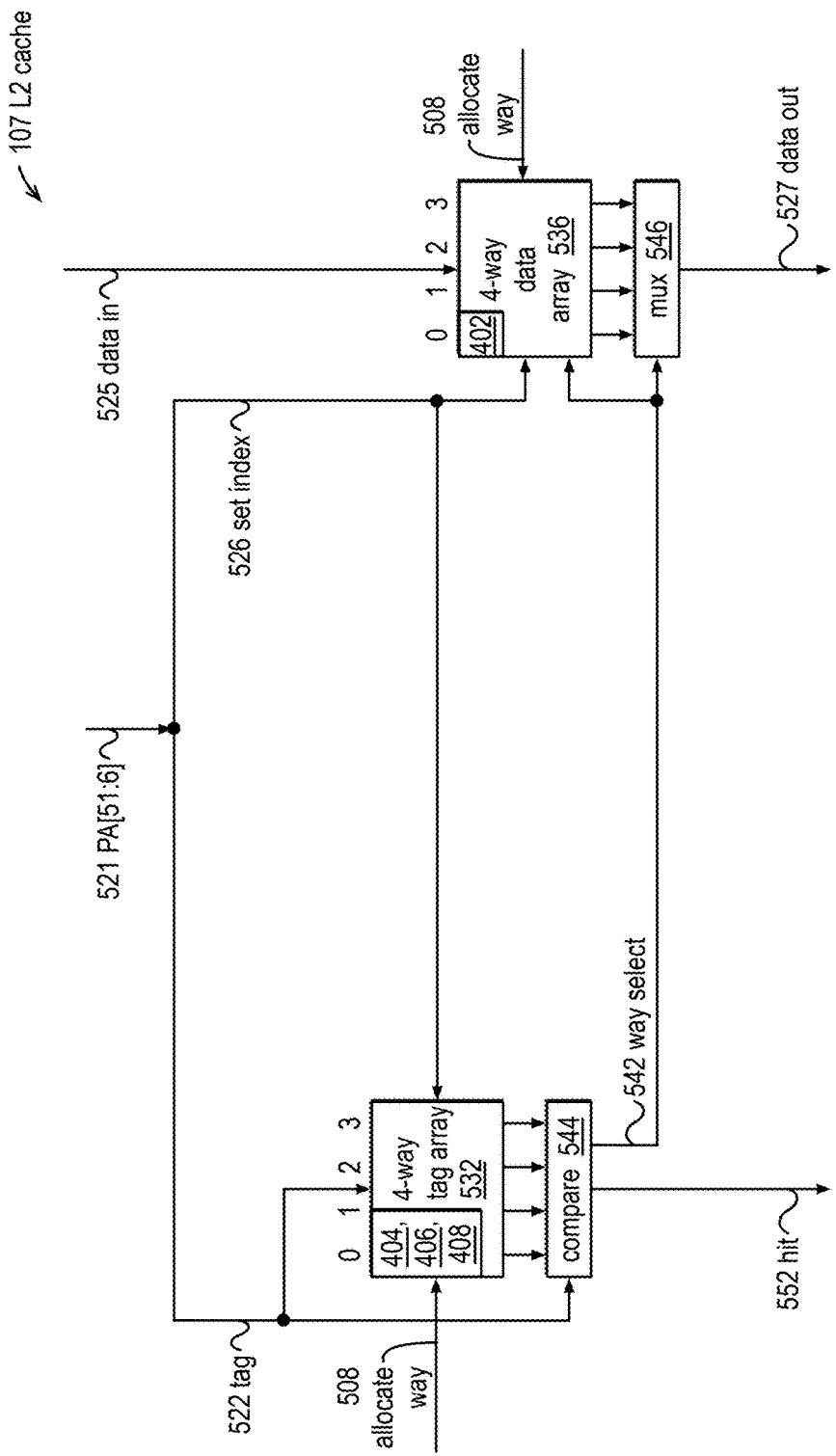
FIG. 40 is an example block diagram illustrating an alternate embodiment of the L2 cache of FIG. 1 that employs GPAPs in accordance with embodiments of the present disclosure.

FIG. 40 is an example block diagram illustrating an alternate embodiment of the L2 cache 107 of FIG. 1 that employs GPAPs in accordance with embodiments of the present disclosure. The L2 cache 107 of FIG. 40 is similar in many respects to the L2 cache 107 of FIG. 5. However, the tag array 532 also holds the GENID[1:0] of each L2 cache entry 401 of FIG. 39, as shown.

Figure 41:
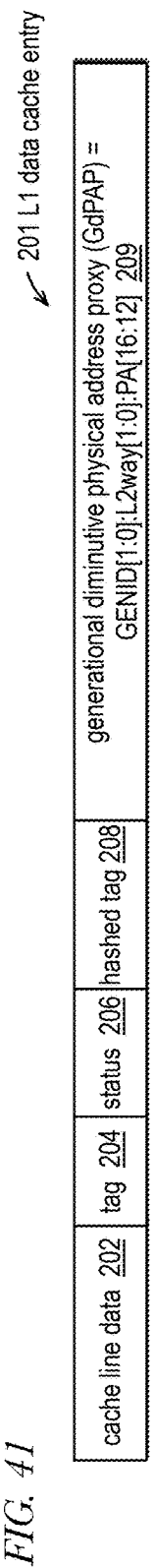
FIG. 41 is an example block diagram of an alternate embodiment of a cache entry of the L1 data cache of FIG. 1 in accordance with embodiments of the present disclosure.

FIG. 41 is an example block diagram of an alternate embodiment of a cache entry 201 of L1 data cache 103 of FIG. 1 in accordance with embodiments of the present disclosure. The L1 data cache entry 201 of FIG. 41 is similar in many respects to the L1 data cache entry 201 of FIG. 2. However, the L1 data cache entry 201 of FIG. 41 holds a generational dPAP (GdPAP) 209 rather than a dPAP 209 as in FIG. 2. The GdPAP 209 is similar to the dPAP 209 of FIG. 2 except that it is concatenated with the GENID[1:0], as shown.

Figure 42:
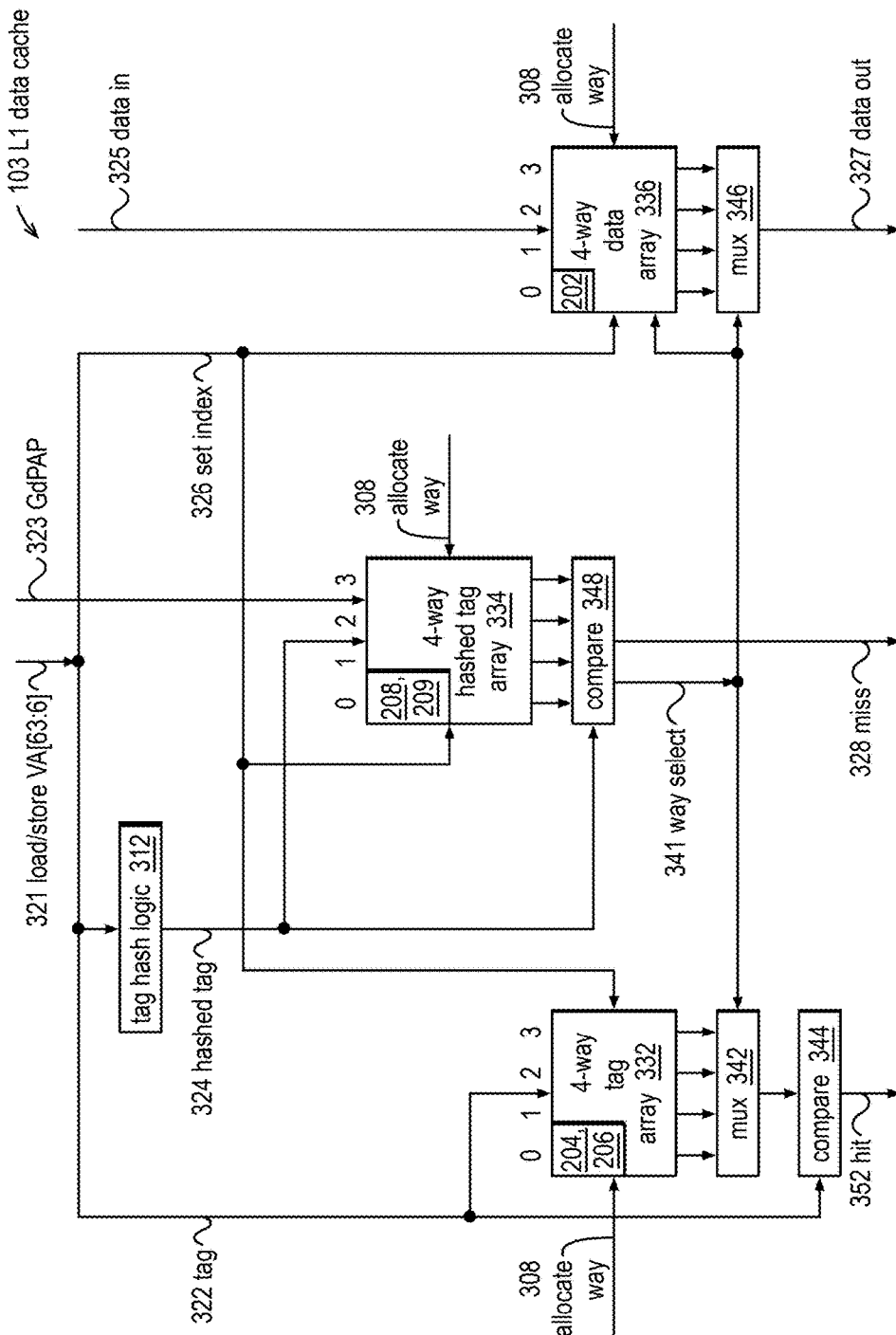
FIG. 42 is an example block diagram illustrating an alternate embodiment of the L1 data cache of FIG. 1 that employs GPAPs in accordance with embodiments of the present disclosure.

FIG. 42 is an example block diagram illustrating an alternate embodiment of the L1 data cache 103 of FIG. 1 that employs GPAPs in accordance with embodiments of the present disclosure. The L1 data cache 103 of FIG. 42 is similar in many respects to the L1 data cache 103 of FIG. 3. However, the L1 data cache 103 stores in each entry 201 a GdPAP 209 (rather than a dPAP). That is, similar to the manner described at block 704 of FIG. 7, when the L2 cache 107 returns the GdPAP 323 (rather than the dPAP) to the L1 data cache 103 in response to a cache line fill request made at block 702, the GdPAP 323 (rather than the dPAP) is written to the GdPAP 209 of the L1 data cache entry 201 of FIG. 41. Additionally, when a load/store instruction hits in the L1 data cache 103, the L1 data cache 103 outputs the GdPAP 209 (rather than the dPAP) of the hit entry 201, e.g., similar to the manner described with respect to block 1602 of FIG. 16 or block 1504 of FIG. 15, respectively.

Figure 43:
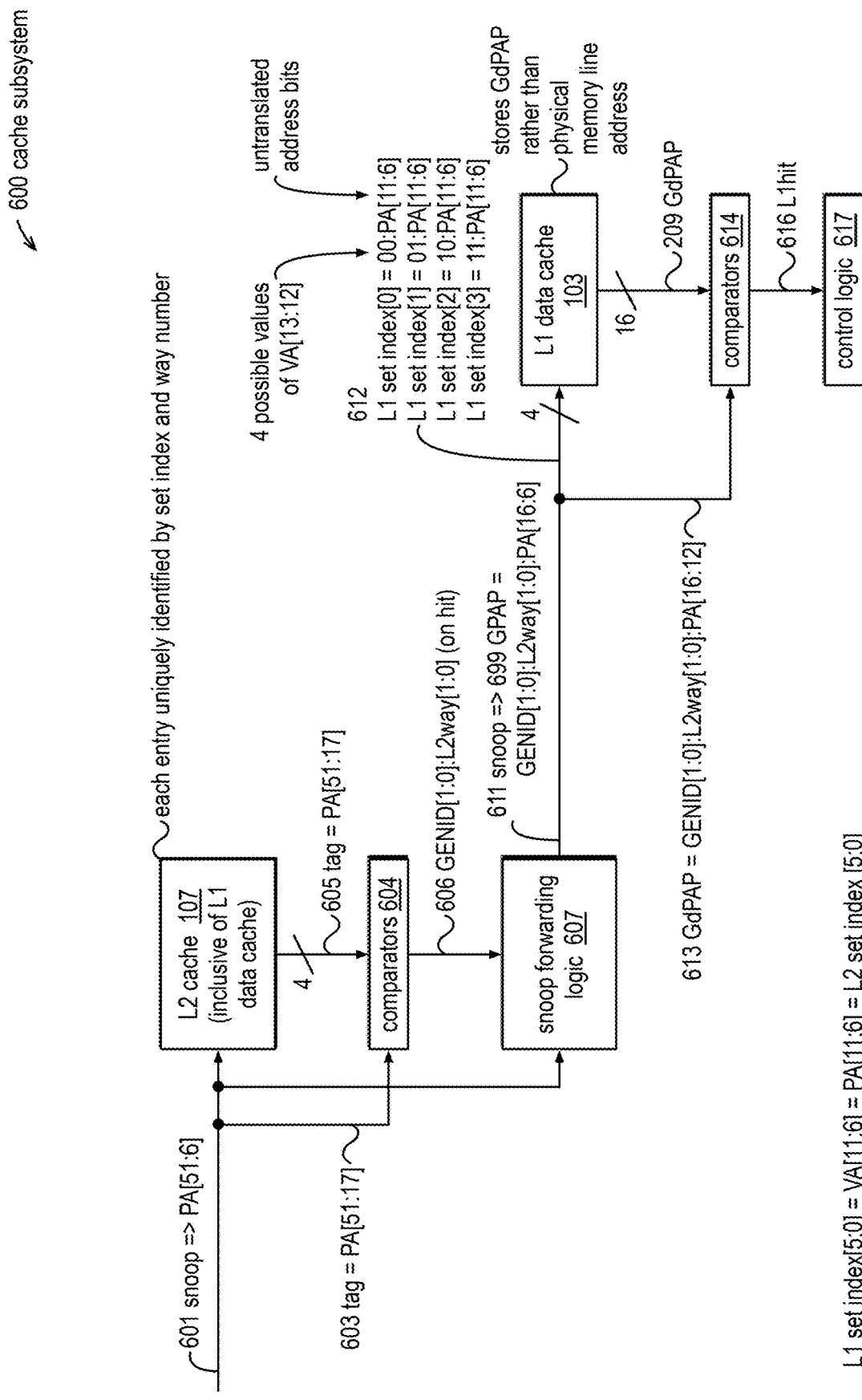
FIG. 43 is an example block diagram of an alternate embodiment of a cache subsystem that employs GPAPs in accordance with embodiments of the present disclosure.

FIG. 43 is an example block diagram of an alternate embodiment of a cache subsystem 600 that employs GPAPs in accordance with embodiments of the present disclosure. The cache subsystem 600 of FIG. 43 is similar in many respects to the cache subsystem 600 of FIG. 6 and performs hardware cache coherency in a similar manner in many respects. However, the cache subsystem 600 of FIG. 43 employs GPAPs instead of PAPs. In particular, on a hit in the L2 cache 107 of a snoop request 601, comparators 604 provide an output 606 that is the GENID[1:0] concatenated with the L2way [1:0] (rather than just the L2way [1:0]). Additionally, similar to the manner described at block 806 of FIG. 8, the snoop forwarding logic 607 forwards a GPAP 699 (rather than a PAP) that includes the GENID[1:0] to the L1 data cache 103 in the forwarded snoop request 611. The forwarded snoop request 611 includes a GdPAP 613 portion (rather than a dPAP portion) that includes a GENID[1:0]. As described above with respect to FIG. 42, each L1 data cache entry 201 holds a GdPAP 209 (rather than a dPAP). Finally, similar to the manner described at block 808 of FIG. 8, in response to the forwarded snoop request 611 of FIG. 43 that specifies a GPAP 699, the L1 data cache 103 outputs the GdPAP 209 (rather than the dPAP) of each entry 201 of each selected set (e.g., of sixteen entries 201) for provision to comparators 614, and the comparators 614 compare the sixteen GdPAPs 209 against the GdPAP 613 (rather than the dPAP) of the forwarded snoop request 611 to generate the L1hit signal 616. Similar modifications may be made in the embodiments of FIGS. 9 and 11, i.e., to form and provide a GPAP 699 rather than a PAP 699 and to compare GdPAPs 613/209 rather than dPAPs 613/209, and hardware cache coherency operations according to FIGS. 10 and 12 may similarly be modified to compare GdPAPs rather than dPAPs similar to the manner described above with respect to FIG. 43.

FIG. 44 is an example block diagram of an alternate embodiment of a store queue (SQ) entry 1301 of the SQ 125 of FIG. 1 that holds GPAPs in accordance with embodiments of the present disclosure. The SQ entry 1301 of FIG. 44 is similar in many respects to the SQ entry 1301 of FIG. 13. However, the SQ entry 1301 of FIG. 44 holds a store GPAP 1304 rather than a store PAP 1304 as in FIG. 13. The store GPAP 1304 is similar to the store PAP 1304 of FIG. 13 except that it is concatenated with the GENID[1:0], as shown. Similar to the manner described with respect to block 1506 of FIG. 15, the store GPAP 1304 is populated with a GPAP received from the L1 data cache 103 when the store virtual memory line address specified by a store instruction during its execution hits in the L1 data cache 103 similar to the manner described with respect to block 1504 of FIG. 15.

FIG. 45 is an example block diagram of portions of an alternate embodiment of the processor 100 of FIG. 1 used to perform store-to-load forwarding using GPAPs in accordance with embodiments of the present disclosure. The processor 100 of FIG. 45 is similar in many respects to the processor 100 of FIG. 14. However, in the embodiment of FIG. 45, the compare block 348 outputs a GdPAP 209 (rather than a dPAP) in response to a load instruction virtual address, and a load GPAP 1495 (rather than a load PAP) is formed for provision to the forwarding decision logic 1499, e.g., similar to the manner described at block 1602 of FIG. 16. Additionally, the store queue 125 provides to the forwarding decision logic 1499 a store GPAP 1304 (rather than a store PAP), e.g., similar to the manner described at block 1604 of FIG. 16. Finally, the forwarding decision logic 1499 uses the load GPAP 1495 (rather than a load PAP) and the store GPAP 1304 (rather than a store PAP) to determine whether to forward store data to the load instruction, e.g., similar to the manner described at block 1606 of FIG. 16. Similar modifications to the SQ entry 1301 may be made in the embodiments of FIGS. 17 and 23, i.e., to hold a store GPAP 1304 rather than a store PAP 1304, and store-to-load forwarding operations according to FIGS. 18 through 22 may similarly be modified to compare load GPAPs 1495 with store GPAPs 1304, rather than load PAPs 1495 with store PAPs 1304.

FIG. 46 is an example block diagram of a load queue (LQ) entry 2901 of the LQ 125 of FIG. 1 in accordance with embodiments of the present disclosure. The LQ entry 2901 of FIG. 46 is similar in many respects to the LQ entry 2901 of FIG. 29. However, the LQ entry 2901 of FIG. 46 holds a load GPAP 2904 rather than a load PAP 2904 as in FIG. 29. The load GPAP 2904 is similar to the load PAP 2904 of FIG. 29 except that it is concatenated with the GENID[1:0], similar to the manner shown in FIG. 44 for the store GPAP 1304. Similar to the manner described above with respect to block 3002 of FIG. 30, the load GPAP 2904 is populated with the load GPAP 1495 of FIG. 45 provided by the L1 data cache 103 in response to the virtual load address 321 specified by the load instruction. Similar to the manner described above with respect to block 3006 of FIGS. 30, 31A and 31B and particularly block 3104, the store GPAP 1304 (rather than a store PAP) of the store instruction being committed is compared with the load GPAP 2904 (rather than a load PAP) of each valid LQ entry 2901 to determine whether there is no match, a full match, or a partial match in order to perform store-to-load forwarding correctness checks.

Figures 47, 48:
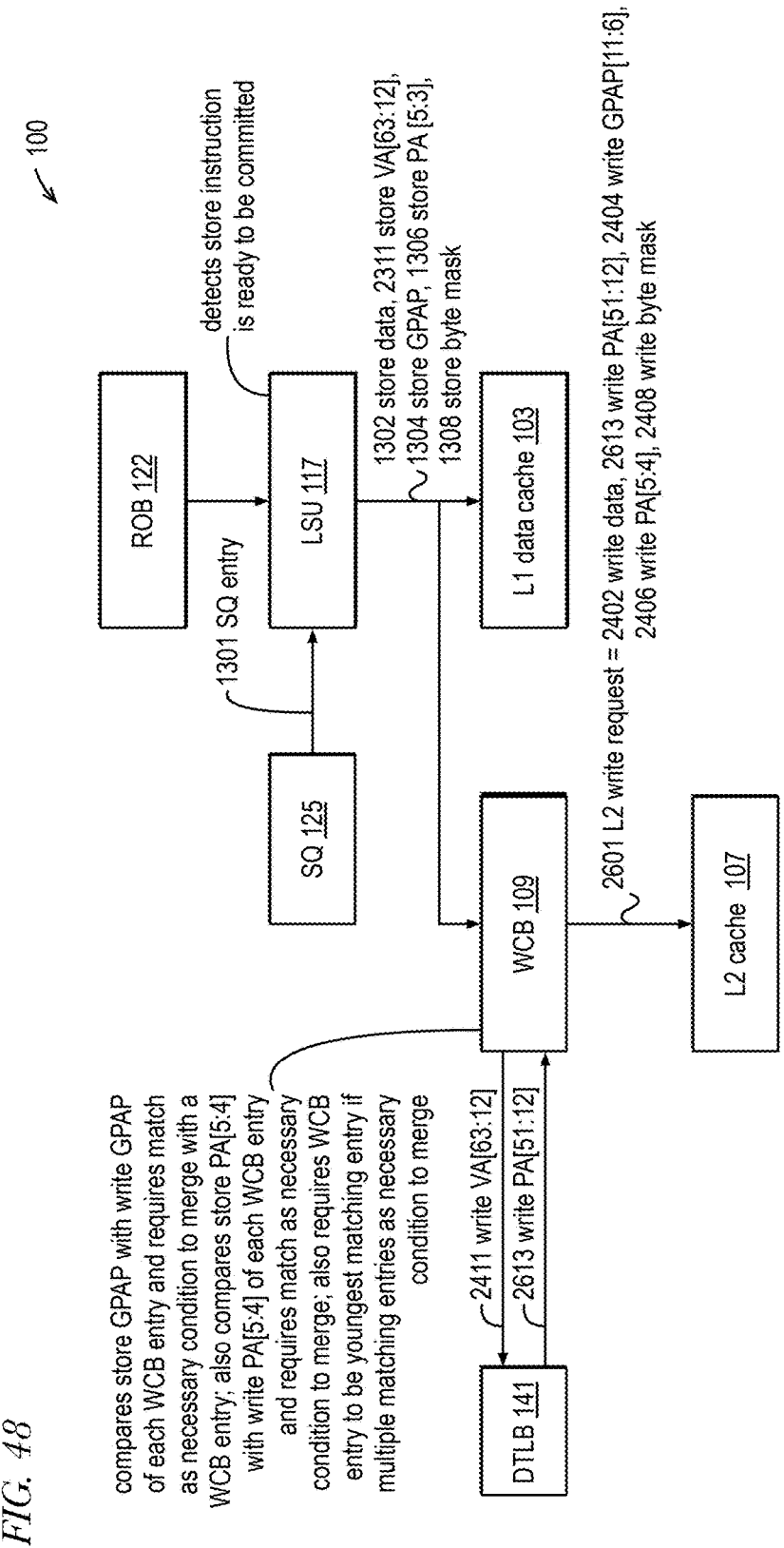
FIG. 47 is an example block diagram of an alternate embodiment of a write combining buffer (WCB) entry of the WCB of FIG. 1 that holds GPAPs to accomplish write combining in accordance with embodiments of the present disclosure.
FIG. 48 is an example block diagram illustrating an alternate embodiment of portions of the processor of FIG. 1 that perform write combining using GPAPs in accordance with embodiments of the present disclosure.

FIG. 47 is an example block diagram of an alternate embodiment of a write combining buffer (WCB) entry 2401 of the WCB 109 of FIG. 1 that holds GPAPs to accomplish write combining in accordance with embodiments of the present disclosure. The WCB entry 2401 of FIG. 47 is similar in many respects to the WCB entry 2401 of FIG. 24. However, the WCB entry 2401 of FIG. 47 holds a write GPAP 2404 rather than a write PAP 2404 as in FIG. 24. The write GPAP 2404 is similar to the write PAP 2404 of FIG. 24 except that it is concatenated with the GENID[1:0], as shown.

FIG. 48 is an example block diagram illustrating an alternate embodiment of portions of the processor 100 of FIG. 1 that perform write combining using GPAPs in accordance with embodiments of the present disclosure. The embodiment of FIG. 48 is similar in many respects to the embodiment of FIG. 26. However, similar to the manner described with respect to block 2812 of FIG. 28, the write GPAP 2404 is populated with a store GPAP 1304 rather than a store PAP of a store instruction being committed. Additionally, similar to the manner described above with respect to block 2802 of FIG. 28, the WCB 109 compares the committed store GPAP 1304 (rather than the store PAP) against the write GPAP 2404 (rather than the write PAP) of all the WCB entries 2401 of the WCB 109 to determine whether the store instruction being committed may be combined with any of the WCB entries 2401 at block 2806 of FIG. 28.

Figure 49:
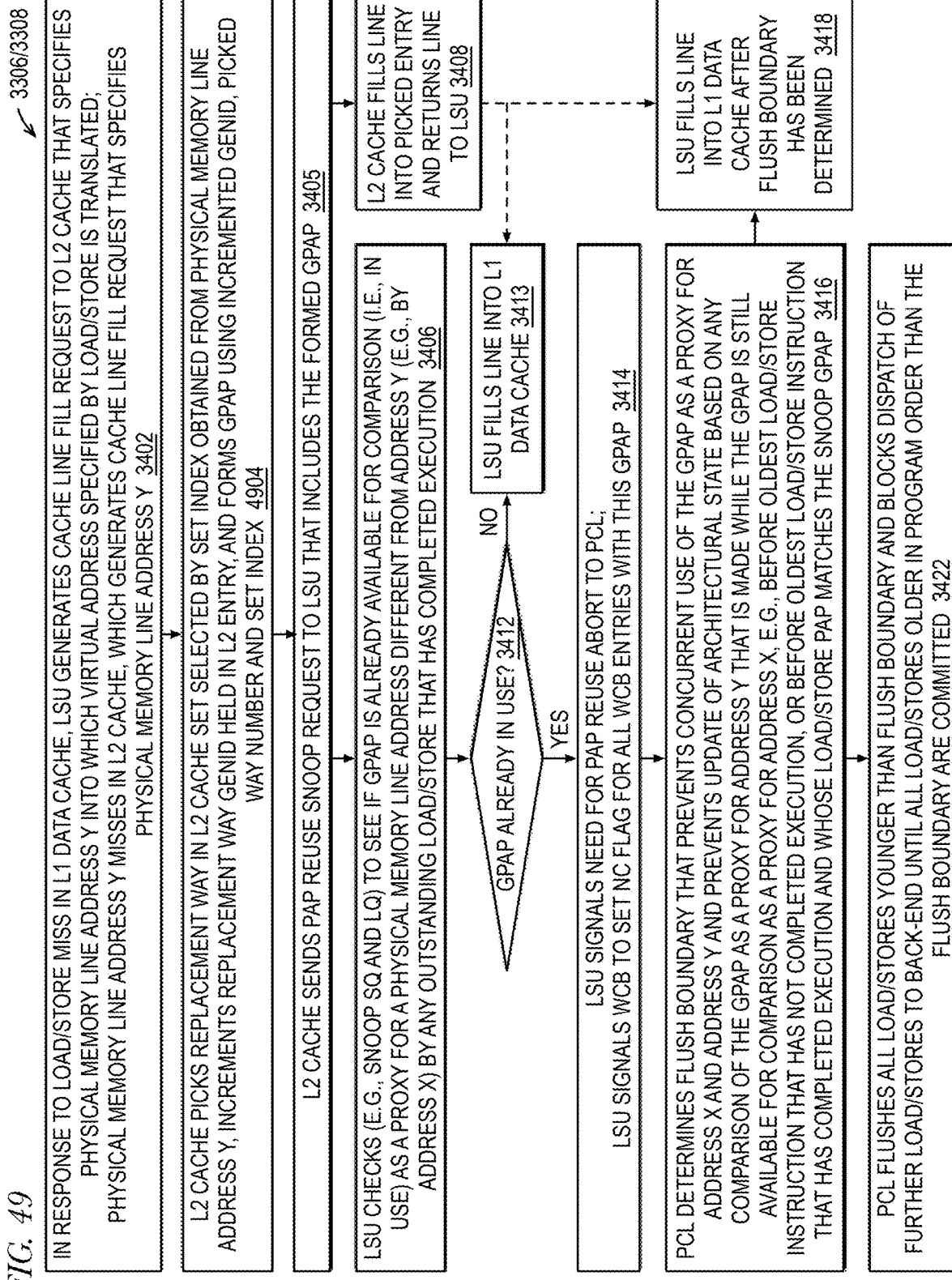
FIG. 49 is an example flowchart illustrating operation of the processor of FIG. 1 to manage GPAP reuse in accordance with embodiments of the present disclosure.

FIG. 49 is an example flowchart illustrating operation of the processor 100 of FIG. 1 to manage GPAP reuse in accordance with embodiments of the present disclosure. More specifically, FIG. 49 illustrates operation at blocks 3306 and 3308 of FIG. 33 in more detail in the case of a load/store instruction miss in the L1 data cache 103 that precipitates the replacement of an L2 cache entry 401 at block 3306 in an embodiment in which each L2 cache entry 401 holds a GENID 408 which is used to form GPAPs (rather than PAPs). Generally, GPAP reuse management is performed similar to the manner described with respect to the operation of FIG. 33. However, at blocks 3302 and 3306, a GPAP is formed (rather than a PAP); at block 3304, the LSU 117 makes GPAPs (rather than PAPs) available for comparison with other GPAPs (e.g., held in a SQ entry 1301, LQ entry 2901, WCB entry 2401, L1 data cache entry 201); and at block 3308, the L2 cache 107, LSU 117, PCL 132 operate to prevent update of architectural state based on a comparison of the GPAP as a proxy for the physical memory line address that is made while the GPAP is still available for comparison as a proxy for a different physical memory line address. Operation begins in FIG. 49 at block 3402 (similar to the operation at block 3402 of FIG. 34) and proceeds to block 4904.

At block 4904, the L2 cache 107 picks a replacement way in the set of the L2 cache 107 selected by the set index obtained from address Y, e.g., PA[16:6]. The L2 cache 107 then increments the GENID 408 held in L2 cache entry 401 of the way picked for replacement. The L2 cache 107 then forms a GPAP using the incremented GENID 408, the set index, and the way of the entry 401 selected for replacement. In one embodiment, the operation at block 4904 is described with respect to FIG. 50.

Operation proceeds from block 4904 to block 3405 and proceeds through blocks 3422 in a manner similar to that described above with respect to FIG. 34. However, at block 3405 of FIG. 49, the formed GPAP (rather than the formed PAP) is sent in the PAP reuse snoop request; at block 3406 of FIG. 49, the LSU 117 checks to see if the GPAP (rather than the PAP) is in use; at decision block 3412 of FIG. 49, operation proceeds according to whether the GPAP (rather than the PAP) is already in use; and at block 3414 of FIG. 49, the LSU 117 signals to the WCB 109 to set the NC flag for all WCB entries 2401 with the in use GPAP (rather than the PAP).

Figure 50:
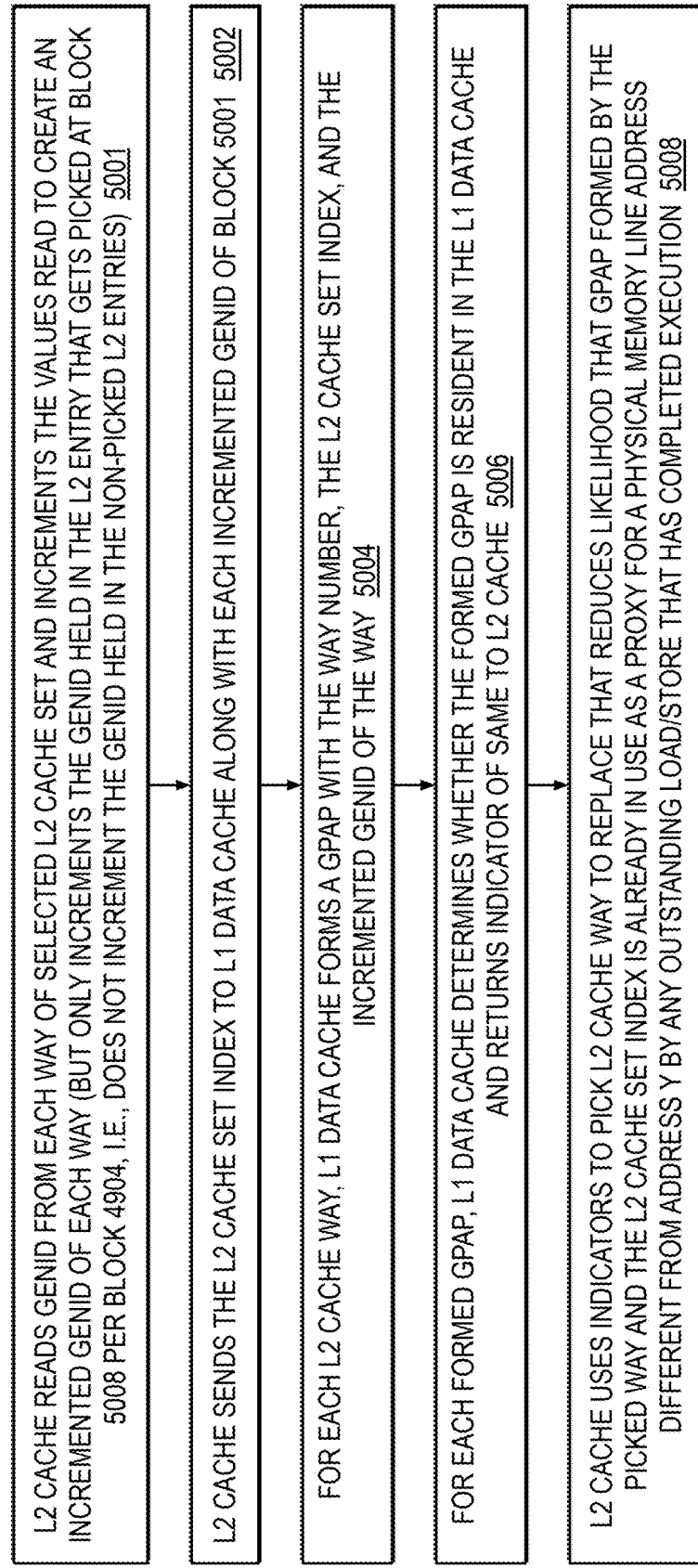
FIG. 50 is an example flowchart illustrating operation of the processor of FIG. 1 to manage GPAP reuse in accordance with embodiments of the present disclosure.

FIG. 50 is an example flowchart illustrating operation of the processor 100 of FIG. 1 to manage GPAP reuse in accordance with embodiments of the present disclosure. More specifically, FIG. 50 illustrates operation at block 4904 of FIG. 49 in more detail. Operation begins at block 5001.

At block 5001, the L2 cache 107 reads the GENID 408 from the L2 cache entry 401 of each way of the selected set and increments the values read to create an incremented GENID for each of the ways. That is, the L2 cache 107 does not increment the GENID 408 itself that is held in the L2 cache entry 401 of the non-picked way (see below), but instead merely creates the incremented GENIDs for use at block 5002. More specifically, the LSU 117 increments only the GENID 408 held in the L2 cache 107 of the way picked at block 5008, according to the operation described above with respect to block 4904.

At block 5002, per block 3402 of FIG. 34, physical memory line address Y has missed in the L2 cache. That is, a set index that selects a set of the L2 cache 107 was obtained from address Y, and the tag portion of address Y did not match the tag 404 of any of the L2 cache entries 401 in any way of the selected set. Therefore, the L2 cache 107 sends the L2 set index along with the incremented GENIDs created at block 5001 to the L1 data cache 103. Operation proceeds to block 5004.

At block 5004, for each possible way number of the L2 cache 107, the L1 data cache 103 effectively forms a GPAP with the way number, the received L2 set index, and the respective incremented GENID of the way that was created at block 5001 and sent at block 5002. For example, in an embodiment in which the L2 cache 107 has four ways, the L1 data cache 103 forms four possible GPAPs using the four possible way numbers each concatenated with the L2 set index and with the respective incremented GENID of the way. Operation proceeds to block 5006.

At block 5006, for each of the GPAPs formed at block 5004, the L1 data cache 103 determines whether the formed GPAP is resident in the L1 data cache 103. In one embodiment, the GPAP residency determination for each formed GPAP is as follows. The untranslated bits PA[11:6] of the L2 set index (e.g., corresponding untranslated bits PA[11:6] of physical memory line address Y), along with the four possible values of the upper two bits of the L1 data cache 103 set index are used to select four sets of the L1 data cache 103 (similar to the manner described above with respect to FIG. 6), which implicates sixteen entries 201 of the L1 data cache 103. The GdPAP 209 of each of the sixteen entries 201 is compared against four different formed GdPAPs to generate 16×4=64 match results. The four formed GdPAPs are formed using the four different possible L2 way values (i.e., 00, 01, 10, 11) concatenated with the upper five bits of the L2 set index sent from the L2 cache 107 at block 5002 and further concatenated with the respective incremented GENID of the way. The sixteen match results associated with each of the four formed GdPAPs are Boolean OR'ed together to generate a single-bit GPAP residency indicator associated with the formed GdPAP. If the single-bit GPAP residency indicator is true, this indicates the associated formed GPAP is resident in the L1 data cache 103, which indicates a high likelihood that the formed GPAP is in use as a proxy for a physical memory line address different than address Y, e.g., address X. The four single-bit GPAP residency indicators are sent as a 4-bit indicator to the L2 cache 107. Operation proceeds to block 5008.

At block 5008, the L2 cache 107 uses the indicators sent at block 5006 to pick the way of the L2 cache 107 to replace that reduces the likelihood that the GPAP formed by the picked way and the L2 cache set index is already in use as a proxy for a physical memory line address different from address Y. In one embodiment, the GPAP residency determination may be performed according to FIG. 36 described below. The GPAP residency determination may be conceptualized effectively as an approximation of the check performed at block 3406 of FIG. 34 to determine whether the GPAP is already in use as a proxy for a physical memory line address different from address Y. Advantageously, typically the time required for the L1 data cache 103 to make the GPAP residency determination is hidden behind the time needed for the L2 cache 107 to go get the missing cache line from system memory or a third level cache memory. Furthermore, there may be many instances in which the GPAP residency determination indicates there is at least one way of the selected L2 cache set for which the formed GPAP is not resident in the L1 data cache 103, indicating a high likelihood that the formed GPAP is not already in use.

Same Address Load-Load Ordering Violation Handling

As described above, in a system that includes multiple processors that share system memory and that each include a cache memory, there is a need for attaining cache coherency, which involves each cache processing snoop requests from the other caches. The presence of external snoop requests introduces a potential for what is referred to herein as a same address load-load ordering violation (SALLOV). A SALLOV may be defined as follows.

A first processing core is processing a program that includes older and younger load instructions in program order that read from the same memory address, and there is no instruction that writes to the memory address that intervenes in the program order the older and younger load instructions. A cache memory of the first processing core holds a current copy of the memory line that includes current data at the memory address. The first processing core executes the younger load instruction by reading the current data from the cache memory before the older load instruction has been executed, i.e., the younger load instruction is executed out of program order. A second processing core writes to the memory address new data that is different from the current data held in the current copy of the memory line. More specifically, the second processing core sends the cache memory an invalidating snoop request that specifies the memory address and then writes the new data to the memory address. Thus, after execution of the younger load instruction, the cache memory invalidates the current copy of the memory line implicated by the memory address in response to receiving the snoop request. After invalidation of the current copy of the memory line, the first processing core attempts to execute the older load instruction resulting in a miss in the cache memory. In response to the cache miss, the first processing core fills the cache memory with a new copy of the memory line implicated by the memory address that includes the new data written by the second processing core. After the fill with the new copy of the memory line, the first processing core successfully executes the older load instruction by reading the new data from cache memory. As a result, the younger load instruction returns the current data that is older than the new data returned by the older load instruction. In this sense, the external snoop request is said to intervene between out of program order execution of the older and younger load instructions that read from the same memory address.

The events just described generally occur in the order in which they are listed, but not necessarily. For example, the second processing core may begin the process of writing the new data to the memory address before the first processing core begins to execute the younger load instruction but the invalidating external snoop does not arrive at the cache memory until after the younger load instruction accesses the cache memory yet before the older load instruction accesses the cache memory.

Many instruction set architectures disallow SALLOVs. Thus, conventional processors include hardware logic dedicated to the task of explicitly looking for the occurrence of a SALLOV and undoing it before it is committed to architectural state. For example, a conventional processor may do this by performing the following actions. First, when the conventional processor receives an invalidating snoop that specifies a physical address, it may compare the snoop physical address with each physical address in the load queue and mark a flag of all matching entries, which will include the entry of the younger load instruction of a potential SALLOV. Second, when the conventional processor executes any load instruction, e.g., the older load instruction of a potential SALLOV, it may compare the physical address specified by the load instruction with each physical address in the load queue. If any matching entry has a marked flag and is younger than the executing load instruction, this indicates a SALLOV has occurred speculatively. The SALLOV occurrence is speculative because, although the conventional processor has speculatively executed the younger and older load instructions and they have received the wrong load data that would violate the ISA disallowance of a SALLOV (i.e., when the younger load executed first it received the old data in the cache, and when the older load executed second it received the new data filled into the cache after the snoop invalidated the old data), the conventional processor has not yet committed the wrong load data to architectural state. So, before the wrong load data is committed to architectural state, the conventional processor flushes instructions to prevent the architectural state of the processor (e.g., the destination register specified by the younger load) from being updated with the old/wrong data.

The process performed by the conventional processor described above requires hardware logic dedicated to the task of detecting a SALLOV speculative occurrence. The dedicated hardware logic, during execution of all load instructions, compares the physical address specified by the load instruction with the physical address specified in each of the entries of the load queue. In high performance superscalar execution processors designed to execute N load instructions in parallel, the load queue is a content-addressable memory (CAM) and the load queue includes N CAM ports to receive the N physical addresses from the N concurrently executing load instructions to see if they match any of the physical addresses specified in the load queue entries. Each additional CAM port in a load queue may add significantly more size and may consume significantly more power.

Rather than including logic, as a conventional processor does, that checks for same address load-load ordering violations during execution of each load instruction, embodiments are described herein that check for the possibility of a SALLOV at the time an entry in the cache is filled with a new copy of a line of memory, which may significantly reduce the number of CAM ports needed in the load queue.

Figure 51:
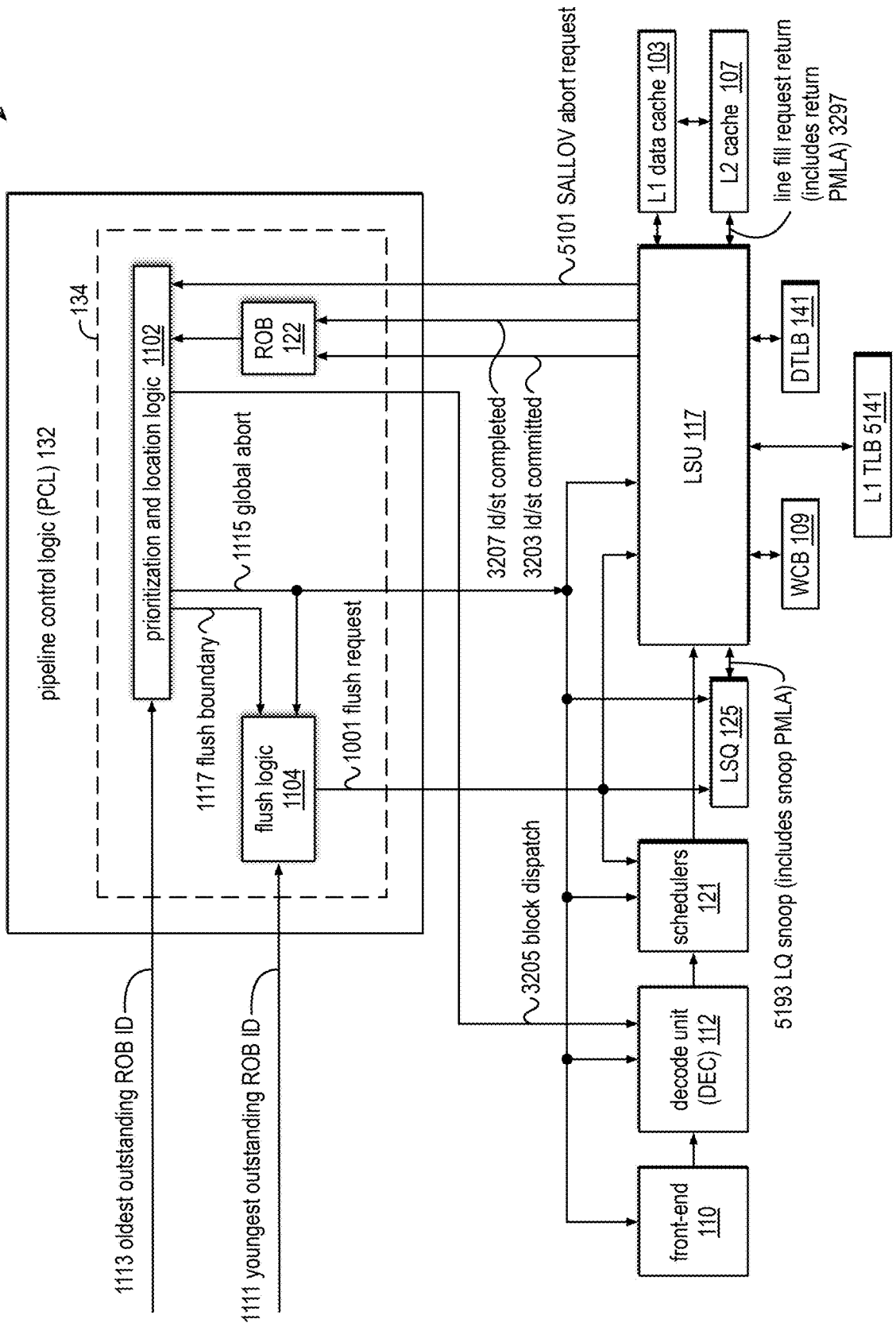
FIG. 51 is an example block diagram illustrating portions of the processor of FIG. 1 that perform SALLOV prevention in accordance with embodiments of the present disclosure.

FIG. 51 is an example block diagram illustrating portions of the processor 100 of FIG. 1 that perform SALLOV prevention in accordance with embodiments of the present disclosure. The embodiments of the processor 100 described with respect to FIGS. 51 through 60 do not employ PAPs and therefore do not require PAP reuse management. Otherwise, the processor 100 shown in the block diagram of FIG. 51 may be similar in many respects to the processor 100 of the block diagram shown in FIG. 32. However, differences will now be described.

In one embodiment, the L1 data cache 103 is a physically-indexed and physically-tagged (PIPT) cache 103, and the processor 100 includes a level-1 translation lookaside buffer (L1 TLB) 5141 coupled to the LSU 117, as shown in FIG. 51. During execution of a load/store instruction, the LSU 117 looks up the virtual address specified by the load/store instruction (e.g., load/store VA 321 of FIG. 3). In the case of a hit in the L1 TLB 5141, the L1 TLB 5141 provides a TLB physical page address (PPA) 5509 (described in more detail below with respect to FIG. 55). The TLB PPA 5509 is combinable with untranslated bits of the load/store virtual address 321 (e.g., VA[11:6]) to form a physical memory line address (PMLA) 5592, referred to herein as a load/store PMLA 5592, into which the load/store virtual address 321 specified by the load/store instruction is translated. In an alternate embodiment, the L1 data cache 103 is a virtually-indexed and virtually-tagged (VIVT) cache 103 (as described above), and the processor 100 is absent the L1 TLB 5141, and the VIVT L1 data cache 103 provides a cache PPA 5609 (described in more detail below with respect to FIG. 56) that is combinable with the untranslated address bits (e.g., VA[11:6]) to form the PMLA 5592 during execution of the load/store instruction.

Additionally, the LSU 117 is shown to generate a SALLOV abort request 5101, rather than a PAP reuse abort request 901, to the PCL 132 on the interface between the LSU 117 and PCL 132. In response to a SALLOV abort request 5101, the PCL 132 operates similarly to a PAP reuse abort request 901, except with respect to only load instructions rather than both load/store instructions.

Additionally, in FIG. 51 a LQ snoop 5193, rather than a LSQ snoop 3293 of FIG. 32, is shown on the interface between the LSU 117 and LSQ 125. Additionally, in FIG. 51 there is no PAP reuse snoop request 3299 of FIG. 32. Instead, the cache line fill request return 3297 serves a similar purpose to the PAP reuse snoop request of FIG. 32. That is, the fill return 3297 operates to trigger the LSU 117 to perform a LQ snoop 5193. The fill return 3297 specifies a PMLA, rather than a PAP specified in the PAP reuse snoop request 3299 of FIG. 32. The LQ snoop 5193 snoops the load queue 125 with the PMLA specified in the fill return 3297. A LQ snoop 5193 operates similarly to a LSQ snoop 3293, except with respect to only load instructions rather than both load/store instructions. That is, the LQ snoop 5193 only snoops the load queue 125—in contrast the LSQ snoop 3293 of FIG. 32 snoops both the load queue 125 and the store queue 125—in embodiments in which the load queue 125 and store queue 125 are distinct entities. The PMLA of the fill return 3297 is compared with a load PMLA 5205 (described below with respect to FIG. 52) of each LQ entry 2901 associated with a load instruction that has completed execution. A load instruction has completed execution when it has received a PMLA 5592—either from the L1 TLB 5141 or from the L1 data cache 103—and written the received PMLA 5592 to the load PMLA field 5205 of the LQ entry 2901 allocated to the load instruction. The L2 cache 107, LSU 117, and PCL 132 operate together to prevent a SALLOV, as described in more detail below. Since the processor 100 of FIG. 51 does not employ PAPs other differences may include: with respect to FIGS. 6 and 8, the snoop request 611 from the L2 cache 107 to the L1 data cache 103 may specify a physical memory line address rather than a PAP; and with respect to FIG. 7, the fill return at block 704 may include a physical memory line address rather than a PAP.

FIG. 52 is an example block diagram of a load queue (LQ) entry 2901 of the LQ 125 of FIG. 1 in accordance with embodiments of the present disclosure. The LQ entry 2901 of FIG. 52 is similar to the LQ entry 2901 of FIG. 29. However, rather than a load PAP 2904, the LQ entry 2901 of FIG. 52 has a load PMLA 5205. In an embodiment in which a cache line is 64 bytes, the load PMLA 5205 is PA[51:6], although in other embodiments having different cache line sizes and/or different physical address sizes, different bits of the physical address may be used. During commit of a store instruction, the load PMLA 5205 is compared with a store PMLA 5305 (described below with respect to FIG. 53) of the store being committed to perform store-to-load forwarding checks, similar to the manner described above that instead uses a load PAP 2904 and a store PAP 1304.

FIG. 53 is an example block diagram of a store queue (SQ) entry 1301 of the SQ 125 of FIG. 1 in accordance with embodiments of the present disclosure. The SQ entry 1301 of FIG. 53 is similar to the SQ entry 1301 of FIG. 13. However, rather than a store PAP 1304, the SQ entry 1301 of FIG. 53 has a store PMLA 5305. During execution of a load instruction, the store PMLA 5305 is compared with a load PMLA 5592 (described below with respect to FIG. 55) of the load being executed to perform a store-to-load forwarding decision, similar to the manner described above that instead uses a store PAP 1304 and a load PAP 1495. Additionally, during commit of a store instruction, the store PMLA 5305 is compared with a write PMLA 5405 (described below with respect to FIG. 54) to perform a write-combining decision, similar to the manner described above that instead uses a store PAP 1304 and a write PAP 2404.

FIG. 54 is an example block diagram of a write-combine buffer (WCB) entry 2401 of the WCB 109 of FIG. 1 in accordance with embodiments of the present disclosure. The WCB entry 2401 of FIG. 54 is similar to the WCB entry 2401 of FIG. 24. However, rather than a write PAP 2404, the WCB entry 2401 of FIG. 54 has a write PMLA 5405.

FIG. 55 is an example block diagram of an entry 5501 of the L1 TLB 5141 of FIG. 51 that is employed to accomplish SALLOV prevention in accordance with embodiments of the present disclosure. The L1 TLB entry 5501 includes a tag 5504, a status 5506 and a physical page address (PPA) 5509. To lookup a load/store virtual address 321 in the L1 TLB 5141, a portion of the load/store VA 321 is used as a set index to select a set of the L1 TLB 5141, and a tag portion of the load/store VA 321 is compared against the TLB PPA 5509 of each valid entry 5501 (e.g., indicated in the status 5506) of the L1 TLB 5141 to detect a match (i.e., hit). If the load/store virtual address 321 hits in the L1 TLB 5141, the TLB PPA 5509 is provided from the hit entry 5501 to the LSU 117 for use in further execution of the load/store instruction. The TLB PPA 5509 is combinable with the untranslated address bits (e.g., VA[11:6]) to form a PMLA during execution of the load/store instruction, which is referred to herein as load/store PMLA 5592, that may be used in comparisons for various purposes by the processor 100 (rather than a PAP that is used for similar purposes in embodiments described above), including SALLOV prevention as described in more detail below. If the load/store virtual address 321 misses in the L1 TLB 5141, the TWE 145 performs a page table walk and returns a physical page address (e.g., PA[51:12]) that is a translation of the corresponding portion of the load/store virtual address 321 (i.e., the virtual page address). The tag 5504 is then populated with the tag portion of the load/store virtual address 321, and the TLB PPA 5509 is populated with the translated physical page address, and the status 5506 is updated to indicate the L1 TLB entry 5501 is valid.

FIG. 56 is an example block diagram of a cache entry 201 of L1 data cache 103 of FIG. 1 that is employed to accomplish SALLOV prevention in accordance with embodiments of the present disclosure. The L1 data cache 103 cache entry 201 of FIG. 56 is similar in many respects to the cache entry 201 of FIG. 2. However, the cache entry 201 of FIG. 56 specifies a physical page address (PPA) 5609, rather than a dPAP 209. The cache PPA 5609 is populated when a cache line is filled into the entry 201. The cache entry 201 embodiment of FIG. 56 corresponds to the alternate embodiment in which the L1 TLB 5141 is not present, and the L1 data cache 103 provides the cache PPA 5609 that is combinable with the untranslated address bits (e.g., VA[11:6]) to form the PMLA 5592 during execution of the load/store instruction.

Figure 57:
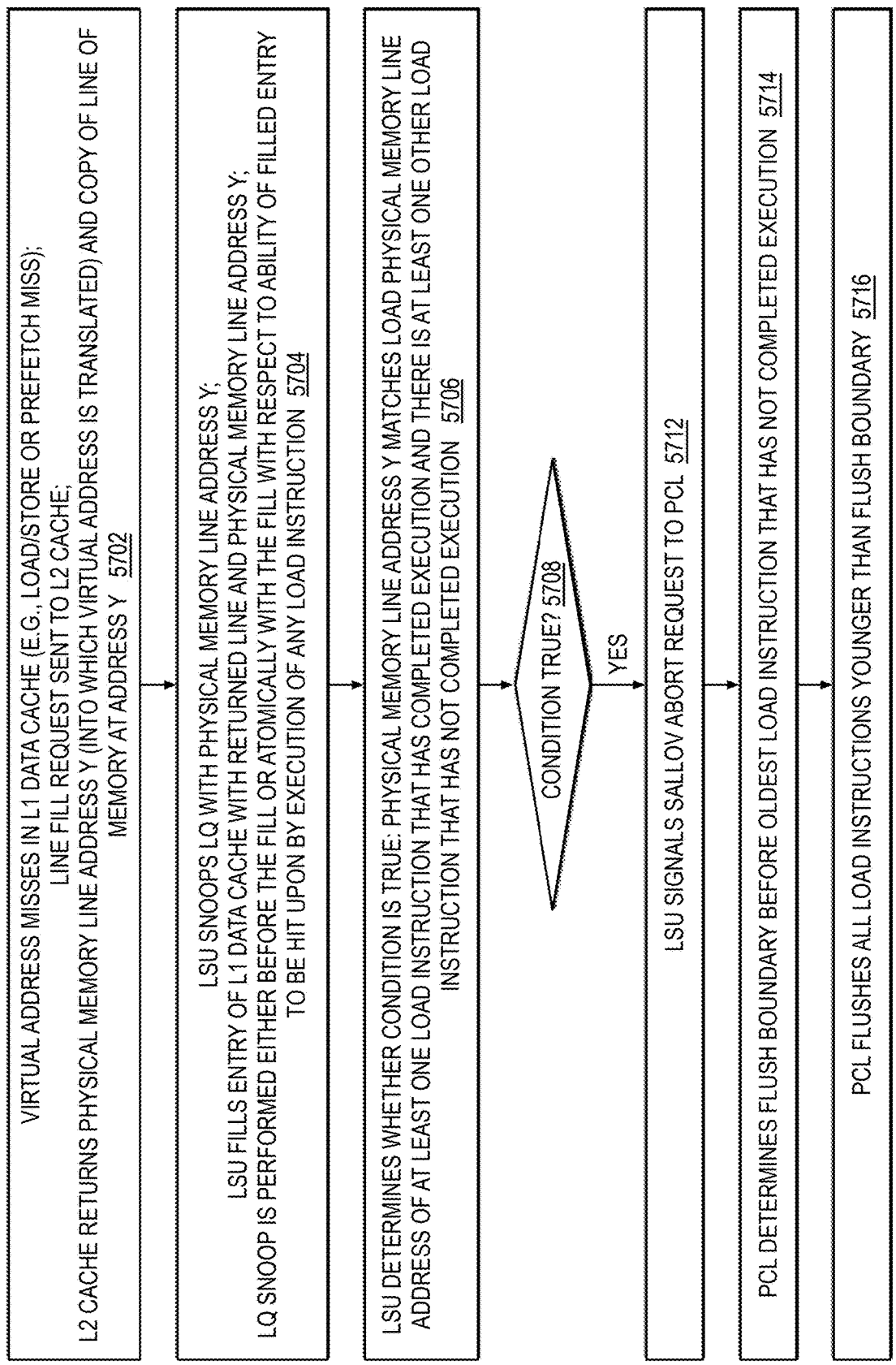
FIGS. 57 through 63 are example flowcharts illustrating operation of the processor of FIG. 1 to accomplish SALLOV prevention in accordance with embodiments of the present disclosure.

FIG. 57 is an example flowchart illustrating operation of the processor 100 of FIG. 1 to accomplish SALLOV prevention in accordance with embodiments of the present disclosure. Operation begins at block 5702.

At block 5702, a virtual address misses in the L1 data cache 103, and in response the LSU 117 generates a cache line fill request to the L2 cache 107, similar to the manner described with respect to blocks 3402 and 3702 of FIGS. 34 and 37. The virtual address may be specified by a load/store instruction (e.g., load/store virtual address 321) or by a prefetch operation. The virtual address is translated into a physical memory line address (PMLA) Y (e.g., by DTLB 141 of FIG. 1) that is specified in the fill request. The L2 cache 107 returns to the LSU 117 PMLA Y and a copy of the line of memory at PMLA Y, similar to the manner described above with respect to block 3408 of FIG. 34, except that the L2 cache 107 does not return a PAP, but instead returns a PMLA. Additionally, the L2 cache 107 does not send a PAP reuse snoop request to the LSU 117 as in FIG. 34. Instead, the cache line fill request return 3297 triggers a LQ snoop 5193, as described below. Operation proceeds to block 5704.

At block 5704, in response to the fill return 3297, the LSU 117 performs a LQ snoop 5193 to snoop the load queue 125 with PMLA Y, which is the physical memory line address of the copy of the line of memory provided by the fill return 3297. That is, PMLA Y is compared against the load PMLA 5205 of each entry 2901 of the load queue 125 that is associated with an outstanding load instruction that has completed execution. Additionally, the LSU 117 performs a fill of an entry 201 of the L1 data cache 103 with the returned copy of the line of memory at PMLA Y and writes the corresponding bits of the returned PMLA Y to the PPA 5609 of the entry 201. In one embodiment, the LQ snoop 5193 is performed before the fill. In another embodiment, the LQ snoop 5193 and the fill are performed in an atomic manner with respect to the ability of a filled entry to be hit upon by execution of any load instruction. The atomic manner means the LQ snoop 5193 and fill are performed such that, even if the LQ snoop 5193 is performed after the fill, no load instruction is able to hit on the entry 201 after the fill and before the snoop, and therefore no load instruction is able to obtain the new data from the filled entry 201 nor write PMLA Y to the load PMLA 5205 of its associated LQ entry 2901 before the LQ snoop 5193 obtains the state of the LQ 125. If the LQ snoop 5193 is performed before the fill, the two will effectively be atomic since any intervening load execution, i.e., before the fill, will miss and then wait for the fill into the L1 data cache 103 in response to the fill return 3297 from the L2 cache 107. A description of the need for atomicity is described below at the end of FIG. 58. Operation proceeds to block 5706.

At block 5706, based on the results of the LQ snoop 5193 at block 5704, the LSU 117 determines whether a condition is true. The condition is that the PMLA of the filled entry 201 (i.e., PMLA Y) matches the load PMLA 5205 of at least one load instruction that has completed execution and that there is at least one other load instruction that has not completed execution. In one embodiment, the Done flag 2936 may be used to determine whether a load instruction has completed execution. In one embodiment, the condition further includes that among the load instructions that have completed execution and whose load PMLA 5205 matches the PMLA of the filled entry 201 (i.e., PMLA Y), there is at least one of them that is younger than the oldest load instruction that has not completed execution. Such an embodiment may prevent unnecessary SALLOV abort requests 5101 (in exchange for more complex condition checking logic) since if all the load instructions that have completed execution and whose load PMLA 5205 matches the PMLA of the filled entry 201 are older than the oldest load instruction that has not completed execution, then there is no possibility of a SALLOV occurring and therefore no need to generate a SALLOV abort request. Operation proceeds to decision block 5708.

At decision block 5708, if the condition determined at block 5706 is true, then operation proceeds to block 5712.

At block 5712, the LSU 117 signals a SALLOV abort request 5101 to the PCL 132. Operation proceeds to block 5714.

At block 5714, in response to the SALLOV abort request 5101, the PCL 132 determines a flush boundary before the oldest load instruction that has not completed execution. In one embodiment, the PCL 132 is given the flush boundary 1117 by the LSU 117 in the SALLOV abort request 5101, and the LSU 117 determines the flush boundary based on the state of the LQ 125 obtained in the LQ snoop 5193. In another embodiment, the PCL 132 determines the flush boundary 1117 based on the state of the ROB 122, and the LSU 117 operates (e.g., by controlling the ld/st completed 3207 and SALLOV abort request 5101 signals) to cause the state of the ROB 122 with respect to load instructions to match the state of the LQ 125 at the time the PCL 132 determines the flush boundary 1117. In one embodiment, similar to the manner described above with respect to block 3416 of FIG. 34, the LSU 117 controls the update of both the load queue 125 and effectively the ROB 122 regarding indications of whether a load instruction has completed execution, i.e., whether a load instruction has a valid load PMLA 5205, and the LSU 117 effectively controls, via ld/st completed signal 3207, the update of indications in the ROB 122 entries of whether or not a load instruction has completed execution, and the LSU 117 and PCL 132 ensure that the execution completion status in the load queue 125 viewed by the LSU 117 at the time the LQ snoop 5193 occurs matches the execution completion status in the ROB 122 viewed by the PCL 132 at the time the PCL 132 determines the flush boundary 1117 in response to the SALLOV abort request 5101. Operation proceeds to block 5716.

At block 5716, the PCL 132 flushes all load instructions younger than the flush boundary.

Figure 58:
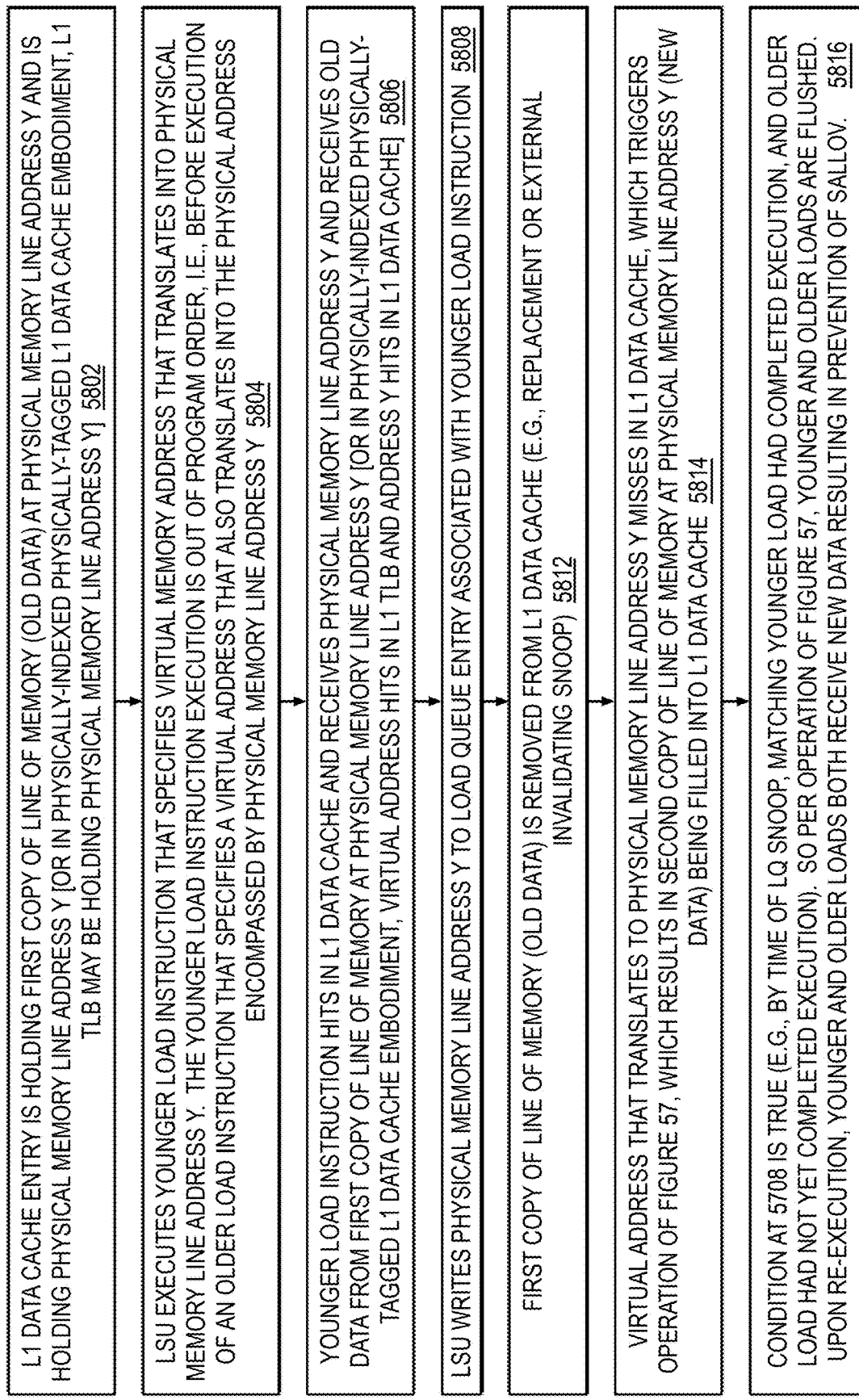

FIG. 58 is an example flowchart illustrating operation of the processor 100 of FIG. 1 to accomplish SALLOV prevention in accordance with embodiments of the present disclosure. Operation begins at block 5802.

At block 5802, an entry 201 of the L1 data cache 103 is holding a first copy of a line of memory at a PMLA Y, which is referred to as "old data" in the example. Additionally, the cache PPA 5609 of the entry 201 is holding the corresponding bits of PMLA Y. In the alternate embodiment in which the L1 data cache 103 is physically-indexed and physically-tagged (i.e., the processor 100 includes the L1 TLB 5141 of FIG. 51), rather than the L1 data cache 103, the TLB PPA 5509 of an entry of the L1 TLB 5141 may be holding the corresponding bits of PMLA Y. Operation proceeds to block 5804.

At block 5804, the LSU 117 executes a younger load instruction that specifies a virtual address that translates into PMLA Y. The execution of the younger load instruction is out of program order with respect to execution of an older load instruction that specifies a virtual address that also translates into the PMLA Y, which presents the possibility of a SALLOV. Operation proceeds to block 5806.

At block 5806, the younger load instruction, during its execution, hits in the L1 data cache 103 and receives load data, i.e., old data, from the hit entry 201. Additionally, the younger load instruction receives PMLA Y, i.e., PMLA 5592 formed from the hit entry 201 and the untranslated virtual address bits VA[11:6]. In the alternate embodiment in which the L1 data cache 103 is physically-indexed and physically-tagged and the processor 100 includes the L1 TLB 5141, the load virtual address hits in the L1 TLB 5141, and PMLA 5592 is formed from the hit entry 5501 of the L1 TLB 5141 and the untranslated virtual address bits VA[11:6], i.e., PMLA Y, for provision to the younger load instruction and to the L1 data cache 103, and PMLA Y hits in the entry 201 of the L1 data cache 103. Operation proceeds to block 5808.

At block 5808, the LSU 117 writes PMLA Y to the load PMLA 5205 of the LQ entry 2901 allocated to the younger load instruction and sets the Done flag 2936 to indicate the load instruction has completed execution, thus making it available for comparison during a subsequent LQ snoop 5193, e.g., at block 5814 below and at block 5704 of FIG. 57. Operation proceeds to block 5812.

At block 5812, the first copy of the line of memory at PMLA Y is removed from the L1 data cache 103. For example, the first copy of the cache line may be removed by an external snoop request that results in invalidation of the entry 201 holding the cache line. For another example, the first copy of the cache line may be replaced by another cache line, i.e., the entry 201 holding the first copy of the cache line may be filled with a copy of another line of memory (e.g., at block 5814 below). The removal of the first copy of the line of memory at PMLA Y creates the possibility of a SALLOV, e.g., in the event that the line of memory at PMLA Y were to be updated by the other processor, and then a copy of the updated line of memory ("new data") were subsequently filled into the L1 data cache 103 (e.g., at block 5814 below), and then the older load instruction was to execute and receive the new data from the filled entry 201. Operation proceeds to block 5814.

At block 5814, a virtual address (e.g., specified by a load/store instruction or a prefetch) that translates to PMLA Y misses in the L1 data cache 103, which triggers operation of FIG. 57 and results in a second copy of a line of memory (new data) at PMLA Y being filled into the L1 data cache 103 at block 5704. In the alternate embodiment in which the L1 data cache 103 is physically-indexed and physically-tagged (i.e., the processor 100 includes the L1 TLB 5141 of FIG. 51), the PMLA Y misses in the L1 data cache 103, which triggers operation of FIG. 57 and results in a second copy of a line of memory (new data) at PMLA Y being filled into the L1 data cache 103. Operation proceeds to block 5816.

At block 5816, in the example, the condition determined at block 5706 is true. That is, at the time of the LQ snoop 5193: (1) the younger load instruction had completed execution and therefore the LQ snoop 5193 with PMLA Y at block 5704 matched the load PMLA 5205 of the LQ entry 2901 allocated to the younger load instruction, and (2) the older load instruction had not yet completed execution and therefore the older load instruction had not hit in L1 data cache 103 and had not received PMLA Y and had not written PMLA Y to load PMLA 5205 of the LQ entry 2901 allocated to the older load instruction. As a result of operation of FIG. 57 (e.g., blocks 5712, 5714 and 5716), a flush boundary is determined before the oldest load instruction that has not completed execution, resulting in both the younger and older load instructions being flushed. The older and younger load instructions will subsequently be re-fetched and re-executed during which they will both receive their load data from the new data filled into the L1 data cache 103 at block 5814.

As illustrated by the example of FIG. 58, a SALLOV was prevented according to the operation of FIG. 57, i.e., the younger load instruction does not commit to architectural state load data that is older than load data committed to architectural state by the older load instruction. Advantageously, the SALLOV was prevented by the embodiments described without logic to check for SALLOVs during execution of load instructions. Instead, the check for SALLOV prevention is performed at the time of the fill return into the L1 data cache 103. In one embodiment, a single fill return 3297 may be performed per clock cycle, which requires a single CAM port to perform the corresponding LQ snoop 5193. More specifically, advantageously the SALLOV was prevented by the embodiments described without the need for N CAM ports in the load queue 125 to enable N different load instructions, during their concurrent execution, to CAM concurrently against the load queue 125 to prevent a SALLOV as in a conventional processor, as described above. Given that load executions tend to occur much more frequently than cache line fills, the absence of logic to check for SALLOVs during execution of load instructions may result in reduced power consumption relative to a conventional processor. Additionally, the absence of logic to check for SALLOVs during execution of load instructions may also result in reduced size relative to a conventional processor. Finally, the embodiments described, unlike a conventional processor, accomplish SALLOV prevention without the need to mark load queue entries that match an external snoop request physical address, as described above, which may further reduce size and power consumption relative to a conventional processor.

To illustrate the need for atomicity as described above with respect to block 5704 of FIG. 57, assume for the moment that the processor 100 is configured such that the fill and LQ snoop 5193 are not atomic, i.e., the LQ snoop 5193 occurs after the fill and that a load instruction is able to hit on the filled entry 201 before the LQ snoop 5193. Further assume that, before the old data is removed, a first load instruction older than the flush boundary 1117 completes execution and receives old data and writes PMLA Y to its load PMLA 5205 and sets the Done flag 2936 before the LQ snoop 5193. Further assume that, after the fill, a second load instruction older than the flush boundary 1117 and older than the first load instruction completes execution and receives new data and writes PMLA Y to its load PMLA 5205 and sets the Done flag 2936 before the LQ snoop 5193. In the embodiment of FIG. 57, the flush boundary 1117 is selected before the oldest load instruction that has not completed execution at block 5714. Thus, these two load instructions, being older than the flush boundary 1117, would not be flushed and would constitute a SALLOV. However, because the processor 100 is configured, according to block 5704, to either perform the LQ snoop 5193 before the fill or to perform the fill and the LQ snoop 5193 atomically, the LQ 125 state obtained by the LQ snoop 5193 will indicate the second load in the example above has not completed execution. Therefore, the condition determined at block 5706 will be satisfied, and the flush boundary 1117 determined at block 5714 will be at least before the second load instruction, such that both the first and second load instructions will be flushed and a SALLOV will be prevented. Stated alternatively, the performance of the LQ snoop 5193 before the fill or atomically therewith ensures that the state of the LQ 125 captured by the LQ snoop 5193 reflects any outstanding load/store instructions that have completed execution and obtained old data at PMLA Y and does not reflect any outstanding load/store instructions that could complete execution after the fill and obtain new data at PMLA Y, which enables the LSU 117 to determine whether there is a possibility of a SALLOV and, if so, to signal the need for a SALLOV abort 5101 at block 5712 to prevent a SALLOV.

Figure 59:
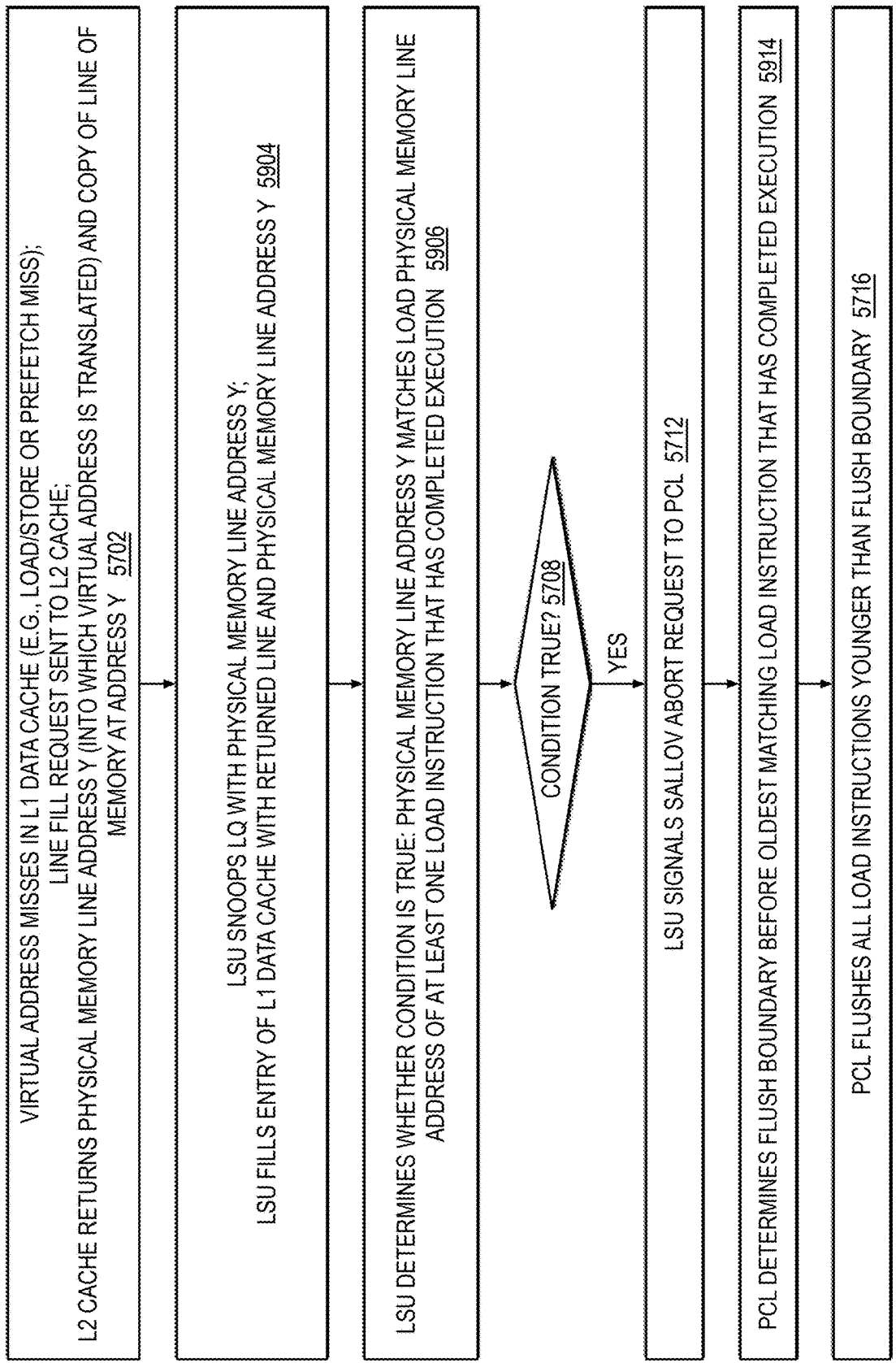

FIG. 59 is an example flowchart illustrating operation of the processor 100 of FIG. 1 to accomplish SALLOV prevention in accordance with an alternate embodiment of the present disclosure. In the embodiment of FIG. 59, a location for the flush boundary is determined that is different from the flush boundary determined in FIG. 57. The operation of the processor 100 according to the embodiment of FIG. 59 is similar in many respects to the operation of the embodiment of FIG. 57. Operation of FIG. 59 begins at block 5702, as in FIG. 57, and proceeds to block 5904.

At block 5904, in response to the fill return 3297, the LSU 117 performs a LQ snoop 5193 to snoop the load queue 125 with PMLA Y, which is the physical memory line address of the copy of the line of memory provided by the fill return 3297. Additionally, the LSU 117 performs a fill of an entry 201 of the L1 data cache 103 with the returned copy of the line of memory at PMLA Y and writes the corresponding bits of the returned PMLA Y to the PPA 5609 of the entry 201. Operation proceeds to block 5906.

At block 5906, based on the results of the LQ snoop 5193 at block 5704, the LSU 117 determines whether a condition is true. The condition is that the PMLA of the filled entry 201 (i.e., PMLA Y) matches the load PMLA 5205 of at least one load instruction that has completed execution (i.e., there is not the additional requirement as at block 5706 of FIG. 57 that there is at least one other load instruction that has not completed execution). Operation proceeds from block 5906 to decision block 5708 and then to block 5712 (assuming the condition is true) as in FIG. 57. Operation of FIG. 59 proceeds from block 5712 to block 5914.

At block 5914, in response to the SALLOV abort request 5101, the PCL 132 determines a flush boundary before the oldest load instruction that has completed execution and whose load PMLA 5205 matches the physical memory line address of the copy of the line of memory provided by the fill return 3297 at block 5702 and with which the load queue 125 was snooped at block 5704. Operation proceeds to block 5716.

At block 5716, the PCL 132 flushes all load instructions younger than the flush boundary.

Figure 60:
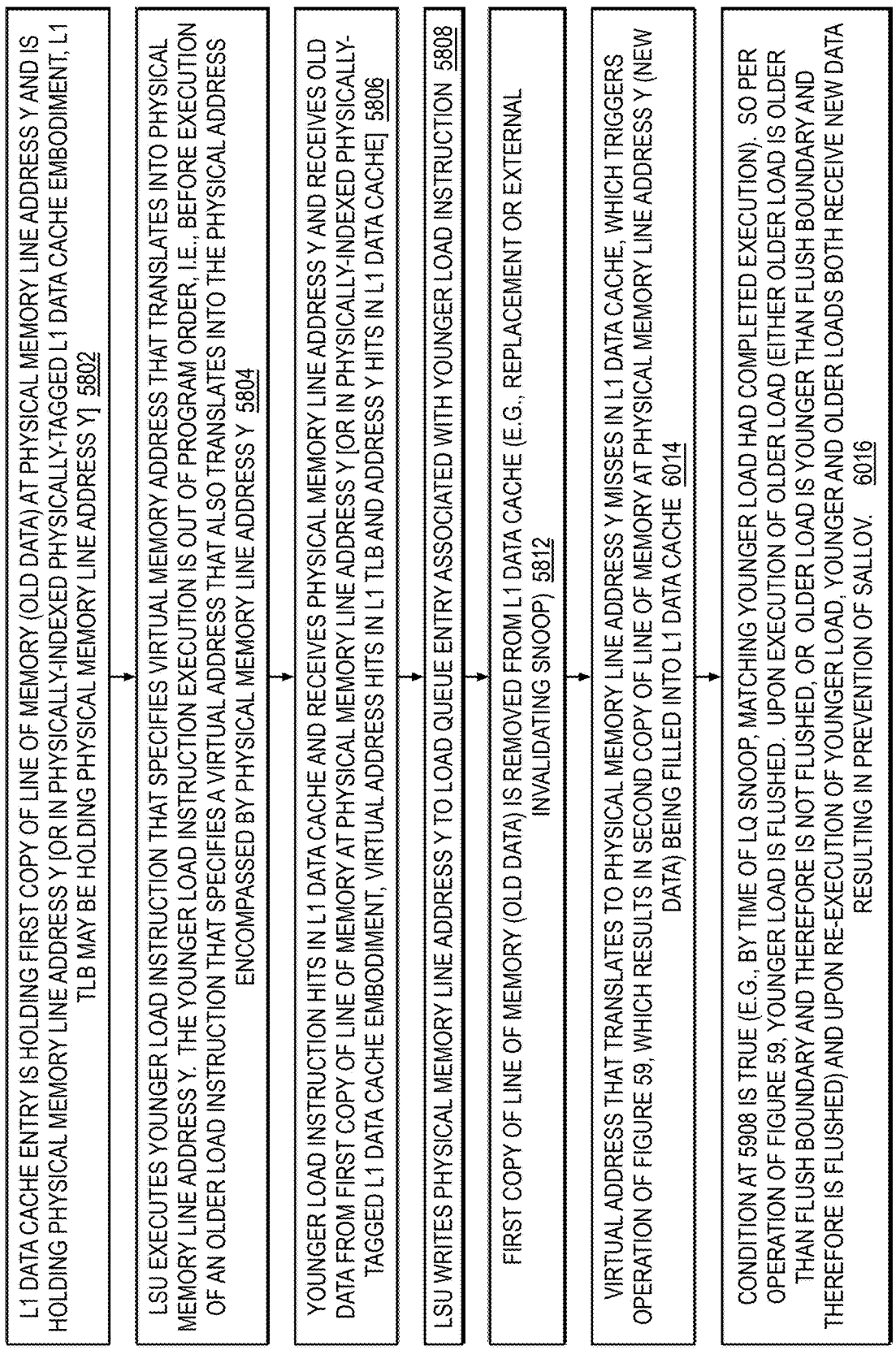

FIG. 60 is an example flowchart illustrating operation of the processor 100 of FIG. 1 to accomplish SALLOV prevention in accordance with an alternate embodiment of the present disclosure. The operation of the processor 100 according to the embodiment of FIG. 60 is similar in many respects to the operation of the embodiment of FIG. 58. Operation of FIG. 60 begins at block 5802 and proceeds to block 5804, then to block 5806, then to block 5808, then to block 5812, as in FIG. 58. From block 5812, operation of FIG. 60 proceeds from block 5812 to block 6014.

At block 6014, a virtual address (e.g., specified by a load/store instruction or a prefetch) that translates to PMLA Y misses in the L1 data cache 103, which triggers operation of FIG. 59 and results in a second copy of a line of memory ("new data") at PMLA Y being filled into the L1 data cache 103. In the alternate embodiment in which the L1 data cache 103 is physically-indexed and physically-tagged (i.e., the processor 100 includes the L1 TLB 5141 of FIG. 51), the PMLA Y misses in the L1 data cache 103, which triggers operation of FIG. 57 and results in a second copy of a line of memory ("new data") at PMLA Y being filled into the L1 data cache 103. Operation proceeds to block 6016.

At block 6016, in the example, the condition determined at block 5906 is true. That is, at the time of the LQ snoop 5193 the younger load instruction had completed execution and therefore the LQ snoop 5193 with PMLA Y at block 5704 matched the load PMLA 5205 of the LQ entry 2901 allocated to the younger load instruction. As a result of operation of FIG. 59 (e.g., blocks 5712, 5914 and 5716), a flush boundary is determined before the oldest load instruction that has completed execution and whose load PMLA 5205 matches the PMLA (i.e., PMLA Y) of the entry 201 filled at block 6014, resulting in the younger load instruction being flushed. The younger load instruction will subsequently be re-fetched and re-executed during which it will receive its load data from the new data filled into the L1 data cache 103 at block 6014. If the older load instruction is older than the flush boundary, it will eventually execute and receive its load data from the new data filled into the L1 data cache 103 at block 6014. If the older load instruction is younger than the flush boundary, it will subsequently be re-fetched and re-executed during which it will receive its load data from the new data filled into the L1 data cache 103 at block 6014. So, in either case, a SALLOV is prevented because both the older and younger load instructions receive the new data.

As illustrated by the example of FIG. 60, a SALLOV was prevented according to the operation of FIG. 59, i.e., the younger load instruction does not commit to architectural state load data that is older than load data committed to architectural state by the older load instruction. Advantageously, as described above with respect to FIG. 58, the SALLOV was prevented by the embodiments described without the need for logic to check for SALLOVs during execution of load instructions but instead checks for SALLOV prevention at the time of the fill return into the L1 data cache 103 and accomplishes SALLOV prevention with similar advantages.

Embodiments of the processor 100 described with respect to FIGS. 51 through 60 do not employ PAPs and perform SALLOV prevention using physical memory line addresses. Embodiments will now be described in which the processor 100 uses PAPs and performs SALLOV prevention using PAPs. More specifically, embodiments described above that perform PAP reuse management by performing a PAP reuse snoop request and performing a PAP reuse abort if needed, as described above primarily with respect to FIGS. 33 through 38B, may advantageously operate to prevent a SALLOV without additional logic, as will now be described.

Figure 61:
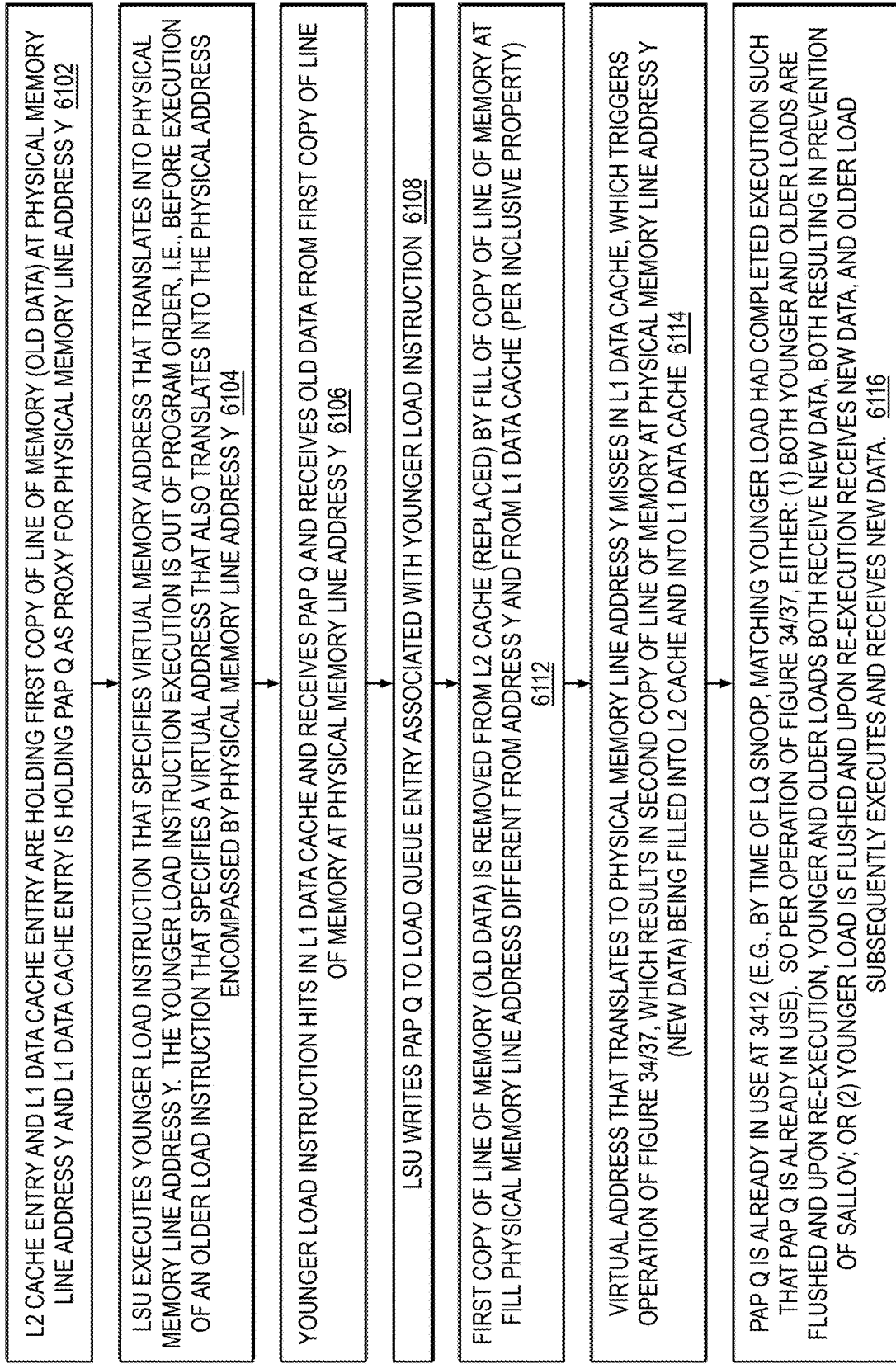

FIG. 61 is an example flowchart illustrating operation of the processor 100 of FIG. 1 to accomplish SALLOV prevention in accordance with embodiments of the present disclosure. Operation begins at block 6102.

At block 6102, an entry 401 of the L2 cache 107 and an entry 201 of the L1 data cache 103 are holding a first copy of a line of memory at a PMLA Y, which is referred to as "old data" in the example. Additionally, the entry 201 of the L1 data cache 103 is holding a PAP, referred to in the example as "PAP Q," that is a proxy for PMLA Y. More specifically, the entry 201 of the L1 data cache 103 is holding the dPAP 209 portion of PAP Q (i.e., the L2 way [1:0] and PA[16:12]), and the remaining bits of PAP Q (i.e., PA[11:6]) are the untranslated bits VA[11:6] of a load/store virtual address 321 used to access the L1 data cache 103. Operation proceeds to block 6104.

At block 6104, the LSU 117 executes a younger load instruction that specifies a virtual address that translates into PMLA Y. The execution of the younger load instruction is out of program order with respect to execution of an older load instruction that specifies a virtual address that also translates into the PMLA Y, which presents the possibility of a SALLOV. Operation proceeds to block 6106.

At block 6106, the younger load instruction, during its execution, hits in the L1 data cache 103 and receives load data, i.e., old data, from the hit entry 201. Additionally, the younger load instruction receives PAP Q, i.e., the dPAP 209 of the hit entry 201 and the untranslated virtual address bits VA[11:6]. Operation proceeds to block 6108.

At block 6108, the LSU 117 writes PAP Q to the load PAP 2904 of the LQ entry 2901 of FIG. 29 allocated to the younger load instruction and sets the Done flag 2936 to indicate the load instruction has completed execution, thus making it available for comparison during a subsequent LSQ snoop 3193, e.g., at block 6114 below and at block 3406 of FIG. 34 or FIG. 37. Operation proceeds to block 6112.

At block 6112, the first copy of the line of memory at PMLA Y is removed from the L2 cache 107. More specifically, the first copy of the cache line is replaced by another cache line, i.e., the entry 401 holding the first copy of the cache line is filled with a copy of another line of memory at a fill physical memory line address different from PMLA Y (e.g., at block 6114 below), which triggers operation of the processor 100 according to FIG. 34. Additionally, consistent with the policy that the L2 cache 107 is inclusive of the L1 data cache 103, the first copy of the line of memory at PMLA Y is also removed (evicted) from the L1 data cache 103 (e.g., at block 3405). The removal of the first copy of the line of memory at PMLA Y creates the possibility of a SALLOV, e.g., in the event that the line of memory at PMLA Y were to be updated by the other processor, and then a copy of the updated line of memory at PMLA Y ("new data") were subsequently filled into the L1 data cache 103 (e.g., at block 6114 below), and then the older load instruction was to execute and receive the new data from the filled entry 201. Operation proceeds to block 6114.

At block 6114, a virtual address (e.g., specified by a load/store instruction or a prefetch) that translates to PMLA Y misses in the L1 data cache 103, which triggers operation of FIG. 34 or FIG. 37 and results in a second copy of a line of memory (new data) at PMLA Y being filled into the L2 cache 107 at block 3408 of FIG. 34/37 and into the L1 data cache 103 at block 3418 of FIG. 34/37. Operation proceeds to block 6116.

At block 6116, in the example, PAP Q is already in use at block 3412 of FIG. 34/37. That is, at the time of the LSQ snoop 3193, the younger load instruction had completed execution and therefore the LSQ snoop 3193 with PAP Q at block 3406 matched the load PAP 2904 of the LQ entry 2901 allocated to the younger load instruction. Additionally, the older load instruction had not yet completed execution and therefore the older load instruction had not hit in L1 data cache 103 and had not received PAP Q and had not written PAP Q to load PAP 2904 of the LQ entry 2901 allocated to the older load instruction. As a result of operation of FIG. 34/37 (e.g., blocks 3414, 3416 and 3422), a flush boundary is determined. In the embodiment in which the flush boundary is determined at block 3416 to be before the oldest load/store instruction that has not completed execution, both the younger and older load instructions are flushed and will subsequently be re-fetched and re-executed during which they will both receive their load data from the new data filled into the L1 data cache 103 at block 6114. In the embodiment in which the flush boundary is determined at block 3416 to be before the oldest matching load/store instruction that has completed execution: (1) in the case that the younger load instruction is the oldest matching completed load, then the younger load instruction will be flushed and the older load instruction will eventually execute and receive new data, and the younger load will subsequently be re-fetched and re-executed during which it will receive new data; (2) in the case that the oldest matching completed load is older than the older load instruction, then both the younger and the older load instructions will be flushed and will subsequently be re-fetched and re-executed during which they will both receive new data.

Figure 62:
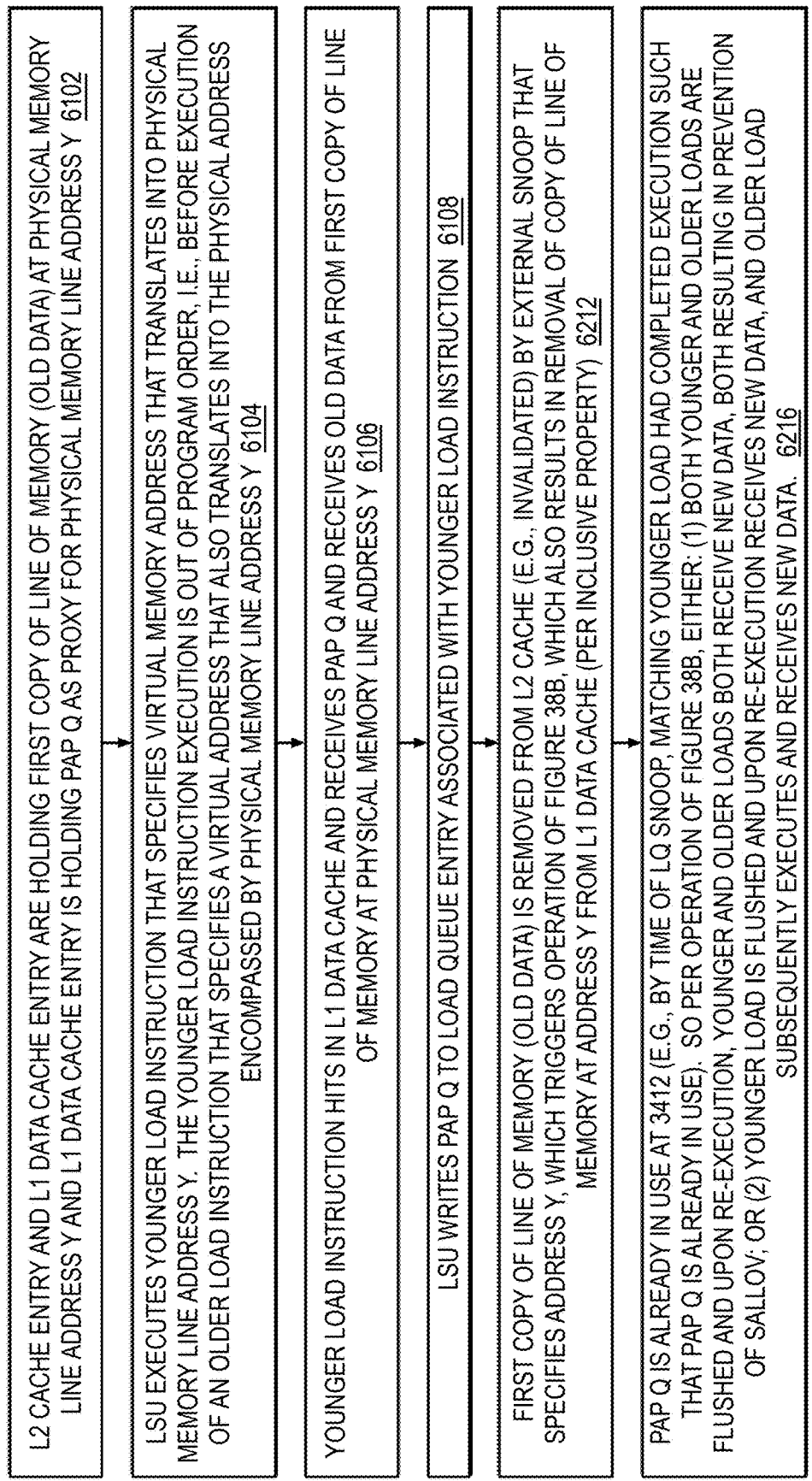

FIG. 62 is an example flowchart illustrating operation of the processor 100 of FIG. 1 to accomplish SALLOV prevention in accordance with embodiments of the present disclosure. Operation according to FIG. 62 is similar in many respects to operation according to FIG. 61. However, whereas FIG. 61 describes operation in which the copy of the line of memory is removed by replacement and the SALLOV is prevented via operation of FIG. 34 or 37, FIG. 62 describes operation in which the copy of the line of memory is removed by invalidation by an external snoop request, and the SALLOV is prevented via operation of FIG. 38B. Operation begins at block 6102 and proceeds to block 6104 then to block 6106 then to block 6108 as described with respect to FIG. 61. From block 6108, operation proceeds to block 6212.

At block 6212, the first copy of the line of memory at PMLA Y is removed from the L2 cache 107. More specifically, the entry 401 holding the first copy of the cache line is invalidated in response to an external snoop request that specifies PMLA Y, which triggers operation of the processor 100 according to FIG. 38B. Additionally, consistent with the policy that the L2 cache 107 is inclusive of the L1 data cache 103, the first copy of the line of memory at PMLA Y is also removed (evicted) from the L1 data cache 103 (e.g., at block 3405). The removal of the first copy of the line of memory at PMLA Y creates the possibility of a SALLOV, e.g., in the event that the line of memory at PMLA Y were to be updated by the other processor, and then a copy of the updated line of memory at PMLA Y ("new data") were subsequently filled into the L1 data cache 103, and then the older load instruction was to execute and receive the new data from the filled entry 201. Operation proceeds to block 6216.

At block 6216, in the example, PAP Q is already in use at block 3412 of FIG. 38B. That is, at the time of the LSQ snoop 3193, the younger load instruction had completed execution and therefore the LSQ snoop 3193 with PAP Q at block 3406 matched the load PAP 2904 of the LQ entry 2901 allocated to the younger load instruction. Additionally, the older load instruction had not yet completed execution and therefore the older load instruction had not hit in L1 data cache 103 and had not received PAP Q and had not written PAP Q to load PAP 2904 of the LQ entry 2901 allocated to the older load instruction. As a result of operation of FIG. 38B (e.g., blocks 3414, 3416 and 3422), a flush boundary is determined. In the embodiment in which the flush boundary is determined at block 3416 to be before the oldest load/store instruction that has not completed execution, both the younger and older load instructions are flushed and will subsequently be re-fetched and re-executed during which they will both receive their load data from new data filled into the L1 data cache 103. In the embodiment in which the flush boundary is determined at block 3416 to be before the oldest matching load/store instruction that has completed execution: (1) in the case that the younger load instruction is the oldest matching completed load, then the younger load instruction will be flushed and the older load instruction will eventually execute and receive new data, and the younger load will subsequently be re-fetched and re-executed during which it will receive new data; (2) in the case that the oldest matching completed load is older than the older load instruction, then both the younger and the older load instructions will be flushed and will subsequently be re-fetched and re-executed during which they will both receive new data.

Figure 63:
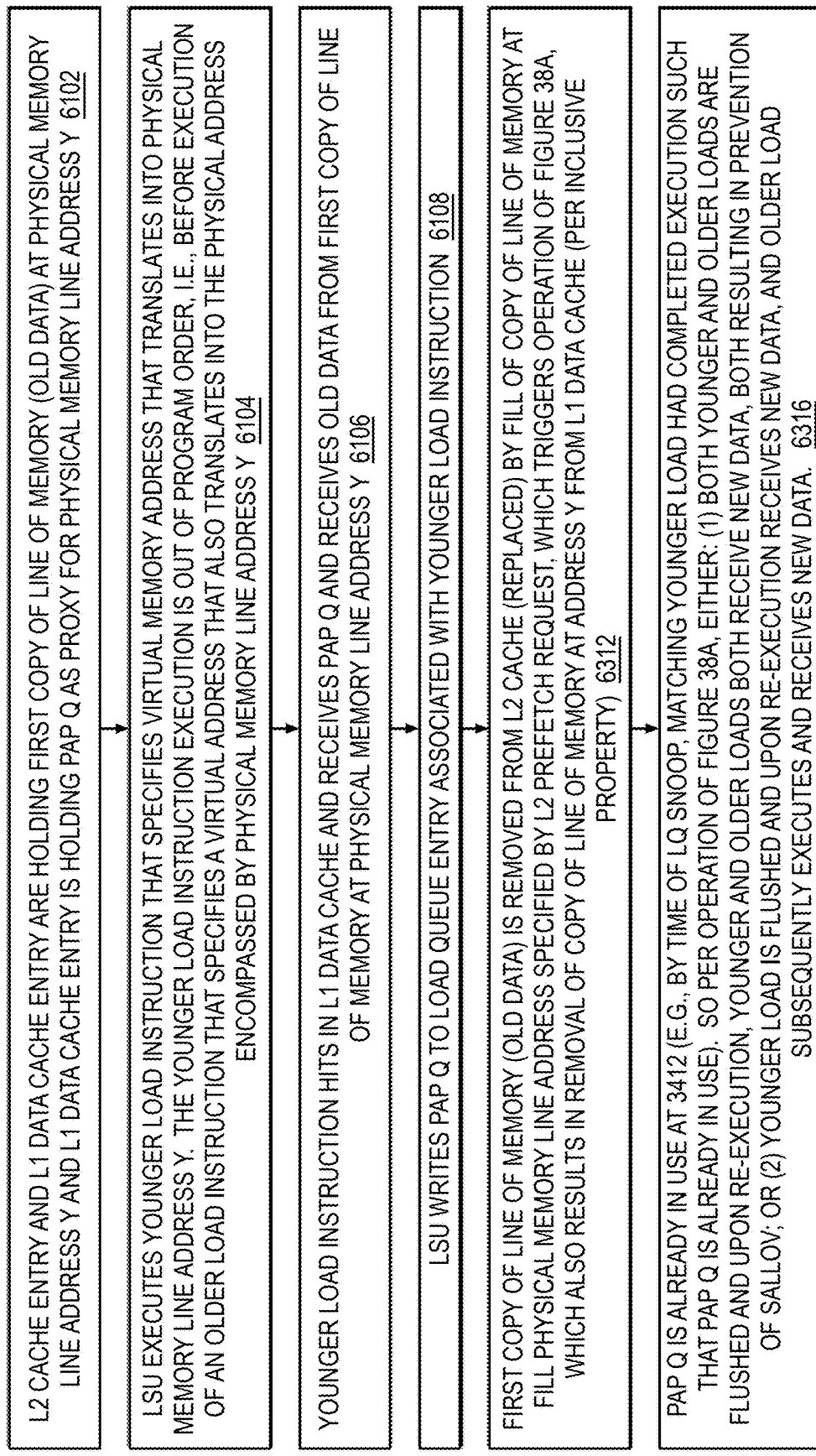

FIG. 63 is an example flowchart illustrating operation of the processor 100 of FIG. 1 to accomplish SALLOV prevention in accordance with embodiments of the present disclosure. Operation according to FIG. 63 is similar in many respects to operation according to FIG. 62. However, whereas FIG. 62 describes operation in which the copy of the line of memory is removed by invalidation by an external snoop request and the SALLOV is prevented via operation of FIG. 38B, FIG. 63 describes operation in which the copy of the line of memory is removed by replacement precipitated by a prefetch request to the L2 cache 107, and the SALLOV is prevented via operation of FIG. 38A. Operation begins at block 6102 and proceeds to block 6104 then to block 6106 then to block 6108 as described with respect to FIG. 61. From block 6108, operation proceeds to block 6312.

At block 6312, the first copy of the line of memory at PMLA Y is removed from the L2 cache 107. More specifically, the first copy of the cache line is replaced by another cache line, i.e., the entry 401 holding the first copy of the cache line is filled with a copy of another line of memory at a fill physical memory line address different from PMLA Y specified by a prefetch request to the L2 cache 107, which triggers operation of the processor 100 according to FIG. 38A. Additionally, consistent with the policy that the L2 cache 107 is inclusive of the L1 data cache 103, the first copy of the line of memory at PMLA Y is also removed (evicted) from the L1 data cache 103 (e.g., at block 3405). The removal of the first copy of the line of memory at PMLA Y creates the possibility of a SALLOV, e.g., in the event that the line of memory at PMLA Y were to be updated by the other processor, and then a copy of the updated line of memory at PMLA Y ("new data") were subsequently filled into the L1 data cache 103, and then the older load instruction was to execute and receive the new data from the filled entry 201. Operation proceeds to block 6316.

At block 6316, in the example, PAP Q is already in use at block 3412 of FIG. 38A. That is, at the time of the LSQ snoop 3193, the younger load instruction had completed execution and therefore the LSQ snoop 3193 with PAP Q at block 3406 matched the load PAP 2904 of the LQ entry 2901 allocated to the younger load instruction. Additionally, the older load instruction had not yet completed execution and therefore the older load instruction had not hit in L1 data cache 103 and had not received PAP Q and had not written PAP Q to load PAP 2904 of the LQ entry 2901 allocated to the older load instruction. As a result of operation of FIG. 38A (e.g., blocks 3414, 3416 and 3422), a flush boundary is determined. In the embodiment in which the flush boundary is determined at block 3416 to be before the oldest load/store instruction that has not completed execution, both the younger and older load instructions are flushed and will subsequently be re-fetched and re-executed during which they will both receive their load data from new data filled into the L1 data cache 103. In the embodiment in which the flush boundary is determined at block 3416 to be before the oldest matching load/store instruction that has completed execution: (1) in the case that the younger load instruction is the oldest matching completed load, then the younger load instruction will be flushed and the older load instruction will eventually execute and receive new data, and the younger load will subsequently be re-fetched and re-executed during which it will receive new data; (2) in the case that the oldest matching completed load is older than the older load instruction, then both the younger and the older load instructions will be flushed and will subsequently be re-fetched and re-executed during which they will both receive new data.

As illustrated by the examples of FIGS. 61 through 63, a SALLOV was prevented according to the operation of FIGS. 34, 37, 38A and 38B, i.e., the younger load instruction does not commit to architectural state load data that is older than load data committed to architectural state by the older load instruction. Advantageously, the SALLOV was prevented by the embodiments described without logic to check for SALLOVs during execution of load instructions. Instead, the check for SALLOV prevention is performed at the time of the fill return into the L1 data cache 103. In one embodiment, a single fill return 3297 of FIG. 32 may be performed per clock cycle, which requires a single CAM port in the load queue 125 to perform the corresponding LSQ snoop 3193. More specifically, advantageously the SALLOV was prevented by the embodiments described without the need for N CAM ports in the load queue 125 to enable N different load instructions, during their concurrent execution, to CAM concurrently against the load queue 125 to prevent a SALLOV as in a conventional processor, as described above. Given that load executions tend to occur much more frequently than cache line fills, the absence of logic to check for SALLOVs during execution of load instructions may result in reduced power consumption relative to a conventional processor. Additionally, the absence of logic to check for SALLOVs during execution of load instructions may also result in reduced size relative to a conventional processor. Finally, the embodiments described, unlike a conventional processor, accomplish SALLOV prevention without the need to mark load queue entries that match an external snoop request physical address, as described above, which may further reduce size and power consumption relative to a conventional processor.

Although embodiments of prevention of a SALLOV have been described with respect to PAP use, other embodiments are contemplated in which the prevention of a SALLOV is similarly performed with respect to generational PAP (GPAP) use.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor, comprising:
   a load/store unit;
   a physically-indexed physically-tagged set-associative cache, wherein each entry in the cache is uniquely identified by a physical address proxy (PAP) that specifies a set index and a way of the cache;
   at least one queue having a plurality of entries, wherein each entry is configured to hold, for an associated load/store instruction to which the entry has been allocated:
      a load/store PAP that identifies a corresponding entry in the cache; and
      for each entry associated with a load/store instruction that comprises a load instruction, forwarding information about store-to-load forwarding with respect to the load instruction;
   wherein the load/store unit is configured to:
      make a comparison of a load/store PAP comprising a store PAP associated with a store instruction with the load/store PAP comprising a load PAP of each valid entry of the at least one queue whose associated load instruction is younger in program order than the store instruction; and
      use the comparison, along with the associated forwarding information, to make a store-to-load forwarding correctness check with respect to each younger load instruction.

2. The microprocessor of claim 1,
   wherein the load/store unit is configured to make the comparison of the store PAP associated with the store instruction with the load PAP of each valid entry of the at least one queue whose associated load instruction is younger in program order than the store instruction rather than making a comparison of corresponding physical memory line addresses associated with the store and load instructions, respectively.

3. The microprocessor of claim 1,
   wherein to make the store-to-load forwarding correctness check, the load/store unit selectively updates the forwarding information; and
   wherein the forwarding information cumulatively indicates, as each older store instruction is committed, whether the load/store unit performed a store-to-load forwarding violation with respect to a younger load instruction.

4. The microprocessor of claim 1,
wherein the load/store unit is further configured to, for each load instruction of the younger load instructions:
  determine when all store instructions older in program order than the load instruction have committed and the load instruction has become the oldest outstanding load/store instruction; and
  if the store-to-load forwarding correctness checks indicate the load/store unit performed a store-to-load forwarding violation with respect to the load instruction:
    signal a request to abort the load instruction and all instructions younger in program order than the load instruction; and
    otherwise, commit the load instruction.

5. The microprocessor of claim 1,
wherein the forwarding information identifies a store instruction, if any, from which store data was forwarded to the associated load instruction.

6. The microprocessor of claim 1,
wherein the load/store unit is configured to make the comparison and use the comparison when committing a store instruction; and
specified by the store instruction to another cache memory of the microprocessor.

7. The microprocessor of claim 1,
wherein each entry associated with a load/store instruction that comprises a store instruction is further configured to hold additional store address and size information that indicates a location and size of store data within a memory line specified by a store physical memory line address for which a corresponding store PAP is a proxy;
wherein each entry associated with a load/store instruction that comprises a load instruction is further configured to hold additional load address and size information that indicates a location and size of load data within a memory line specified by a load physical memory line address for which a corresponding load PAP is a proxy; and
wherein the comparison further includes comparing the additional store address and size information with the additional load address and size information of each valid entry of the at least one queue whose associated load/store instruction comprises a load instruction that is younger in program order than the load/store instruction comprising a store instruction.

8. A method, comprising:
in a microprocessor comprising:
  a load/store unit;
  a physically-indexed physically-tagged set-associative cache, wherein each entry in the cache is uniquely identified by a physical address proxy (PAP) that specifies a set index and a way of the cache;
  at least one queue having a plurality of entries, wherein each entry is configured to hold, for an associated load/store instruction to which the entry has been allocated:
    a load/store PAP that identifies a corresponding entry in the cache; and
    for each entry associated with a load/store instruction that comprises a load instruction, forwarding information about store-to-load forwarding with respect to the load instruction;
by the load/store unit:
  making a comparison of a load/store PAP comprising a store PAP associated with a store instruction with the load/store PAP comprising a load PAP of each valid entry of the at least one queue whose associated load instruction is younger in program order than the store instruction; and
  using the comparison, along with the associated forwarding information, to make a store-to-load forwarding correctness check with respect to each younger load instruction.

9. The method of claim 8, further comprising:
said making the comparison of the store PAP associated with the store instruction with the load PAP of each valid entry of the at least one queue whose associated load instruction is younger in program order than the store instruction rather than making a comparison of corresponding physical memory line addresses associated with the store and load instructions, respectively.

10. The method of claim 8,
wherein said using the comparison, along with the associated forwarding information, to make the store-to-load forwarding correctness check, comprises:
  selectively updating the forwarding information, wherein the forwarding information cumulatively indicates, as each older store instruction is committed, whether the load/store unit performed a store-to-load forwarding violation with respect to the load instruction.

11. The method of claim 8,
for each load instruction of the younger load instructions:
  determining when all store instructions older in program order than the load instruction have committed and the load instruction has become the oldest outstanding load/store instruction; and
  if the store-to-load forwarding correctness checks indicate the load/store unit performed a store-to-load forwarding violation with respect to the load instruction:
    signaling a request to abort the load instruction and all instructions younger in program order than the load instruction; and
    otherwise, committing the load instruction.

12. The method of claim 8,
wherein the forwarding information identifies a store instruction, if any, from which store data was forwarded to the associated load instruction.

13. The method of claim 8,
wherein said making the comparison and said using the comparison when committing a store instruction are performed by the load/store unit when committing a store instruction; and
wherein said committing the store instruction comprises writing store data specified by the store instruction to another cache memory of the microprocessor.

14. The method of claim 8,
wherein each entry associated with a load/store instruction that comprises a store instruction is further configured to hold additional store address and size information that indicates a location and size of store data within a memory line specified by a store physical memory line address for which a corresponding store PAP is a proxy;
wherein each entry associated with a load/store instruction that comprises a load instruction is further configured to hold additional load address and size information that indicates a location and size of load data within a memory line specified by a load physical memory line address for which a corresponding load PAP is a proxy; and wherein said making the comparison further includes comparing the additional store address and size information with the additional load address and size information of each valid entry of the at least one queue whose associated load/store instruction comprises a load instruction that is younger in program order than the load/store instruction comprising a store instruction.

15. A non-transitory computer-readable medium having instructions stored thereon that are capable of causing or configuring a microprocessor comprising:
  a load/store unit;
  a physically-indexed physically-tagged set-associative cache, wherein each entry in the cache is uniquely identified by a physical address proxy (PAP) that specifies a set index and a way of the cache;
  at least one queue having a plurality of entries, wherein each entry is configured to hold, for an associated load/store instruction to which the entry has been allocated:
    a load/store PAP that identifies a corresponding entry in the cache; and
    for each entry associated with a load/store instruction that comprises a load instruction, forwarding information about store-to-load forwarding with respect to the load instruction;
  wherein the load/store unit is configured to:
    make a comparison of a load/store PAP comprising a store PAP associated with a store instruction with the load/store PAP comprising a load PAP of each valid entry of the at least one queue whose associated load instruction is younger in program order than the store instruction; and
    use the comparison, along with the associated forwarding information, to make a store-to-load forwarding correctness check with respect to each younger load instruction.

16. The non-transitory computer-readable medium of claim 15,
  wherein the load/store unit is configured to make the comparison of the store PAP associated with the store instruction with the load PAP of each valid entry of the at least one queue whose associated load instruction is younger in program order than the store instruction rather than making a comparison of corresponding physical memory line addresses associated with the store and load instructions, respectively.

17. The non-transitory computer-readable medium of claim 15,
  wherein to make the store-to-load forwarding correctness check, the load/store unit selectively updates the forwarding information; and
  wherein the forwarding information cumulatively indicates, as each older store instruction is committed, whether the load/store unit performed a store-to-load forwarding violation with respect to a younger load instruction.

18. The non-transitory computer-readable medium of claim 15,
  wherein the load/store unit is further configured to, for each load instruction of the younger load instructions:
    determine when all store instructions older in program order than the load instruction have committed and the load instruction has become the oldest outstanding load/store instruction; and
    if the store-to-load forwarding correctness checks indicate the load/store unit performed a store-to-load forwarding violation with respect to the load instruction:
      signal a request to abort the load instruction and all instructions younger in program order than the load instruction; and
    otherwise, commit the load instruction.

19. The non-transitory computer-readable medium of claim 15,
  wherein the forwarding information identifies a store instruction, if any, from which store data was forwarded to the associated load instruction.

20. The non-transitory computer-readable medium of claim 15,
  wherein the load/store unit is configured to make the comparison and use the comparison when committing a store instruction; and
  specified by the store instruction to another cache memory of the microprocessor.

21. The non-transitory computer-readable medium of claim 15,
  wherein each entry associated with a load/store instruction that comprises a store instruction is further configured to hold additional store address and size information that indicates a location and size of store data within a memory line specified by a store physical memory line address for which a corresponding store PAP is a proxy;
  wherein each entry associated with a load/store instruction that comprises a load instruction is further configured to hold additional load address and size information that indicates a location and size of load data within a memory line specified by a load physical memory line address for which a corresponding load PAP is a proxy; and
  wherein the comparison further includes comparing the additional store address and size information with the additional load address and size information of each valid entry of the at least one queue whose associated load/store instruction comprises a load instruction that is younger in program order than the load/store instruction comprising a store instruction.

* * * * *

UNITED STATES PATENT AND TRADEMARK OFFICE
CERTIFICATE OF CORRECTION

PATENT NO. : 12,487,936 B1
APPLICATION NO. : 18/886590
DATED : December 2, 2025
INVENTOR(S) : Favor et al.

Page 1 of 3

It is certified that error appears in the above-identified patent and that said Letters Patent is hereby corrected as shown below:

On the Title Page

In Item (72), under "Inventors", in Column 1, Line 1, delete "G" and insert -- G. --, therefor.

On Page 2, below "Related U.S. Application Data", Line 1, insert -- (60) Provisional application No. 63/331,487, filed on Apr. 15, 2022, provisional application No. 63/271,934, filed on Oct. 26, 2021. --, therefor.

In the Specification

In Column 1, Line 11, delete "2022;" and insert -- 2022, now U.S. Pat. No. 12,093,179, --, therefor.

In Column 1, Line 18, delete "2021," and insert -- 2021, now U.S. Pat. No. 11,481,332, --, therefor.

In Column 1, Line 20, delete "2021," and insert -- 2021, now U.S. Pat. No. 11,416,406, --, therefor.

In Column 1, Line 22, delete "2021," and insert -- 2021, now U.S. Pat. No. 11,397,686, --, therefor.

In Column 1, Line 24, delete "2021;" and insert -- 2021, now U.S. Pat. No. 11,416,400, --, therefor.

In Column 20, Line 66, delete "L1hit" and insert -- L1 hit --, therefor.

In Column 21, Line 19, delete "L1hit" and insert -- L1 hit --, therefor.

In Column 38, Line 3, delete "103." and insert -- 103 to --, therefor.

In Column 41, Line 33, delete "such as" and insert -- such a --, therefor.

Signed and Sealed this
Third Day of February, 2026

John A. Squires
*Director of the United States Patent and Trademark Office*

In Column 42, Line 22, delete "Fwding Viol" and insert -- FwdingViol --, therefor.

In Column 42, Lines 22-23, delete "Fwding ViolStId" and insert -- FwdingViolStId --, therefor.

In Column 42, Line 29, delete "Fwding ViolStId" and insert -- FwdingViolStId --, therefor.

In Column 44, Line 7, delete "Fwding Viol" and insert -- FwdingViol --, therefor.

In Column 44, Line 8, delete "Fwding ViolStId" and insert -- FwdingViolStId --, therefor.

In Column 44, Line 17, delete "Fwding Viol" and insert -- FwdingViol --, therefor.

In Column 44, Line 21, delete "Fwding Viol" and insert -- FwdingViol --, therefor.

In Column 44, Line 25, delete "Fwding Viol" and insert -- FwdingViol --, therefor.

In Column 44, Line 26, delete "Fwding Viol" and insert -- FwdingViol --, therefor.

In Column 44, Line 28, delete "Fwding ViolStId" and insert -- FwdingViolStId --, therefor.

In Column 44, Line 29, delete "Fwding Viol" and insert -- FwdingViol --, therefor.

In Column 44, Lines 31-32, delete "Fwding ViolStId" and insert -- FwdingViolStId --, therefor.

In Column 45, Line 56, delete "Fwding Viol" and insert -- FwdingViol --, therefor.

In Column 46, Line 23, delete "Fwding Viol" and insert -- FwdingViol --, therefor.

In Column 46, Line 41, delete "occur did" and insert -- did --, therefor.

In Column 48, Line 6, delete "Fwding Viol" and insert -- FwdingViol --, therefor.

In Column 51, Line 53, delete "Fwding Viol" and insert -- FwdingViol --, therefor.

In Column 51, Line 54, delete "Fwding ViolStId" and insert -- FwdingViolStId --, therefor.

In Column 60, Line 50, delete "L2way [1:0]," and insert -- L2way[1:0], --, therefor.

In Column 72, Line 6, delete "L2way [1:0]" and insert -- L2way[1:0] --, therefor.

In Column 72, Line 6, delete "L2way [1:0]." and insert -- L2way[1:0]. --, therefor.

In Column 72, Line 23, delete "L1hit" and insert -- L1 hit --, therefor.

CERTIFICATE OF CORRECTION (continued)
U.S. Pat. No. 12,487,936 B1

In the Claims

In Column 91, Line 23, in Claim 6, delete "and" and insert
-- and
wherein the
committing the store instruction comprises writing store data --, therefor.

In Column 94, Line 28, in Claim 20, delete "and" and insert
-- and
wherein the
committing the store instruction comprises writing store data --, therefor.